United States Patent
Hicks et al.

(10) Patent No.: US 11,698,845 B2
(45) Date of Patent: *Jul. 11, 2023

(54) EVALUATION RATING OF A SYSTEM OR PORTION THEREOF

(71) Applicant: UncommonX Inc., Chicago, IL (US)

(72) Inventors: Raymond Hicks, Chicago, IL (US); Ryan Michael Pisani, Burlington, WI (US); Thomas James McNeela, Streamwood, IL (US)

(73) Assignee: UncommonX Inc., Chicago, IL (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/128,509

(22) Filed: Dec. 21, 2020

(65) Prior Publication Data

US 2021/0294902 A1 Sep. 23, 2021

Related U.S. Application Data

(60) Provisional application No. 62/992,661, filed on Mar. 20, 2020.

(51) Int. Cl.
 *G06F 11/26* (2006.01)
 *G06F 16/23* (2019.01)
 (Continued)

(52) U.S. Cl.
 CPC ............ *G06F 11/26* (2013.01); *G06F 11/076* (2013.01); *G06F 11/079* (2013.01);
 (Continued)

(58) Field of Classification Search
 CPC ............ G06F 2221/034; G06F 21/577; G06F 11/3668; G06F 11/3495; G06F 11/3476;
 (Continued)

(56) References Cited

U.S. PATENT DOCUMENTS 7,934,253 B2   4/2011  Overcash
9,336,268 B1 * 5/2016  Moudy ................ G06N 3/0445
(Continued)

FOREIGN PATENT DOCUMENTS

KR   1020180106533 A   10/2018

OTHER PUBLICATIONS

International Searching Authority; International Search Report and Written Opinion; International Application No. PCT/US2021/021898; dated Jul. 9, 2021; 8 pgs.

*Primary Examiner* — Josnel Jeudy
(74) *Attorney, Agent, or Firm* — Garlick & Markison; Timothy W. Markison

(57) ABSTRACT

A method for execution by an analysis unit includes obtaining a collection of data for a particular evaluation of a system aspect. The method further includes acquiring data analysis parameters regarding the particular evaluation of the system aspect. The method further includes determining one or more evaluation perspectives based on the data analysis parameters. The method further includes determining one or more evaluation modalities based on the data analysis parameters. The method further includes determining one or more evaluation metrics based on the data analysis parameters. The method further includes evaluating the collection of data in accordance with the one or more evaluation metrics, the one or more evaluation perspectives, and the one or more evaluation modalities to produce one or more evaluation outputs.

28 Claims, 114 Drawing Sheets
(63 of 114 Drawing Sheet(s) Filed in Color)

(51) Int. Cl.
  *H04L 9/40* (2022.01)
  *G06F 11/30* (2006.01)
  *G06F 11/34* (2006.01)
  *G06F 21/57* (2013.01)
  *G06F 11/07* (2006.01)
  *G06Q 10/0639* (2023.01)
  *G06F 11/36* (2006.01)

(52) U.S. Cl.
  CPC ...... *G06F 11/0709* (2013.01); *G06F 11/0793* (2013.01); *G06F 11/3006* (2013.01); *G06F 11/3409* (2013.01); *G06F 11/3476* (2013.01); *G06F 11/3495* (2013.01); *G06F 11/3668* (2013.01); *G06F 16/2379* (2019.01); *G06F 21/577* (2013.01); *G06Q 10/06393* (2013.01); *H04L 63/1416* (2013.01); *H04L 63/1425* (2013.01); *H04L 63/1433* (2013.01); *H04L 63/20* (2013.01); *G06F 2221/034* (2013.01)

(58) Field of Classification Search
  CPC ............ G06F 11/3409; G06F 11/3006; G06F 11/0793; G06F 11/079; G06F 11/076; G06F 11/0709; G06F 11/26; G06F 16/2379; H04L 63/1433; H04L 63/1425; H04L 63/1416; G06Q 10/06393
  USPC ........................................................ 726/25
  See application file for complete search history.

(56) References Cited

U.S. PATENT DOCUMENTS

| | | |
|---|---|---|
| 9,699,208 B1 | 7/2017 | Francoeur |
| 10,536,478 B2 | 1/2020 | Kirti |
| 11,023,511 B1* | 6/2021 | Fletcher ................ G06F 16/338 |
| 2008/0034425 A1 | 2/2008 | Overcash |
| 2008/0183552 A1 | 7/2008 | O'Hagan |
| 2012/0304253 A1 | 11/2012 | Newman |
| 2013/0208880 A1* | 8/2013 | Lovy ...................... H04L 43/14 |
| | | 379/265.03 |
| 2014/0207486 A1 | 7/2014 | Carty |
| 2014/0280952 A1* | 9/2014 | Shear ..................... H04L 63/10 |
| | | 709/226 |
| 2016/0092658 A1* | 3/2016 | Leenaerts ............. G16H 10/20 |
| | | 705/2 |
| 2016/0212166 A1 | 7/2016 | Henry |
| 2017/0034700 A1 | 2/2017 | Cohen |
| 2017/0070361 A1 | 3/2017 | Sundermeyer |
| 2017/0139762 A1* | 5/2017 | Sherlock .................. G09B 7/00 |
| 2017/0270295 A1 | 9/2017 | Park |
| 2017/0331839 A1 | 11/2017 | Park |
| 2019/0064791 A1 | 2/2019 | Cella et al. |
| 2019/0164015 A1 | 5/2019 | Jones, Jr. et al. |
| 2019/0179738 A1* | 6/2019 | Hawthorne ......... G06F 11/3664 |
| 2019/0187212 A1 | 6/2019 | Garcia et al. |

* cited by examiner computing device 40 computing device 40

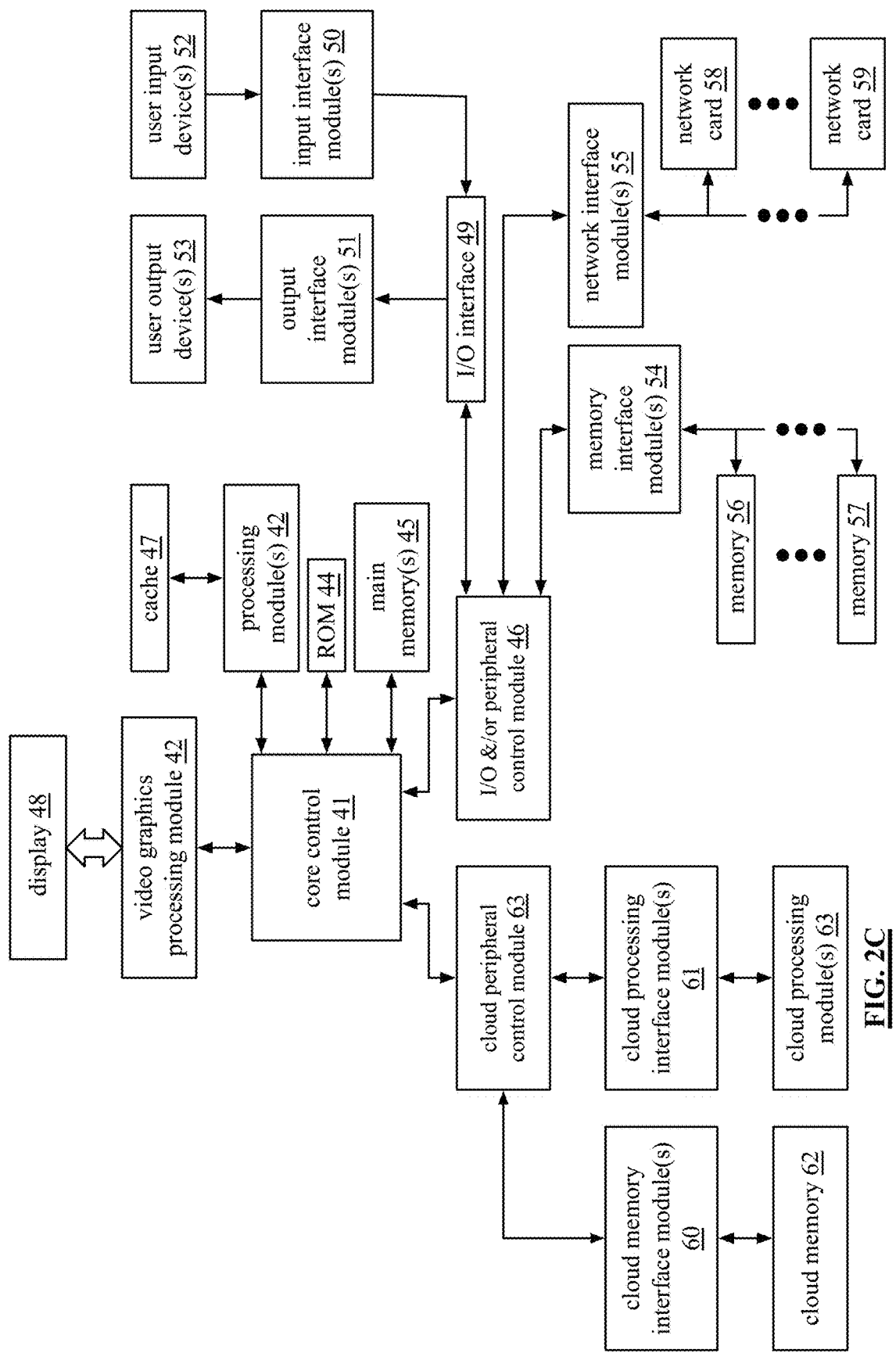

computing device 40

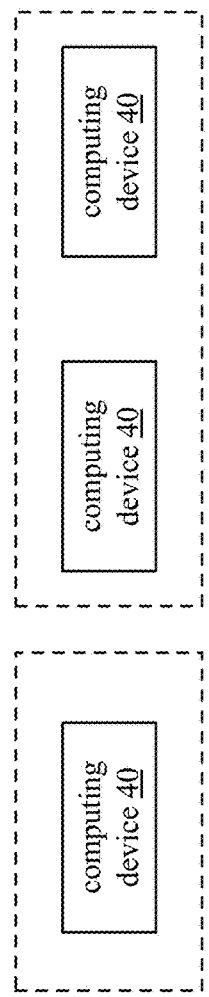
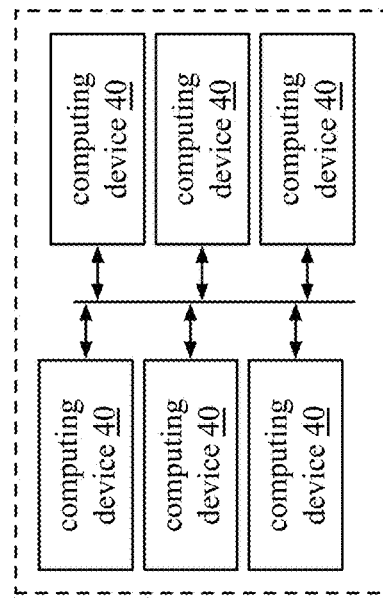
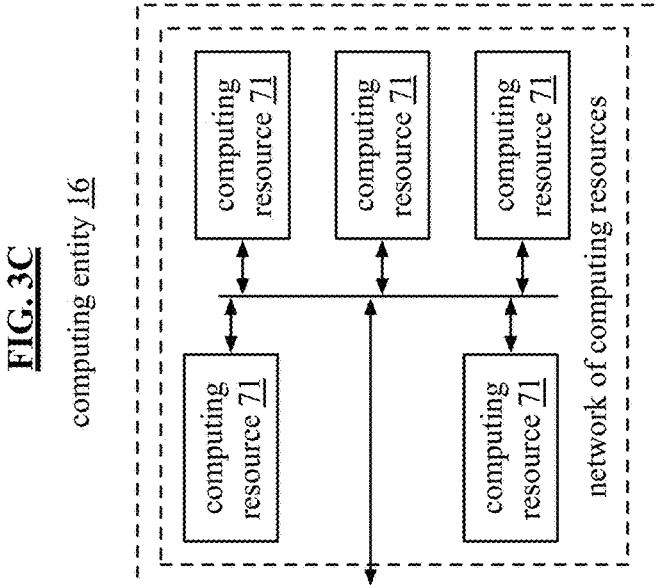
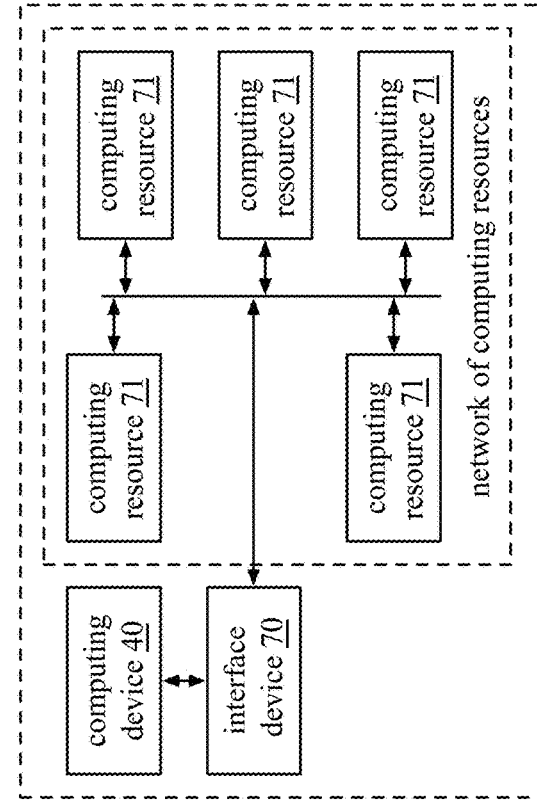
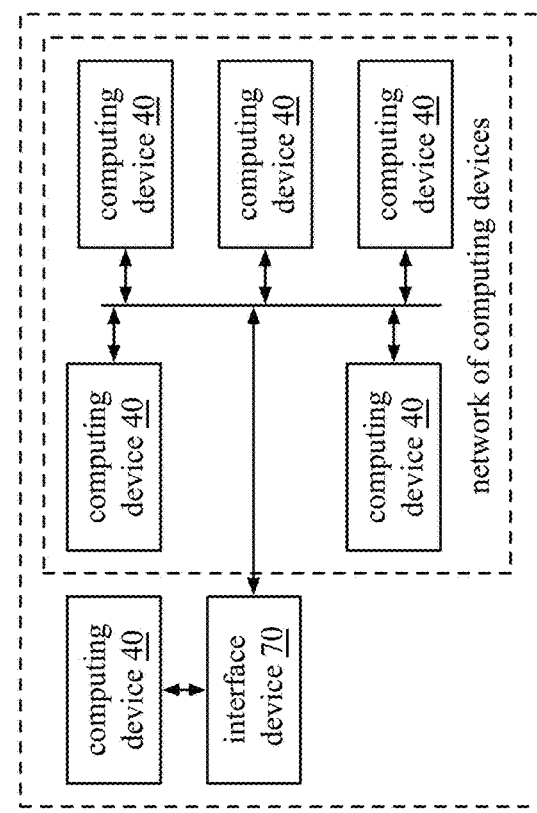

D = device
HW = hardware
SW = software

D = device
HW = hardware
SW = software system 11 system 11

FIG. 22 division 2 - 182

| marketing 190 | operations 191 | engineering 192 | manufacturing 193 | sales 194 | accounting 195 |
|---|---|---|---|---|---|
| devices | devices | devices | devices | devices | devices |
| software | software | software | software | software | software |
| security policies | security policies | security policies | security policies | security policies | security policies |
| security procedures | security procedures | security procedures | security procedures | security procedures | security procedures |
| business policies | business policies | business policies | business policies | business policies | business policies |
| business procedures | business procedures | business procedures | business procedures | business procedures | business procedures |
| data protection | data protection | data protection | data protection | data protection | data protection |
| data access | data access | data access | data access | data access | data access |
| data storage | data storage | data storage | data storage | data storage | data storage |
| personnel hierarchy | personnel hierarchy | personnel hierarchy | personnel hierarchy | personnel hierarchy | personnel hierarchy |
| local networking | local networking | local networking | local networking | local networking | local networking |
| external networking | external networking | external networking | external networking | external networking | external networking |

| | | system functions (independent and/or dependent) | | | | | | |
|---|---|---|---|---|---|---|---|---|
| | | business operations | requirement compliance | data flow | data access | data integrity | data storage | data use | data dissemination |
| physical assets | user HW | | | | | | | | |
| | user SW | | | | | | | | |
| | networking HW | | | | | | | | |
| | networking SW | | | | | | | | |
| | system HW | | | | | | | | |
| | system SW | | | | | | | | |
| | security SW | | | | | | | | |
| | security HW | | | | | | | | |
| | system monitoring HW | | | | | | | | |
| | system monitoring SW | | | | | | | | |
| conceptual assets | HW architecture | | | | | | | | |
| | SW architecture | | | | | | | | |
| | HW sub-architecture | | | | | | | | |
| | SW sub-architecture | | | | | | | | |

FIG. 32

|  | | system functions (independent and/or dependent) | | | | | | |
|---|---|---|---|---|---|---|---|---|
|  | | business operations | requirement compliance | data flow | data access | data integrity | data storage | data use | data dissemination |
| security functions | threat detection | | | | | | | | |
| | threat avoidance | | | | | | | | |
| | threat resolution | | | | | | | | |
| | threat recovery | | | | | | | | |
| | threat assessment | | | | | | | | |
| | threat impact | | | | | | | | |
| | threat tolerance policies | | | | | | | | |
| | business security policies | | | | | | | | |
| | governance security policies | | | | | | | | |
| | data at rest protection | | | | | | | | |
| | data in transit protection | | | | | | | | |
| | data loss prevention | | | | | | | | |

FIG. 33

| | security functions | | | | | | | | | |
|---|---|---|---|---|---|---|---|---|---|---|
| | threat detection | threat avoidance | threat resolution | threat recovery | threat assessment | threat impact | threat tolerance policies | business security policies | governance security policies | data at rest protection | data in transit protection | data loss prevention |
| user HW | | | | | | | | | | | | |
| user SW | | | | | | | | | | | | |
| networking HW | | | | | | | | | | | | |
| networking SW | | | | | | | | | | | | |
| system HW | | | | | | | | | | | | |
| system SW | | | | | | | | | | | | |
| security SW | | | | | | | | | | | | |
| security HW | | | | | | | | | | | | |
| system monitoring HW | | | | | | | | | | | | |
| system monitoring SW | | | | | | | | | | | | |
| HW architecture | | | | | | | | | | | | |
| SW architecture | | | | | | | | | | | | |
| HW sub-architecture | | | | | | | | | | | | |
| SW sub-architecture | | | | | | | | | | | | |

FIG. 34 data analysis module 252

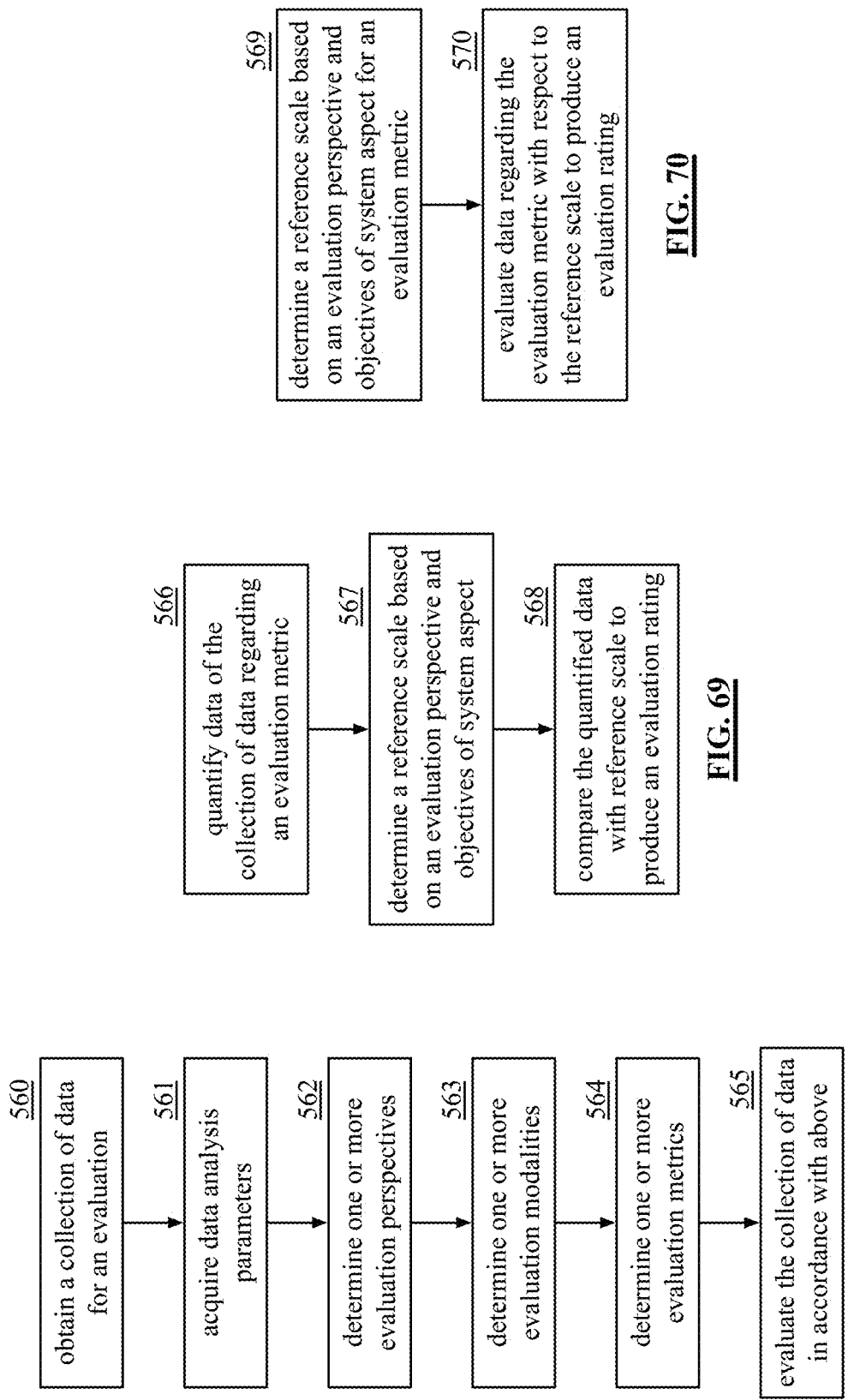

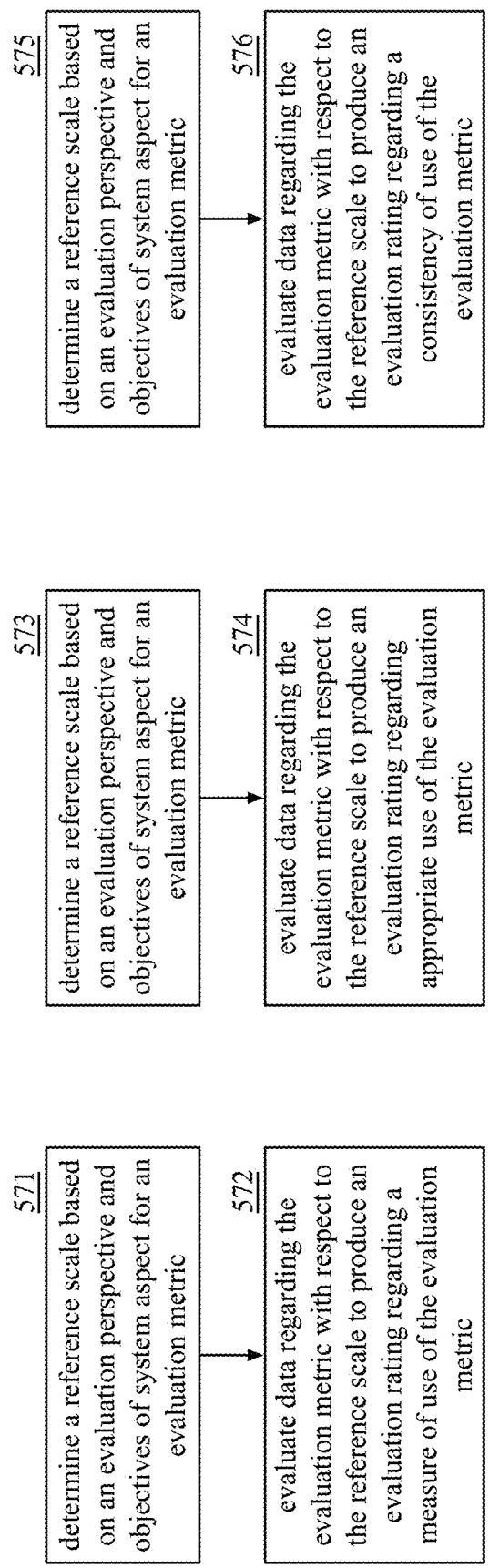

level of evaluation selected one or more eval metrics:
- process
- policy
- procedure
- documentation
- automation
- certification for each eval metric, one or more eval modality:
- sufficiency
- effectiveness
- quantity of use
- appropriate use
- consistency of use select one or more evaluation outputs:
- evaluation rating
- identify deficiencies
- auto-correct deficiencies for selected system portion, what's being evaluated

| understanding | implementation | operation |
|---|---|---|
| evaluate understanding of guidelines | evaluate development of guidelines | |
| evaluate understanding of system req. | evaluate development of system req. | evaluate sys. req. fulfillment of guidelines |
| evaluate understanding of design | evaluate development of design | evaluate design fulfillment of guidelines, &/or sys. req. |
| evaluate understanding of build | evaluate development of build | evaluate build fulfillment of guidelines, sys. req. &/or design |
| evaluate understanding of system functions | evaluate development of system functions | evaluate system function fulfillment of guidelines, sys. req., design, &/or build |
| evaluate understanding of security functions | evaluate development of security functions | evaluate security function fulfillment of guidelines, sys. req., design, &/or build |
| evaluate understanding of system assets | evaluate development of system asset | evaluate asset fulfillment of guidelines, sys. req., design, &/or build | select system portion

- entire system
- by division
- by department
- by group
- by sub-group
- by system asset
- by system element
- by physical asset
- by system function
- by security function

FIG. 74 collection of data 581

FIG. 78 collection of data 581

| disclosed data | | | | | |
|---|---|---|---|---|---|
| identify data | protect data | detect data | recover data | respond data | |
| system element data | system element data | system element data | system element data | system element data | |
| system mode data | system mode data | system mode data | system mode data | system mode data | |
| system criteria data | system criteria data | system criteria data | system criteria data | system criteria data | |
| objectives data | objectives data | objectives data | objectives data | objectives data | |
| eval. metric data | eval. metric data | eval. metric data | eval. metric data | eval. metric data | |

| discovered data | | | | | |
|---|---|---|---|---|---|
| identify data | protect data | detect data | recover data | respond data | |
| system element data | system element data | system element data | system element data | system element data | |
| system mode data | system mode data | system mode data | system mode data | system mode data | |
| system criteria data | system criteria data | system criteria data | system criteria data | system criteria data | |
| objectives data | objectives data | objectives data | objectives data | objectives data | |
| eval. metric data | eval. metric data | eval. metric data | eval. metric data | eval. metric data | |

| desired data | | | | | |
|---|---|---|---|---|---|
| identify data | protect data | detect data | recover data | respond data | |
| system element data | system element data | system element data | system element data | system element data | |
| system mode data | system mode data | system mode data | system mode data | system mode data | |
| system criteria data | system criteria data | system criteria data | system criteria data | system criteria data | |
| objectives data | objectives data | objectives data | objectives data | objectives data | |
| eval. metric data | eval. metric data | eval. metric data | eval. metric data | eval. metric data | | disclosed, discovered, or desired data

FIG. 82
asset information

Blocks (left to right, top row): list of networking devices | list of security devices | list of storage devices | list of user applications | list of design tools Blocks (bottom row): list of networking tools | list of security tools | list of servers | list of user devices | list of system applications | list of verification tools

FIG. 83
list of user devices

| user ID | user level | user role | HW info | IP address | SW user app info | SW device app info | device use data | maintenance |
|---|---|---|---|---|---|---|---|---|
| user device 1 | | | | | | | | |
| user device 2 | | | | | | | | |
| user device 3 | | | | | | | | |
| ... | | | | | | | | |
| user device x | | | | | | | | |

|  | user level 1 | user level 2 | user level 3 |
|---|---|---|---|
| data access privileges |  |  |  |
| data access restrictions |  |  |  |
| network access privileges |  |  |  |
| network access restrictions |  |  |  |
| server access privileges |  |  |  |
| server access restrictions |  |  |  |
| storage access privileges |  |  |  |
| storage access restrictions |  |  |  |
| required SW user Apps |  |  |  |
| required SW device Apps |  |  |  |
| prohibited SW user Apps |  |  |  |

FIG. 84
user level

|  | role A | role B | role C | role D |
|---|---|---|---|---|
| data access privileges |  |  |  |  |
| data access restrictions |  |  |  |  |
| network access privileges |  |  |  |  |
| network access restrictions |  |  |  |  |
| server access privileges |  |  |  |  |
| server access restrictions |  |  |  |  |
| storage access privileges |  |  |  |  |
| storage access restrictions |  |  |  |  |
| required SW user Apps |  |  |  |  |
| required SW device Apps |  |  |  |  |
| prohibited SW user Apps |  |  |  |  |

FIG. 85
user role collection of data 581

| | guidelines | system requirements | system design | system build | system operation |
|---|---|---|---|---|---|
| disclosed data | system element data<br>system mode data<br>eval. category data<br>objectives data<br>eval. metric data | system element data<br>system mode data<br>eval. category data<br>objectives data<br>eval. metric data | system element data<br>system mode data<br>eval. category data<br>objectives data<br>eval. metric data | system element data<br>system mode data<br>eval. category data<br>objectives data<br>eval. metric data | system element data<br>system mode data<br>eval. category data<br>objectives data<br>eval. metric data |
| discovered data | system element data<br>system mode data<br>eval. category data<br>objectives data<br>eval. metric data | system element data<br>system mode data<br>eval. category data<br>objectives data<br>eval. metric data | system element data<br>system mode data<br>eval. category data<br>objectives data<br>eval. metric data | system element data<br>system mode data<br>eval. category data<br>objectives data<br>eval. metric data | system element data<br>system mode data<br>eval. category data<br>objectives data<br>eval. metric data |
| desired data | system element data<br>system mode data<br>eval. category data<br>objectives data<br>eval. metric data | system element data<br>system mode data<br>eval. category data<br>objectives data<br>eval. metric data | system element data<br>system mode data<br>eval. category data<br>objectives data<br>eval. metric data | system element data<br>system mode data<br>eval. category data<br>objectives data<br>eval. metric data | system element data<br>system mode data<br>eval. category data<br>objectives data<br>eval. metric data |

FIG. 87    collection of data 581

| name | record # | sys. element | system criteria | system mode | eval. view pt. | eval. category | eval. metric | data field |
|---|---|---|---|---|---|---|---|---|
| design spec A | 1 | 00 | 0010 | 000 | 00 | 1111 | 0000 | <schematic A> |
| | | | | | | | | |
| | | | | | | | | |
| | | | | | | | | |
| | | | | | | | | |
| | | | | | | | | |
| | | | | | | | | |

FIG. 93

| | understanding (knowledge of system) | implementation (accuracy of development) | operation (accuracy of fulfilling objectives) |
|---|---|---|---|
| sufficiency (count &/or checklist) | compare quantity (checklist) of processes, policies, procedures, documents, automation, and/or certifications with respective understanding reference quantities (checklists) | compare quantity (checklist) of design and/or build processes, policies, procedures, documents, automation, and/or certifications with respective implementation reference quantities (checklists) | compare quantity (checklist) of system functions, security functions, and/or assets processes, policies, procedures, documents, automation, and/or certifications with respective operation reference quantities (checklists) |
| effectiveness (content review) | evaluate content of processes, policies, procedures, documents, automation, and/or certifications with respective reference scales | evaluate content of design and/or build processes, policies, procedures, documents, automation, and/or certifications with respective reference scales | evaluate content of system functions, security functions, and/or assets processes, policies, procedures, documents, automation, and/or certifications with respective reference scales |
| quantity of use (count) | compare quantity of use of processes, policies, procedures, documents, automation, and/or certifications with respective understanding condition of use reference quantities | compare quantity of use of design and/or build processes, policies, procedures, documents, automation, and/or certifications with respective implementation use reference quantities | compare quantity of use of system functions, security functions, and/or assets processes, policies, procedures, documents, automation, and/or certifications with respective operation use reference quantities |
| appropriate use (condition review) | evaluate condition of use of processes, policies, procedures, documents, automation, and/or certifications with respective understanding condition of use reference scales | evaluate condition of use of design and/or build processes, policies, procedures, documents, automation, and/or certifications with respective implementation condition of use reference scales | evaluate condition of use of system functions, security functions, and/or assets processes, policies, procedures, documents, automation, and/or certifications with respective operation condition of use reference scales |
| consistency of use (situation review) | evaluate situation of use of processes, policies, procedures, documents, automation, and/or certifications with respective understanding situation of use reference scales | evaluate situation of use of design and/or build processes, policies, procedures, documents, automation, and/or certifications with respective implementation situation of use reference scales | evaluate situation of use of system functions, security functions, and/or assets processes, policies, procedures, documents, automation, and/or certifications with respective operation situation of use reference scales |

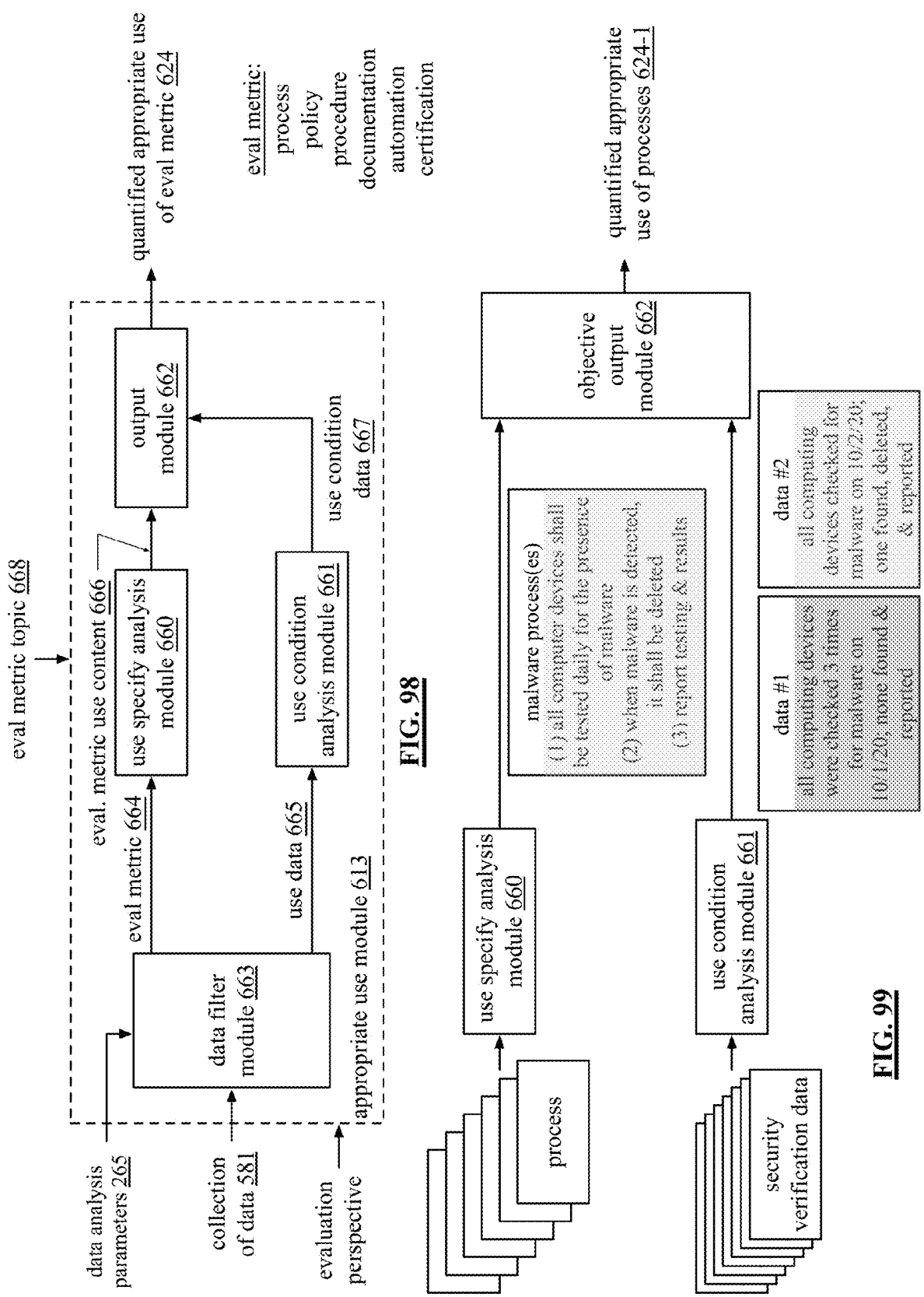

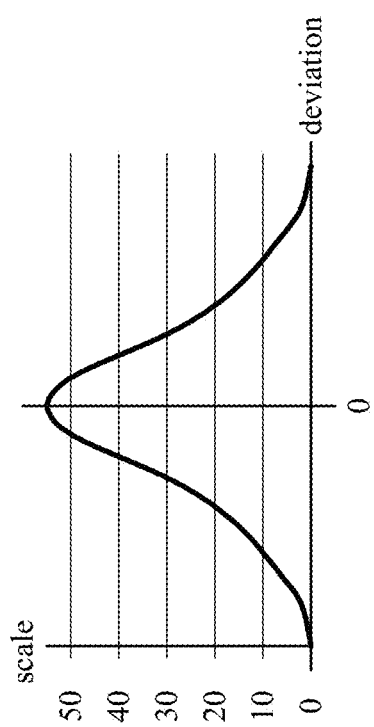
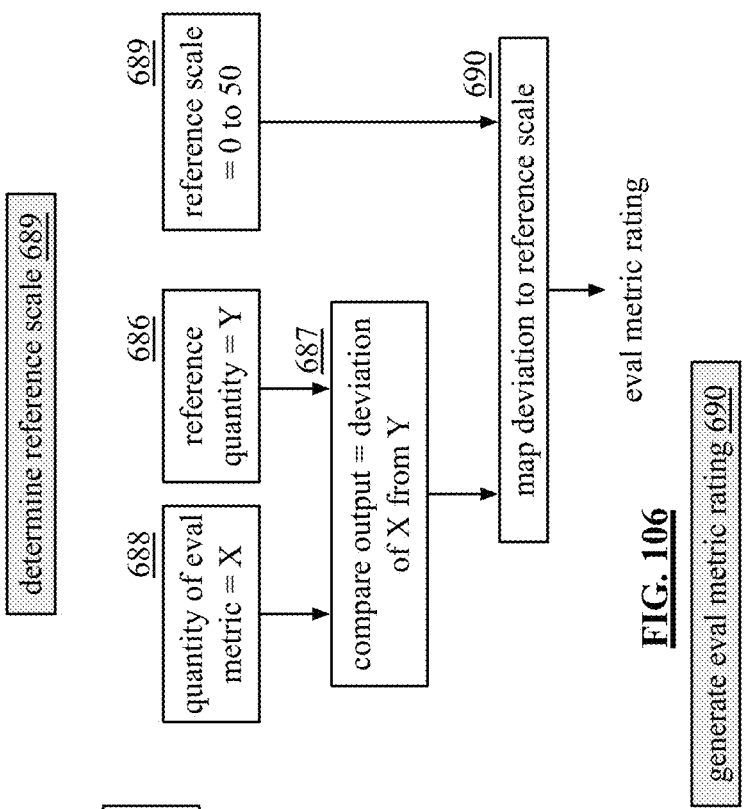
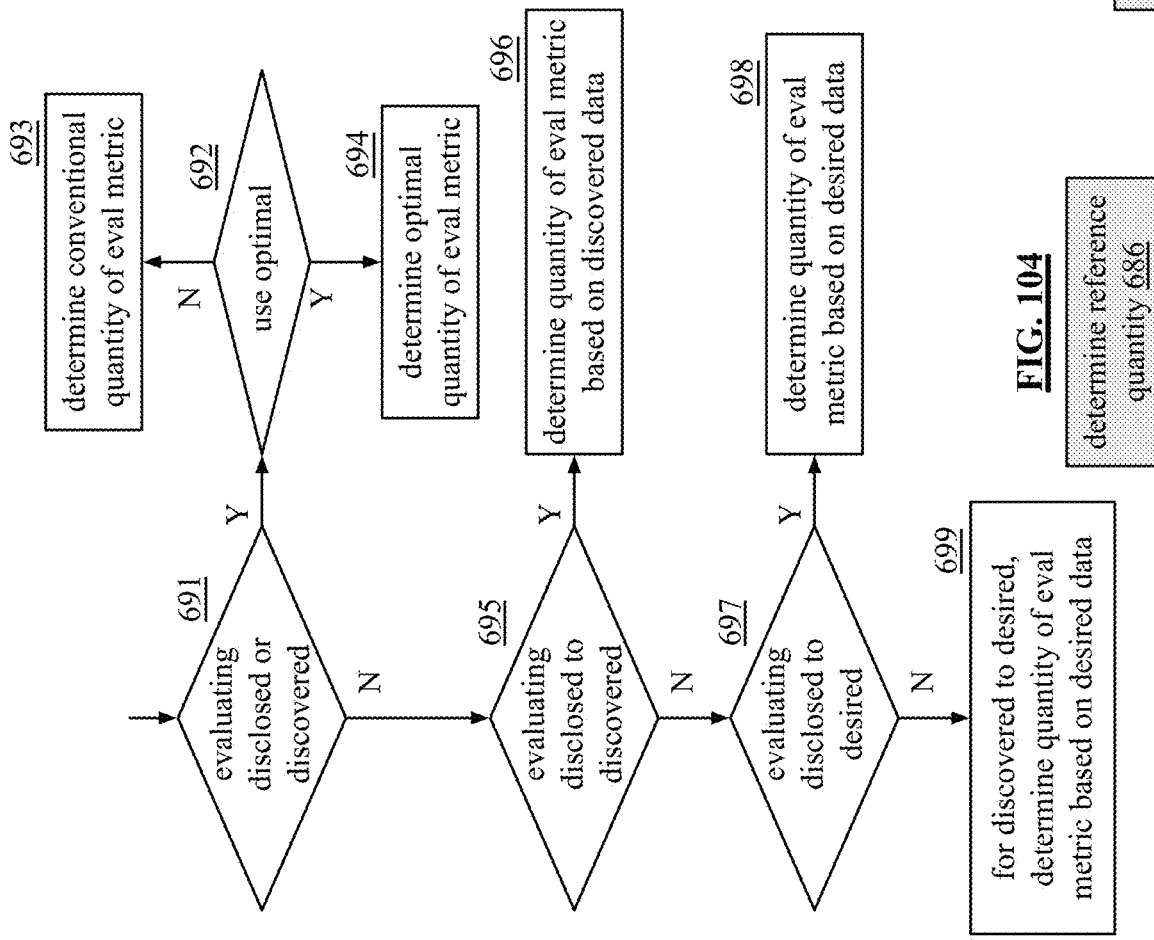
FIG. 105
determine reference scale 689
FIG. 106
generate eval metric rating 690
FIG. 104
determine reference quantity 686

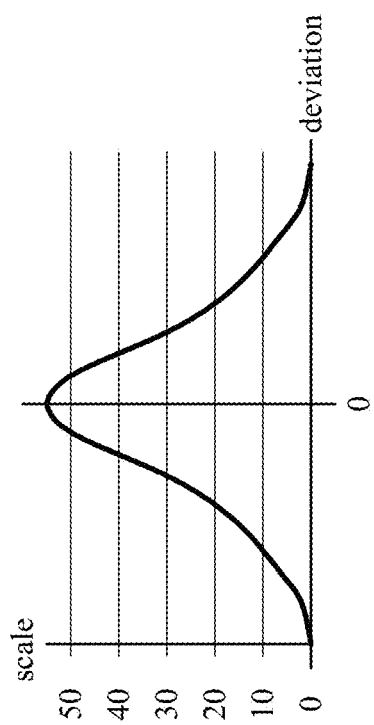
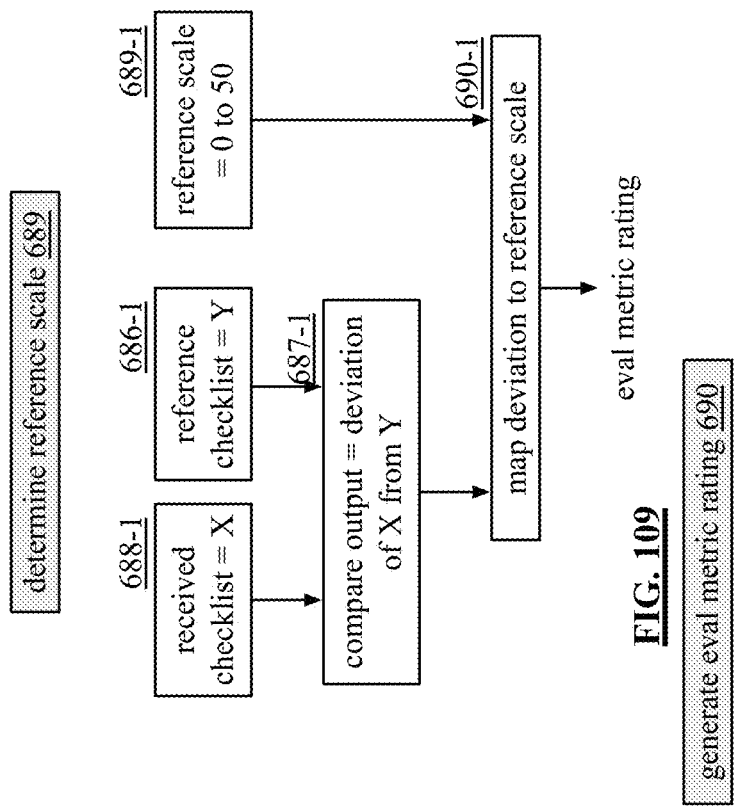
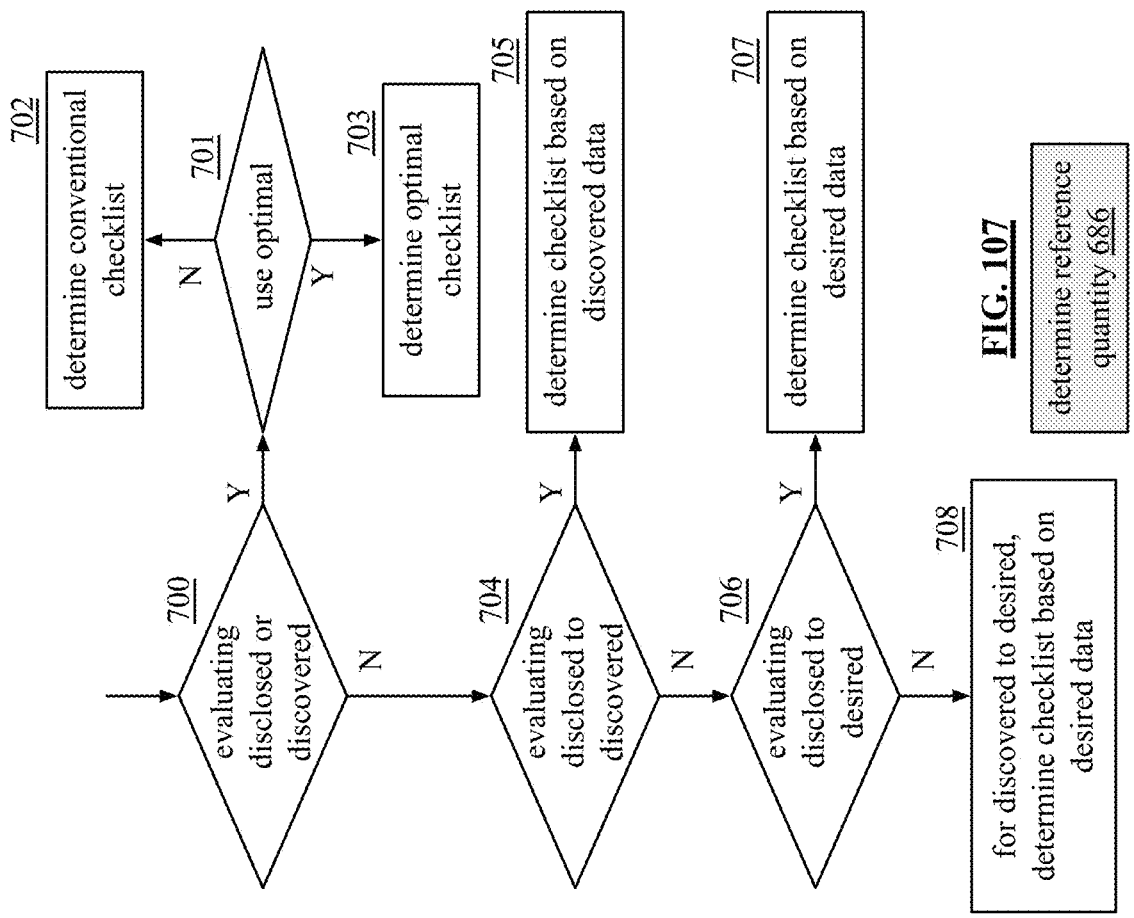

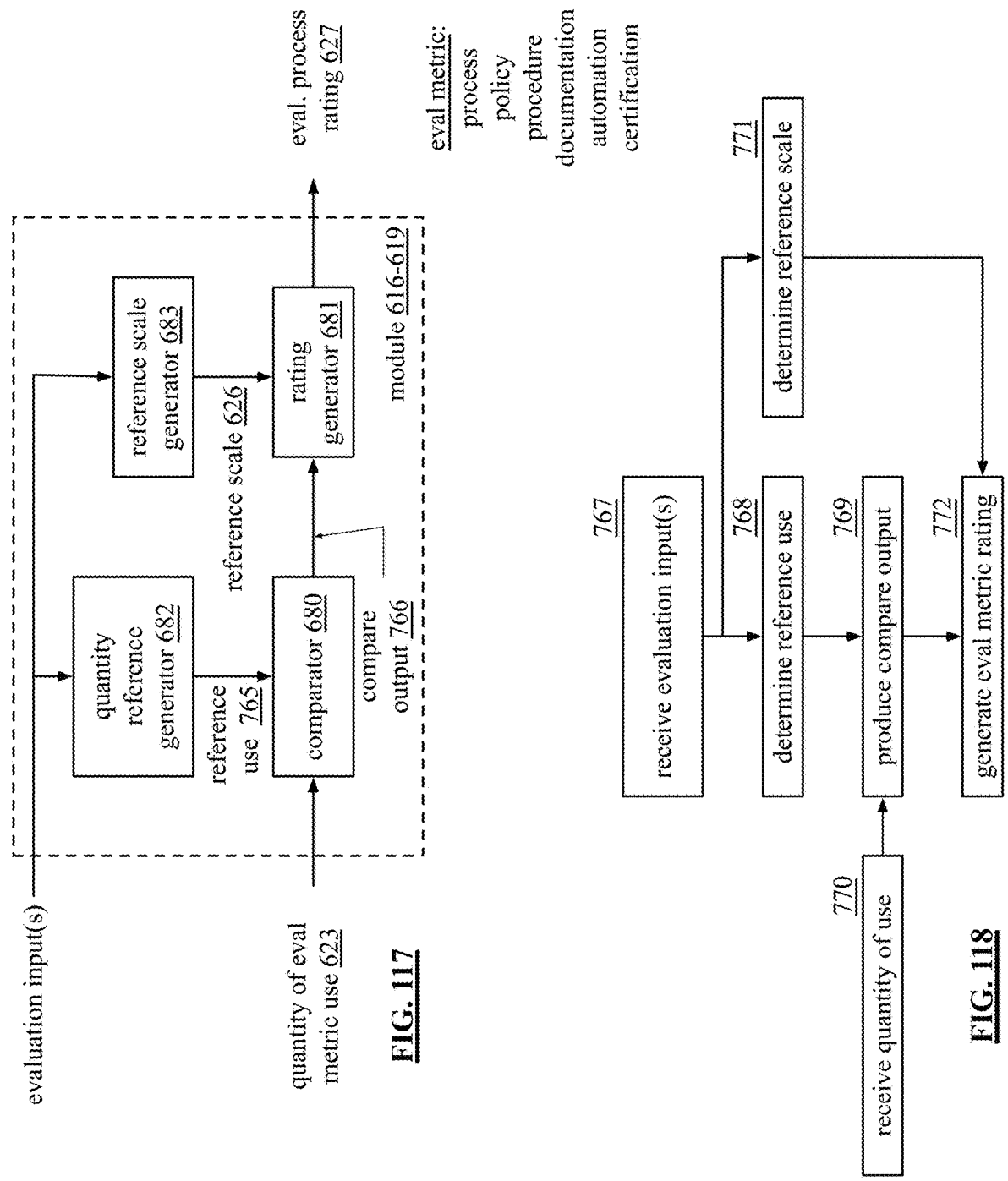

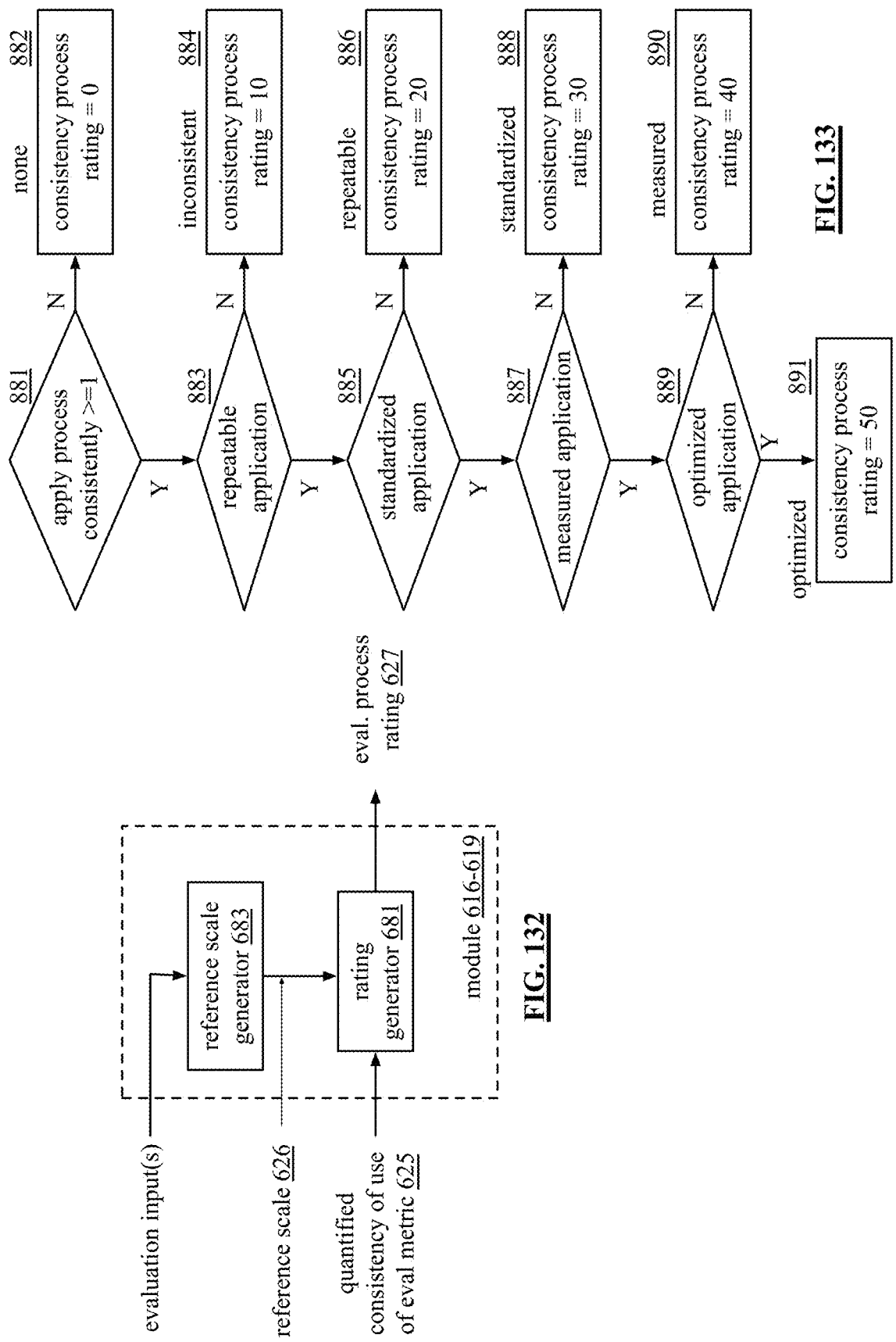

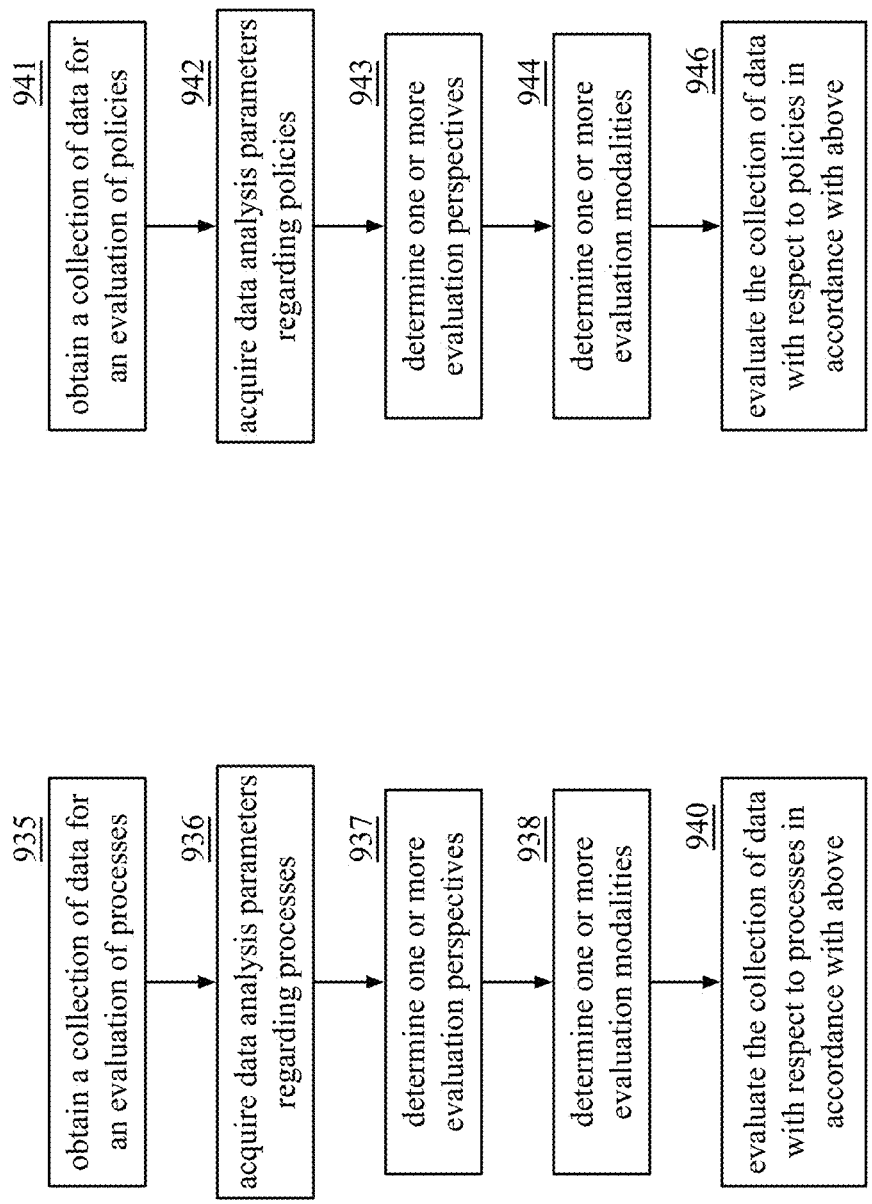

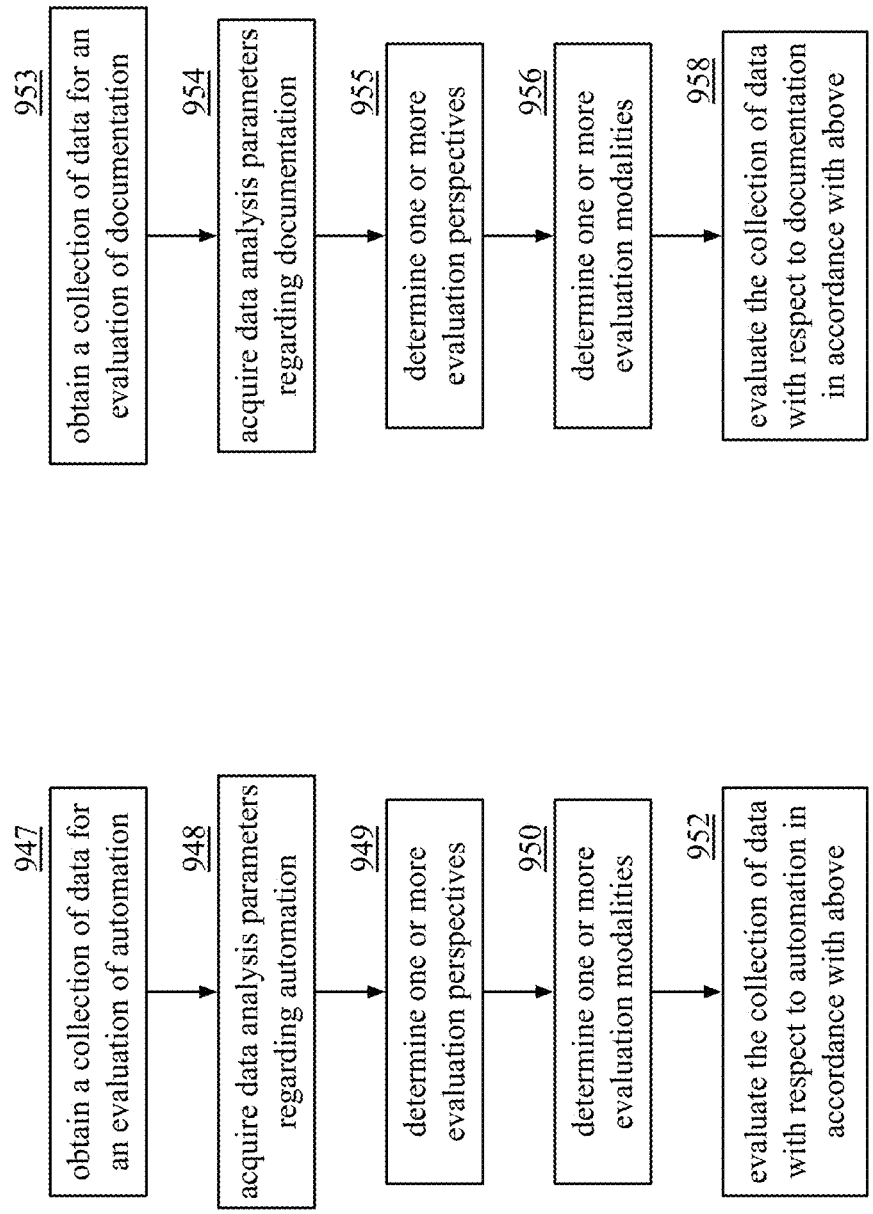

EVALUATION RATING OF A SYSTEM OR PORTION THEREOF

CROSS-REFERENCE TO RELATED APPLICATIONS

The present U.S. Utility Patent Application claims priority pursuant to 35 U.S.C. § 119(e) to U.S. Provisional Application No. 62/992,661, entitled "SYSTEM ANALYSIS SYSTEM", filed Mar. 20, 2020, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This disclosure relates to computer systems and more particularly to evaluation of a system.

Description of Related Art

The structure and operation of the Internet and other publicly available networks are well known and support computer systems (systems) of multitudes of companies, organizations, and individuals. A typical system includes networking equipment, end point devices such as computer servers, user computers, storage devices, printing devices, security devices, and point of service devices, among other types of devices. The networking equipment includes routers, switches, edge devices, wireless access points, and other types of communication devices that intercouple in a wired or wireless fashion. The networking equipment facilitates the creation of one or more networks that are tasked to service all or a portion of a company's communication needs, e.g., Wide Area Networks, Local Area Networks, Virtual Private Networks, etc.

Each device within a system includes hardware components and software components. Hardware components degrade over time and eventually are incapable of performing their intended functions. Software components must be updated regularly to ensure their proper functionality. Some software components are simply replaced by newer and better software even though they remain operational within a system.

Many companies and larger organizations have their own Information Technology (IT) departments. Others outsource their IT needs to third party providers. The knowledge requirements for servicing a system typically outstrip the abilities of the IT department or third-party provider. Thus, hardware and software may not be functioning properly and can adversely affect the overall system.

Cyber-attacks are initiated by individuals or entities with the bad intent of stealing sensitive information such as login/password information, stealing proprietary information such as trade secrets or important new technology, interfering with the operation of a system, and/or holding the system hostage until a ransom is paid, among other improper purposes. A single cyber-attack can make a large system inoperable and cost the system owner many millions of dollars to restore and remedy.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIGS. 2A-2D are schematic block diagrams of embodiments of a computing device in accordance with the present disclosure;

FIGS. 3A-3E are schematic block diagrams of embodiments of a computing entity in accordance with the present disclosure;

FIG. 22 is a schematic block diagram of another embodiment of a division of a system having departments, which include system elements in accordance with the present disclosure;

FIG. 32 is a diagram of another example of evaluation options of an analysis system for evaluating a system element under test of a system in accordance with the present disclosure;

FIG. 33 is a diagram of another example of evaluation options of an analysis system for evaluating a system element under test of a system in accordance with the present disclosure;

FIG. 34 is a diagram of another example of evaluation options of an analysis system for evaluating a system element under test of a system in accordance with the present disclosure;

FIG. 68 is a logic diagram of an example of an analysis system generating an evaluation output in accordance with the present disclosure;

FIG. 69 is a logic diagram of a further example of an analysis system generating an evaluation output in accordance with the present disclosure;

FIG. 70 is a logic diagram of a further example of an analysis system generating an evaluation output in accordance with the present disclosure;

FIG. 71 is a logic diagram of a further example of an analysis system generating an evaluation output in accordance with the present disclosure;

FIG. 72 is a logic diagram of a further example of an analysis system generating an evaluation output in accordance with the present disclosure;

FIG. 73 is a logic diagram of a further example of an analysis system generating an evaluation output in accordance with the present disclosure;

FIG. 74 is a diagram of an example of an analysis system generating an evaluation output for a selected portion of a system in accordance with the present disclosure;

FIG. 78 is a diagram of another example of a collection of data in accordance with the present disclosure;

FIG. 82 is a diagram of another example of a collection of data in accordance with the present disclosure;

FIG. 83 is a diagram of another example of a collection of data in accordance with the present disclosure;

FIG. 84 is a diagram of another example of a collection of data in accordance with the present disclosure;

FIG. 85 is a diagram of another example of a collection of data in accordance with the present disclosure;

FIG. 87 is a diagram of another example of a collection of data in accordance with the present disclosure;

FIG. 93 is a diagram of an example an evaluation matrix in accordance with the present disclosure;

FIG. 98 is a schematic block diagram of an embodiment of an appropriate use module in accordance with the present disclosure;

FIG. 99 is a diagram of an example of an appropriate use module producing a quantified appropriate of use of an evaluation metric in accordance with the present disclosure;

FIG. 104 is a logic diagram of a further example of a module of FIG. 102 generating an evaluation metric rating in accordance with the present disclosure;

FIG. 105 is a diagram of an example of a quantity reference scale in accordance with the present disclosure;

FIG. 106 is a logic diagram of a further example of a module of FIG. 102 generating an evaluation metric rating in accordance with the present disclosure;

FIG. 107 is a logic diagram of a further example of a module of FIG. 102 generating an evaluation metric rating in accordance with the present disclosure;

FIG. 108 is a diagram of an example of a checklist reference scale in accordance with the present disclosure;

FIG. 109 is a logic diagram of a further example of a module of FIG. 102 generating an evaluation metric rating in accordance with the present disclosure;

FIG. 117 is a schematic block diagram of an embodiment of an understanding, implementation, operation, or self-analysis module in accordance with the present disclosure;

FIG. 118 is a logic diagram of an example of a module of FIG. 117 generating an evaluation metric rating in accordance with the present disclosure;

FIG. 132 is a schematic block diagram of an embodiment of an understanding, implementation, operation, or self-analysis module in accordance with the present disclosure;

FIG. 133 is a logic diagram of an example of a module of FIG. 125 generating an evaluation metric rating in accordance with the present disclosure;

FIG. 139 is a logic diagram of an example of an analysis unit generating an evaluation metric rating with respect to processes in accordance with the present disclosure;

FIG. 140 is a logic diagram of an example of an analysis unit generating an evaluation metric rating with respect to policies in accordance with the present disclosure;

FIG. 141 is a logic diagram of an example of an analysis unit generating an evaluation metric rating with respect to automation in accordance with the present disclosure; and FIG. 142 is a logic diagram of an example of an analysis unit generating an evaluation metric rating with respect to documentation in accordance with the present disclosure.

DETAILED DESCRIPTION OF THE INVENTION

Figure 1:
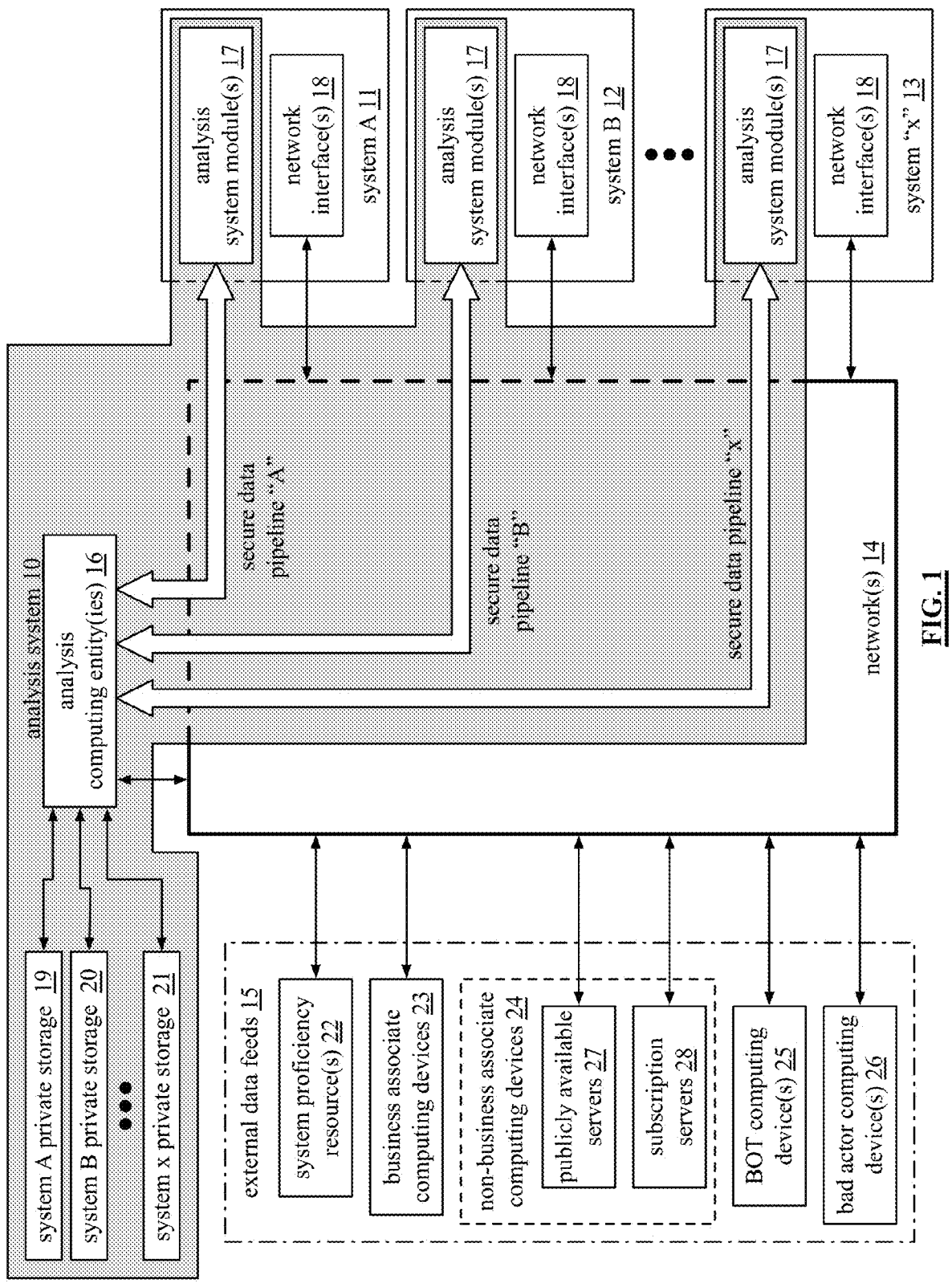
FIG. 1 is a schematic block diagram of an embodiment of a networked environment that includes systems coupled to an analysis system in accordance with the present disclosure.

FIG. 1 is a schematic block diagram of an embodiment of a networked environment that includes one or more networks 14, external data feeds sources 15, a plurality of systems 11-13, and an analysis system 10. The external data feed sources 15 includes one or more system proficiency resources 22, one or more business associated computing devices 23, one or more non-business associated computing devices 24 (e.g., publicly available servers 27 and subscription based servers 28), one or more BOT (i.e., internet robot) computing devices 25, and one or more bad actor computing devices 26. The analysis system 10 includes one or more analysis computing entities 16, a plurality of analysis system modules 17 (one or more in each of the systems 11-13), and a plurality of storage systems 19-21 (e.g., system A private storage 19, system B private storage 20, through system x private storage 21, and other storage). Each of the systems 11-13 includes one or more network interfaces 18 and many more elements not shown in FIG. 1.

A computing device may be implemented in a variety of ways. A few examples are shown in FIGS. 2A-2D. A computing entity may be implemented in a variety of ways. A few examples are shown in FIGS. 3A-3E.

A storage system 19-21 may be implemented in a variety of ways. For example, each storage system is a standalone database. As another example, the storage systems are implemented in a common database. A database is a centralized database, a distributed database, an operational database, a cloud database, an object-oriented database, and/or a relational database. A storage system 19-21 is coupled to the analysis system 10 using a secure data pipeline to limit and control access to the storage systems. The secure data pipeline may be implemented in a variety of ways. For example, the secure data pipeline is implemented on a provide network of the analysis system and/or of a system under test. As another example, the secure data pipeline is implemented via the network 14 using access control, using network controls, implementing access and control policies, using encryption, using data loss prevention tools, and/or using auditing tools.

The one or more networks 14 includes one or more wide area networks (WAN), one or more local area networks (LAN), one or more wireless LANs (WLAN), one or more cellular networks, one or more satellite networks, one or more virtual private networks (VPN), one or more campus area networks (CAN), one or more metropolitan area networks (MAN), one or more storage area networks (SAN), one or more enterprise private networks (EPN), and/or one or more other type of networks.

In general, a system proficiency resource 22 is a source for data regarding best-in-class practices (for system requirements, for system design, for system implementation, and/or for system operation), governmental and/or regulatory requirements, security risk awareness and/or risk remediation information, security risk avoidance, performance optimization information, system development guidelines, software development guideline, hardware requirements, networking requirements, networking guidelines, and/or other system proficiency guidance. "Framework for Improving Critical Instructure Cybersecurity", Version 1.1, Apr. 16, 2018 by the National Institute of Standards and Technology (NIST) is an example of a system proficiency in the form of a guideline for cybersecurity.

A business associated computing device 23 is one that is operated by a business associate of the system owner. Typically, the business associated computing device 23 has access to at least a limited portion of the system to which the general public does not have access. For example, the business associated computing device 23 is operated by a vendor of the organization operating the system and is granted limited access for order placement and/or fulfillment. As another example, the business associated computing device 23 is operated by a customer of the organization operating the system and is granted limited access for placing orders.

A non-business associated computing device 24 is a computing device operated by a person or entity that does not have a business relationship with the organization operating the system. Such non-business associated computing device 24 are not granted special access to the system. For example, a non-business associated computing device 24 is a publicly available server 27 to which a user computing device of the system may access. As another example, a non-business associated computing device 24 is a subscription based servers 28 to which a user computing device of the system may access if it is authorized by a system administrator of the system to have a subscription and has a valid subscription. As yet another example, the non-business associated computing device 24 is a computing device operated by a person or business that does not have an affiliation with the organization operating the system.

A bot (i.e., internet robot) computing device 25 is a computing device that runs, with little to no human interaction, to interact with a system and/or a computing device of a user via the internet or a network. There are a variety of types of bots. For example, there are social media bots, chatbots, bot crawlers, transaction bots, information bots, and entertainment bots (e.g., games, art, books, etc.).

A bad actor computing device 26 is a computing device operated by a person whose use of the computing device is for illegal and/or immoral purposes. The bad actor computing device 26 may employ a bot to execute an illegal and/or immoral purpose. In addition or in the alternative, the person may instruct the bad actor computing device to perform the illegal and/or immoral purpose, such as hacking, planting a worm, planting a virus, stealing data, uploading false data, and so on.

The analysis system 10 is operable to evaluate a system 11-13, or portion thereof, in a variety of ways. For example, the analysis system 10 evaluates system A 11, or a portion thereof, by testing the organization's understanding of its system, or portion thereof; by testing the organization's implementation of its system, or portion thereof; and/or by testing the system's, or portion thereof; operation. As a specific example, the analysis system 10 tests the organization's understanding of its system requirements for the implementation and/or operation of its system, or portion thereof. As another specific example, the analysis system 10 tests the organization's understanding of its software maintenance policies and/or procedures. As another specific example, the analysis system 10 tests the organization's understanding of its cybersecurity policies and/or procedures.

There is an almost endless combination of ways in which the analysis system 10 can evaluate a system 11-13, which may be a computer system, a computer network, an enterprise system, and/or other type of system that includes computing devices operating software. For example, the analysis system 10 evaluates a system aspect (e.g., the system or a portion of it) based on an evaluation aspect (e.g., options for how the system, or portion thereof, can be evaluated) in view of evaluation rating metrics (e.g., how the system, or portion thereof, is evaluated) to produce an analysis system output (e.g., an evaluation rating, deficiency identification, and/or deficiency auto-correction).

The system aspect (e.g., the system or a portion thereof) includes a selection of one or more system elements of the system, a selection of one or more system criteria, and/or a selection of one or more system modes. A system element of the system includes one or more system assets which is a physical asset of the system and/or a conceptual asset of the system. For example, a physical asset is a computing entity, a computing device, a user software application, a system software application (e.g., operating system, etc.), a software tool, a network software application, a security software application, a system monitoring software application, and the like. As another example, a conceptual asset is a hardware architectural layout, or portion thereof, and/or a software architectural layout, or portion thereof.

A system element and/or system asset may be identified in a variety of ways. For example, it is identifiably by its use and/or location within the organization. As a specific example, a system element and/or system asset is identified by an organizational identifier, a division of the organization identifier, a department of a division identifier, a group of a department identifier, and/or a sub-group of a group identifier. In this manner, if the entire system is to be evaluated, the organization identifier is used to select all of the system elements in the system. If a portion of the system is to be test based on business function, then a division, department, group, and/or sub-group identifier is used to select the desired portion of the system.

In addition or in the alternative, a system element and/or system asset is identifiable based on a serial number, an IP (internet protocol) address, a vendor name, a type of system element and/or system asset (e.g., computing entity, a particular user software application, etc.), registered user of the system element and/or system asset, and/or other identifying metric. In this manner, an individual system element and/or system asset can be evaluated and/or a type of system element and/or system asset can be evaluated (e.g., a particular user software application).

A system criteria is regarding a level of the system, or portion thereof, being evaluated. For example, the system criteria includes guidelines, system requirements, system design, system build, and resulting system. As a further example, the guidelines (e.g., business objectives, security objectives, NIST cybersecurity guidelines, system objectives, governmental and/or regulatory requirements, third party requirements, etc.) are used to develop the system requirements, which are used to design the system, which is used to the build the resulting system. As such, the system, or potion thereof, can be evaluated from a guideline level, a system requirements level, a design level, a build level, and/or a resulting system level.

A system mode is regarding a different level of the system, or portion thereof, being evaluated. For example, the system mode includes assets, system functions, and security functions. As such, the system can be evaluated from an assets level, a system function level, and/or a security function level.

The evaluation aspect (e.g., options for how the system, or portion thereof, can be evaluated) includes a selection of one or more evaluation perspectives, a selection of one or more evaluation viewpoints, and/or a selection of one or more evaluation categories, which may further include sub-categories, and sub-categories of the sub-categories). An evaluation perspective is understanding of the system, or portion thereof; implementation (e.g., design and build) of the system, or portion thereof; operational performance of the system, or portion thereof; or self-analysis of the system, or portion thereof.

An evaluation viewpoint is disclosed information from the system, discovered information about the system by the analysis system, or desired information about the system obtained by the analysis system from system proficiency resources. The evaluation viewpoint complements the evaluation perspective to allow for more in-depth and/or detailed evaluations. For example, the analysis system 10 can evaluate how well the system is understood by comparing disclosed data with discovered data. As another example, the analysis system 10 can evaluate how well the system is actually implemented in comparison to a desired level of implementation.

The evaluation category includes an identify category, a protect category, a detect category, a respond category, and a recover category. Each evaluation category includes a plurality of sub-categories and, at least some of the sub-categories include their own sub-categories (e.g., a sub-sub category). For example, the identify category includes the sub-categories of asset management, business environment, governance, risk assessment, risk management, access control, awareness & training, and data security. As a further example, asset management includes the sub-categories of hardware inventory, software inventory, data flow maps, external system cataloged, resource prioritization, and security roles. The analysis system 10 can evaluate the system, or portion thereof, in light of one more evaluation categories, in light of an evaluation category and one or more sub-categories, or in light of an evaluation category, a sub-category, and one or more sub-sub-categories.

The evaluation rating metrics (e.g., how the system, or portion thereof, is evaluated) include a selection of process, policy, procedure, certification, documentation, and/or automation. This allows the analysis system to quantify its evaluation. For example, the analysis system 10 can evaluate the processes a system, or portion thereof, has to generate an evaluation rating, to identify deficiencies, and/or to auto-correct deficiencies. As another example, the analysis system 10 can evaluate how well the system, or portion thereof, uses the process it has to generate an evaluation rating, to identify deficiencies, and/or to auto-correct deficiencies.

In an example, the analysis computing entity 16 (which includes one or more computing entities) sends a data gathering request to the analysis system module 17. The data gathering request is specific to the evaluation to be performed by the analysis system 10. For example, if the analysis system 10 is evaluating the understanding of the policies, processes, documentation, and automation regarding the assets built for the engineering department, then the data gathering request would be specific to policies, processes, documentation, and automation regarding the assets built for the engineering department.

The analysis system module 17 is loaded on the system 11-13 and obtained the requested data from the system. The obtaining of the data can be done in a variety of ways. For example, the data is disclosed by one or more system administrators. The disclosed data corresponds to the information the system administrator(s) has regarding the system. In essence, the disclosed data is a reflection of the knowledge the system administrator(s) has regarding the system.

As another example, the analysis system module 17 communicates with physical assets of the system to discover the data. The communication may be direct with an asset. For example, the analysis system module 17 sends a request to a particular computing device. Alternatively or in addition, the communication may be through one or more discovery tools of the system. For example, the analysis system module 17 communicates with one or more tools of the system to obtain data regarding data segregation & boundary, infrastructure management, exploit & malware protection, encryption, identity & access management, system monitoring, vulnerability management, and/or data protection.

A tool is a network monitoring tool, a network strategy and planning tool, a network managing tool, a Simple Network Management Protocol (SNMP) tool, a telephony monitoring tool, a firewall monitoring tool, a bandwidth monitoring tool, an IT asset inventory management tool, a network discovery tool, a network asset discovery tool, a software discovery tool, a security discovery tool, an infrastructure discovery tool, Security Information & Event Management (SIEM) tool, a data crawler tool, and/or other type of tool to assist in discovery of assets, functions, security issues, implementation of the system, and/or operation of the system. If the system does not have a particular tool, the analysis system module 17 engages one to discover a particular piece of data.

The analysis system module 17 provides the gathered data to the analysis computing entity 16, which stores the gathered data in a private storage 19-21 and processes it. The gathered data is processed alone, in combination with stored data (of the system being evaluated and/or another system's data), in combination with desired data (e.g., system proficiencies), in combination with analysis modeling (e.g., risk modeling, data flow modeling, security modeling, etc.), and/or in combination with stored analytic data (e.g., results of other evaluations). As a result of the processing, the analysis computing entity 16 produces an evaluation rating, to identify deficiencies, and/or to auto-correct deficiencies. The evaluation results are stored in a private storage and/or in another database.

The analysis system 10 is operable to evaluate a system and/or its eco-system at any level of granularity from the entire system to an individual asset over a wide spectrum of evaluation options. As an example, the evaluation is to test understanding of the system, to test the implementation of the system, and/or to test the operation of the system. As another example, the evaluation is to test the system's self-evaluation capabilities with respect to understanding, implementation, and/or operation. As yet another example, the evaluation is to test policies regarding software tools; to test which software tools are prescribed by policy; to test which software tools are prohibited by policy; to test the use of the software tools in accordance with policy, to test maintenance of software tools in accordance with policy; to test the sufficiency of the policies, to test the effectiveness of the policies; and/or to test compliancy with the policies.

The analysis system 10 takes an outside perspective to analyze the system. From within the system, it is often difficult to test the entire system, to test different combinations of system elements, to identify areas of vulnerabilities (assets and human operators), to identify areas of strength (assets and human operators), and to be proactive. Further, such evaluations are additional tasks the system has to perform, which means it consumes resources (human, physicals assets, and financial). Further, since system analysis is not the primary function of a system (supporting the organization is the system's primary purpose), the system analysis is not as thoroughly developed, implemented, and/or executed as is possible when its implemented in a stand-alone analysis system, like system 10.

The primary purpose of the analysis system is to analyze other systems to determine an evaluation rating, to identify deficiencies in the system, and, where it can, auto-correct the deficiencies. The evaluation rating can be regarding how well the system, or portion thereof, is understood, how well it is implemented, and/or how well it operates. The evaluation rating can be regarding how effective the system, or portion thereof, is believed (disclosed data) to support a business function; actually (discovered data) supports a business function; and/or should (desired data) support the business function.

The evaluation rating can be regarding how effective the system, or portion thereof, is believed (disclosed data) to mitigate security risks; actually (discovered data) supports mitigating security risks; and/or should (desired data) support mitigating security risks. The evaluation rating can be regarding how effective the system, or portion thereof, is believed (disclosed data) to respond to security risks; actually (discovered data) supports responding to security risks; and/or should (desired data) support responding security risks.

The evaluation rating can be regarding how effective the system, or portion thereof, is believed (disclosed data) to be used by people; is actually (discovered data) used by people; and/or should (desired data) be used by people. The evaluation rating can be regarding how effective the system, or portion thereof, is believed (disclosed data) to identify assets of the system; actually (discovered data) identifies assets of the system; and/or should (desired data) identify assets of the system.

There are a significant number of combinations in which the analysis system 10 can evaluate a system 11-13. A primary purpose the analysis system 10 is help the system 11-13 become more self-healing, more self-updating, more self-protecting, more self-recovering, more self-evaluating, more self-aware, more secure, more efficient, more adaptive, and/or more self-responding. By discovering the strengths, weaknesses, vulnerabilities, and other system limitations in a way that the system itself cannot do effectively, the analysis system 10 significantly improves the usefulness, security, and efficiency of systems 11-13.

Figure 2A:
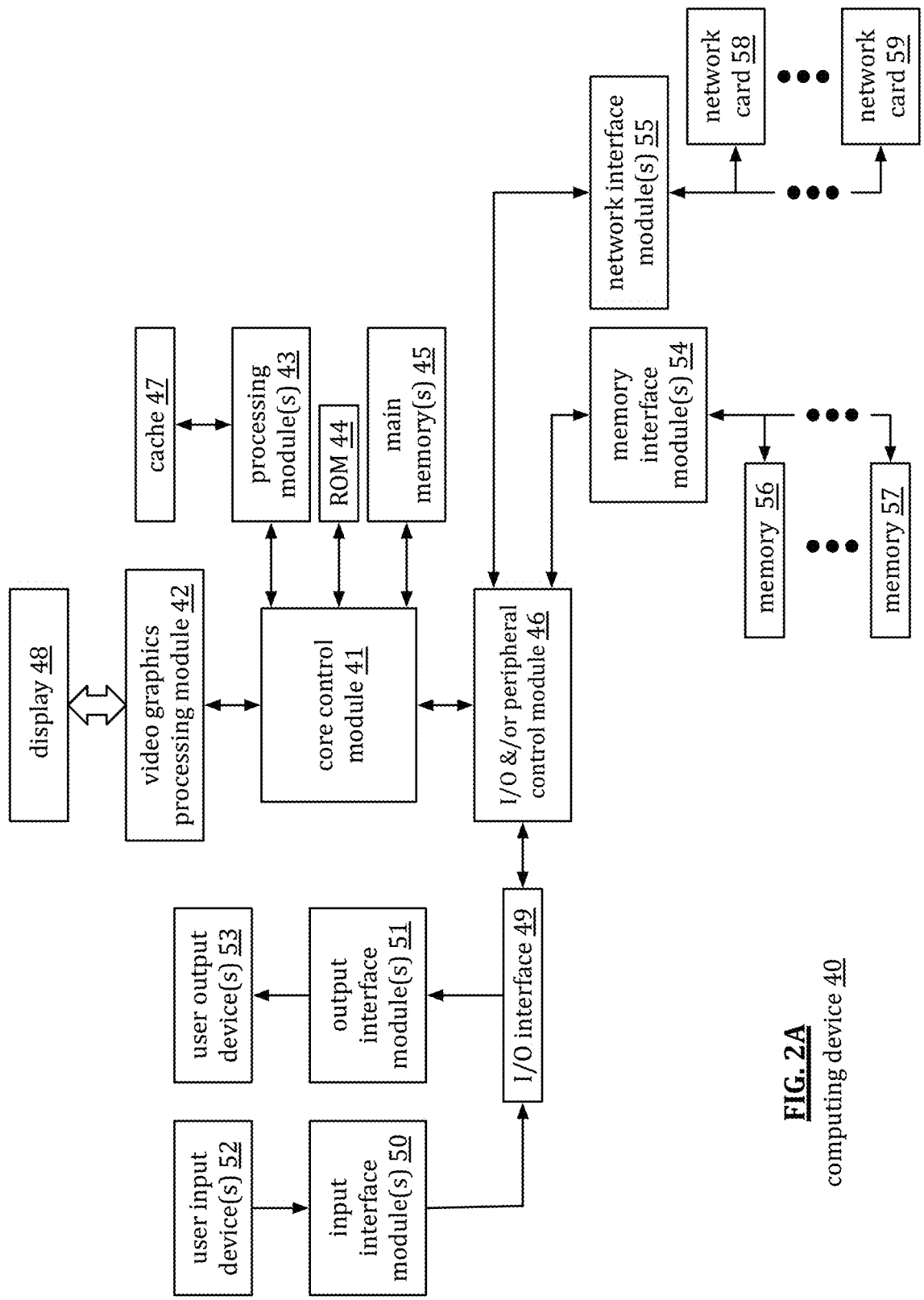

FIG. 2A is a schematic block diagram of an embodiment of a computing device 40 that includes a plurality of computing resources. The computing resource include a core control module 41, one or more processing modules 43, one or more main memories 45, a read only memory (ROM) 44 for a boot up sequence, cache memory 47, a video graphics processing module 42, a display 48 (optional), an Input-Output (I/O) peripheral control module 46, an I/O interface module 49 (which could be omitted), one or more input interface modules 50, one or more output interface modules 51, one or more network interface modules 55, and one or more memory interface modules 54. A processing module 43 is described in greater detail at the end of the detailed description of the invention section and, in an alternative embodiment, has a direction connection to the main memory 45. In an alternate embodiment, the core control module 41 and the I/O and/or peripheral control module 46 are one module, such as a chipset, a quick path interconnect (QPI), and/or an ultra-path interconnect (UPI).

Each of the main memories 45 includes one or more Random Access Memory (RAM) integrated circuits, or chips. For example, a main memory 45 includes four DDR4 ($4^{th}$ generation of double data rate) RAM chips, each running at a rate of 2,400 MHz. In general, the main memory 45 stores data and operational instructions most relevant for the processing module 43. For example, the core control module 41 coordinates the transfer of data and/or operational instructions between the main memory 45 and the memory 56-57. The data and/or operational instructions retrieve from memory 56-57 are the data and/or operational instructions requested by the processing module or will most likely be needed by the processing module. When the processing module is done with the data and/or operational instructions in main memory, the core control module 41 coordinates sending updated data to the memory 56-57 for storage.

The memory 56-57 includes one or more hard drives, one or more solid state memory chips, and/or one or more other large capacity storage devices that, in comparison to cache memory and main memory devices, is/are relatively inexpensive with respect to cost per amount of data stored. The memory 56-57 is coupled to the core control module 41 via the I/O and/or peripheral control module 46 and via one or more memory interface modules 54. In an embodiment, the I/O and/or peripheral control module 46 includes one or more Peripheral Component Interface (PCI) buses to which peripheral components connect to the core control module 41. A memory interface module 54 includes a software driver and a hardware connector for coupling a memory device to the I/O and/or peripheral control module 46. For example, a memory interface 54 is in accordance with a Serial Advanced Technology Attachment (SATA) port.

The core control module 41 coordinates data communications between the processing module(s) 43 and the network(s) 14 via the I/O and/or peripheral control module 46, the network interface module(s) 55, and a network card 58 or 59. A network card 58 or 59 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 55 includes a software driver and a hardware connector for coupling the network card to the I/O and/or peripheral control module 46. For example, the network interface module 55 is in accordance with one or more versions of IEEE 802.11, cellular telephone protocols, 10/100/1000 Gigabit LAN protocols, etc.

The core control module 41 coordinates data communications between the processing module(s) 43 and input device(s) 52 via the input interface module(s) 50, the I/O interface 49, and the I/O and/or peripheral control module 46. An input device 52 includes a keypad, a keyboard, control switches, a touchpad, a microphone, a camera, etc. An input interface module 50 includes a software driver and a hardware connector for coupling an input device to the I/O and/or peripheral control module 46. In an embodiment, an input interface module 50 is in accordance with one or more Universal Serial Bus (USB) protocols.

The core control module 41 coordinates data communications between the processing module(s) 43 and output device(s) 53 via the output interface module(s) 51 and the I/O and/or peripheral control module 46. An output device 53 includes a speaker, auxiliary memory, headphones, etc.

An output interface module 51 includes a software driver and a hardware connector for coupling an output device to the I/O and/or peripheral control module 46. In an embodiment, an output interface module 46 is in accordance with one or more audio codec protocols.

The processing module 43 communicates directly with a video graphics processing module 42 to display data on the display 48. The display 48 includes an LED (light emitting diode) display, an LCD (liquid crystal display), and/or other type of display technology. The display has a resolution, an aspect ratio, and other features that affect the quality of the display. The video graphics processing module 42 receives data from the processing module 43, processes the data to produce rendered data in accordance with the characteristics of the display, and provides the rendered data to the display 48.

Figure 2B:
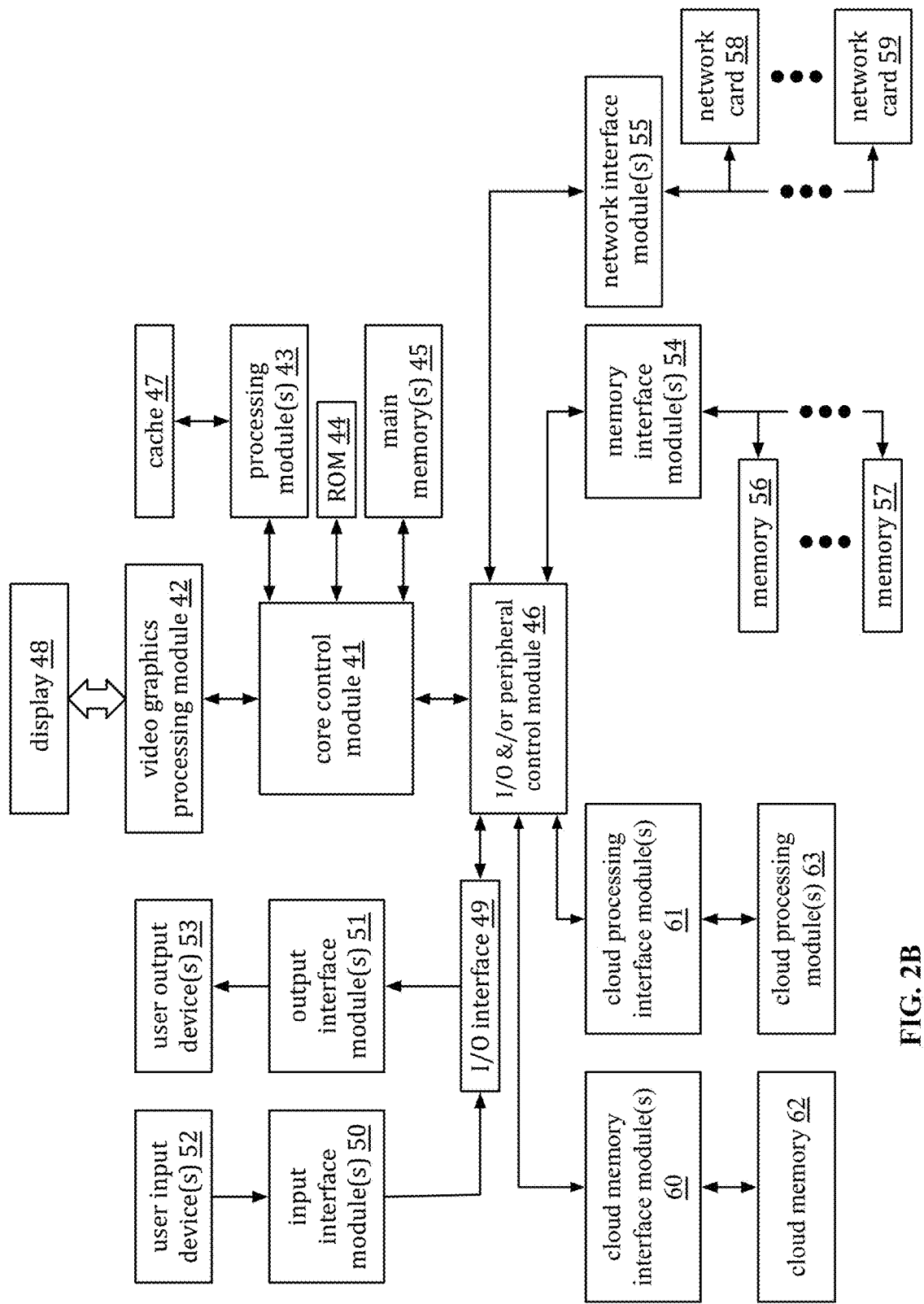

FIG. 2B is a schematic block diagram of an embodiment of a computing device 40 that includes a plurality of computing resources similar to the computing resources of FIG. 2A with the addition of one or more cloud memory interface modules 60, one or more cloud processing interface modules 61, cloud memory 62, and one or more cloud processing modules 63. The cloud memory 62 includes one or more tiers of memory (e.g., ROM, volatile (RAM, main, etc.), non-volatile (hard drive, solid-state, etc.) and/or backup (hard drive, tape, etc.)) that is remoted from the core control module and is accessed via a network (WAN and/or LAN). The cloud processing module 63 is similar to processing module 43 but is remoted from the core control module and is accessed via a network.

FIG. 2C is a schematic block diagram of an embodiment of a computing device 40 that includes a plurality of computing resources similar to the computing resources of FIG. 2B with a change in how the cloud memory interface module(s) 60 and the cloud processing interface module(s) 61 are coupled to the core control module 41. In this embodiment, the interface modules 60 and 61 are coupled to a cloud peripheral control module 63 that directly couples to the core control module 41.

Figure 2D:
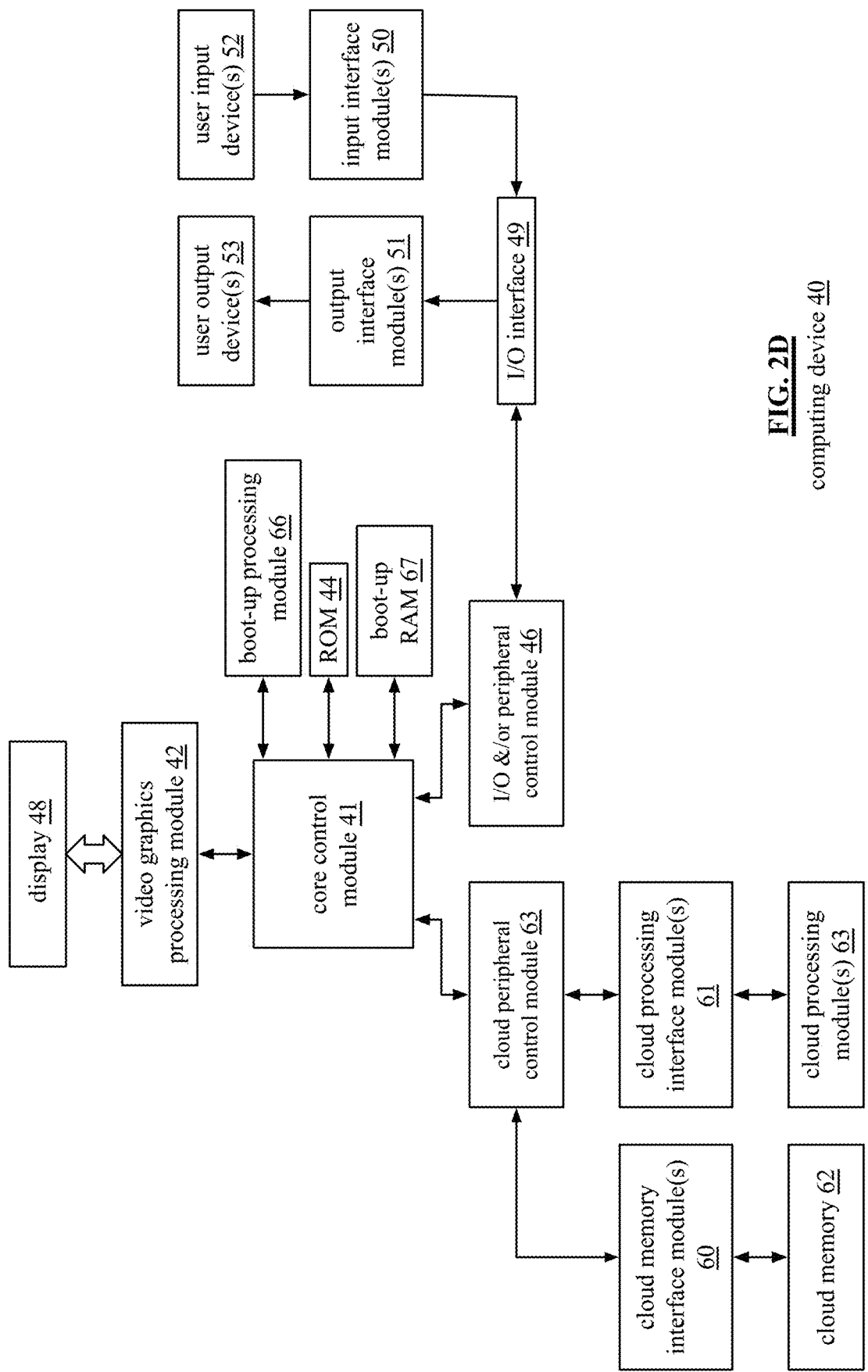

FIG. 2D is a schematic block diagram of an embodiment of a computing device 40 that includes a plurality of computing resources, which includes include a core control module 41, a boot up processing module 66, boot up RAM 67, a read only memory (ROM) 45, a video graphics processing module 42, a display 48 (optional), an Input-Output (I/O) peripheral control module 46, one or more input interface modules 50, one or more output interface modules 51, one or more cloud memory interface modules 60, one or more cloud processing interface modules 61, cloud memory 62, and cloud processing module(s) 63.

In this embodiment, the computing device 40 includes enough processing resources (e.g., module 66, ROM 44, and RAM 67) to boot up. Once booted up, the cloud memory 62 and the cloud processing module(s) 63 function as the computing device's memory (e.g., main and hard drive) and processing module.

FIG. 3A is schematic block diagram of an embodiment of a computing entity 16 that includes a computing device 40 (e.g., one of the embodiments of FIGS. 2A-2D). A computing device may function as a user computing device, a server, a system computing device, a data storage device, a data security device, a networking device, a user access device, a cell phone, a tablet, a laptop, a printer, a game console, a satellite control box, a cable box, etc.

FIG. 3B is schematic block diagram of an embodiment of a computing entity 16 that includes two or more computing devices 40 (e.g., two or more from any combination of the embodiments of FIGS. 2A-2D). The computing devices 40 perform the functions of a computing entity in a peer processing manner (e.g., coordinate together to perform the functions), in a master-slave manner (e.g., one computing device coordinates and the other support it), and/or in another manner.

FIG. 3C is schematic block diagram of an embodiment of a computing entity 16 that includes a network of computing devices 40 (e.g., two or more from any combination of the embodiments of FIGS. 2A-2D). The computing devices are coupled together via one or more network connections (e.g., WAN, LAN, cellular data, WLAN, etc.) and preform the functions of the computing entity.

FIG. 3D is schematic block diagram of an embodiment of a computing entity 16 that includes a primary computing device (e.g., any one of the computing devices of FIGS. 2A-2D), an interface device (e.g., a network connection), and a network of computing devices 40 (e.g., one or more from any combination of the embodiments of FIGS. 2A-2D). The primary computing device utilizes the other computing devices as co-processors to execute one or more the functions of the computing entity, as storage for data, for other data processing functions, and/or storage purposes.

FIG. 3E is schematic block diagram of an embodiment of a computing entity 16 that includes a primary computing device (e.g., any one of the computing devices of FIGS. 2A-2D), an interface device (e.g., a network connection) 70, and a network of computing resources 71 (e.g., two or more resources from any combination of the embodiments of FIGS. 2A-2D). The primary computing device utilizes the computing resources as co-processors to execute one or more the functions of the computing entity, as storage for data, for other data processing functions, and/or storage purposes.

Figure 4:
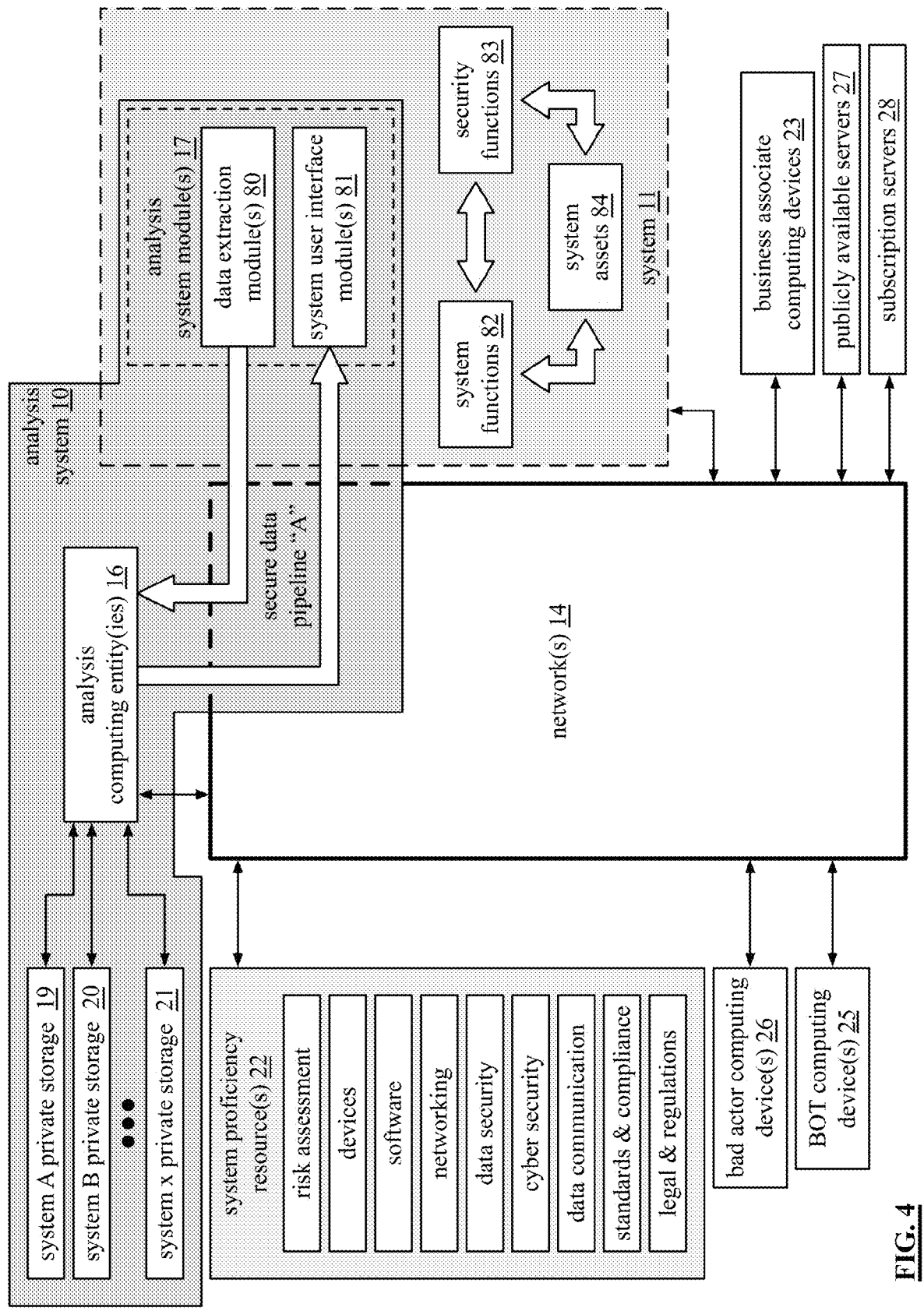
FIG. 4 is a schematic block diagram of another embodiment of a networked environment that includes a system coupled to an analysis system in accordance with the present disclosure.

FIG. 4 is a schematic block diagram of another embodiment of a networked environment that includes a system 11 (or system 12 or system 13), the analysis system 10, one or more networks, one or more system proficiency resources 22, one or more business associated computing devices 23, one or more non-business associated computing devices 24 (e.g., publicly available servers 27 and subscription based servers 28), one or more BOT computing devices 25, and one or more bad actor computing devices 26. This diagram is similar to FIG. 1 with the inclusion of detail within the system proficiency resource(s) 22, with inclusion of detail within the system 11, and with the inclusion of detail within the analysis system module 17.

In addition to the discussion with respect FIG. 1, a system proficiency resource 22 is a computing device that provides information regarding best-in-class assets, best-in-class practices, known protocols, leading edge information, and/or established guidelines regarding risk assessment, devices, software, networking, data security, cybersecurity, and/or data communication. A system proficiency resource 22 is a computing device that may also provide information regarding standards, information regarding compliance requirements, information regarding legal requirements, and/or information regarding regulatory requirements.

The system 11 is shown to include three inter-dependent modes: system functions 82, security functions 83, and system assets 84. System functions 82 correspond to the functions the system executes to support the organization's business requirements. Security functions 83 correspond to the functions the system executes to support the organization's security requirements. The system assets 84 are the hardware and/or software platforms that support system functions 82 and/or the security functions 83.

The analysis system module 17 includes one or more data extraction modules 80 and one or more system user interface modules 81. A data extraction module 80, which will be described in greater detail with reference to one or more subsequent figures, gathers data from the system for analysis by the analysis system 10. A system user interface module 81 provides a user interface between the system 11 and the analysis system 10 and functions to provide user information to the analysis system 10 and to receive output data from the analysis system. The system user interface module 81 will be described in greater detail with reference to one or more subsequent figures.

Figure 5:
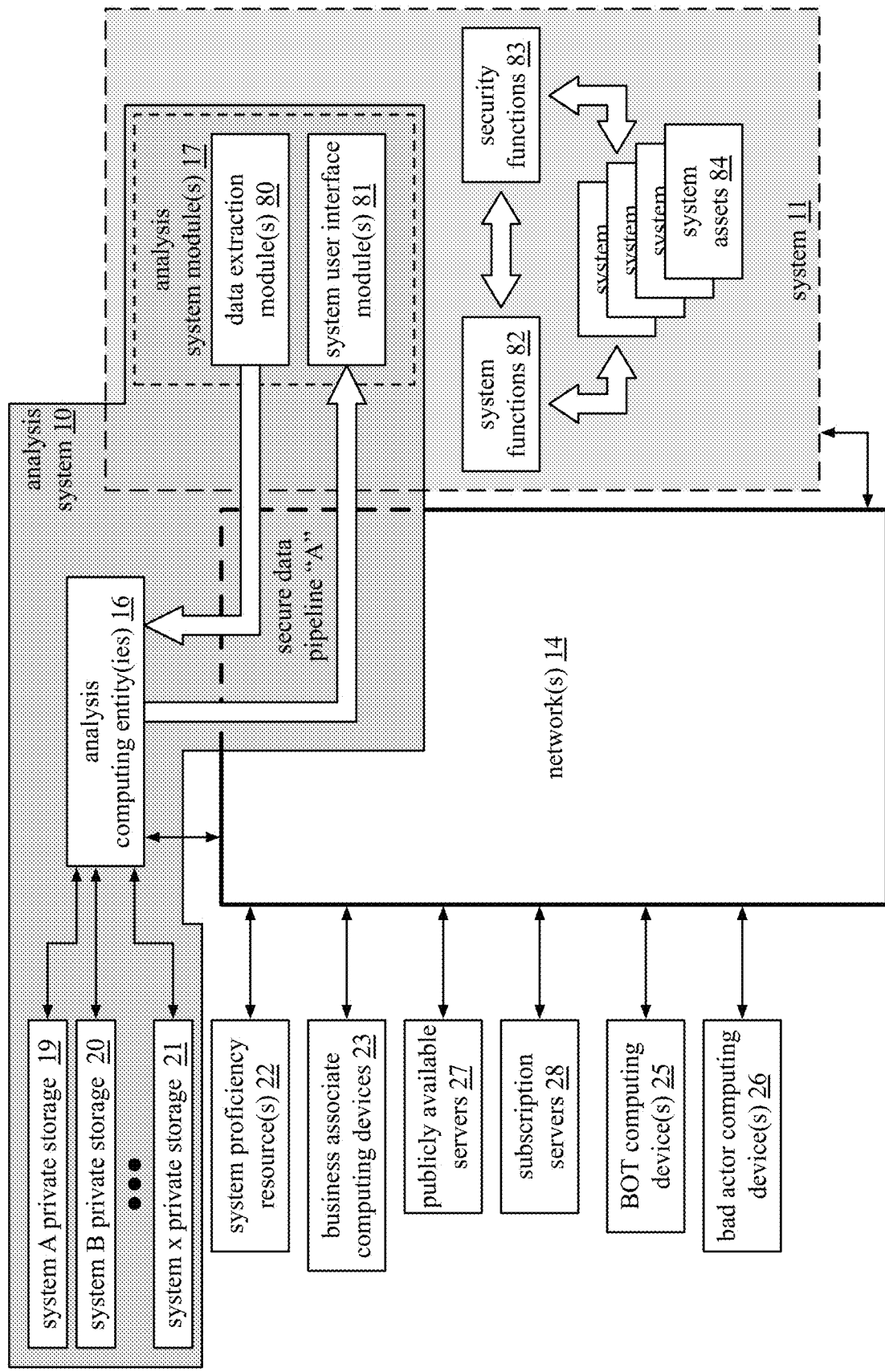
FIG. 5 is a schematic block diagram of another embodiment of a networked environment that includes a system coupled to an analysis system in accordance with the present disclosure.

FIG. 5 is a schematic block diagram of another embodiment of a networked environment that includes a system 11 (or system 12 or system 13), the analysis system 10, one or more networks, one or more system proficiency resources 22, one or more business associated computing devices 23, one or more non-business associated computing devices 24 (e.g., publicly available servers 27 and subscription based servers 28), one or more BOT computing devices 25, and one or more bad actor computing devices 26. This diagram is similar to FIG. 4 with the inclusion of additional detail within the system 11.

In this embodiment, the system 11 includes a plurality of sets of system assets to support the system functions 82 and/or the security functions 83. For example, a set of system assets supports the system functions 82 and/or security functions 83 for a particular business segment (e.g., a department within the organization). As another example, a second set of system assets supports the security functions 83 for a different business segment and a third set of system assets supports the system functions 82 for the different business segment.

Figure 6:
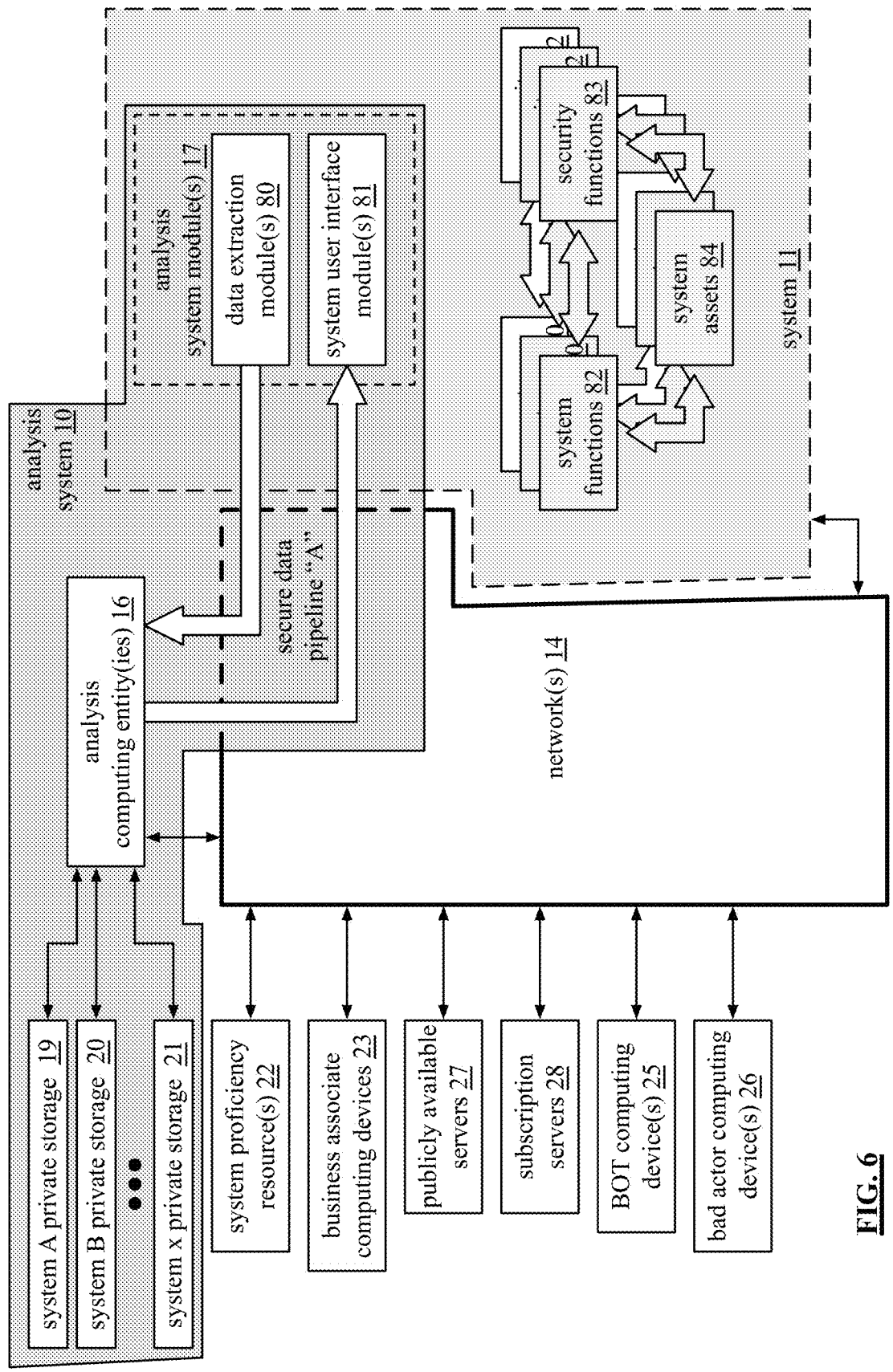
FIG. 6 is a schematic block diagram of another embodiment of a networked environment that includes a system coupled to an analysis system in accordance with the present disclosure.

FIG. 6 is a schematic block diagram of another embodiment of a networked environment that includes a system 11 (or system 12 or system 13), the analysis system 10, one or more networks, one or more system proficiency resources 22, one or more business associated computing devices 23, one or more non-business associated computing devices 24 (e.g., publicly available servers 27 and subscription based servers 28), one or more BOT computing devices 25, and one or more bad actor computing devices 26. This diagram is similar to FIG. 5 with the inclusion of additional detail within the system 11.

In this embodiment, the system 11 includes a plurality of sets of system assets 84, system functions 82, and security functions 83. For example, a set of system assets 84, system functions 82, and security functions 83 supports one department in an organization and a second set of system assets 84, system functions 82, and security functions 83 supports another department in the organization.

Figure 7:
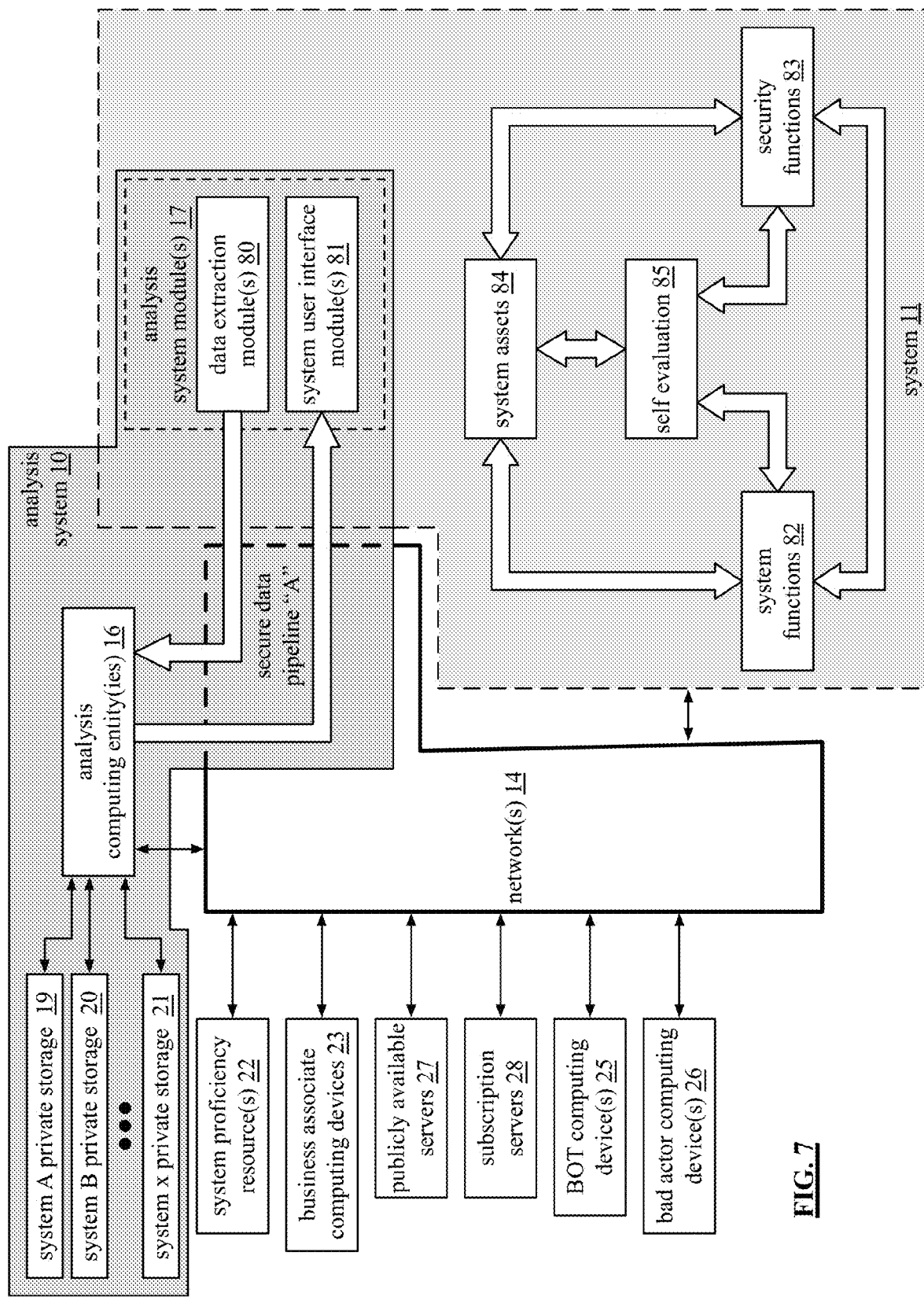
FIG. 7 is a schematic block diagram of another embodiment of a networked environment that includes a system coupled to an analysis system in accordance with the present disclosure.

FIG. 7 is a schematic block diagram of another embodiment of a networked environment that includes a system 11 (or system 12 or system 13), the analysis system 10, one or more networks, one or more system proficiency resources 22, one or more business associated computing devices 23, one or more non-business associated computing devices 24 (e.g., publicly available servers 27 and subscription based servers 28), one or more BOT computing devices 25, and one or more bad actor computing devices 26. This diagram is similar to FIG. 4 with the inclusion of additional detail within the system 11.

In this embodiment, the system 11 includes system assets 84, system functions 82, security functions 83, and self-evaluation functions 85. The self-evaluation functions 85 are supported by the system assets 84 and are used by the system to evaluate its assets, is system functions, and its security functions. In general, self-evaluates looks at system's ability to analyze itself for self-determining it's understanding (self-aware) of the system; self-determining the implementation of the system, and/or self-determining operation of the system. In addition, the self-evaluation may further consider the system's ability to self-heal, self-update, self-protect, self-recover, self-evaluate, and/or self-respond. The analysis system 10 can evaluate the understanding, implementation, and/or operation of the self-evaluation functions.

Figure 8:
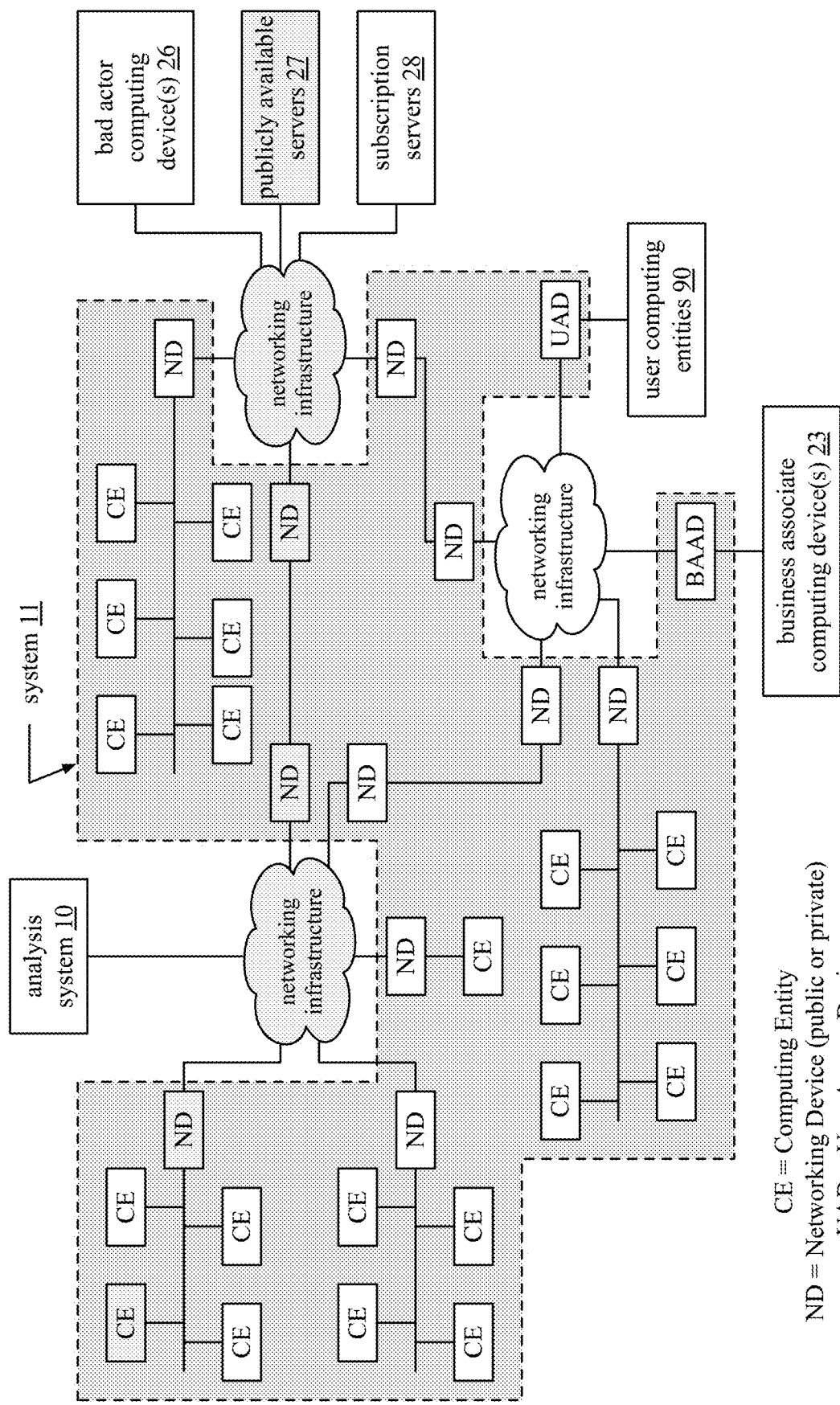
FIG. 8 is a schematic block diagram of another embodiment of a networked environment having a system that includes a plurality of system elements in accordance with the present disclosure.

FIG. 8 is a schematic block diagram of another embodiment of a networked environment having a system 11 (or system 12 or system 13), the analysis system 10, one or more networks represented by networking infrastructure, one or more system proficiency resources 22, one or more business associated computing devices 23, one or more publicly available servers 27, one or more subscription based servers 28, one or more BOT computing devices 25, and one or more bad actor computing devices 26.

In this embodiment, the system 11 is shown to include a plurality of physical assets dispersed throughout a geographic region (e.g., a building, a town, a county, a state, a country). Each of the physical assets includes hardware and software to perform its respective functions within the system. A physical asset is a computing entity (CE), a public or provide networking device (ND), a user access device (UAD), or a business associate access device (BAAD).

A computing entity may be a user device, a system admin device, a server, a printer, a data storage device, etc. A network device may be a local area network device, a network card, a wide area network device, etc. A user access device is a portal that allows authorizes users of the system to remotely access the system. A business associated access device is a portal that allows authorized business associates of the system access the system.

Some of the computing entities are grouped via a common connection to a network device, which provides the group of computing entities access to other parts of the system and/or the internet. For example, the highlighted computing entity may access a publicly available server 25 via network devices coupled to the network infrastructure. The analysis system 10 can evaluation whether this is an appropriate access, the understanding of this access, the implementation to enable this access, and/or the operation of the system to support this access.

Figure 9:
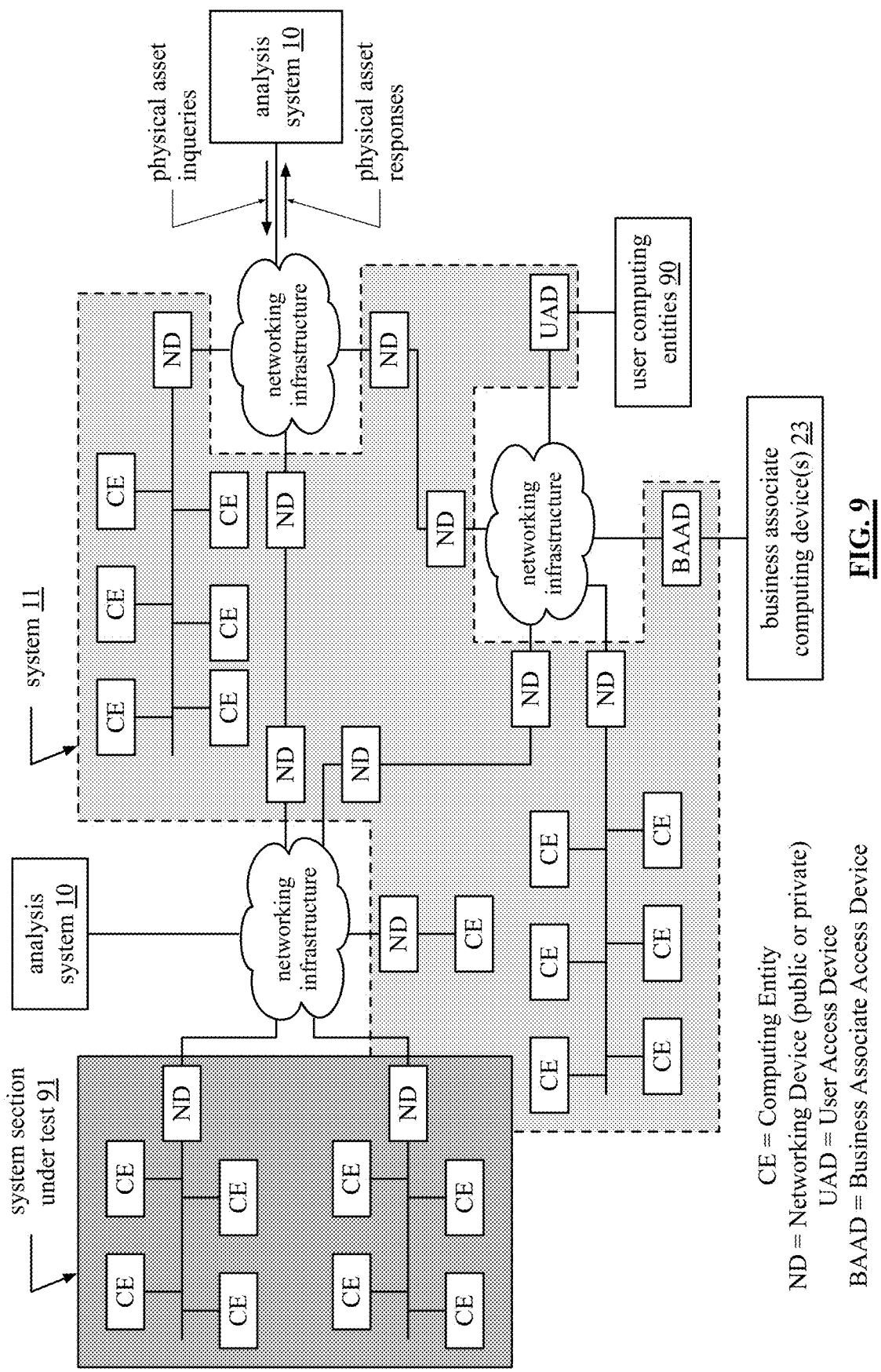
FIG. 9 is a schematic block diagram of an example of a system section of a system selected for evaluation in accordance with the present disclosure.

FIG. 9 is a schematic block diagram of an example of a system section of a system selected for evaluation similar to FIG. 8. In this example, only a portion of the system is being tested, i.e., system section under test 91. As such, the analysis system 10 only evaluates assets, system functions, and/or security functions related to assets within the system section under test 91.

Figure 10:
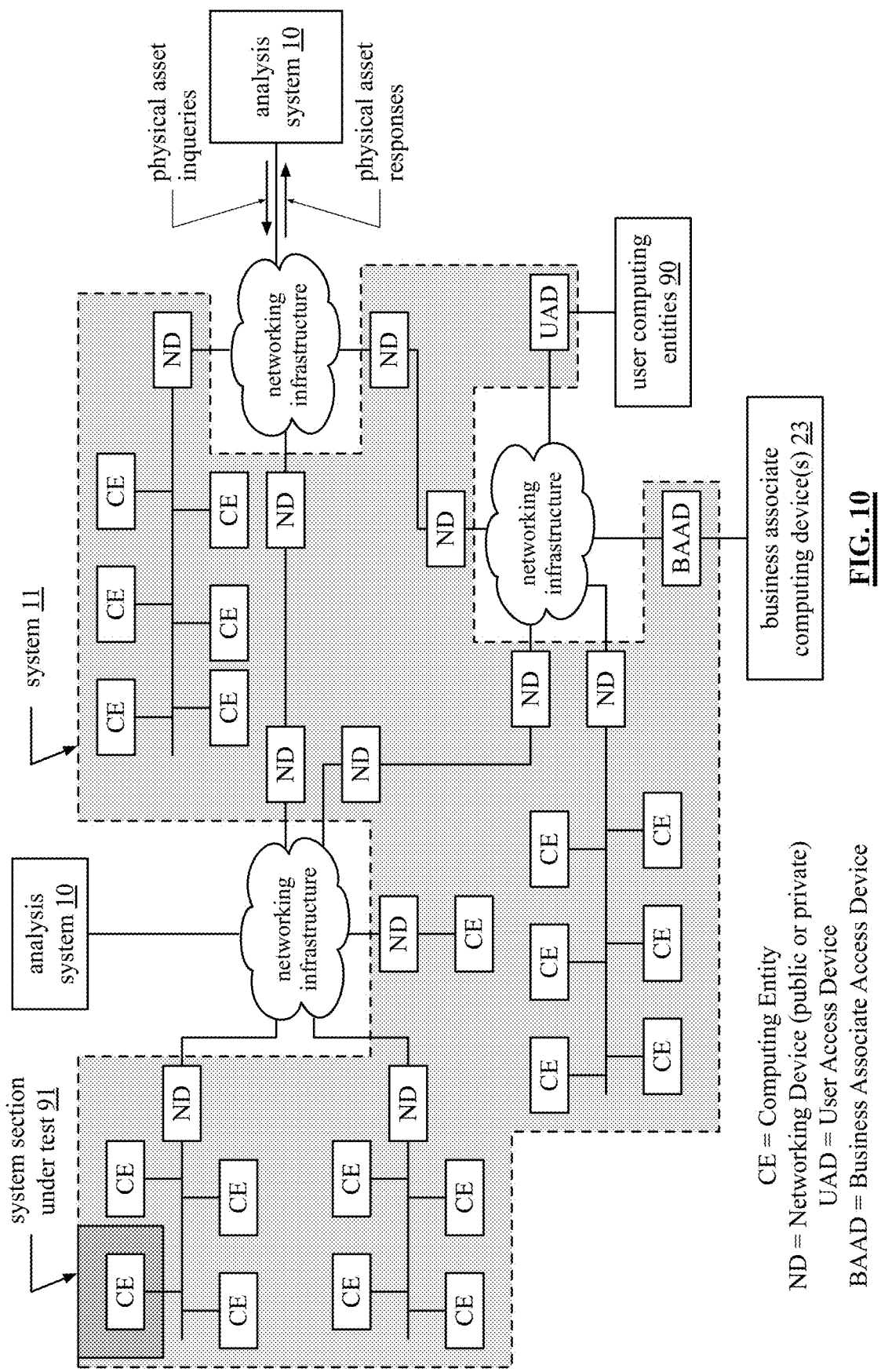
FIG. 10 is a schematic block diagram of another example of a system section of a system selected for evaluation in accordance with the present disclosure.

FIG. 10 is a schematic block diagram of another example of a system section of a system selected for evaluation similar to FIG. 9. In this example, a single computing entity (CE) is being tested, i.e., system section under test 91. As such, the analysis system 10 only evaluates assets, system functions, and/or security functions related to the selected computing entity.

Figure 11:
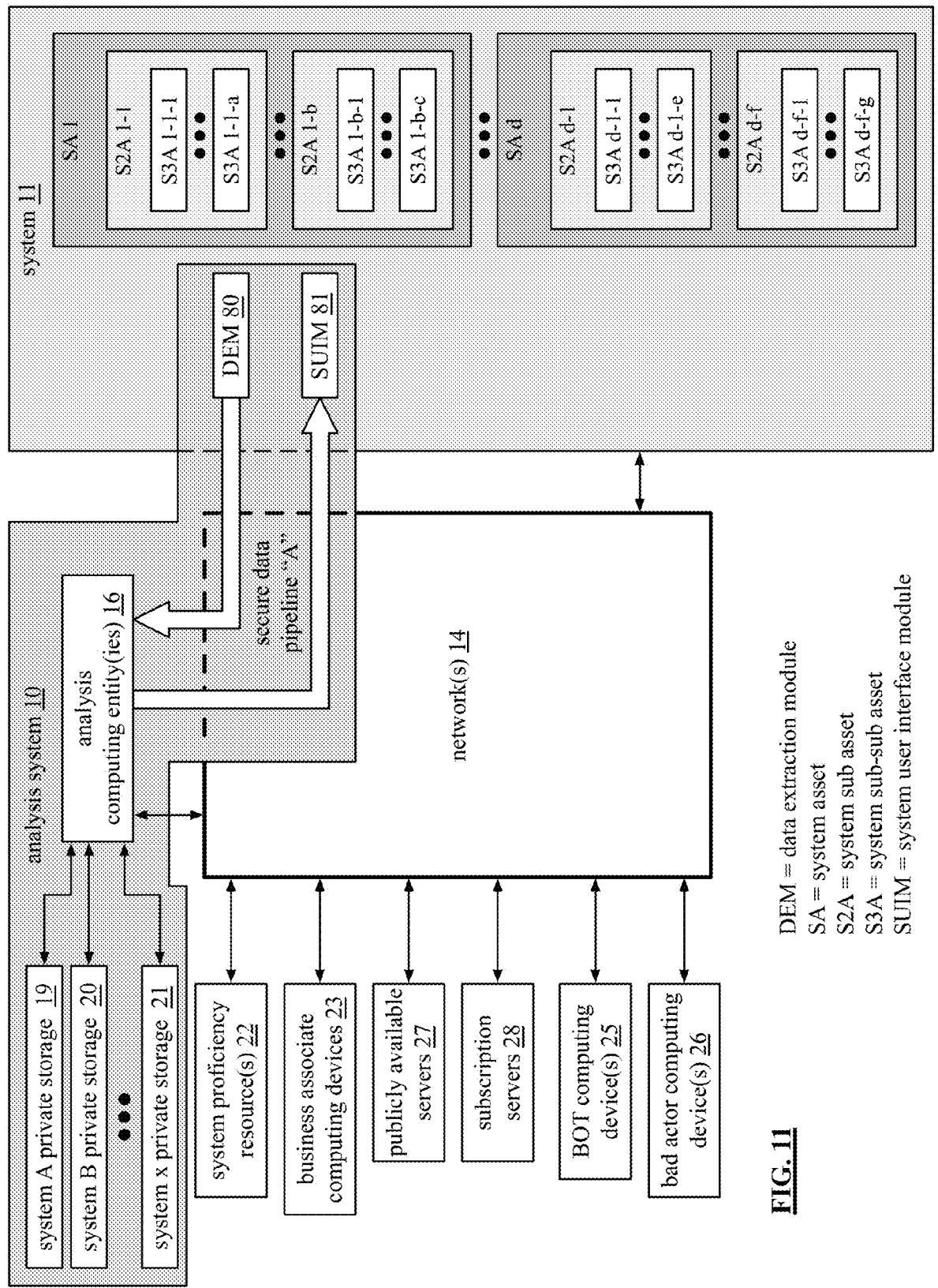
FIG. 11 is a schematic block diagram of an embodiment of a networked environment having a system that includes a plurality of system assets coupled to an analysis system in accordance with the present disclosure.

FIG. 11 is a schematic block diagram of an embodiment of a networked environment having a system 11 (or system 12 or system 13), the analysis system 10, one or more networks 14, one or more system proficiency resources 22, one or more business associated computing devices 23, one or more publicly available servers 27, one or more subscription based servers 28, one or more BOT computing devices 25, and one or more bad actor computing devices 26.

In this embodiment, the system 11 is shown to include a plurality of system assets (SA). A system asset (SA) may include one or more system sub assets (S2A) and a system sub asset (S2A) may include one or more system sub-sub assets (S3A). While being a part of the analysis system 10, at least one data extraction module (DEM) 80 and at least one system user interface module (SUIM) 81 are installed on the system 11.

A system element includes one or more system assets. A system asset (SA) may be a physical asset or a conceptual asset as previously described. As an example, a system element includes a system asset of a computing device. The computing device, which is the SA, includes user applications and an operating system; each of which are sub assets of the computing device (S2A). In addition, the computing device includes a network card, memory devices, etc., which are sub assets of the computing device (S2A). Documents created from a word processing user application are sub assets of the word processing user application (S3A) and sub-sub assets of the computing device.

As another example, the system asset (SA) includes a plurality of computing devices, printers, servers, etc. of a department of the organization operating the system 11. In this example, a computing device is a sub asset of the system asset and the software and hardware of the computing devices are sub-sub assets.

The analysis system 10 may evaluate understanding, implementation, and/or operation of one or more system assets, one or more system sub assets, and/or one or more system sub-sub assets, as an asset, as it supports system functions 82, and/or as it supports security functions. The evaluation may be to produce an evaluation rating, to identify deficiencies, and/or to auto-correct deficiencies.

Figure 12:
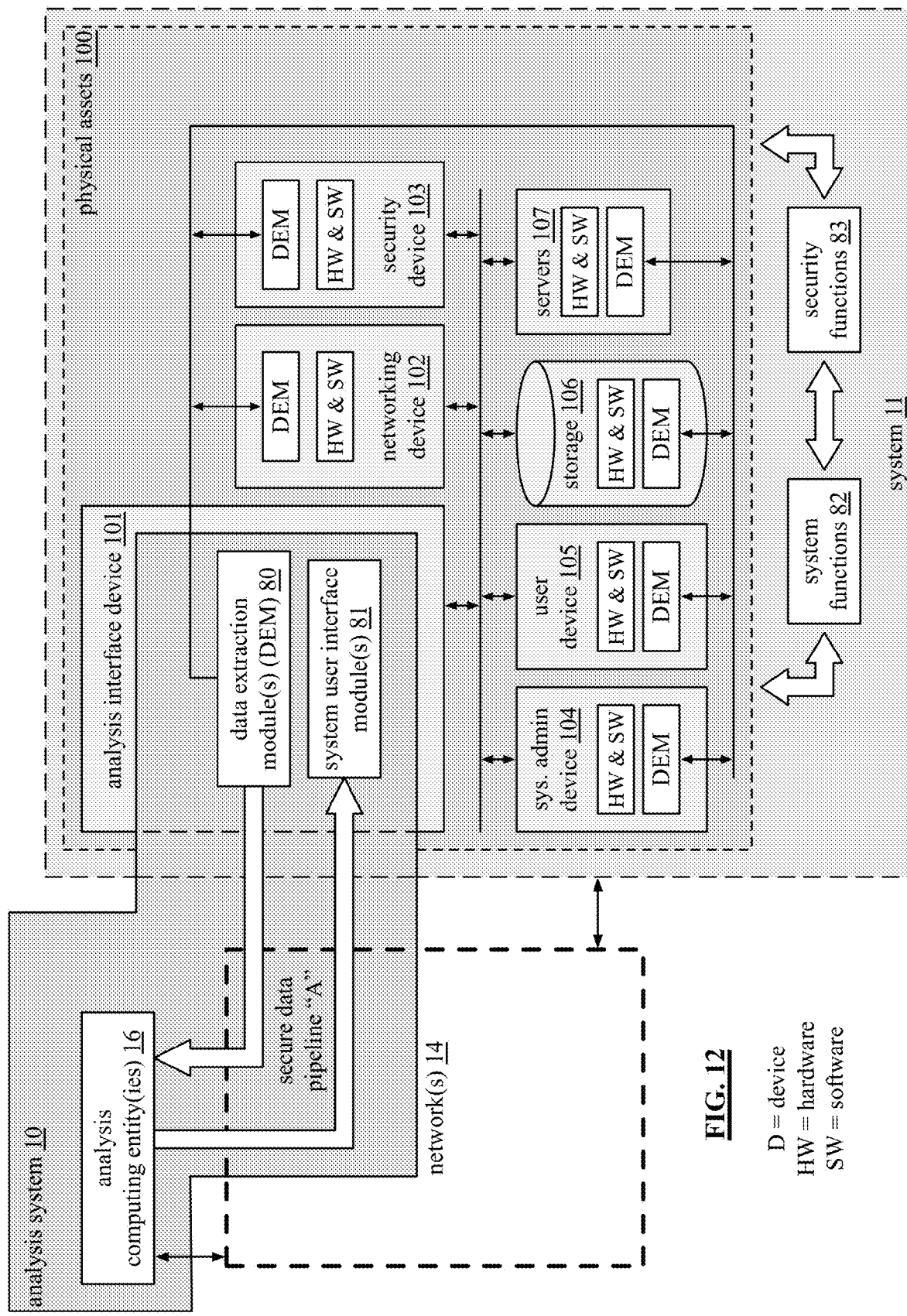
FIG. 12 is a schematic block diagram of an embodiment of a system that includes a plurality of physical assets coupled to an analysis system in accordance with the present disclosure.

FIG. 12 is a schematic block diagram of an embodiment of a system 11 that includes a plurality of physical assets 100 coupled to an analysis system 100. The physical assets 100 include an analysis interface device 101, one or more networking devices 102, one or more security devices 103, one or more system admin devices 104, one or more user devices 105, one or more storage devices 106, and/or one or more servers 107. Each device may be a computing entity that includes hardware (HW) components and software (SW) applications (user, device, drivers, and/or system). A device may further include a data extraction module (DEM).

The analysis interface device 101 includes a data extraction module (DEM) 80 and the system user interface module 81 to provide connectivity to the analysis system 10. With the connectivity, the analysis system 10 is able to evaluate understanding, implementation, and/or operation of each device, or portion thereof, as an asset, as it supports system functions 82, and/or as it supports security functions. For example, the analysis system 10 evaluates the understanding of networking devices 102 as an asset. As a more specific example, the analysis system 10 evaluates how well the networking devices 102, its hardware, and its software are understood within the system and/or by the system administrators. The evaluation includes how well are the networking devices 102, its hardware, and its software documented; how well are they implemented based on system requirements; how well do they operate based on design and/or system requirements; how well are they maintained per system policies and/or procedures; how well are their deficiencies identified; and/or how well are their deficiencies auto-corrected.

Figure 13:
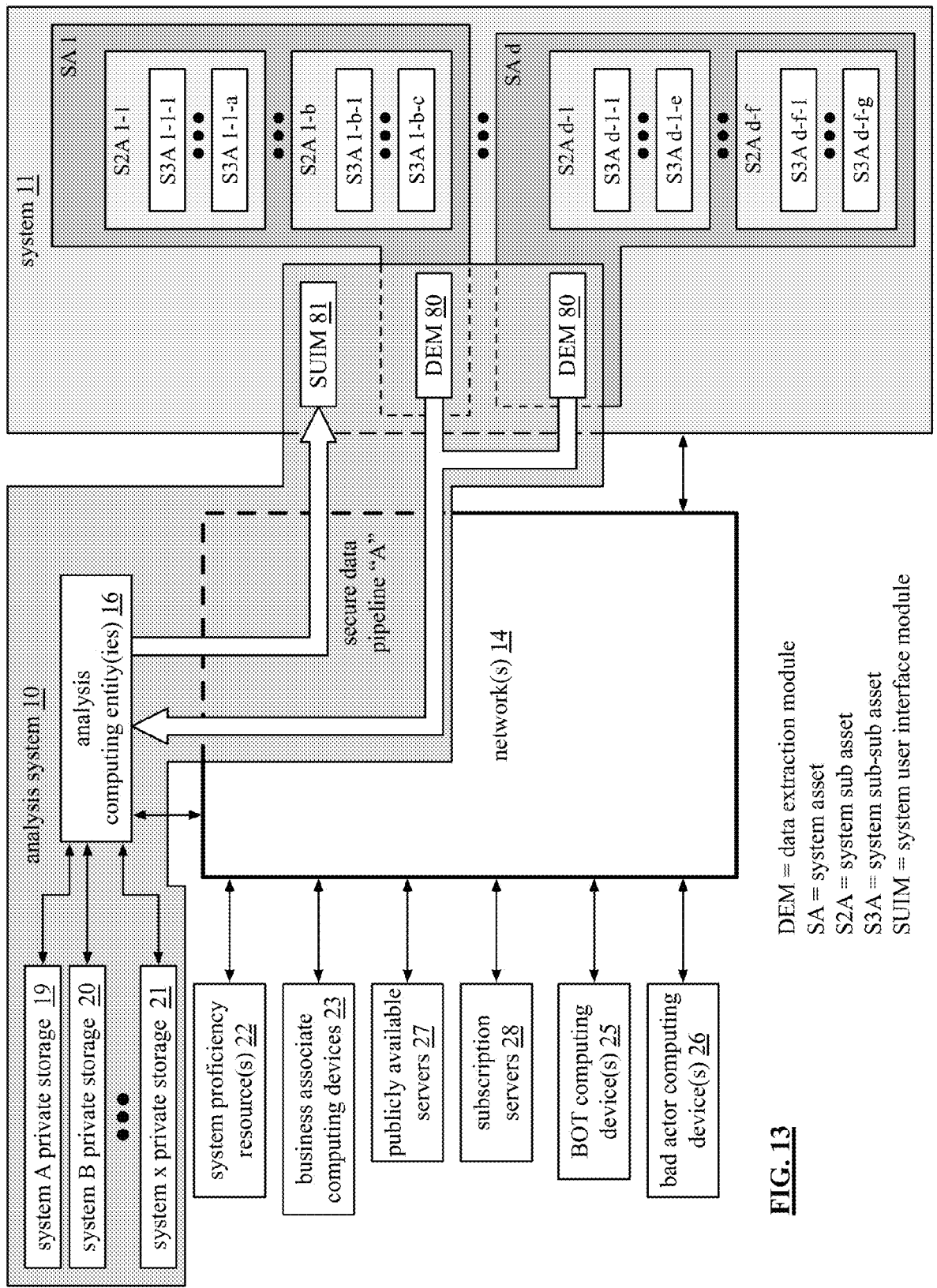
FIG. 13 is a schematic block diagram of another embodiment of a networked environment having a system that includes a plurality of system assets coupled to an analysis system in accordance with the present disclosure.

FIG. 13 is a schematic block diagram of another embodiment of a networked environment having a system 11 that includes a plurality of system assets coupled to an analysis system 10. This embodiment is similar to the embodiment of FIG. 11 with the addition of additional data extraction modules (DEM) 80. In this embodiment, each system asset (SA) is affiliated with its own DEM 80. This allows the analysis system 10 to extract data more efficiently than via a single DEM. A further extension of this embodiment is that each system sub asset (S2A) could have its own DEM 80. As yet a further extension, each system sub-sub asset (S3A) could have its own DEM 80.

Figure 14:
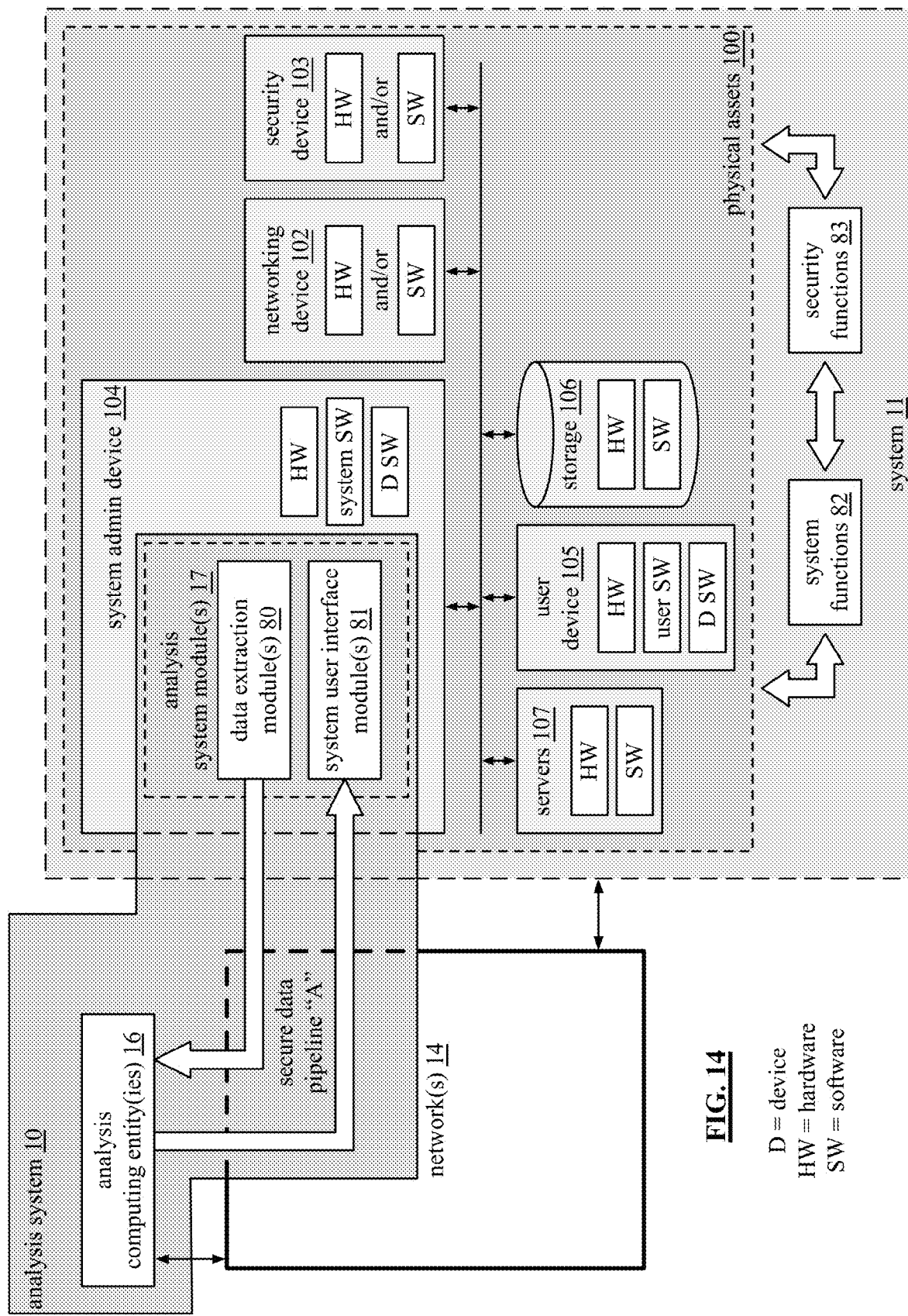
FIG. 14 is a schematic block diagram of another embodiment of a system that includes a plurality of physical assets coupled to an analysis system in accordance with the present disclosure.

FIG. 14 is a schematic block diagram of another embodiment of a system 11 physical assets 100 coupled to an analysis system 100. The physical assets 100 include one or more networking devices 102, one or more security devices 103, one or more system admin devices 104, one or more user devices 105, one or more storage devices 106, and/or one or more servers 107. Each device may be a computing entity that includes hardware (HW) components and software (SW) applications (user, system, and/or device).

The system admin device 104 includes one or more analysis system modules 17, which includes a data extraction module (DEM) 80 and the system user interface module 81 to provide connectivity to the analysis system 10. With the connectivity, the analysis system 10 is able to evaluate understanding, implementation, and/or operation of each device, or portion thereof, as an asset, as it supports system functions 82, and/or as it supports security functions. For example, the analysis system 10 evaluates the implementation of networking devices 102 to support system functions. As a more specific example, the analysis system 10 evaluates how well the networking devices 102, its hardware, and its software are implemented within the system to support one or more system functions (e.g., managing network traffic, controlling network access per business guidelines, policies, and/or processes, etc.). The evaluation includes how well is the implementation of the networking devices 102, its hardware, and its software documented to support the one or more system functions; how well does their implementation support the one or more system functions; how well have their implementation to support the one or more system functions been verified in accordance with policies, processes, etc.; how well are they updated per system policies and/or procedures; how well are their deficiencies in support of the one or more system functions identified; and/or how well are their deficiencies in support of the one or more system functions auto-corrected.

Figure 15:
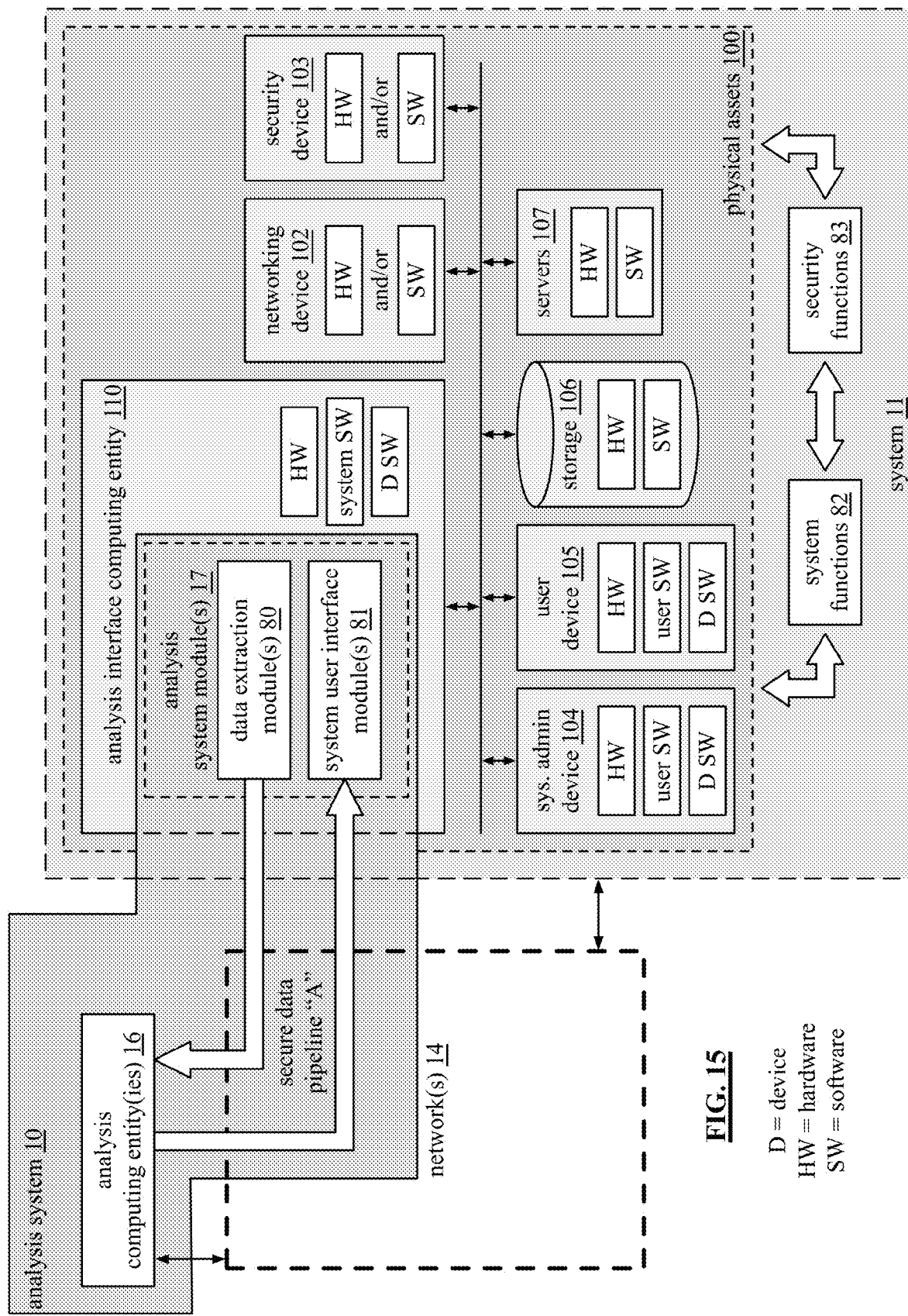
FIG. 15 is a schematic block diagram of another embodiment of a system that includes a plurality of physical assets coupled to an analysis system in accordance with the present disclosure.

FIG. 15 is a schematic block diagram of another embodiment of a system 11 that includes a plurality of physical assets 100 coupled to an analysis system 100. The physical assets 100 include an analysis interface device 101, one or more networking devices 102, one or more security devices 103, one or more system admin devices 104, one or more user devices 105, one or more storage devices 106, and/or one or more servers 107. Each device may be a computing entity that includes hardware (HW) components and software (SW) applications (user, device, drivers, and/or system). This embodiment is similar to the embodiment of FIG. 12 with a difference being that the devices 102-107 do not include a data extraction module (DEM) as is shown in FIG. 12.

Figure 16:
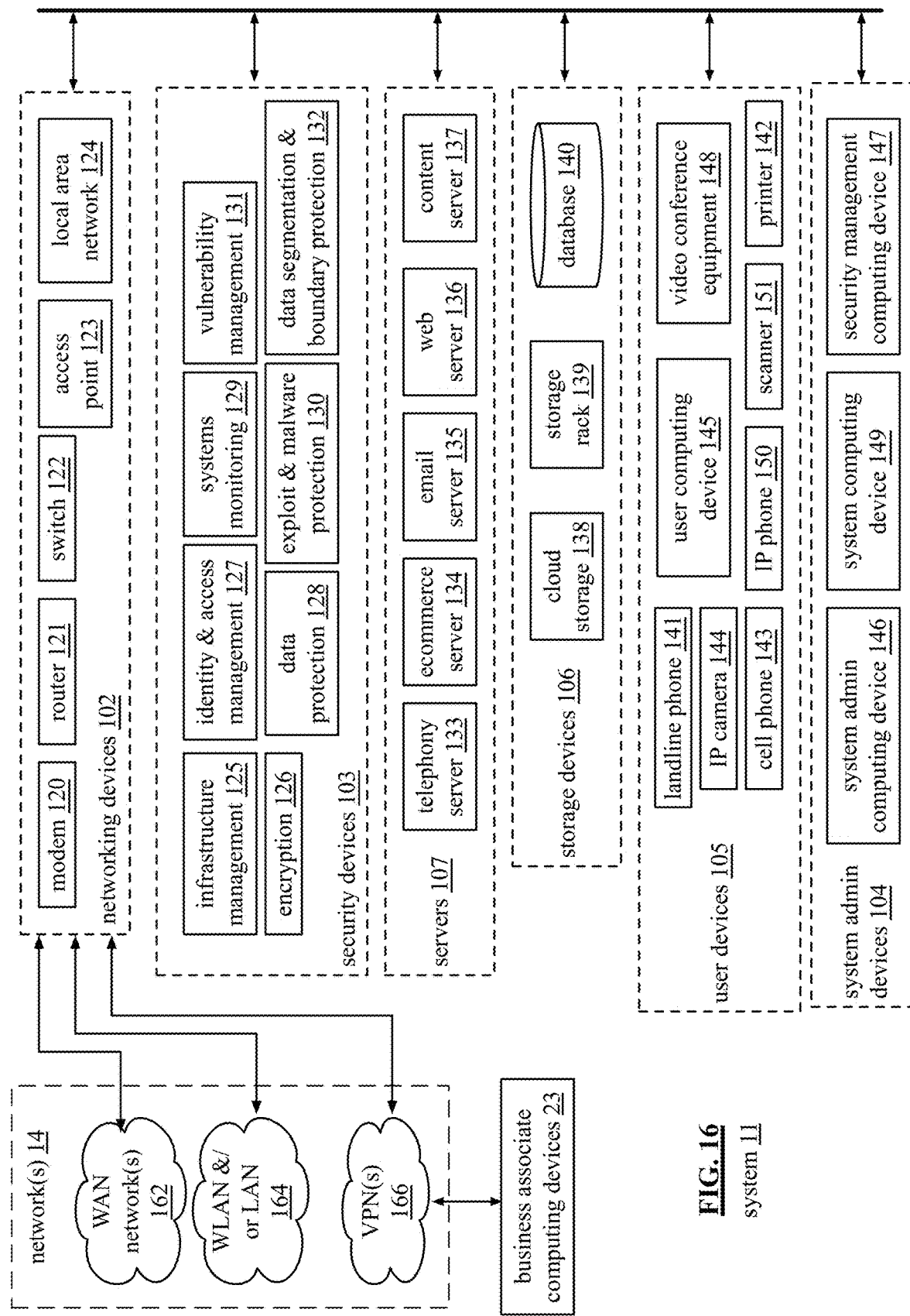
FIG. 16 is a schematic block diagram of another embodiment of a system that includes a plurality of physical assets in accordance with the present disclosure.

FIG. 16 is a schematic block diagram of another embodiment of a system 11 that includes networking devices 102, security devices 103, servers 107, storage devices 106, and user devices 105. The system 11 is coupled to the network 14, which provides connectivity to the busines associate computing device 23. The network 14 is shown to include one or more wide area networks (WAN) 162, one or more wireless LAN (WLAN) and/or LANs 164, one or more virtual private networks 166.

The networking devices 102 includes one or more modems 120, one or more routers 121, one or more switches 122, one or more access points 124, and/or one or more local area network cards 124. The analysis system 10 can evaluate the network devices 102 collectively as assets, as they support system functions, and/or as they support security functions. The analysis system 10 may also evaluate each network device individually as an asset, as it supports system functions, and/or as it supports security functions. The analysis system may further evaluate one or more network devices as part of the physical assets of a system aspect (e.g., the system or a portion thereof being evaluated with respect to one or more system criteria and one or more system modes).

The security devices 103 includes one or more infrastructure management tools 125, one or more encryption software programs 126, one or more identity and access management tools 127, one or more data protection software programs 128, one or more system monitoring tools 129, one or more exploit and malware protection tools 130, one or more vulnerability management tools 131, and/or one or more data segmentation and boundary tools 132. Note that a tool is a program that functions to develop, repair, and/or enhance other programs and/or hardware.

The analysis system 10 can evaluate the security devices 103 collectively as assets, as they support system functions, and/or as they support security functions. The analysis system 10 may also evaluate each security device individually as an asset, as it supports system functions, and/or as it supports security functions. The analysis system may further evaluate one or more security devices as part of the physical assets of a system aspect (e.g., the system or a portion thereof being evaluated with respect to one or more system criteria and one or more system modes).

The servers 107 include one or more telephony servers 133, one or more ecommerce servers 134, one or more email servers 135, one or more web servers 136, and/or one or more content servers 137. The analysis system 10 can evaluate the servers 103 collectively as assets, as they support system functions, and/or as they support security functions. The analysis system 10 may also evaluate each server individually as an asset, as it supports system functions, and/or as it supports security functions. The analysis system may further evaluate one or more servers as part of the physical assets of a system aspect (e.g., the system or a portion thereof being evaluated with respect to one or more system criteria and one or more system modes).

The storage devices includes one or more cloud storage devices 138, one or more storage racks 139 (e.g., a plurality of storage devices mounted in a rack), and/or one or more databases 140. The analysis system 10 can evaluate the storage devices 103 collectively as assets, as they support system functions, and/or as they support security functions. The analysis system 10 may also evaluate each storage device individually as an asset, as it supports system functions, and/or as it supports security functions. The analysis system may further evaluate one or more storage devices as part of the physical assets of a system aspect (e.g., the system or a portion thereof being evaluated with respect to one or more system criteria and one or more system modes).

The user devices 105 include one or more landline phones 141, one or more IP cameras 144, one or more cell phones 143, one or more user computing devices 145, one or more IP phones 150, one or more video conferencing equipment 148, one or more scanners 151, and/or one or more printers 142. The analysis system 10 can evaluate the use devices 103 collectively as assets, as they support system functions, and/or as they support security functions. The analysis system 10 may also evaluate each user device individually as an asset, as it supports system functions, and/or as it supports security functions. The analysis system may further evaluate one or more user devices as part of the physical assets of a system aspect (e.g., the system or a portion thereof being evaluated with respect to one or more system criteria and one or more system modes).

The system admin devices 104 includes one or more system admin computing devices 146, one or more system computing devices 194 (e.g., data management, access control, privileges, etc.), and/or one or more security management computing devices 147. The analysis system 10 can evaluate the system admin devices 103 collectively as assets, as they support system functions, and/or as they support security functions. The analysis system 10 may also evaluate each system admin device individually as an asset, as it supports system functions, and/or as it supports security functions. The analysis system may further evaluate one or more system admin devices as part of the physical assets of a system aspect (e.g., the system or a portion thereof being evaluated with respect to one or more system criteria and one or more system modes).

Figure 17:
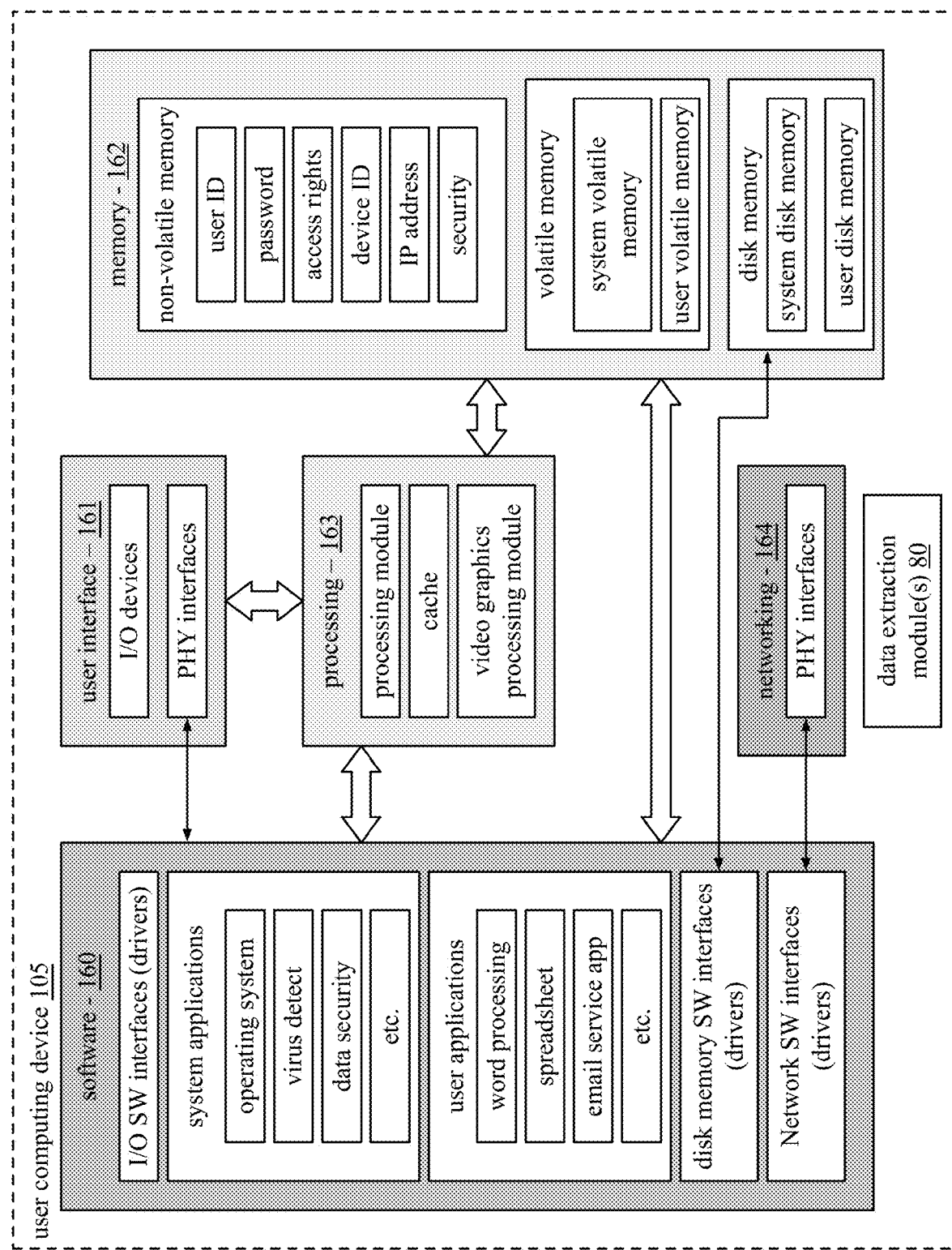
FIG. 17 is a schematic block diagram of an embodiment of a user computing device in accordance with the present disclosure.

FIG. 17 is a schematic block diagram of an embodiment of a user computing device 105 that includes software 160, a user interface 161, processing resources 163, memory 162 and one or more networking device 164. The processing resources 163 include one or more processing modules, cache memory, and a video graphics processing module.

The memory 162 includes non-volatile memory, volatile memory and/or disk memory. The non-volatile memory stores hardware IDs, user credentials, security data, user IDs, passwords, access rights data, device IDs, one or more IP addresses and security software. The volatile memory includes system volatile memory and user volatile memory. The disk memory includes system disk memory and user disk memory. User memory (volatile and/or disk) stores user data and user applications. System memory (volatile and/or disk) stores system applications and system data.

The user interface 104 includes one or more I/O (input/output) devices such as video displays, keyboards, mice, eye scanners, microphones, speakers, and other devices that interface with one or more users. The user interface 161 further includes one or more physical (PHY) interface with supporting software such that the user computing device can interface with peripheral devices.

The software 160 includes one or more I/O software interfaces (e.g., drivers) that enable the processing module to interface with other components. The software 160 also includes system applications, user applications, disk memory software interfaces (drivers) and network software interfaces (drivers).

The networking device 164 may be a network card or network interface that intercouples the user computing device 105 to devices external to the computing device 105 and includes one or more PHY interfaces. For example, the network card is a WLAN card. As another example, the network card is a cellular data network card. As yet another example, the network card is an ethernet card.

The user computing device may further include a data extraction module 80. This would allow the analysis system 10 to obtain data directly from the user computing device. Regardless of how the analysis system 10 obtains data regarding the user computing device, the analysis system 10 can evaluate the user computing device as an asset, as it supports one or more system functions, and/or as it supports one or more security functions. The analysis system 10 may also evaluate each element of the user computing device (e.g., each software application, each drive, each piece of hardware, etc.) individually as an asset, as it supports one or more system functions, and/or as it supports one or more security functions.

Figure 18:
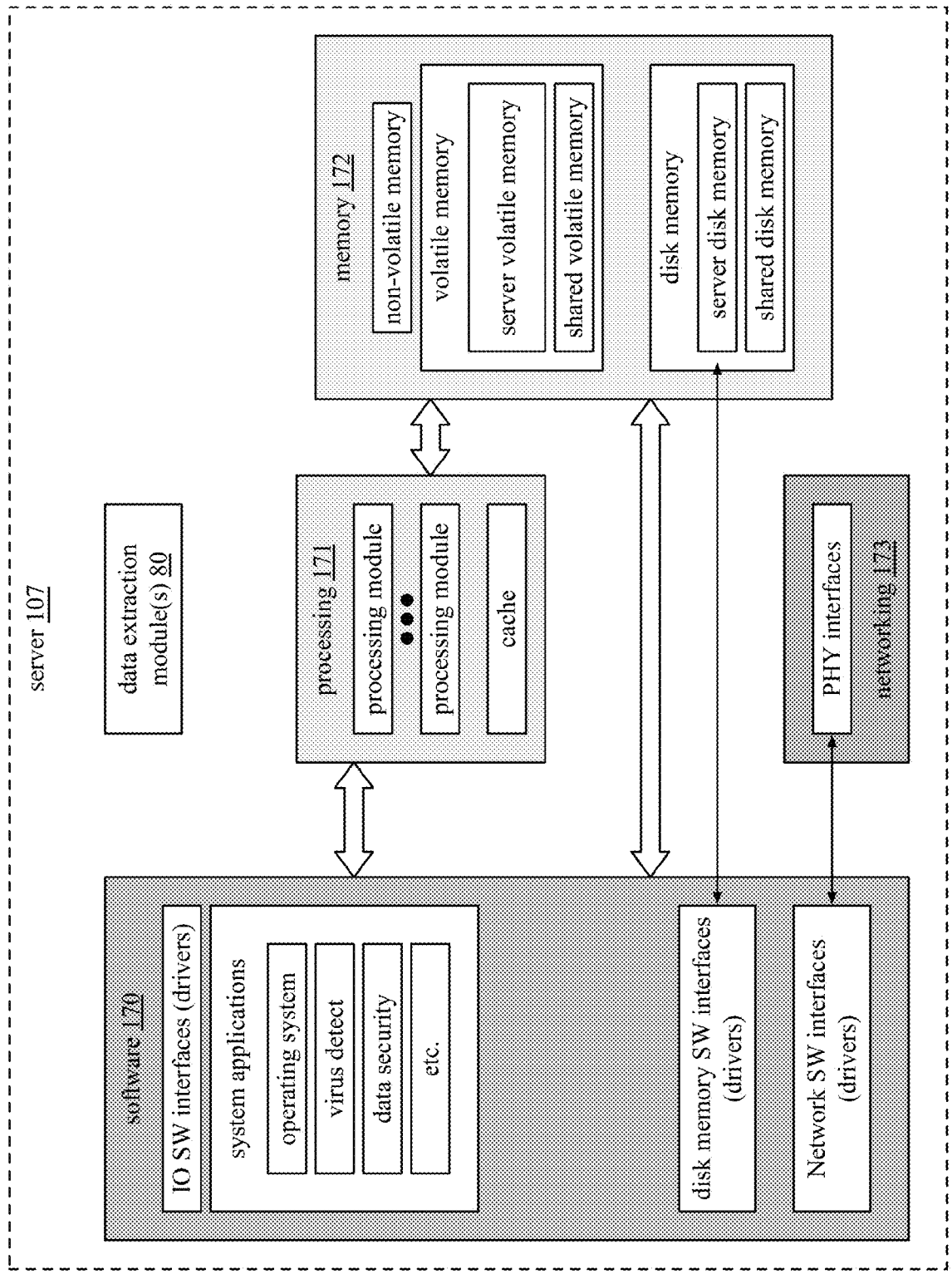
FIG. 18 is a schematic block diagram of an embodiment of a server in accordance with the present disclosure.

FIG. 18 is a schematic block diagram of an embodiment of a server 107 that includes software 170, processing resources 171, memory 172 and one or more networking resources 173. The processing resources 171 include one or more processing modules, cache memory, and a video graphics processing module. The memory 172 includes non-volatile memory, volatile memory, and/or disk memory. The non-volatile memory stores hardware IDs, user credentials, security data, user IDs, passwords, access rights data, device IDs, one or more IP addresses and security software. The volatile memory includes system volatile memory and shared volatile memory. The disk memory include server disk memory and shared disk memory.

The software 170 includes one or more I/O software interfaces (e.g., drivers) that enable the software 170 to interface with other components. The software 170 includes system applications, server applications, disk memory software interfaces (drivers), and network software interfaces (drivers). The networking resources 173 may be one or more network cards that provides a physical interface for the server to a network.

The server 107 may further include a data extraction module 80. This would allow the analysis system 10 to obtain data directly from the server. Regardless of how the analysis system 10 obtains data regarding the server, the analysis system 10 can evaluate the server as an asset, as it supports one or more system functions, and/or as it supports one or more security functions. The analysis system 10 may also evaluate each element of the server (e.g., each software application, each drive, each piece of hardware, etc.) individually as an asset, as it supports one or more system functions, and/or as it supports one or more security functions.

Figure 19:
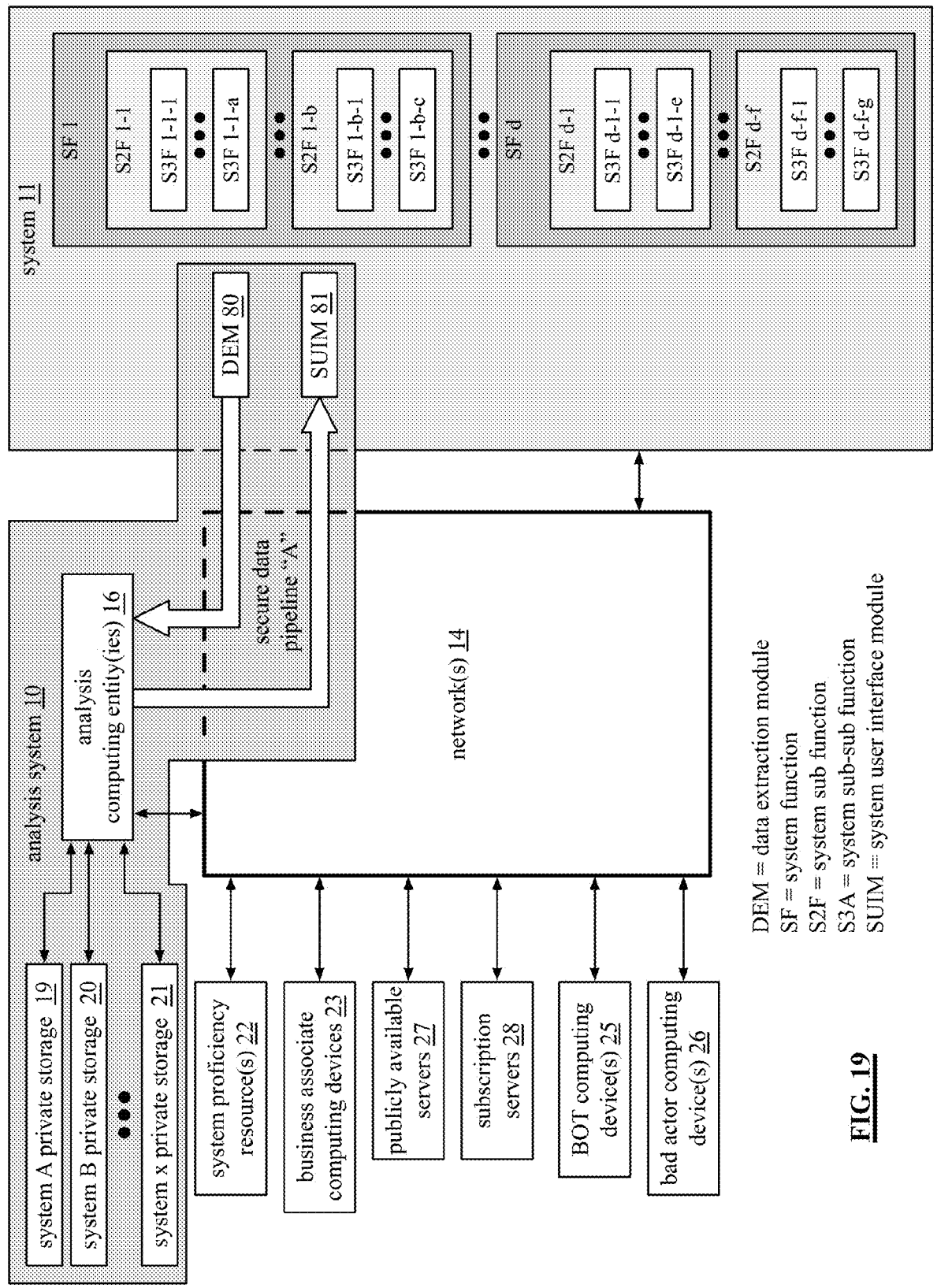
FIG. 19 is a schematic block diagram of another embodiment of a networked environment having a system that includes a plurality of system functions coupled to an analysis system in accordance with the present disclosure.

FIG. 19 is a schematic block diagram of another embodiment of a networked environment having a system 11 (or system 12 or system 13), the analysis system 10, one or more networks 14, one or more system proficiency resources 22, one or more business associated computing devices 23, one or more publicly available servers 27, one or more subscription based servers 28, one or more BOT computing devices 25, and one or more bad actor computing devices 26.

In this embodiment, the system 11 is shown to include a plurality of system functions (SF). A system function (SF) may include one or more system sub functions (S2F) and a system sub function (S2F) may include one or more system sub-sub functions (S3F). While being a part of the analysis system 10, at least one data extraction module (DEM) 80 and at least one system user interface module (SUIM) 81 are installed on the system 11.

A system function (SF) includes one or more business operations, one or more compliance requirements, one or more data flow objectives, one or more data access control objectives, one or more data integrity objectives, one or more data storage objectives, one or more data use objectives, and/or one or more data dissemination objectives. Business operation system functions are the primary purpose for the system 11. The system 11 is designed and built to support the operations of the business, which vary from business to business.

In general, business operations include operations regarding critical business functions, support functions for core business, product and/or service functions, risk management objectives, business ecosystem objectives, and/or business contingency plans. The business operations may be divided into executive management operations, information technology operations, marketing operations, engineering operations, manufacturing operations, sales operations, accounting operations, human resource operations, legal operations, intellectual property operations, and/or finance operations. Each type of business operation includes sub-business operations, which, in turn may include its own sub-operations.

For example, engineering operations includes a system function of designing new products and/or product features. The design of a new product or feature involves sub-functions of creating design specifications, creating a design based on the design specification, and testing the design through simulation and/or prototyping. Each of these steps includes sub-steps. For example, for the design of a software program, the design process includes the sub-sub system functions of creating a high level design from the design specifications; creating a low level design from the high level design; and the creating code from the low level design.

A compliance requirement may be a regulatory compliance requirement, a standard compliance requirement, a statutory compliance requirement, and/or an organization compliance requirement. For example, there are a regulatory compliance requirements when the organization has governmental agencies as clients. An example of a standard compliance requirement, encryption protocols are often standardized. Data Encryption Standard (DES), Advanced Encryption Standard (AES), RSA (Rivest-Shamir-Adleman) encryption, and public-key infrastructure (PKI) are examples of encryption type standards. HIPAA (health Insurance Portability and Accountability Act) is an example of a statutory compliance requirement. Examples of organization compliance requirements include use of specific vendor hardware, use of specific vendor software, use of encryption, etc.

A data flow objective is regarding where data can flow, at what rate data can and should flow, the manner in which the data flow, and/or the means over which the data flows. As an example of a data flow objective, data for remote storage is to flow via a secure data pipeline using a particular encryption protocol. As another example of a data flow objective, ingesting of data should have the capacity to handle a data rate of 100 giga-bits per second.

A data access control objective established which type of personnel and/or type of assets can access specific types of data. For example, certain members of the corporate department and human resources department have access to employee personnel files, while all other members of the organization do not.

A data integrity objective establishes a reliability that, when data is retrieved, it is the data that was stored, i.e., it was not lost, damaged, or corrupted. An example of a data integrity protocol is Cyclic Redundancy Check (CRC). Another example of a data integrity protocol is a hash function.

A data storage objective establishes the manner in which data is to be stored. For example, a data storage objective is to store data in a RAID system; in particular, a RAID 6 system. As another example, a data storage objective is regarding archiving of data and the type of storage to use for archived data.

A data use objective establishes the manner in which data can be used. For example, if the data is for sale, then the data use objective would establish what type of data is for sale, at what price, and what is the target customer. As another example, a data use objective establishes read only privileges, editing privileges, creation privileges, and/or deleting privileges.

A data dissemination objective establishes how the data can be shared. For example, a data dissemination objective is regarding confidential information and indicates how the confidential information should be marked, who in can be shared with internally, and how it can be shared externally, if at all.

The analysis system 10 may evaluate understanding, implementation, and/or operation of one or more system functions, one or more system sub functions, and/or one or more system sub-sub functions. The evaluation may be to produce an evaluation rating, to identify deficiencies, and/or to auto-correct deficiencies. For example, the analysis system 10 evaluates the understanding of the software development policies and/or processes. As another example, the analysis system 10 evaluates the use of software development policies and/or processes to implement a software program. As yet another example, analysis system 10 evaluates the operation of the software program with respect to the business operation, the design specifications, and/or the design.

Figure 20:
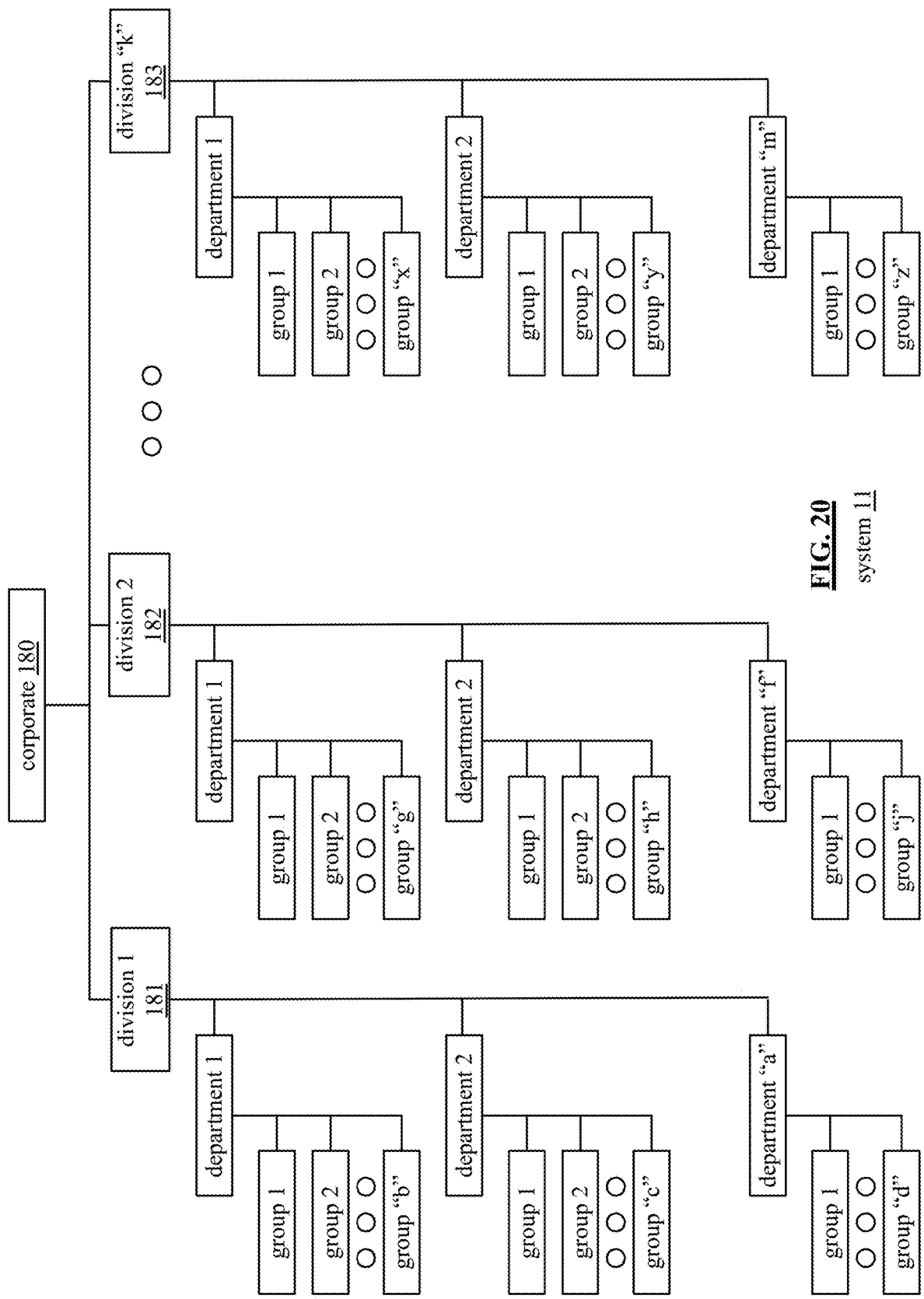
FIG. 20 is a schematic block diagram of another embodiment of a system that includes divisions, departments, and groups in accordance with the present disclosure.

FIG. 20 is a schematic block diagram of another embodiment of a system 11 that includes, from a business operations perspective, divisions 181-183, departments, and groups. The business structure of the system 11, as in most businesses, is governed by a corporate department 180. The corporate department may have its own sub-system with structures and software tailored to the corporate function of the system. Organized under the corporate department 180 are divisions, division 1 181, division 2 182, through division k 183. These divisions may be different business divisions of a multi-national conglomerate, may be different functional divisions of a business, e.g., finance, marketing, sales, legal, engineering, research and development, etc. Under each division 1081-183 include a plurality of departments. Under each department are a number of groups.

The business structure is generic and can be used to represent the structure of most conventional businesses and/or organizations. The analysis system 10 is able to use this generic structure to create and categorize the business structure of the system 11. The creation and categorization of the business structure is done in a number of ways. Firstly, the analysis system 10 accesses corporate organization documents for the business and receive feedback from one or more persons in the business and use these documents and data to initially determine at least partially the business structure. Secondly, the analysis system 10 determines the network structure of the other system, investigate identities of components of the network structure, and construct a sub-division of the other system. Then, based upon software used within the sub-division, data character, and usage character, the analysis system 10 identifies more specifically the function of the divisions, departments and groups. In doing so, the analysis system 10 uses information known of third-party systems to assist in the analysis.

With the abstraction of the business structure, differing portions of the business structure may have different levels of abstraction from a component/sub-component/sub-sub-component/system/sub-system/sub-sub-system level based upon characters of differing segments of the business. For example, a more detailed level of abstraction for elements of the corporate and security departments of the business may be taken than for other departments of the business.

Figure 21:
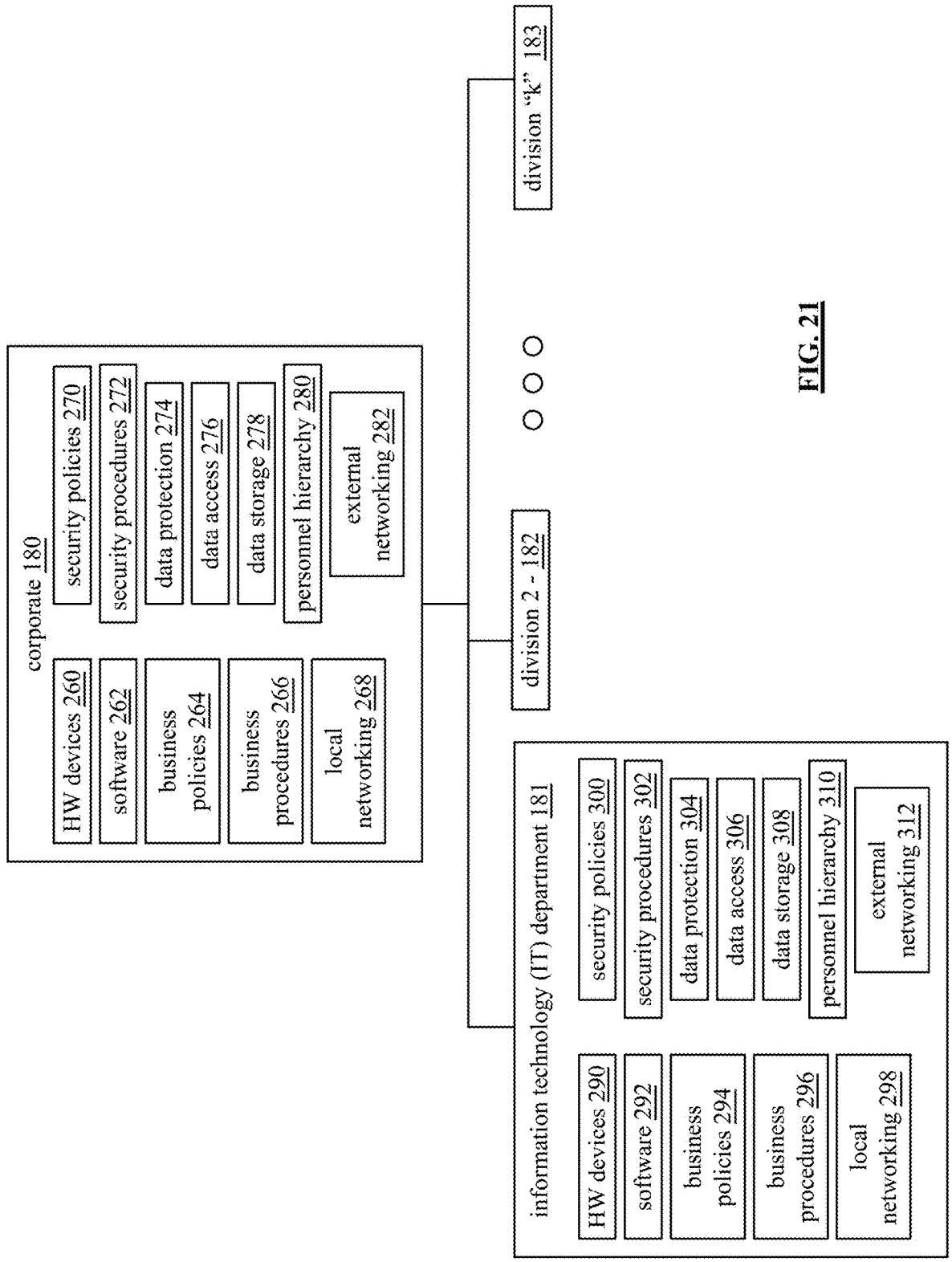
FIG. 21 is a schematic block diagram of another embodiment of a system that includes divisions and departments, which include system elements in accordance with the present disclosure.

FIG. 21 is a schematic block diagram of another embodiment of a business structure of the system 11. Shown are a corporate department 180, an IT department 181, division 2 182 through division "k" 183, where k is an integer equal to or greater than 3. The corporate department 180 includes a plurality of hardware devices 260, a plurality of software applications 262, a plurality of business policies 264, a plurality of business procedures 266, local networking 268, a plurality of security policies 270, a plurality of security procedures 272, data protection resources 272, data access resources 276, data storage devices 278, a personnel hierarchy 280, and external networking 282. Based upon an assessment of these assets of the corporate department 180, analysis system 10 may evaluate the understanding, implementation, and/or operation of the assets, system functions, and/or security functions of the corporate department from a number of different perspectives, as will be described further with reference to one or more the subsequent figures.

Likewise, the IT department 181 includes a plurality of hardware devices 290, a plurality of software applications 292, a plurality of business policies 294, a plurality of business procedures 296, local networking 298, a plurality of security policies 300, a plurality of security procedures 302, data protection resources 304, data access resources 306, data storage devices 308, a personnel hierarchy 310, and external networking 312. Based upon an assessment of these assets of the IT department 181, the analysis system 10 may evaluate the understanding, implementation, and/or operation of the assets, system functions, and/or security functions of the IT department from a number of different perspectives, as will be described further with reference to one or more of the subsequent figures.

FIG. 22 is a schematic block diagram of another embodiment of a division 182 of a system that includes multiple departments. The departments include a marketing department 190, an operations department 191, an engineering department 192, a manufacturing department 193, a sales department 194, and an accounting department 195. Each of the departments includes a plurality of components relevant to support the corresponding business functions and/or security functions of the division and of the department. In particular, the marketing department 190 includes a plurality of devices, software, security policies, security procedures, business policies, business procedures, data protection resources, data access resources, data storage resources, a personnel hierarchy, local network resources, and external network resources.

Likewise, each of the operations department 191, the engineering department 192, the manufacturing department 193, the sales department 194, and the accounting department 195 includes a plurality of devices, software, security policies, security procedures, business policies, business procedures, data protection resources, data access resources, data storage resources, a personnel hierarchy, local network resources, and external network resources.

Further, within the business structure, a service mesh may be established to more effectively protect important portions of the business from other portions of the business. The service mesh may have more restrictive safety and security mechanisms for one part of the business than another portion of the business, e.g., manufacturing department service mesh is more restrictive than the sales department service mesh.

The analysis system 10 may evaluate the understanding, implementation, and/or operation of the assets, system functions, and/or security functions of the division 182, of each department, of each type of system elements, and/or each system element. For example, the analysis system 10 evaluates the data access policies and procedures of each department. As another example, the analysis system 10 evaluates the data storage policies, procedures, design, implementation, and/or operation of data storage within the engineering department 192.

Figure 23:
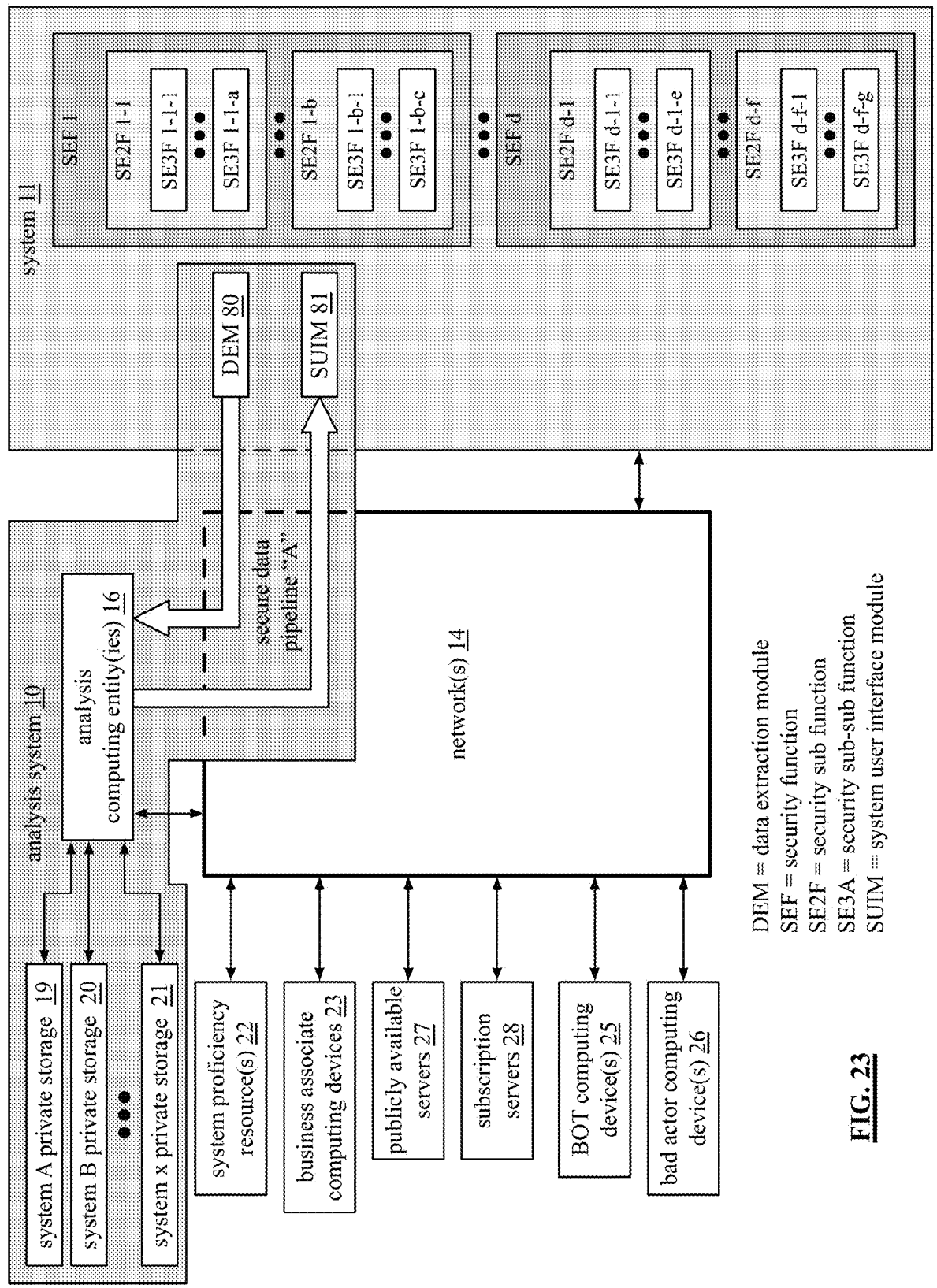
FIG. 23 is a schematic block diagram of another embodiment of a networked environment having a system that includes a plurality of security functions coupled to an analysis system in accordance with the present disclosure.

FIG. 23 is a schematic block diagram of another embodiment of a networked environment having a system 11 (or system 12 or system 13), the analysis system 10, one or more networks 14, one or more system proficiency resources 22, one or more business associated computing devices 23, one or more publicly available servers 27, one or more subscription based servers 28, one or more BOT computing devices 25, and one or more bad actor computing devices 26.

In this embodiment, the system 11 is shown to include a plurality of security functions (SEF). A security function (SEF) may include one or more system sub security functions (SE2F) and a security sub function (SE2F) may include one or more security sub-sub functions (SE3F). While being a part of the analysis system 10, at least one data extraction module (DEM) 80 and at least one system user interface module (SUIM) 81 are installed on the system 11. As used herein, a security function includes a security operation, a security requirement, a security policy, and/or a security objective with respect to data, system access, system design, system operation, and/or system modifications (e.g., updates, expansion, part replacement, maintenance, etc.).

A security function (SF) includes one or more threat detection functions, one or more threat avoidance functions, one or more threat resolution functions, one or more threat recovery functions, one or more threat assessment functions, one or more threat impact functions, one or more threat tolerance functions, one or more business security functions, one or more governance security functions, one or more data at rest protection functions, one or more data in transit protection functions, and/or one or more data loss prevention functions.

A threat detection function includes detecting unauthorized system access; detecting unauthorized data access; detecting unauthorized data changes; detecting uploading of worms, viruses, and the like; and/or detecting bad actor attacks. A threat avoidance function includes avoiding unauthorized system access; avoiding unauthorized data access; avoiding unauthorized data changes; avoiding uploading of worms, viruses, and the like; and/or avoiding bad actor attacks.

A threat resolution function includes resolving unauthorized system access; resolving unauthorized data access; resolving unauthorized data changes; resolving uploading of worms, viruses, and the like; and/or resolving bad actor attacks. A threat recovery function includes recovering from an unauthorized system access; recovering from an unauthorized data access; recovering from an unauthorized data changes; recovering from an uploading of worms, viruses, and the like; and/or recovering from a bad actor attack.

A threat assessment function includes accessing the likelihood of and/or mechanisms for unauthorized system access; accessing the likelihood of and/or mechanisms for unauthorized data access; accessing the likelihood of and/or mechanisms for unauthorized data changes; accessing the likelihood of and/or mechanisms for uploading of worms, viruses, and the like; and/or accessing the likelihood of and/or mechanisms for bad actor attacks.

A threat impact function includes determining an impact on business operations from an unauthorized system access;

resolving unauthorized data access; determining an impact on business operations from an unauthorized data changes; determining an impact on business operations from an uploading of worms, viruses, and the like; and/or determining an impact on business operations from a bad actor attacks.

A threat tolerance function includes determining a level of tolerance for an unauthorized system access; determining a level of tolerance for an unauthorized data access; determining a level of tolerance for an unauthorized data changes; determining a level of tolerance for an uploading of worms, viruses, and the like; and/or determining a level of tolerance for a bad actor attacks.

A business security function includes data encryption, handling of third party data, releasing data to the public, and so on. A governance security function includes HIPAA compliance; data creation, data use, data storage, and/or data dissemination for specific types of customers (e.g., governmental agency); and/or the like.

A data at rest protection function includes a data access protocol (e.g., user ID, password, etc.) to store data in and/or retrieve data from system data storage; data storage requirements, which include type of storage, location of storage, and storage capacity; and/or other data storage security functions.

A data in transit protection function includes using a specific data transportation protocol (e.g., TCP/IP); using an encryption function prior to data transmission; using an error encoding function for data transmission; using a specified data communication path for data transmission; and/or other means to protect data in transit. A data loss prevention function includes a storage encoding technique (e.g., single parity encoding, double parity encoding, erasure encoding, etc.); a storage backup technique (e.g., one or two backup copies, erasure encoding, etc.); hardware maintenance and replacement policies and processes; and/or other means to prevent loss of data.

The analysis system 10 may evaluate understanding, implementation, and/or operation of one or more security functions, one or more security sub functions, and/or one or more security sub-sub functions. The evaluation may be to produce an evaluation rating, to identify deficiencies, and/or to auto-correct deficiencies. For example, the analysis system 10 evaluates the understanding of the threat detection policies and/or processes. As another example, the analysis system 10 evaluates the use of threat detection policies and/or processes to implement a security assets. As yet another example, analysis system 10 evaluates the operation of the security assets with respect to the threat detection operation, the threat detection design specifications, and/or the threat detection design.

Figure 24:
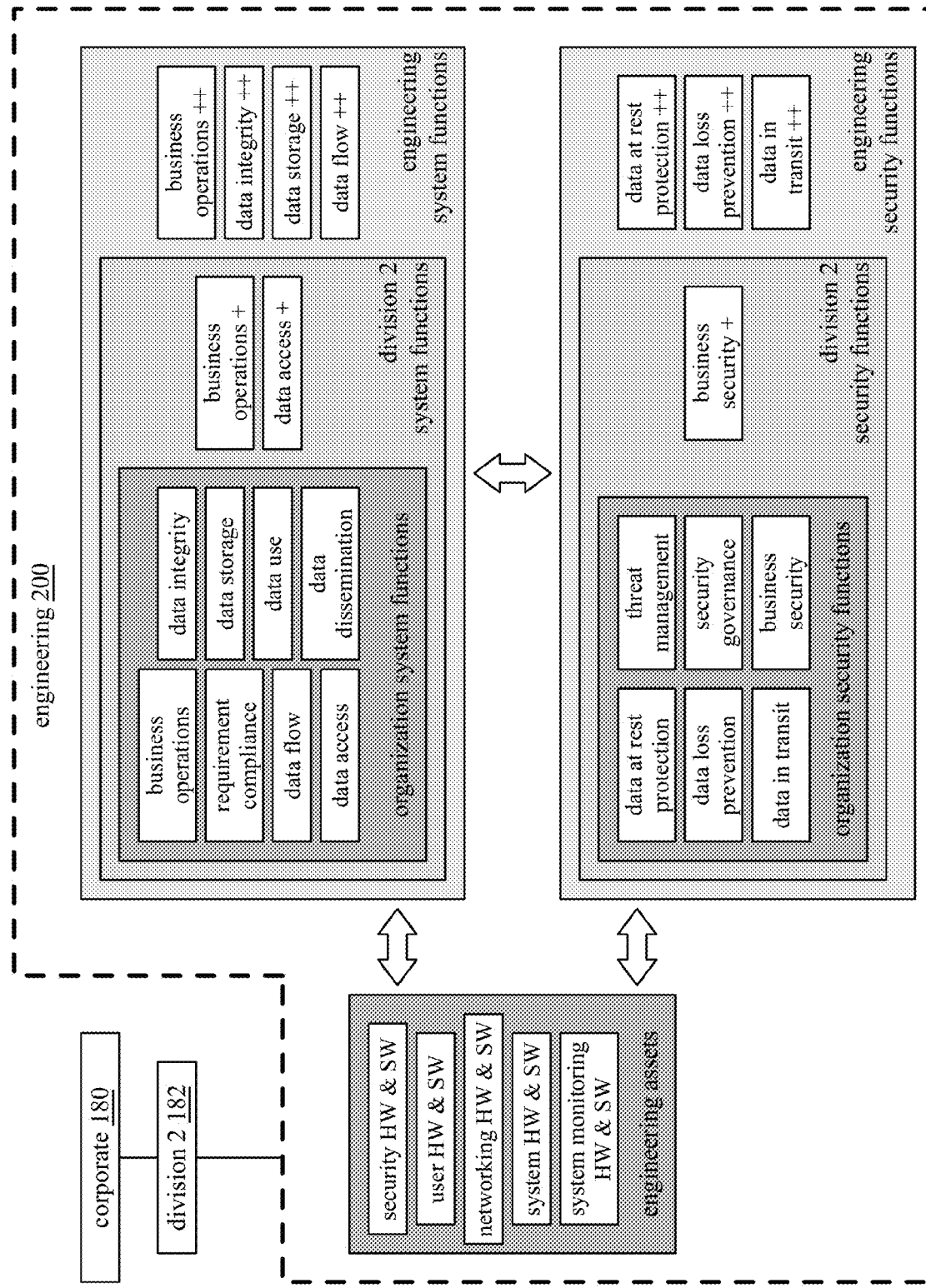
FIG. 24 is a schematic block diagram of an embodiment an engineering department of a division that reports to a corporate department of a system in accordance with the present disclosure.

FIG. 24 is a schematic block diagram of an embodiment of an engineering department 200 of a division 182 that reports to a corporate department 180 of a system 11. The engineering department 200 includes engineering assets, engineering system functions, and engineering security functions. The engineering assets include security HW & SW, user device HW & SW, networking HW & SW, system HW & SW, system monitoring HW & SW, and/or other devices that includes HW and/or SW.

In this example, the organization's system functions includes business operations, compliance requirements, data flow objectives, data access objectives, data integrity objectives, data storage objectives, data use objectives, and/or data dissemination objectives. These system functions apply throughout the system including throughout division 2 and for the engineering department 200 of division 2.

The division 182, however, can issues more restrictive, more secure, and/or more detailed system functions. In this example, the division has issued more restrictive, secure, and/or detailed business operations (business operations+) and more restrictive, secure, and/or detailed data access functions (data access+). Similarly, the engineering department 200 may issue more restrictive, more secure, and/or more detailed system functions than the organization and/or the division. In this example, the engineering department has issued more restrictive, secure, and/or detailed business operations (business operations++) than the division; has issued more restrictive, secure, and/or detailed data flow functions (data flow++) than the organization; has issued more restrictive, secure, and/or detailed data integrity functions (data integrity++) than the organization; and has issued more restrictive, secure, and/or detailed data storage functions (data storage++) than the organization.

For example, an organization level business operation regarding the design of new products and/or of new product features specifies high-level design and verify guidelines. The division issued more detailed design and verify guidelines. The engineering department issued even more detailed design and verify guidelines.

The analysis system 10 can evaluate the compliance with the system functions for the various levels. In addition, the analysis system 10 can evaluate that the division issued system functions are compliant with the organization issued system functions and/or are more restrictive, more secure, and/or more detailed. Similarly, the analysis system 10 can evaluate that the engineering department issued system functions are compliant with the organization and the division issued system functions and/or are more restrictive, more secure, and/or more detailed.

As is further shown in this example, the organization security functions includes data at rest protection, data loss prevention, data in transit protection, threat management, security governance, and business security. The division has issued more restrictive, more secure, and/or more detailed busines security functions (business security+). The engineering department has issued more restrictive, more secure, and/or more detailed data at rest protection (data at rest protection++), data loss prevention (data loss prevention++), and data in transit protection (data in transit++).

The analysis system 10 can evaluate the compliance with the security functions for the various levels. In addition, the analysis system 10 can evaluate that the division issued security functions are compliant with the organization issued security functions and/or are more restrictive, more secure, and/or more detailed. Similarly, the analysis system 10 can evaluate that the engineering department issued security functions are compliant with the organization and the division issued security functions and/or are more restrictive, more secure, and/or more detailed.

Figure 25:
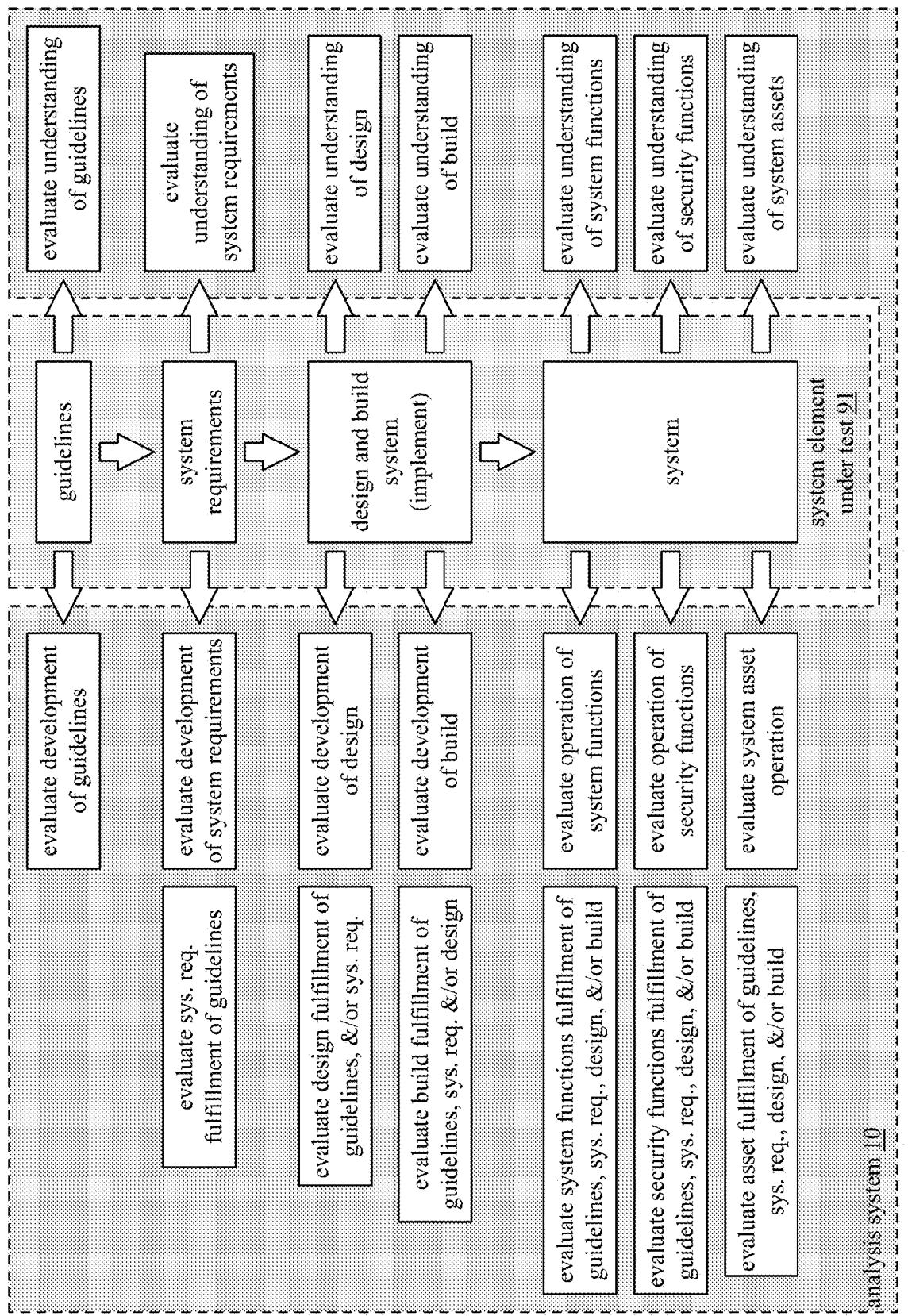
FIG. 25 is a schematic block diagram of an example of an analysis system evaluating a system element under test of a system in accordance with the present disclosure.

FIG. 25 is a schematic block diagram of an example of an analysis system 10 evaluating a system element under test 91 of a system 11. The system element under test 91 corresponds to a system aspect (or system sector), which includes one or more system elements, one or more system criteria, and one or more system modes.

In this example, the system criteria are shown to includes guidelines, system requirements, system design & system build (system implementation), and the resulting system. The analysis system 10 may evaluate the system, or portion thereof, during initial system requirement development, initial design of the system, initial build of the system, operation of the initial system, revisions to the system requirements, revisions to the system design, revisions to the system build, and/or operation of the revised system. A revision to a system includes adding assets, system functions, and/or security functions; deleting assets, system functions, and/or security functions; and/or modifying assets, system functions, and/or security functions.

The guidelines include one or more of business objectives, security objectives, NIST cybersecurity guidelines, system objectives, governmental and/or regulatory requirements, third party requirements, etc. and are used to help create the system requirements. System requirements outline the hardware requirements for the system, the software requirements for the system, the networking requirements for the system, the security requirements for the system, the logical data flow for the system, the hardware architecture for the system, the software architecture for the system, the logical inputs and outputs of the system, the system input requirements, the system output requirements, the system's storage requirements, the processing requirements for the system, system controls, system backup, data access parameters, and/or specification for other system features.

The system requirements are used to help create the system design. The system design includes a high level design (HDL), a low level design (LLD), a detailed level design (DLD), and/or other design levels. High level design is a general design of the system. It includes a description of system architecture; a database design; an outline of platforms, services, and processes the system will require; a description of relationships between the assets, system functions, and security functions; diagrams regarding data flow; flowcharts; data structures; and/or other documentation to enable more detailed design of the system.

Low level design is a component level design that is based on the HLD. It provides the details and definitions for every system component (e.g., HW and SW). In particular, LLD specifies the features of the system components and component specifications. Detailed level design describes the interaction of every component of the system.

The system is built based on the design to produce a resulting system (i.e., the implemented assets). The assets of system operate to perform the system functions and/or security functions.

The analysis system 10 can evaluate the understanding, implementation, operation and/or self-analysis of the system 11 at one or more system criteria level (e.g., guidelines, system requirements, system implementation (e.g., design and/or build), and system) in a variety of ways.

The analysis system 10 evaluates the understanding of the system (or portion thereof) by determining a knowledge level of the system and/or maturity level of system. For example, an understanding evaluation interprets what is known about the system and compares it to what should be known about the system.

As a more specific example, the analysis system evaluates the understanding of the guidelines. For instance, the analysis system 10 evaluates the policies, processes, procedures, automation, certifications, documentation, and/or other evaluation metric (e.g., evaluation metrics) regarding the thoroughness of the guidelines to facilitate the understanding of the guidelines. The more incomplete the data regarding the evaluation metrics, the more likely the guidelines are incomplete; which indicates a lack of understanding. The fewer numbers of and/or incompleteness of policies, processes, procedures, automation, documentation, certification, and/or other evaluation metric regarding the creation and/or use of the guidelines, the more likely the guidelines are not well understood (e.g., lower level of knowledge and/or of system maturity) resulting in a low evaluation rating.

As another more specific example of an understanding evaluation, the analysis system 10 evaluates the understanding of the system requirements. For instance, the analysis system 10 evaluates the policies, processes, procedures, automation, certifications, documentation, and/or other evaluation metric (e.g., evaluation metrics) regarding the thoroughness of the system requirements to facilitate the understanding of the system requirements. The more incomplete the data regarding the evaluation metrics, the more likely the system requirements are incomplete; which indicates a lack of understanding. The fewer numbers of and/or incompleteness of policies, processes, procedures, automation, documentation, certification, and/or other evaluation metric regarding the creation and/or use of the system requirements, the more likely the system requirements are not well understood (e.g., lower level of knowledge and/or of system maturity) resulting in a low evaluation rating.

As another more specific example of an understanding evaluation, the analysis system 10 evaluates the understanding of the system design. For instance, the analysis system 10 evaluates the policies, processes, procedures, automation, certifications, documentation, and/or other evaluation metric (e.g., evaluation metrics) regarding the thoroughness of the system design to facilitate the understanding of the system design. The more incomplete the data regarding the evaluation metrics, the more likely the system design is incomplete; which indicates a lack of understanding. The fewer numbers of and/or incompleteness of policies, processes, procedures, automation, documentation, certification, and/or other evaluation metric regarding the creation and/or use of the system design, the more likely the system design is not well understood (e.g., lower level of knowledge and/or of system maturity) resulting in a low evaluation rating.

As another more specific example of an understanding evaluation, the analysis system 10 evaluates the understanding of the system build. For instance, the analysis system 10 evaluates the policies, processes, procedures, automation, certifications, documentation, and/or other evaluation metric (e.g., evaluation metrics) regarding the thoroughness of the system build to facilitate the understanding of the system build. The more incomplete the data regarding the evaluation metrics, the more likely the system build is incomplete; which indicates a lack of understanding. The fewer numbers of and/or incompleteness of policies, processes, procedures, automation, documentation, certification, and/or other evaluation metric regarding the execution of and/or use of the system build, the more likely the system build is not well understood (e.g., lower level of knowledge and/or of system maturity) resulting in a low evaluation rating.

As another more specific example of an understanding evaluation, the analysis system 10 evaluates the understanding of the system functions. For instance, the analysis system 10 evaluates the policies, processes, procedures, automation, certifications, documentation, and/or other evaluation metric (e.g., evaluation metrics) regarding the thoroughness of the system build to facilitate the understanding of the system build. The more incomplete the data regarding the evaluation metrics, the more likely the system build is incomplete; which indicates a lack of understanding. The fewer numbers of and/or incompleteness of policies, processes, procedures, automation, documentation, certification, and/or other evaluation metric regarding the execution of and/or use of the system build, the more likely the system build is not well understood (e.g., lower level of knowledge and/or of system maturity) resulting in a low evaluation rating.

As another more specific example of an understanding evaluation, the analysis system 10 evaluates the understanding of the security functions. For instance, the analysis system 10 evaluates the policies, processes, procedures, automation, certifications, documentation, and/or other evaluation metric (e.g., evaluation metrics) regarding the thoroughness of the system functions to facilitate the understanding of the system functions. The more incomplete the data regarding the evaluation metrics, the more likely the system functions are incomplete; which indicates a lack of understanding. The fewer numbers of and/or incompleteness of policies, processes, procedures, automation, documentation, certification, and/or other evaluation metric regarding the execution of and/or use of the system functions, the more likely the system functions are not well understood (e.g., lower level of knowledge and/or of system maturity) resulting in a low evaluation rating.

As another more specific example of an understanding evaluation, the analysis system 10 evaluates the understanding of the system assets. For instance, the analysis system 10 evaluates the policies, processes, procedures, automation, certifications, documentation, and/or other evaluation metric (e.g., evaluation metrics) regarding the thoroughness of the system assets to facilitate the understanding of the system assets. The more incomplete the data regarding the evaluation metrics, the more likely the system assets are incomplete; which indicates a lack of understanding. The fewer numbers of and/or incompleteness of policies, processes, procedures, automation, documentation, certification, and/or other evaluation metric regarding the selection, identification, and/or use of the system assets, the more likely the system assets are not well understood (e.g., lower level of knowledge and/or of system maturity) resulting in a low evaluation rating.

The analysis system 10 also evaluates the implementation of the system (or portion thereof) by determining how well the system is being, was developed, and/or is being updated. For example, the analysis system 10 determines how well the assets, system functions, and/or security functions are being developed, have been developed, and/or are being updated based on the guidelines, the system requirements, the system design, and/or the system build.

As a more specific example of an implementation evaluation, the analysis system 10 evaluates the implementation of the guidelines. For instance, the analysis system 10 evaluates the policies, processes, procedures, automation, certifications, documentation, and/or other evaluation metric (e.g., evaluation metrics) regarding the development of the guidelines. The more incomplete the data regarding the evaluation metrics, the more likely the development of the guidelines is incomplete. The fewer numbers of and/or incompleteness of policies, processes, procedures, automation, documentation, certification, and/or other evaluation metric regarding the development of the guidelines, the more likely the guidelines are not well developed (e.g., lower level of system development maturity) resulting in a low evaluation rating.

As another more specific example of an implementation evaluation, the analysis system 10 evaluates the implementation of the system requirements. For instance, the analysis system 10 evaluates the policies, processes, procedures, automation, certifications, documentation, and/or other evaluation metric (e.g., evaluation metrics) regarding the development of the system requirements. The more incomplete the data regarding the evaluation metrics, the more likely the development of the system requirements is incomplete. The fewer numbers of and/or incompleteness of policies, processes, procedures, automation, documentation, certification, and/or other evaluation metric regarding the development of the system requirements, the more likely the system requirements are not well developed (e.g., lower level of system development maturity) resulting in a low evaluation rating.

As another more specific example of an implementation evaluation, the analysis system 10 evaluates the implementation of the system design. For instance, the analysis system 10 evaluates the policies, processes, procedures, automation, certifications, documentation, and/or other evaluation metric (e.g., evaluation metrics) regarding the development of the system design. The more incomplete the data regarding the evaluation metrics, the more likely the development of the system design is incomplete. The fewer numbers of and/or incompleteness of policies, processes, procedures, automation, documentation, certification, and/or other evaluation metric regarding the development of the system design, the more likely the system design is not well developed (e.g., lower level of system development maturity) resulting in a low evaluation rating.

As another more specific example of an implementation evaluation, the analysis system 10 evaluates the implementation of the system build. For instance, the analysis system 10 evaluates the policies, processes, procedures, automation, certifications, documentation, and/or other evaluation metric (e.g., evaluation metrics) regarding the development of the system build. The more incomplete the data regarding the evaluation metrics, the more likely the development of the system build is incomplete. The fewer numbers of and/or incompleteness of policies, processes, procedures, automation, documentation, certification, and/or other evaluation metric regarding the development of the system build, the more likely the system build is not well developed (e.g., lower level of system development maturity) resulting in a low evaluation rating.

As another more specific example of an implementation evaluation, the analysis system 10 evaluates the implementation of the system functions. For instance, the analysis system 10 evaluates the policies, processes, procedures, automation, certifications, documentation, and/or other evaluation metric (e.g., evaluation metrics) regarding the development of the system functions. The more incomplete the data regarding the evaluation metrics, the more likely the development of the system functions is incomplete. The fewer numbers of and/or incompleteness of policies, processes, procedures, automation, documentation, certification, and/or other evaluation metric regarding the development of the system functions, the more likely the system functions are not well developed (e.g., lower level of system development maturity) resulting in a low evaluation rating.

As another more specific example of an implementation evaluation, the analysis system 10 evaluates the implementation of the security functions. For instance, the analysis system 10 evaluates the policies, processes, procedures, automation, certifications, documentation, and/or other evaluation metric (e.g., evaluation metrics) regarding the development of the security functions. The more incomplete the data regarding the evaluation metrics, the more likely the development of the security functions is incomplete. The fewer numbers of and/or incompleteness of policies, processes, procedures, automation, documentation, certification, and/or other evaluation metric regarding the development of the security functions, the more likely the security functions are not well developed (e.g., lower level of system development maturity) resulting in a low evaluation rating.

As another more specific example of an implementation evaluation, the analysis system 10 evaluates the implementation of the system assets. For instance, the analysis system 10 evaluates the policies, processes, procedures, automation, certifications, documentation, and/or other evaluation metric (e.g., evaluation metrics) regarding the development of the system assets. The more incomplete the data regarding the evaluation metrics, the more likely the development of the system assets is incomplete. The fewer numbers of and/or incompleteness of policies, processes, procedures, automation, documentation, certification, and/or other evaluation metric regarding the development of the system assets, the more likely the system assets are not well developed (e.g., lower level of system development maturity) resulting in a low evaluation rating.

The analysis system 10 also evaluates the operation of the system (or portion thereof) by determining how well the system fulfills its objectives. For example, the analysis system 10 determines how well the assets, system functions, and/or security functions to fulfill the guidelines, the system requirements, the system design, the system build, the objectives of the system, and/or other purpose of the system.

As a more specific example of an operation evaluation, the analysis system 10 evaluates the operation (i.e., fulfillment) of the guidelines by the system requirements. For instance, the analysis system 10 evaluates the policies, processes, procedures, automation, certifications, documentation, and/or other evaluation metric (e.g., evaluation metrics) regarding the fulfillment of the guidelines by the system requirements. The more incomplete the data regarding the evaluation metrics, the more likely the fulfillment of the guidelines by the system requirements is incomplete. The fewer numbers of and/or incompleteness of policies, processes, procedures, automation, documentation, certification, and/or other evaluation metric regarding the fulfillment of the guidelines by the system requirements, the more likely the system requirements does not adequately fulfill the guidelines (e.g., lower level of system development maturity) resulting in a low evaluation rating.

As another more specific example of an operation evaluation, the analysis system 10 evaluates the operation (i.e., fulfillment) of the guidelines and/or the system requirements by the system design. For instance, the analysis system 10 evaluates the policies, processes, procedures, automation, certifications, documentation, and/or other evaluation metric (e.g., evaluation metrics) regarding the fulfillment of the guidelines and/or the system requirements by the system design. The more incomplete the data regarding the evaluation metrics, the more likely the fulfillment of the guidelines and/or the system requirements by the system design is incomplete. The fewer numbers of and/or incompleteness of policies, processes, procedures, automation, documentation, certification, and/or other evaluation metric regarding the fulfillment of the guidelines and/or the system requirements by the system design, the more likely the system design does not adequately fulfill the guidelines and/or the system requirements (e.g., lower level of system operation maturity) resulting in a low evaluation rating.

As another more specific example of an operation evaluation, the analysis system 10 evaluates the operation (i.e., fulfillment) of the guidelines, the system requirements, and/or the system design by the system build. For instance, the analysis system 10 evaluates the policies, processes, procedures, automation, certifications, documentation, and/or other evaluation metric (e.g., evaluation metrics) regarding the fulfillment of the guidelines, the system requirements, and/or the system design by the system build. The more incomplete the data regarding the evaluation metrics, the more likely the fulfillment of the guidelines, the system requirements, and/or the system design by the system build is incomplete. The fewer numbers of and/or incompleteness of policies, processes, procedures, automation, documentation, certification, and/or other evaluation metric regarding the fulfillment of the guidelines, the system requirements, and/or the system design by the system build, the more likely the system build does not adequately fulfill the guidelines, the system requirements, and/or the system design (e.g., lower level of system operation maturity) resulting in a low evaluation rating.

As another more specific example of an operation evaluation, the analysis system 10 evaluates the operation (i.e., fulfillment) of the guidelines, the system requirements, the system design, the system build, and/or objectives by the operation of the system in performing the system functions. For instance, the analysis system 10 evaluates the policies, processes, procedures, automation, certifications, documentation, and/or other evaluation metric (e.g., evaluation metrics) regarding the fulfillment of the guidelines, the system requirements, the system design, the system build, and/or objectives regarding the performance of the system functions by the system. The more incomplete the data regarding the evaluation metrics, the more likely the fulfillment of the guidelines, the system requirements, the system design, the system, and/or the objectives regarding the system functions is incomplete. The fewer numbers of and/or incompleteness of policies, processes, procedures, automation, documentation, certification, and/or other evaluation metric regarding the fulfillment of the guidelines, the system requirements, the system design, the system build, and/or the objectives, the more likely the system does not adequately fulfill the guidelines, the system requirements, the system design, the system build, and/or the objectives regarding the system functions (e.g., lower level of system operation maturity) resulting in a low evaluation rating.

As another more specific example of an operation evaluation, the analysis system 10 evaluates the operation (i.e., fulfillment) of the guidelines, the system requirements, the system design, the system build, and/or objectives by the operation of the system in performing the security functions. For instance, the analysis system 10 evaluates the policies, processes, procedures, automation, certifications, documentation, and/or other evaluation metric (e.g., evaluation metrics) regarding the fulfillment of the guidelines, the system requirements, the system design, the system build, and/or objectives regarding the performance of the security functions by the system. The more incomplete the data regarding the evaluation metrics, the more likely the fulfillment of the guidelines, the system requirements, the system design, the system, and/or the objectives regarding the security functions is incomplete. The fewer numbers of and/or incompleteness of policies, processes, procedures, automation, documentation, certification, and/or other evaluation metric regarding the fulfillment of the guidelines, the system requirements, the system design, the system build, and/or the objectives, the more likely the system does not adequately fulfill the guidelines, the system requirements, the system design, the system build, and/or the objectives regarding the security functions (e.g., lower level of system operation maturity) resulting in a low evaluation rating.

As another more specific example of an operation evaluation, the analysis system 10 evaluates the operation (i.e., fulfillment) of the guidelines, the system requirements, the system design, the system build, and/or objectives by the operation of the system functions. For instance, the analysis system 10 evaluates the policies, processes, procedures, automation, certifications, documentation, and/or other evaluation metric (e.g., evaluation metrics) regarding the fulfillment of the guidelines, the system requirements, the system design, the system build, and/or objectives regarding the performance of the system assets. The more incomplete the data regarding the evaluation metrics, the more likely the fulfillment of the guidelines, the system requirements, the system design, the system, and/or the objectives regarding the system assets is incomplete. The fewer numbers of and/or incompleteness of policies, processes, procedures, automation, documentation, certification, and/or other evaluation metric regarding the fulfillment of the guidelines, the system requirements, the system design, the system build, and/or the objectives, the more likely the system assets do not adequately fulfill the guidelines, the system requirements, the system design, the system build, and/or the objectives (e.g., lower level of system operation maturity) resulting in a low evaluation rating.

The analysis system 10 also evaluates the self-analysis capabilities of the system (or portion thereof) by determining how well the self-analysis functions are implemented and how they subsequently fulfill the self-analysis objectives. In an example, the self-analysis capabilities of the system are a self-analysis system that overlies the system. Accordingly, the overlaid self-analysis system can be evaluated by the analysis system 10 in a similar manner as the system under test 91. For example, the understanding, implementation, and/or operation of the overlaid self-analysis system can be evaluated with respect to self-analysis guidelines, self-analysis requirements, design of the self-analysis system, build of the self-analysis system, and/or operation of the self-analysis system.

As part of the evaluation process, the analysis system 10 may identify deficiencies and, when appropriate, auto-correct a deficiency. For example, the analysis system 10 identifies deficiencies in the understanding, implementation, and/or operation of the guidelines, the system requirements, the system design, the system build, the resulting system, and/or the system objectives. For example, the analysis system 10 obtains addition information from the system via a data gathering process (e.g., producing discovered data) and/or from a system proficiency resource (e.g., producing desired data). The analysis system 10 uses the discovered data and/or desired data to identify the deficiencies. When possible, the analysis system 10 auto-corrects the deficiencies. For example, when a software tool that aides in the creation of guidelines and/or system requirements is missing from the system's tool set, the analysis system 10 can automatically obtain a copy of the missing software tool for the system.

Figure 26:
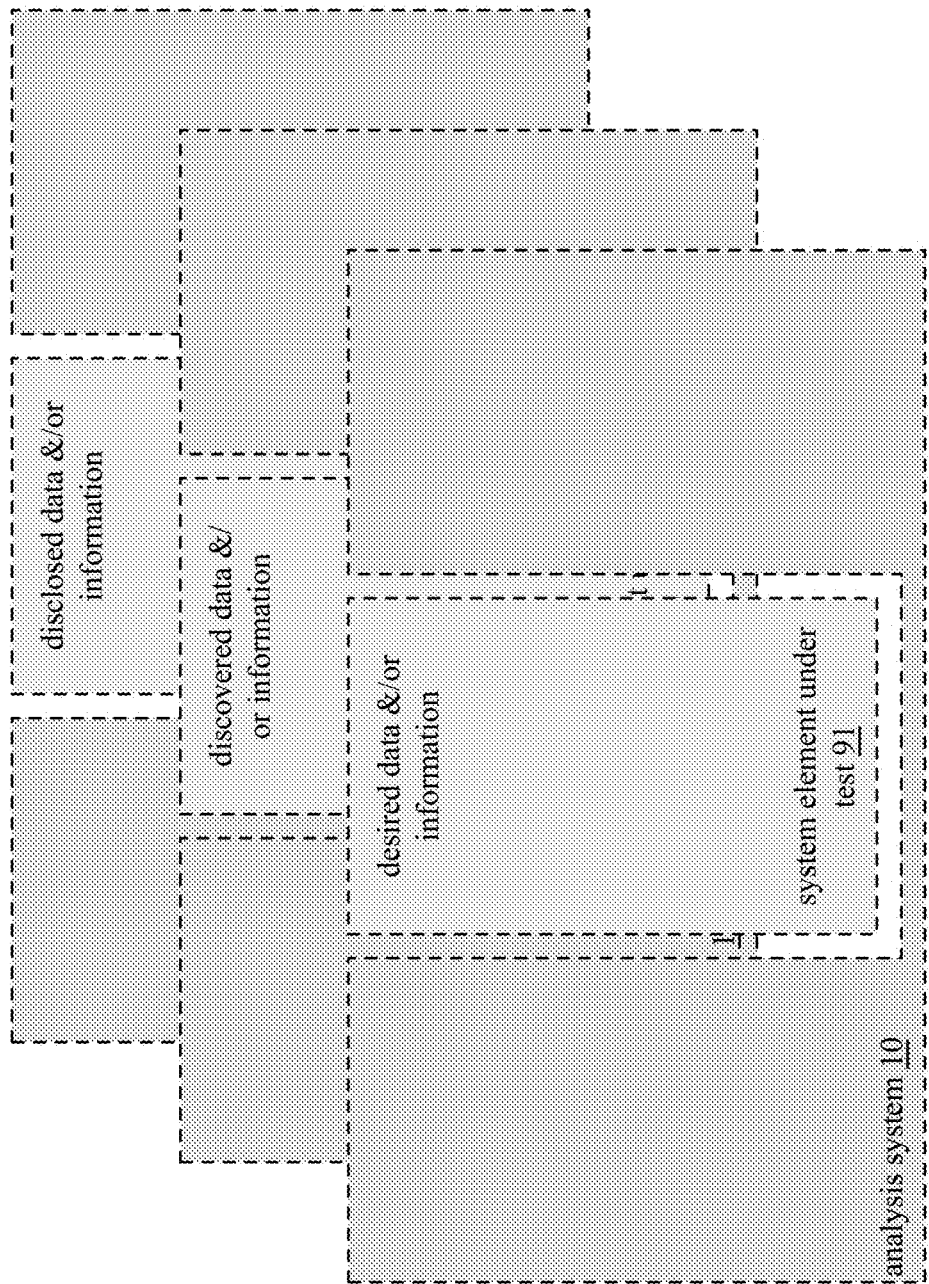
FIG. 26 is a schematic block diagram of another example of an analysis system evaluating a system element under test of a system in accordance with the present disclosure.

FIG. 26 is a schematic block diagram of another example of an analysis system 10 evaluating a system element under test 91. In this example, the analysis system 10 is evaluating the system element under test 91 from three evaluation viewpoints: disclosed data, discovered data, and desired data. Disclosed data is the known data of the system at the outset of an analysis, which is typically supplied by a system administrator and/or is obtained from data files of the system. Discovered data is the data discovered about the system by the analysis system 10 during the analysis. Desired data is the data obtained by the analysis system 10 from system proficiency resources regarding desired guidelines, system requirements, system design, system build, and/or system operation.

The evaluation from the three evaluation viewpoints may be done serially, in parallel, and/or in a parallel-serial combination to produce three sets of evaluation ratings. One set for disclosed data, one set for discovered data, and one set for desired data.

A set of evaluation ratings includes one or more of: an evaluation rating regarding the understanding of the guidelines; an evaluation rating regarding the understanding of the system requirements; an evaluation rating regarding the understanding of the system design; an evaluation rating regarding the understanding of the system build; an evaluation rating regarding the understanding of the system operation; an evaluation rating regarding the development of the system requirements from the guidelines; an evaluation rating regarding the design from the system requirements; an evaluation rating regarding the system build from the design; an evaluation rating regarding the system operation based on the system design and/or system build; an evaluation rating regarding the guidelines; an evaluation rating regarding the system requirements; an evaluation rating regarding the system design; an evaluation rating regarding the system build; and/or an evaluation rating regarding the system operation.

Figure 27:
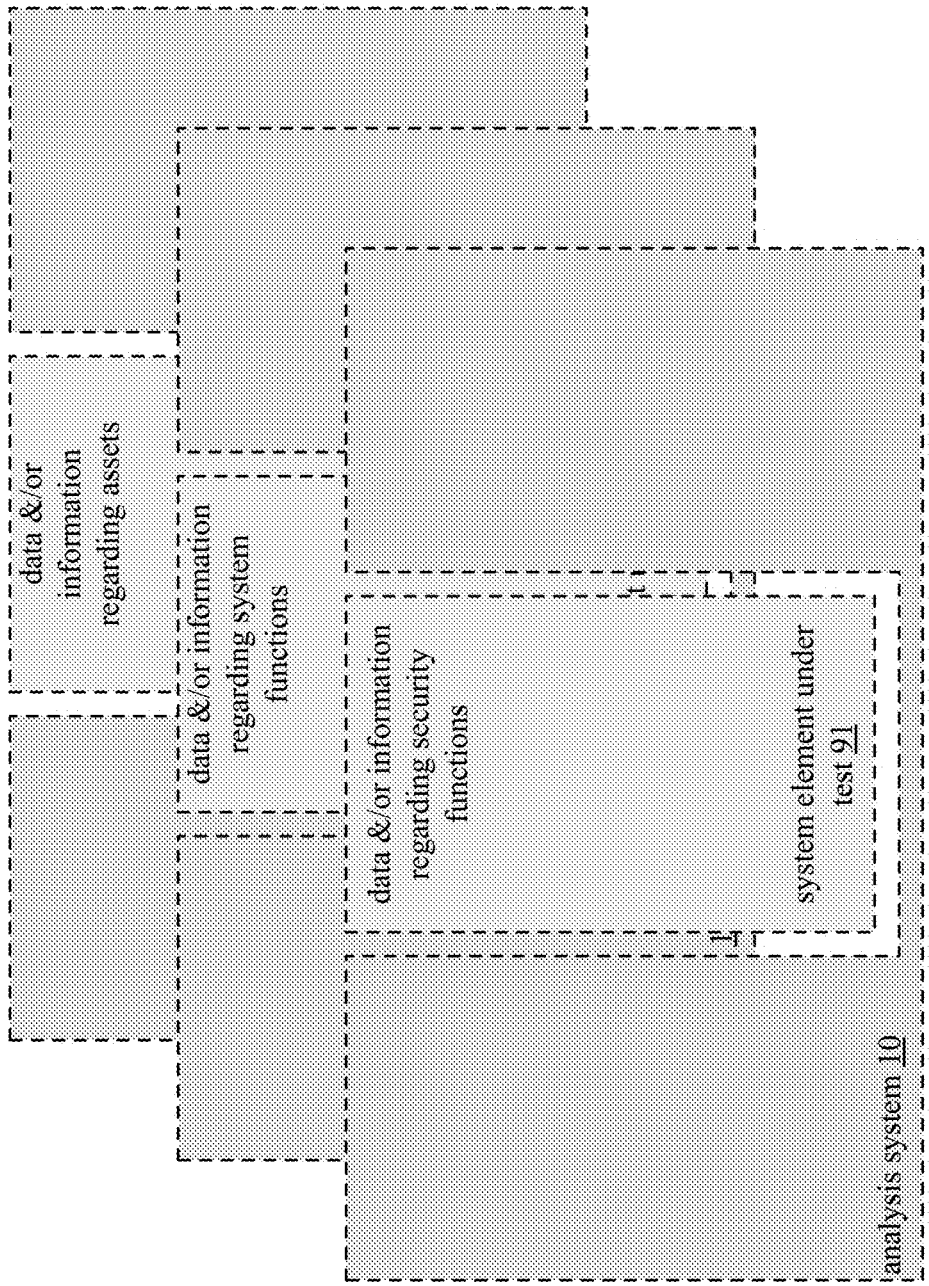
FIG. 27 is a schematic block diagram of another example of an analysis system evaluating a system element under test of a system in accordance with the present disclosure.

FIG. 27 is a schematic block diagram of another example of an analysis system 10 evaluating a system element under test 91. In this example, the analysis system 10 is evaluating the system element under test 91 from three evaluation viewpoints: disclosed data, discovered data, and desired data with regard to security functions. The evaluation from the three evaluation viewpoints for the security functions may be done serially, in parallel, and/or in a parallel-serial combination to produce three sets of evaluation ratings with respect to security functions: one for disclosed data, one for discovered data, and one for desired data.

Figure 28:
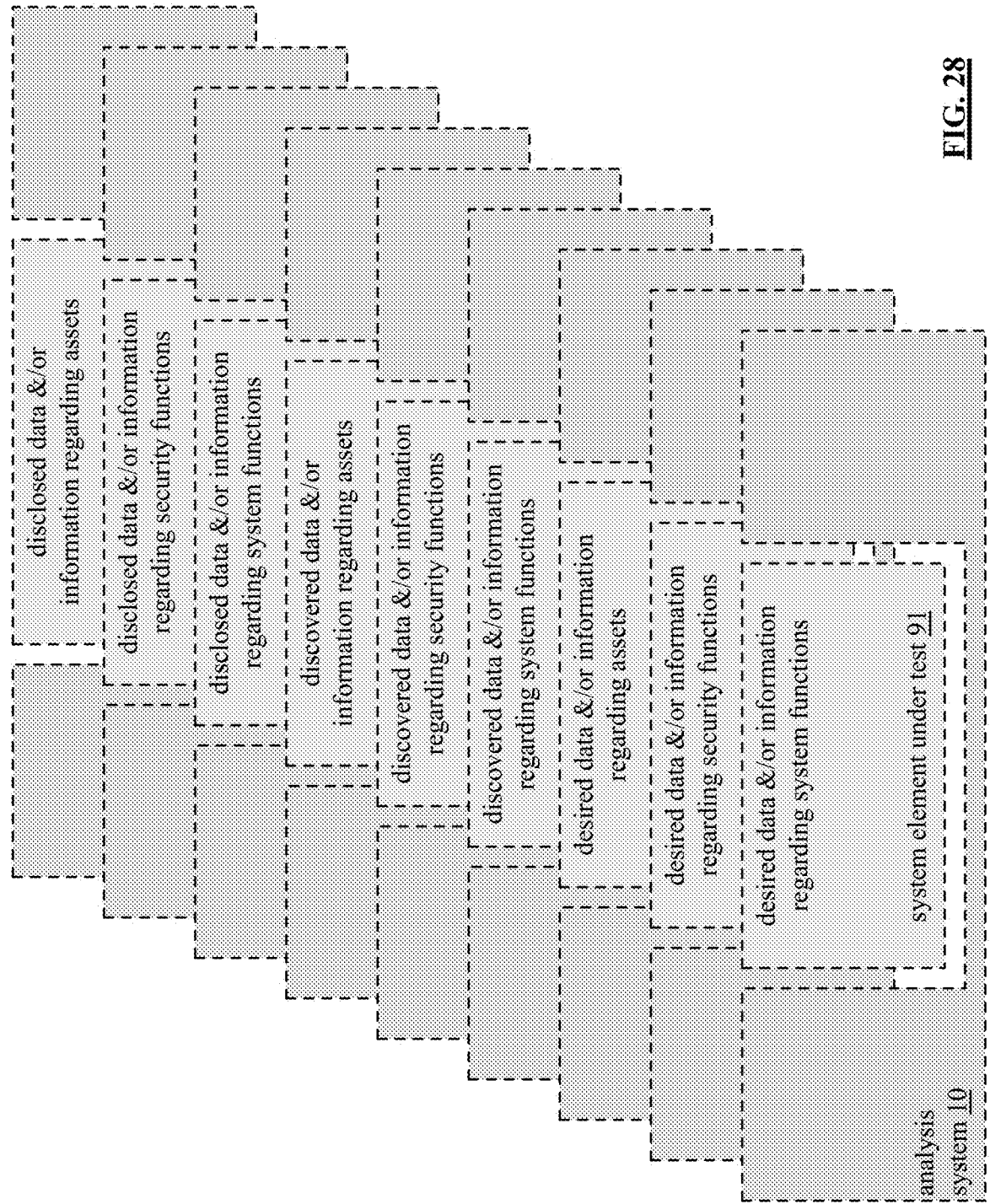
FIG. 28 is a schematic block diagram of another example of an analysis system evaluating a system element under test of a system in accordance with the present disclosure.

FIG. 28 is a schematic block diagram of another example of an analysis system 10 evaluating a system element under test 91. In this example, the analysis system 10 is evaluating the system element under test 91 from three evaluation viewpoints and from three evaluation modes. For example, disclosed data regarding assets, discovered data regarding assets, desired data regarding assets, disclosed data regarding system functions, discovered data regarding system functions, desired data regarding system functions, disclosed data regarding security functions, discovered data regarding security functions, and desired data regarding security functions.

The evaluation from the nine evaluation viewpoints & evaluation mode combinations may be done serially, in parallel, and/or in a parallel-serial combination to produce nine sets of evaluation ratings one for disclosed data regarding assets, one for discovered data regarding assets, one for desired data regarding assets, one for disclosed data regarding system functions, one for discovered data regarding system functions, one for desired data regarding functions, one for disclosed data regarding security functions, one for discovered data regarding security functions, and one for desired data regarding security functions.

Figure 29:
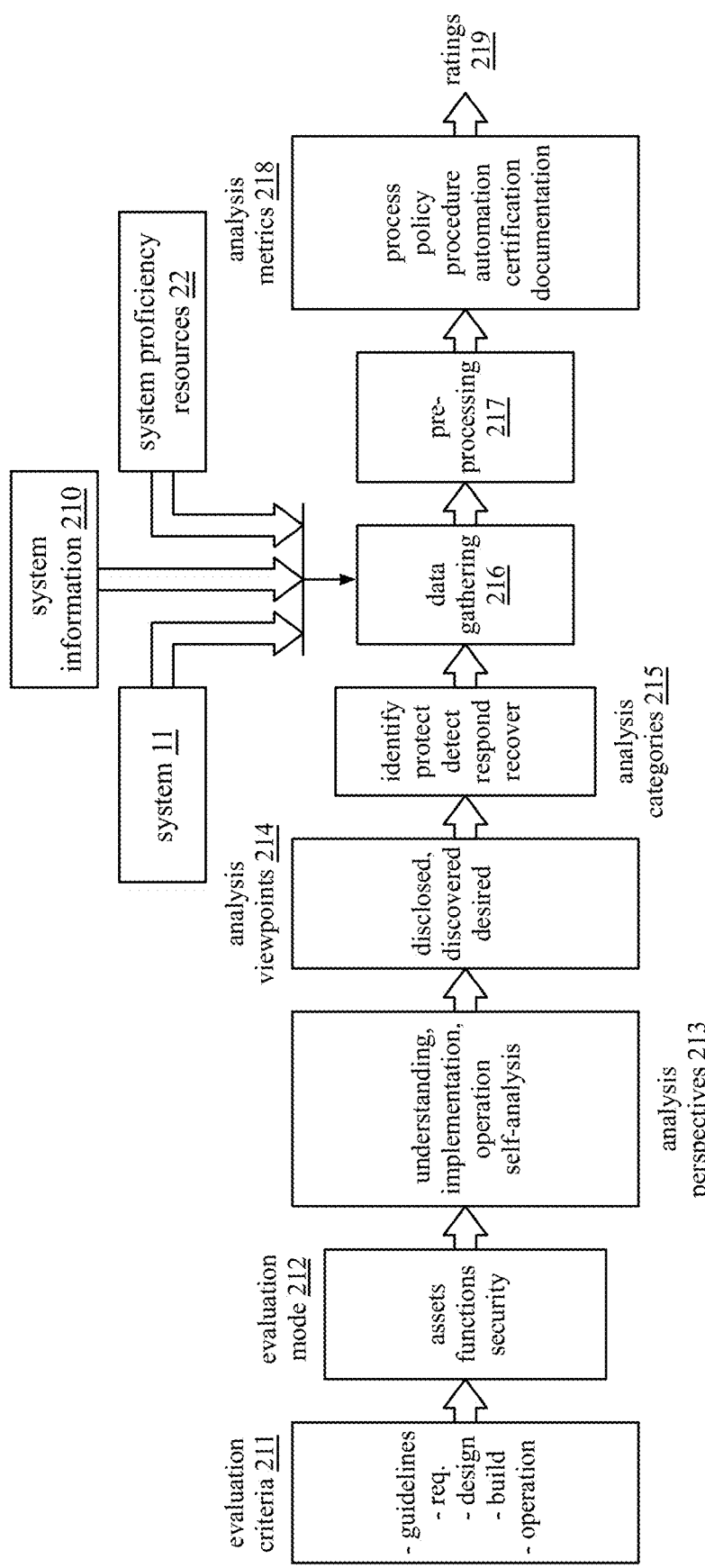
FIG. 29 is a schematic block diagram of an example of the functioning of an analysis system evaluating a system element under test of a system in accordance with the present disclosure.

FIG. 29 is a schematic block diagram of an example of the functioning of an analysis system 10 evaluating a system element under test 91. Functionally, the analysis system 10 includes evaluation criteria 211, evaluation mode 212, analysis perspective 213, analysis viewpoint 214, analysis categories 215, data gathering 216, pre-processing 217, and analysis metrics 218 to produce one or more ratings 219. The evaluation criteria 211 includes guidelines, system requirements, system design, system build, and system operation. The evaluation mode 212 includes assets, system functions, and security functions. The evaluation criteria 211 and the evaluation mode 212 are part of the system aspect, which corresponds to the system, or portion thereof, being evaluated.

The analysis perspective 213 includes understanding, implementation, operation, and self-analysis. The analysis viewpoint includes disclosed, discovered, and desired. The analysis categories 215 include identify, protect, detect, respond, and recover. The analysis perspective 213, the analysis viewpoint 214, and the analysis categories correspond to how the system, or portion thereof, will be evaluated. For example, the system, or portion thereof, is being evaluated regarding the understanding of the system's ability to identify assets, system functions, and/or security functions from discovered data.

The analysis metrics 218 includes process, policy, procedure, automation, certification, and documentation. The analysis metric 218 and the pre-processing 217 corresponds to manner of evaluation. For example, the policies regarding system's ability to identify assets, system functions, and/or security functions from discovered data of the system, or portion thereof, are evaluated to produce an understanding evaluation rating.

In an example of operation, the analysis system 10 determines what portion of the system is evaluated (i.e., a system aspect). As such, the analysis system 10 determines one or more system elements (e.g., including one or more system assets which are physical assets and/or conceptual assets), one or more system criteria (e.g., guidelines, system requirements, system design, system build, and/or system operation), and one or more system modes (e.g., assets, system functions, and security functions). The analysis system 10 may determine the system aspect in a variety of ways. For example, the analysis system 10 receives an input identifying the system aspect from an authorized operator of the system (e.g., IT personnel, executive personnel, etc.). As another example, the analysis system determines the system aspect in a systematic manner to evaluate various combinations of system aspects as part of an overall system evaluation. The overall system evaluation may be done one time, periodically, or continuously. As yet another example, the analysis system determines the system aspect as part of a systematic analysis of a section of the system, which may be done one time, periodically, or continuously.

The analysis system then determines how the system aspect is to be evaluated by selecting one or more analysis perspectives (understanding, implementation, operation, and self-analysis), one or more analysis viewpoints (disclosed, discovered, and desired), and one or more analysis categories (identify, protect, detect, respond, and recover). The analysis system 10 may determine how the system aspect is to be evaluated in a variety of ways. For example, the analysis system 10 receives an input identifying how the system aspect is to be evaluated from an authorized operator of the system (e.g., IT personnel, executive personnel, etc.). As another example, the analysis system determines how the system aspect is to be evaluated in a systematic manner to evaluate the system aspect in various combinations of analysis perspectives, analysis viewpoints, and analysis categories as part of an overall system evaluation. The overall system evaluation may be done one time, periodically, or continuously. As yet another example, the analysis system determines how the system aspect is to be evaluated as part of a systematic analysis of a section of the system, which may be done one time, periodically, or continuously.

The analysis system 10 also determines one or more analysis metrics (e.g., process, policy, procedure, automation, certification, and documentation) regarding the manner for evaluating the system aspect in accordance with how it's to be evaluated. A policy sets out a strategic direction and includes high-level rules or contracts regarding issues and/or matters. For example, all software shall be a most recent version of the software. A process is a set of actions for generating outputs from inputs and includes one or more directives for generating outputs from inputs. For example, a process regarding the software policy is that software updates are to be performed by the IT department and all software shall be updated within one month of the release of the new version of software.

A procedure is the working instructions to complete an action as may be outlined by a process. For example, the IT department handling software updates includes a procedure that describes the steps for updating the software, verifying that the updated software works, and recording the updating and verification in a software update log. Automation is in regard to the level of automation the system includes for handling actions, issues, and/or matters of policies, processes, and/or procedures. Documentation is in regard to the level of documentation the system has regard guidelines, system requirements, system design, system build, system operation, system assets, system functions, security functions, system understanding, system implementation, operation of the system, policies, processes, procedures, etc. Certification is in regard to certifications of the system, such as maintenance certification, regulatory certifications, etc.

In an example, the analysis system 10 receives an input identifying manner in which to evaluate the system aspect from an authorized operator of the system (e.g., IT personnel, executive personnel, etc.). As another example, the analysis system determines the manner in which to evaluate the system aspect in a systematic manner to evaluate the system aspect in various combinations of analysis metrics as part of an overall system evaluation. The overall system evaluation may be done one time, periodically, or continuously. As yet another example, the analysis system determines the manner in which to evaluate the system aspect as part of a systematic analysis of a section of the system, which may be done one time, periodically, or continuously.

Once the analysis system has determined the system aspect, how it is to be evaluated, and the manner for evaluation, the data gathering function 216 gathers data relevant to the system aspect, how it's to be evaluated, and the manner of evaluation from the system 11, from resources that store system information 210 (e.g., from the system, from a private storage of the analysis system, etc.), and/or from one or more system proficiency resources 22. For example, a current evaluation is regarding an understanding (analysis perspective) of policies (analysis metric) to identify (analysis category) assets (evaluation mode) of an engineering department (system elements) regarding operations (evaluation criteria) that the assets perform based on discovered data (analysis viewpoint). As such, the data gathering function 216 gathers data regarding policies to identify assets of the engineering department and the operations they perform using one or more data discovery tools.

The pre-processing function 217 processes the gathered data by normalizing the data, parsing the data, tagging the data, and/or de-duplicating the data. The analysis system evaluations the processed data in accordance with the selected analysis metric to produce one or more ratings 219. For example, the analysis system would produce a rating regarding the understanding of policies to identify assets of an engineering department regarding operations that the assets perform based on discovered data. The rating 219 is on a scale from low to high. In this example, a low rating indicates issues with the understanding and a high rating indicates no issues with the understanding.

Figure 30:
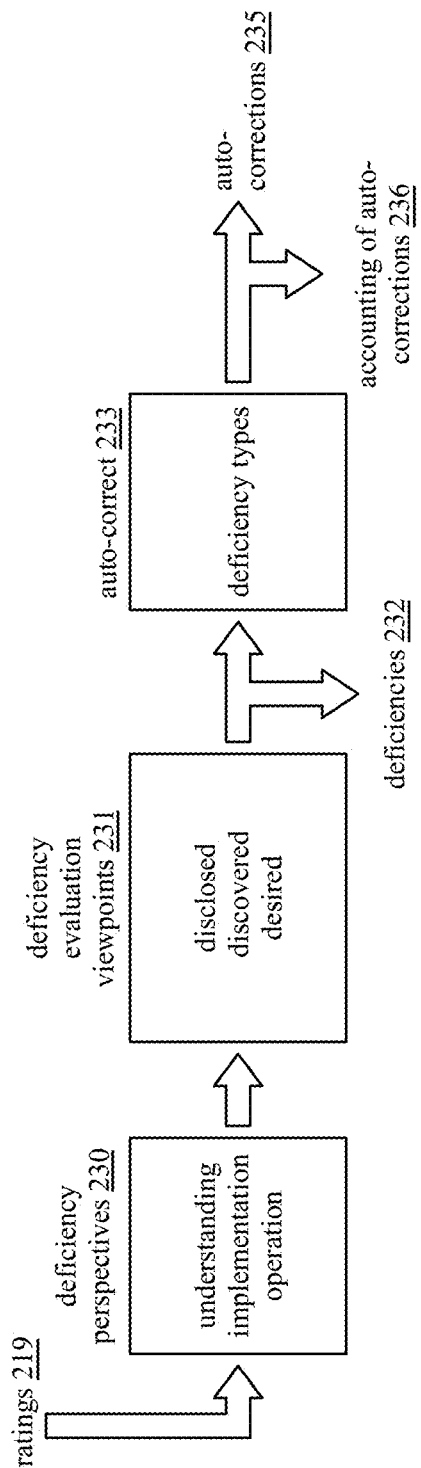
FIG. 30 is a schematic block diagram of another example of the functioning of an analysis system evaluating a system element under test of a system in accordance with the present disclosure.

FIG. 30 is a schematic block diagram of another example of the functioning of an analysis system 10 evaluating a system element under test 91. The functioning of the analysis system includes a deficiency perspective function 230, a deficiency evaluation viewpoint function 31, and an auto-correction function 233.

The deficiency perspective function 230 receives one or more ratings 219 and may also receive the data used to generate the ratings 219. From these inputs, the deficiency perspective function 230 determines whether there is an understanding issue, an implementation issue, and/or an operation issue. For example, an understanding (analysis perspective) issue relates to a low understanding evaluation rating for a specific evaluation regarding policies (analysis metric) to identify (analysis category) assets (evaluation mode) of an engineering department (system elements) regarding operations (evaluation criteria) that the assets perform based on discovered data (analysis viewpoint).

As another example, an implementation (analysis perspective) issue relates to a low implementation evaluation rating for a specific evaluation regarding implementation and/or use of policies (analysis metric) to identify (analysis category) assets (evaluation mode) of an engineering department (system elements) regarding operations (evaluation criteria) that the assets perform based on discovered data (analysis viewpoint). As yet another example, an operation (analysis perspective) issue relates to a low operation evaluation rating for a specific evaluation regarding consistent, reliable, and/or accurate mechanism(s) to identify (analysis category) assets (evaluation mode) of an engineering department (system elements) regarding operations (evaluation criteria) that the assets perform based on discovered data (analysis viewpoint) and on policies (analysis metric).

When an understanding, implementation, and/or operation issue is identified, the deficiency evaluation viewpoint function 231 determines whether the issue(s) is based on disclosed data, discovered data, and/or desired data. For example, an understanding issue may be based on a difference between disclosed data and discovered data. As a specific example, the disclosed data includes a policy outline how to identify (analysis category) assets (evaluation mode) of an engineering department (system elements) regarding operations (evaluation criteria) that the assets perform, which is listed as version 1.12 and a last revision date of Oct. 2, 2020. In this specific example, the discovered data includes the same policy, but is has been updated to version 1.14 and the last revision date as Nov. 13, 2020. As such, the deficiency evaluation viewpoint function identifies a deficiency 232 in the disclosed data as being an outdated policy.

As another specific example, the disclosed data includes a policy outline how to identify (analysis category) assets (evaluation mode) of an engineering department (system elements) regarding operations (evaluation criteria) that the assets perform. The disclosed data also shows an inconsistent use and/or application of the policy resulting one or more assets not being properly identified. In this instance, the deficiency evaluation viewpoint function identifies a deficiency 232 in the disclosed data as being inconsistent use and/or application of the policy.

The auto-correct function 233 receives a deficiency 232 and interprets it to determine a deficiency type, i.e., a nature of the understanding issue, the implementation issue, and/or the operation issues. Continuing with the outdated policy example, the nature of the understanding issue is that there is a newer version of the policy. Since there is a newer version available, the auto-correct function 233 can update the policy to the newer version for the system (e.g., an auto-correction). In addition to making the auto-correction 235, the analysis system creates an accounting 236 of the auto-correction (e.g., creates a record). The record includes an identity of the deficiency, date information, what auto-correction was done, how it was done, verification that it was done, and/or more or less data as may be desired for recording auto-corrections.

As another specific example, a deficiency 232 is discovered that an asset exists in the engineering department that was not included in the disclosed data. This deficiency may include one or more related deficiencies. For example, a deficiency of design, a deficiency of build, a deficiency is oversight of asset installation, etc. The deficiencies of design, build, and/or installation oversight can be auto-corrected; the deficiency of an extra asset cannot. With regard to the deficiency of the extra asset, the analysis system generates a report regarding the extra asset and the related deficiencies.

Figure 31:
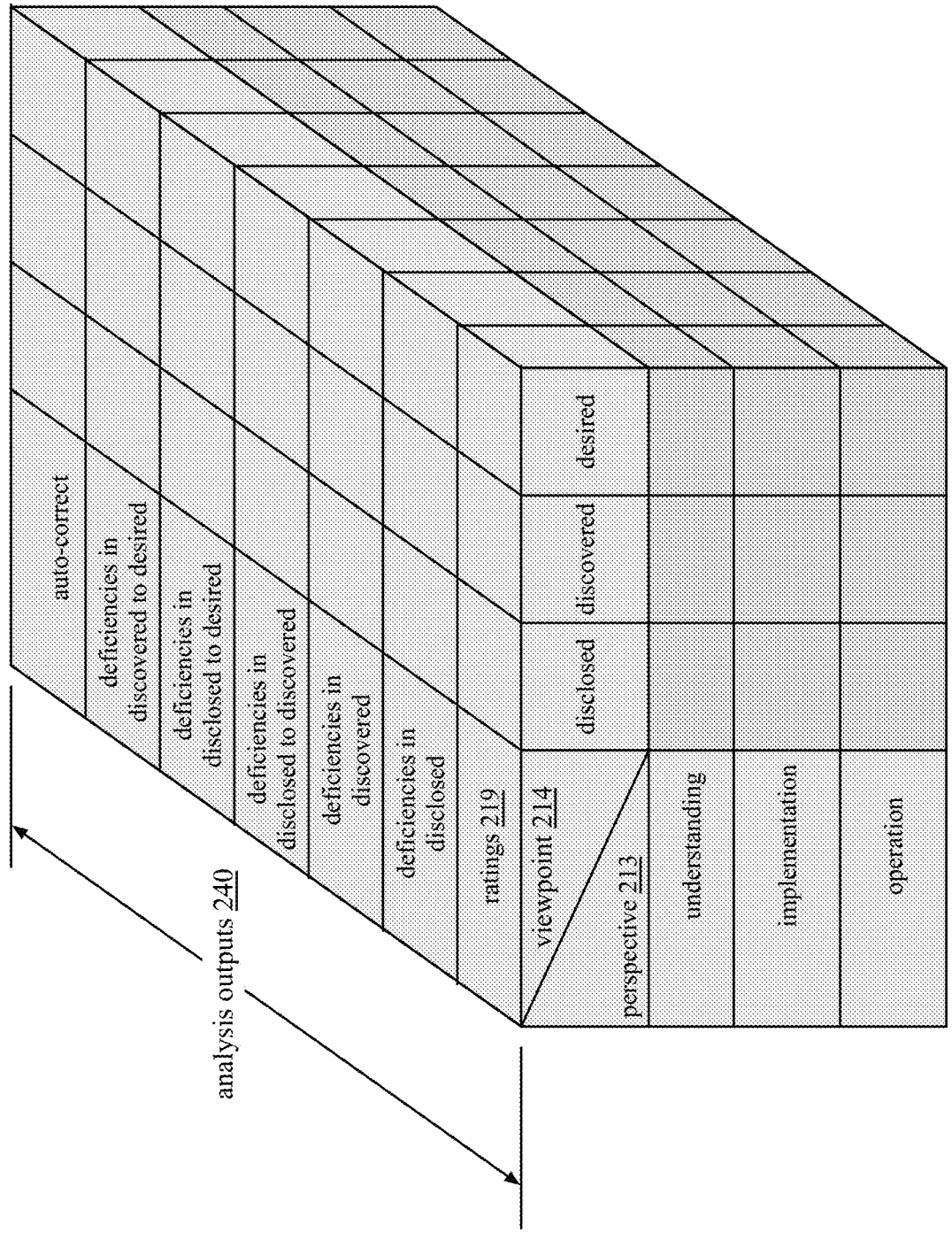
FIG. 31 is a diagram of an example of evaluation options of an analysis system for evaluating a system element under test of a system in accordance with the present disclosure.

FIG. 31 is a diagram of an example of evaluation options of an analysis system 10 for evaluating a system element under test 91. The evaluation options are shown in a three-dimensional tabular form. The rows include analysis perspective 213 options (e.g., understanding, implementation, and operation). The columns includes analysis viewpoint 214 option (e.g., disclosed, discovered, and desired). The third dimension includes analysis output 240 options (e.g., ratings 219, deficiencies in disclosed data, deficiencies in discovered data, deficiencies in disclosed to discovered data, deficiencies in disclosed to desired data, deficiencies in discovered to desired data, and auto-correct.

The analysis system 10 can evaluate the system element under test 91 (e.g., system aspect) in one or more combinations of a row selection, a column selection, and/or a third dimension selection. For example, the analysis system performs an evaluation from an understanding perspective, a disclosed data viewpoint, and a ratings output. As another example, the analysis system performs an evaluation from an understanding perspective, all viewpoints, and a ratings output.

FIG. 32 is a diagram of another example of evaluation options of an analysis system 10 for evaluating a system element under test 91 (e.g., system aspect). The evaluation options are shown in the form of a table. The rows are assets (physical and conceptual) and the columns are system functions. The analysis system 10 can evaluate the system element under test 91 (e.g., system aspect) in one or more combinations of a row selection and a column selection.

For example, the analysis system 10 can evaluate user HW with respect to business operations. As another example, the analysis system 10 can evaluate physical assets with respect to data flow. As another example, the analysis system 10 can evaluate user SW with respect to all system functions.

FIG. 33 is a diagram of another example of evaluation options of an analysis system 10 for evaluating a system element under test 91 (e.g., system aspect). The evaluation options are shown in the form of a table. The rows are security functions and the columns are system functions. The analysis system 10 can evaluate the system element under test 91 (e.g., system aspect) in one or more combinations of a row selection and a column selection.

For example, the analysis system 10 can evaluate threat detection with respect to business operations. As another example, the analysis system 10 can evaluate all security functions with respect to data flow. As another example, the analysis system 10 can evaluate threat avoidance with respect to all system functions.

FIG. 34 is a diagram of another example of evaluation options of an analysis system 10 for evaluating a system element under test 91 (e.g., system aspect). The evaluation options are shown in the form of a table. The rows are assets (physical and conceptual) and the columns are security functions. The analysis system 10 can evaluate the system element under test 91 (e.g., system aspect) in one or more combinations of a row selection and a column selection.

For example, the analysis system 10 can evaluate user HW with respect to threat recovery. As another example, the analysis system 10 can evaluate physical assets with respect to threat resolution. As another example, the analysis system 10 can evaluate user SW with respect to all security functions.

Figure 35:
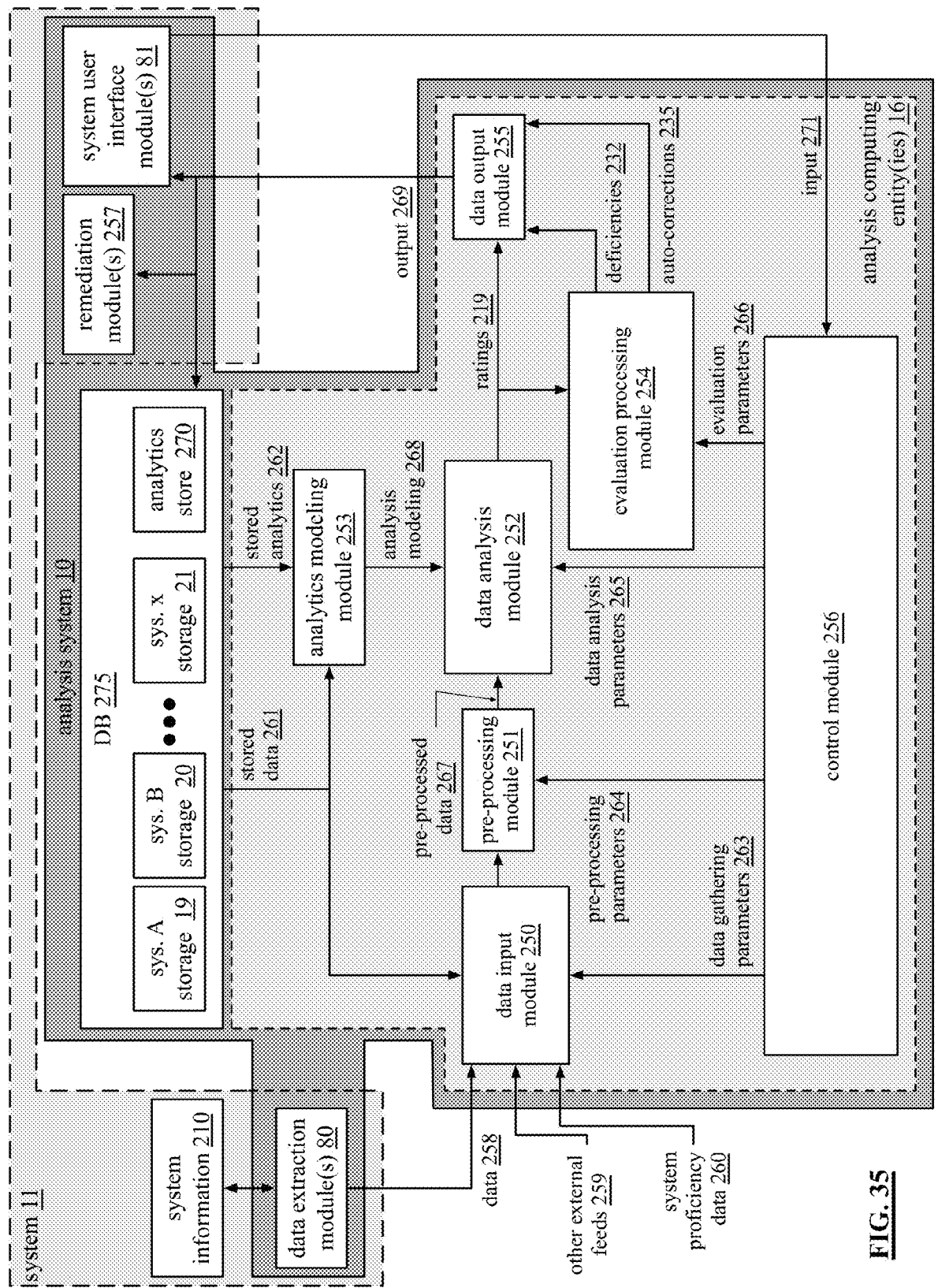
FIG. 35 is a schematic block diagram of an embodiment of an analysis system coupled to a system in accordance with the present disclosure.

FIG. 35 is a schematic block diagram of an embodiment of an analysis system 10 that includes one or more computing entities 16, one or more databases 275, one or more data extraction modules 80, one or more system user interface modules 81, and one or more remediation modules 257. The computing entity(ies) 16 is configured to include a data input module 250, a pre-processing module 251, a data analysis module 252, an analytics modeling module 253, an evaluation processing module 254, a data output module 255, and a control module 256. The database 275, which includes one or more databases, stores the private data for a plurality of systems (e.g., systems A-x) and stores analytical data 270 of the analysis system 10.

In an example, the system 11 provides input 271 to the analysis system 10 via the system user interface module 80. The system user interface module 80 provides a user interface for an administrator of the system 11 and provides a s secure end-point of a secure data pipeline between the system 11 and the analysis system 10. While the system user interface module 81 is part of the analysis system, it is loaded on and is executed on the system 11.

Via the system user interface module 81, the administrator makes selections as to how the system is to be evaluated and the desired output from the evaluation. For example, the administrator selects evaluate system, which instructs the analysis system 10 to evaluate the system from most every, if not every, combination of system aspect (e.g., system element, system criteria, and system mode), evaluation aspect (e.g., evaluation perspective, evaluation viewpoint, and evaluation category), evaluation metric (e.g., process, policy, procedure, automation, documentation, and certification), and analysis output (e.g., an evaluation rating, deficiencies identified, and auto-correction of deficiencies). As another example, the administrator selects one or more system aspects, one or more evaluation aspects, one or more evaluation metrics, and/or one or more analysis outputs.

The analysis system 10 receives the evaluation selections as part of the input 271. A control module 256 interprets the input 271 to determine what part of the system is to be evaluated (e.g., system aspects), how the system is to be evaluated (e.g., evaluation aspects), the manner in which the system is to be evaluated (e.g., evaluation metrics), and/or the resulting evaluation output (e.g., an evaluation rating, a deficiency report, and/or auto-correction). From the interpretation of the input, the control module 256 generates data gathering parameters 263, pre-processing parameters 264, data analysis parameters 265, and evaluation parameters 266.

The control module 256 provides the data gathering parameters 263 to the data input module 250. The data input module 250 interprets the data gathering parameters 263 to determine data to gather. For example, the data gathering parameters 263 are specific to the evaluation to be performed by the analysis system 10. As a more specific example, if the analysis system 10 is evaluating the understanding of the policies, processes, documentation, and automation regarding the assets built for an engineering department, then the data gathering parameters 263 would prescribe gathering data related to policies, processes, documentation, and automation regarding the assets built for the engineering department.

The data input module 250 may gather (e.g., retrieve, request, etc.) from a variety of sources. For example, the data input module 250 gathers data 258 from the data extraction module 80. In this example, the data input module 250 provides instructions to the data extraction module 80 regarding the data being requested. The data extraction module 80 pulls the requested data from system information 210, which may be centralized data of the system, system administration data, and/or data from assets of the system.

As another example, the data input module 250 gathers data from one or more external data feeds 259. A source of an external data feed includes one or more business associate computing devices 23, one or more publicly available servers 27, and/or one or more subscriber servers 28. Other sources of external data feeds 259 includes bot computing devices 25, and/or bad actor computing devices 26. Typically, the data input module 250 does not seek data inputs from bot computing devices 25 and/or bad actor computing devices 26 except under certain circumstances involving specific types of cybersecurity risks.

As another example, the data input module 250 gathers system proficiency data 260 from one or more system proficiency resources 22. As a specific example, for a data request that includes desired data, the data input module 250 addresses one or more system proficiencies resources 22 to obtain the desired system proficiency data 260. For example, system proficiency data 260 includes information regarding best-in-class practices (for system requirements, for system design, for system implementation, and/or for system operation), governmental and/or regulatory requirements, security risk awareness and/or risk remediation information, security risk avoidance, performance optimization information, system development guidelines, software development guideline, hardware requirements, networking requirements, networking guidelines, and/or other system proficiency guidance.

As another example, the data input module 250 gathers stored data 261 from the database 275. The stored data 261 is previously stored data that is unique to the system 11, is data from other systems, is previously processed data, is previously stored system proficiency data, and/or is previously stored data that assists in the current evaluation of the system.

The data input module 250 provides the gathered data to the pre-processing module 251. Based on the pre-processing parameters 264 (e.g., normalize, parse, tag, de-duplication, sort, filter, etc.), the pre-processing module 251 processes the gathered data to produce pre-processed data 267. The pre-processed data 267 may be stored in the database 275 and later retrieved as stored data 261.

The analysis modeling module 253 retrieves stored data 261 and/or stored analytics 262 from the database 275. The analysis modeling module 253 operates to increase the artificial intelligence of the analysis system 10. For example, the analysis modeling module 253 evaluates stored data from one or more systems in a variety of ways to test the evaluation processes of the analysis system. As a more specific example, the analysis modeling module 253 models the evaluation of understanding of the policies, processes, documentation, and automation regarding the assets built for an engineering department across multiple systems to identify commonalities and/or deviations. The analysis modeling module 253 interprets the commonalities and/or deviations to adjust parameters of the evaluation of understanding and models how the adjustments affect the evaluation of understanding. If the adjustments have a positive effect, the analysis modeling module 253 stores them as analytics 262 and/or analysis modeling 268 in the database 275.

The data analysis module 252 receives the pre-processed data 267, the data analysis parameters 265 and may further receive optional analysis modeling data 268. The data analysis parameters 265 includes identify of selected evaluation categories (e.g., identify, protect, detect, respond, and recover), identity of selected evaluation sub-categories, identify of selected evaluation sub-sub categories, identity of selected analysis metrics (e.g., process, policy, procedure, automation, certification, and documentation), grading parameters for the selected analysis metrics (e.g., a scoring scale for each type of analysis metric), identity of selected analysis perspective (e.g., understanding, implementation, operation, and self-analysis), and/or identity of selected analysis viewpoint (e.g., disclosed, discovered, and desired).

The data analysis module 252 generates one or more ratings 219 for the pre-processed data 267 based on the data analysis parameters 265. The data analysis module 252 may adjust the generation of the one or more rating 219 based on the analysis modeling data 268. For example, the data analysis module 252 evaluates the understanding of the policies, processes, documentation, and automation regarding the assets built for an engineering department based on the pre-processed data 267 to produce at least one evaluation rating 219.

Continuing with this example, the analysis modeling 268 is regarding the evaluation of understanding of the policies, processes, documentation, and automation regarding the assets built for an engineering department of a plurality of different organizations operating on a plurality of different systems. The modeling indicates that if processes are well understood, the understanding of the policies is less significant in the overall understanding. In this instance, the data analysis module 252 may adjusts its evaluation rating of the understanding to a more favorably rating if the pre-processed data 267 correlates with the modeling (e.g., good understanding of processes).

The data analysis module 252 provides the rating(s) 219 to the data output module 255 and to the evaluation processing module 254. The data output module 255 provides the rating(s) 219 as an output 269 to the system user interface module 81. The system user interface module 81 provides a graphical rendering of the rating(s) 219.

The evaluation processing module 254 processes the rating(s) 219 based on the evaluation parameters 266 to identify deficiencies 232 and/or to determine auto-corrections 235. The evaluation parameters 266 provide guidance on how to evaluate the rating(s) 219 and whether to obtain data (e.g., pre-processed data, stored data, etc.) to assist in the evaluation. The evaluation guidance includes how deficiencies are to be identified. For example, identify the deficiencies based on the disclosed data, based on the discovered data, based on a differences between the disclosed and discovered data, based on a differences between the disclosed and desired data, and/or based on a differences between the discovered and desired data. The evaluation guidance further includes whether auto-correction is enabled. The evaluation parameters 266 may further includes deficiency parameters, which provide a level of tolerance between the disclosed, discovered, and/or desired data when determining deficiencies.

The evaluation processing module 254 provides deficiencies 232 and/or the auto-corrections 235 to the data output module 255. The data output module 255 provides the deficiencies 232 and/or the auto-corrections 235 as an output 269 to the system user interface module 81 and to the remediation module 257. The system user interface module 81 provides a graphical rendering of the deficiencies 232 and/or the auto-corrections 235.

The remediation module 257 interprets the deficiencies 232 and the auto-corrections 235 to identify auto-corrections to be performed within the system. For example, if a deficiency is a computing device having an outdated user software application, the remediation module 257 coordinates obtaining a current copy of the user software application, uploading it on the computing device, and updating maintenance logs.

Figure 36:
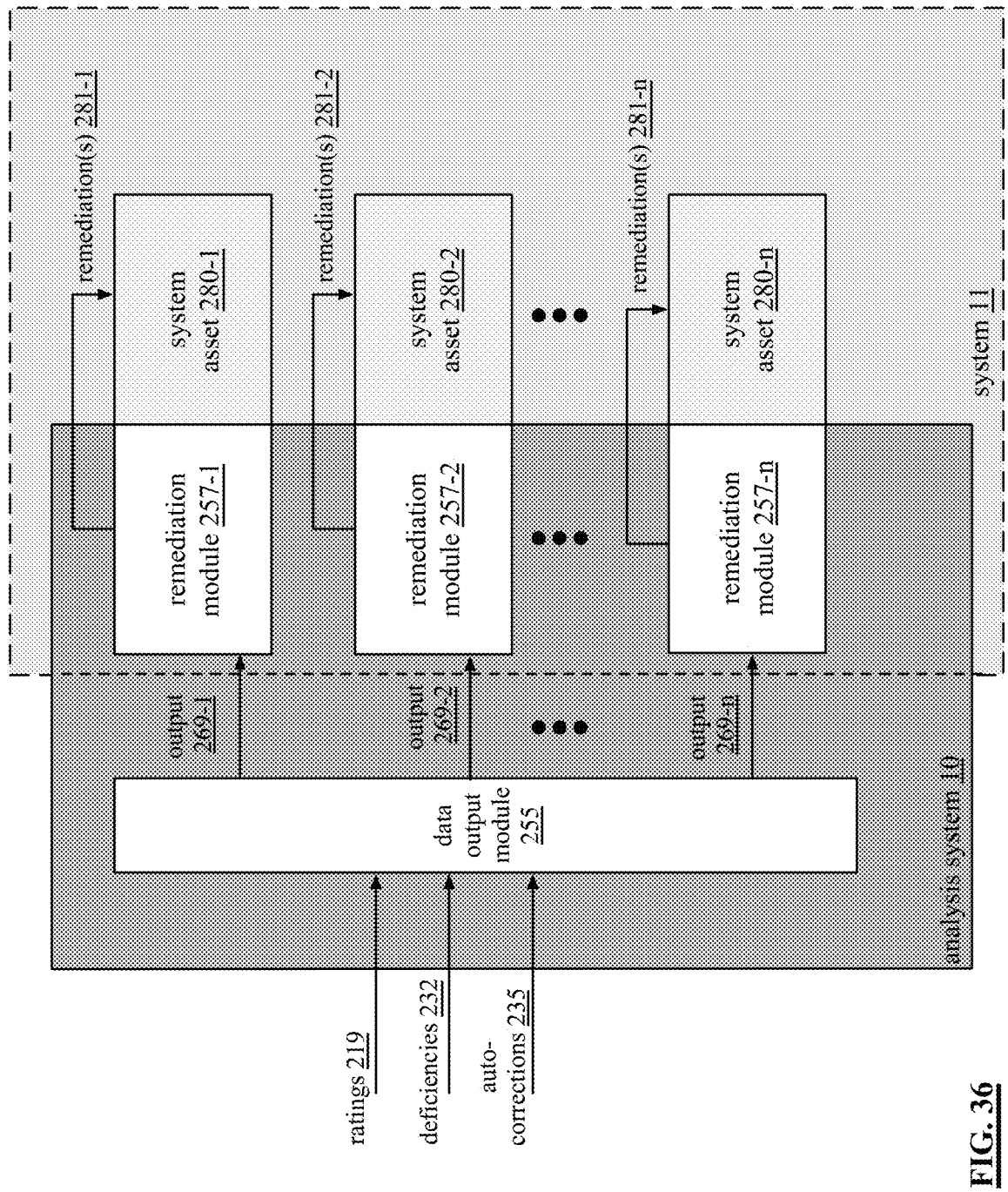
FIG. 36 is a schematic block diagram of an embodiment of a portion of an analysis system coupled to a system in accordance with the present disclosure.

FIG. 36 is a schematic block diagram of an embodiment of a portion of an analysis system 10 coupled to a portion of the system 11. In particular, the data output module 255 of the analysis system 10 is coupled to a plurality of remediation modules 257-1 through 257-*n*. Each remediation module 257 is coupled to one or more system assets 280-1 through 280-*n*.

A remediation module 257 receives a corresponding portion of the output 269. For example, remediation module 257-1 receives output 269-1, which is regarding an evaluation rating, deficiency, and/or an auto-correction of system asset 280-1. Remediation module 257-1 may auto-correct a deficiency of the system asset or a system element thereof. Alternatively or in addition, the remediation module 257-1 may quarantine the system asset or system element thereof if the deficiency cannot be auto-corrected and the deficiency exposes the system to undesired risks, undesired liability, and/or undesired performance degradation.

Figure 37:
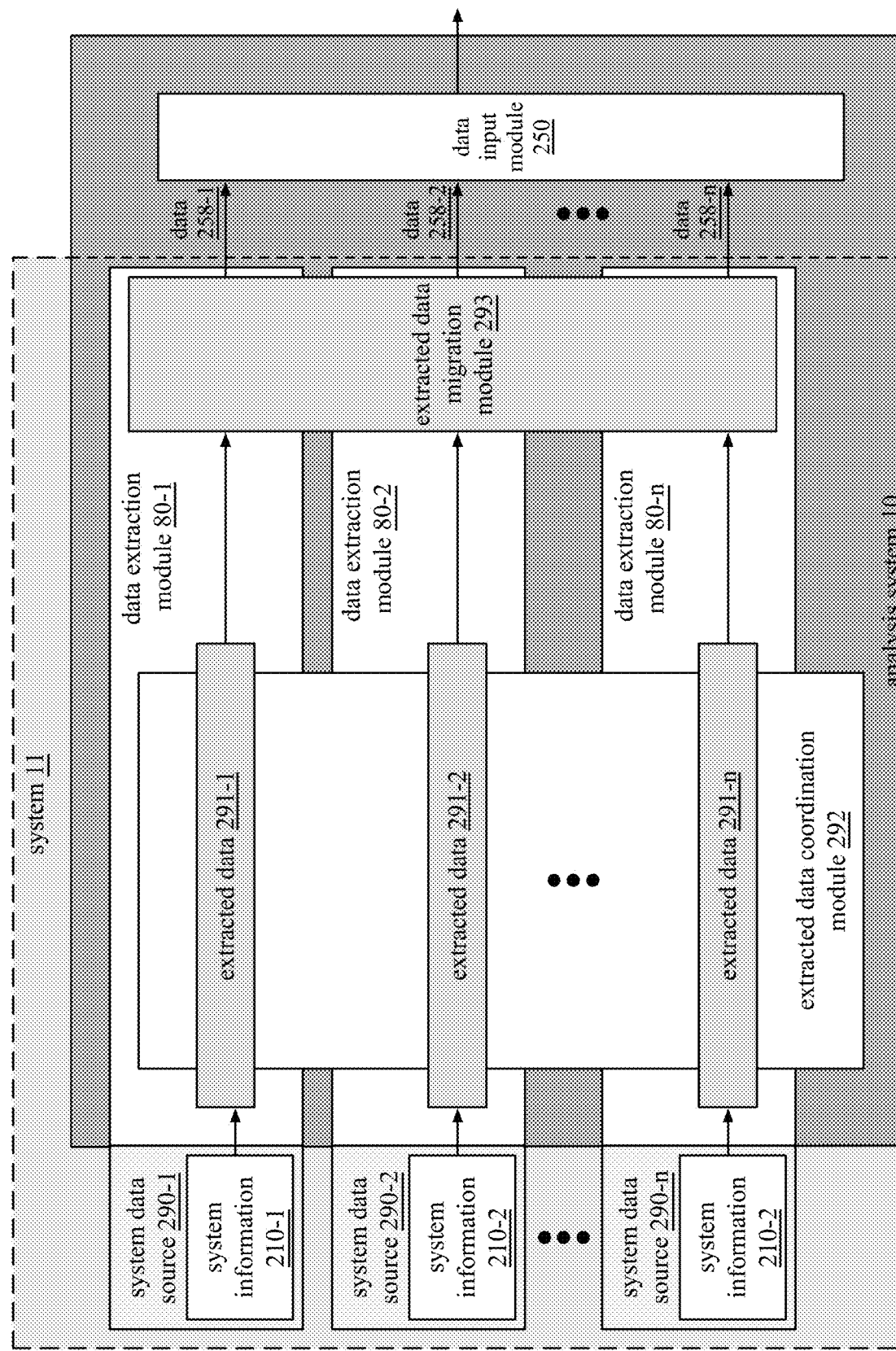
FIG. 37 is a schematic block diagram of another embodiment of a portion of an analysis system coupled to a system in accordance with the present disclosure.

FIG. 37 is a schematic block diagram of another embodiment of a portion of an analysis system 10 coupled to a portion of the system 11. In particular, the data input module 250 of the analysis system 10 is coupled to a plurality of data extraction modules 80-1 through 80-*n*. Each data extraction module 80 is coupled to a system data source 290 of the system 11. Each of the system data sources produce system information 210 regarding a corresponding portion of the system. A system data source 290-1 through 290-*n* may be an Azure EventHub, Cisco Advanced Malware Protection (AMP), Cisco Email Security Appliance (ESA), Cisco Umbrella, NetFlow, and/or Syslog. In addition, a system data source may be a system asset, a system element, and/or a storage device storing system information 210.

An extraction data migration module 293 coordinates the collection of system information 210 as extracted data 291-1 through 291-*n*. An extraction data coordination module 292 coordinates the forwarding of the extracted data 291 as data 258 to the data input module 250.

Figure 38:
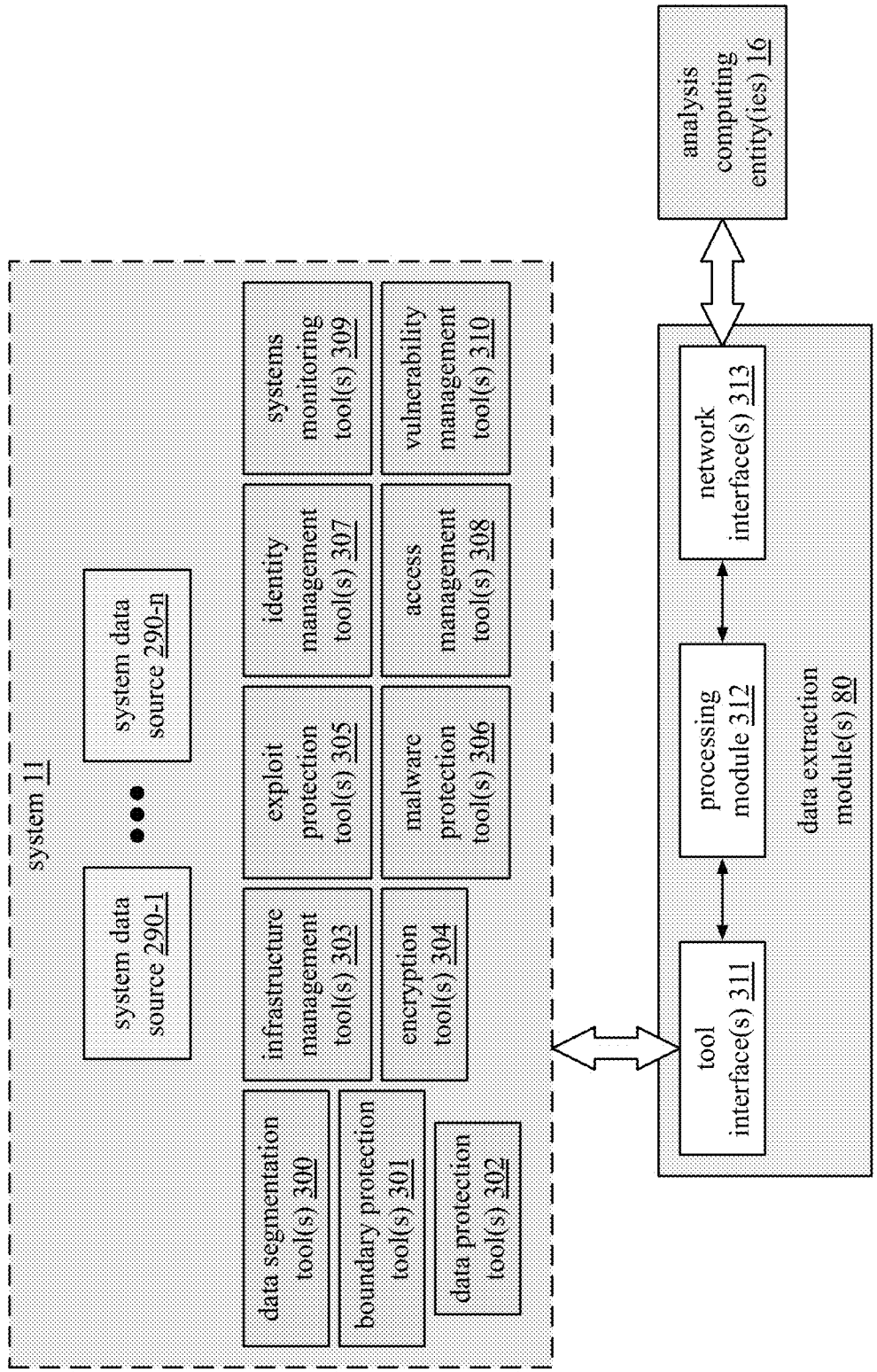
FIG. 38 is a schematic block diagram of an embodiment of a data extraction module of an analysis system coupled to a system in accordance with the present disclosure.

FIG. 38 is a schematic block diagram of an embodiment of a data extraction module 80 of an analysis system 10 coupled to a system 11. The data extraction module 80 includes a tool one or more interface modules 311, one or more processing module 312, and one or more network interfaces 313. The network interface 313 provides a network connections that allows the data extraction module 80 to be coupled to the one or more computing entities 16 of the analysis system 10. The tool interface 311 allows the data extraction module 80 to interact with tools of the system 11 to obtain system information from system data sources 290.

The system 11 includes one or more tools that can be accessed by the data extraction module 80 to obtain system information from one or more data sources 290-1 through 290-n. The tools include one or more data segmentation tools 300, one or more boundary detection tools 301, one or more data protection tools 302, one or more infrastructure management tools 303, one or more encryption tools 304, one or more exploit protection tools 305, one or more malware protection tools 306, one or more identity management tools 307, one or more access management tools 308, one or more system monitoring tools, and/or one or more vulnerability management tools 310.

A system tool may also be an infrastructure management tool, a network monitoring tool, a network strategy and planning tool, a network managing tool, a Simple Network Management Protocol (SNMP) tool, a telephony monitoring tool, a firewall monitoring tool, a bandwidth monitoring tool, an IT asset inventory management tool, a network discovery tool, a network asset discovery tool, a software discovery tool, a security discovery tool, an infrastructure discovery tool, Security Information & Event Management (SIEM) tool, a data crawler tool, and/or other type of tool to assist in discovery of assets, functions, security issues, implementation of the system, and/or operation of the system.

Depending on the data gathering parameters, the tool interface 311 engages a system tool to retrieve system information. For example, the tool interface 311 engages the identity management tool to identify assets in the engineering department. The processing module 312 coordinates requests from the analysis system 10 and responses to the analysis system 10.

Figure 39:
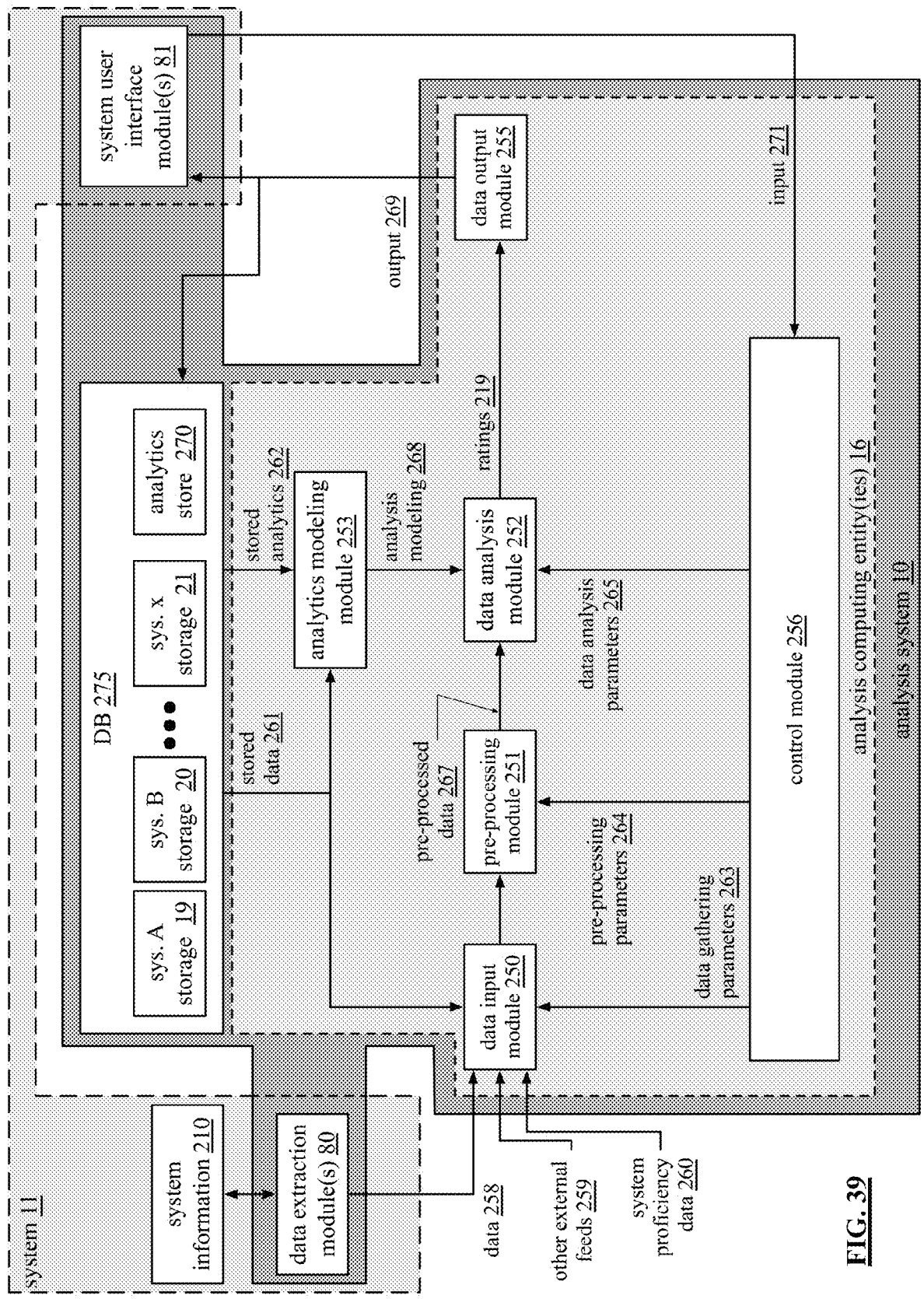
FIG. 39 is a schematic block diagram of another embodiment of an analysis system coupled to a system in accordance with the present disclosure.

FIG. 39 is a schematic block diagram of another embodiment of an analysis system 10 that includes one or more computing entities 16, one or more databases 275, one or more data extraction modules 80, and one or more system user interface modules 81. The computing entity(ies) 16 is configured to include a data input module 250, a pre-processing module 251, a data analysis module 252, an analytics modeling module 253, a data output module 255, and a control module 256. The database 275, which includes one or more databases, stores the private data for a plurality of systems (e.g., systems A-x) and stores analytical data 270 of the analysis system 10.

This embodiment operates similarly to the embodiment of FIG. 35 with the removal of the evaluation module 254, which produces deficiencies 232 and auto-corrections 235, and the removal of the remediation modules 257. As such, this analysis system 10 produces evaluation ratings 219 as the output 269.

Figure 40:
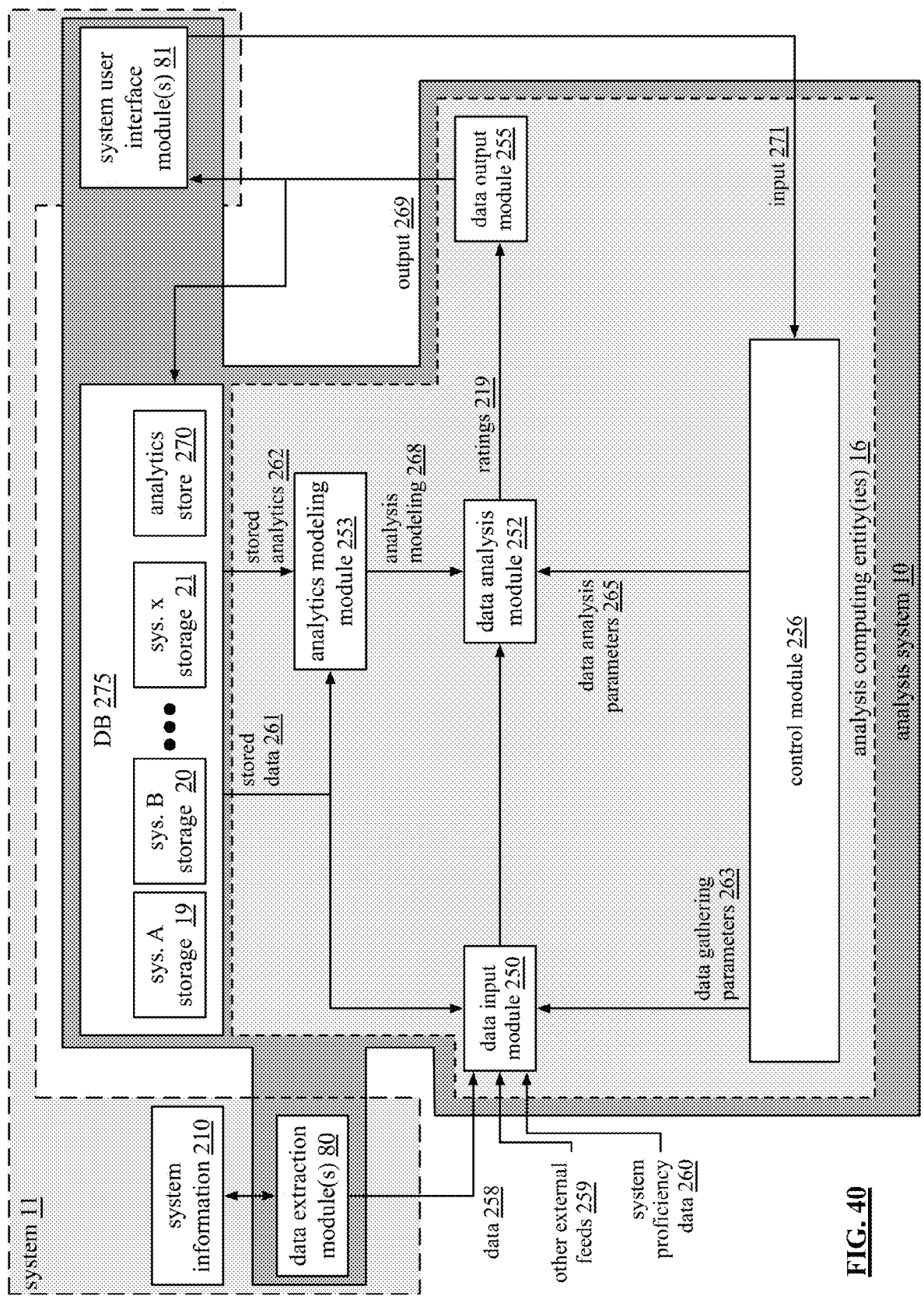
FIG. 40 is a schematic block diagram of another embodiment of an analysis system coupled to a system in accordance with the present disclosure.

FIG. 40 is a schematic block diagram of another embodiment of an analysis system 10 that is similar to the embodiment of FIG. 39. This embodiment does not include a pre-processing module 251. As such, the data collected by the data input module 250 is provided directly to the data analysis module 252.

Figure 41:
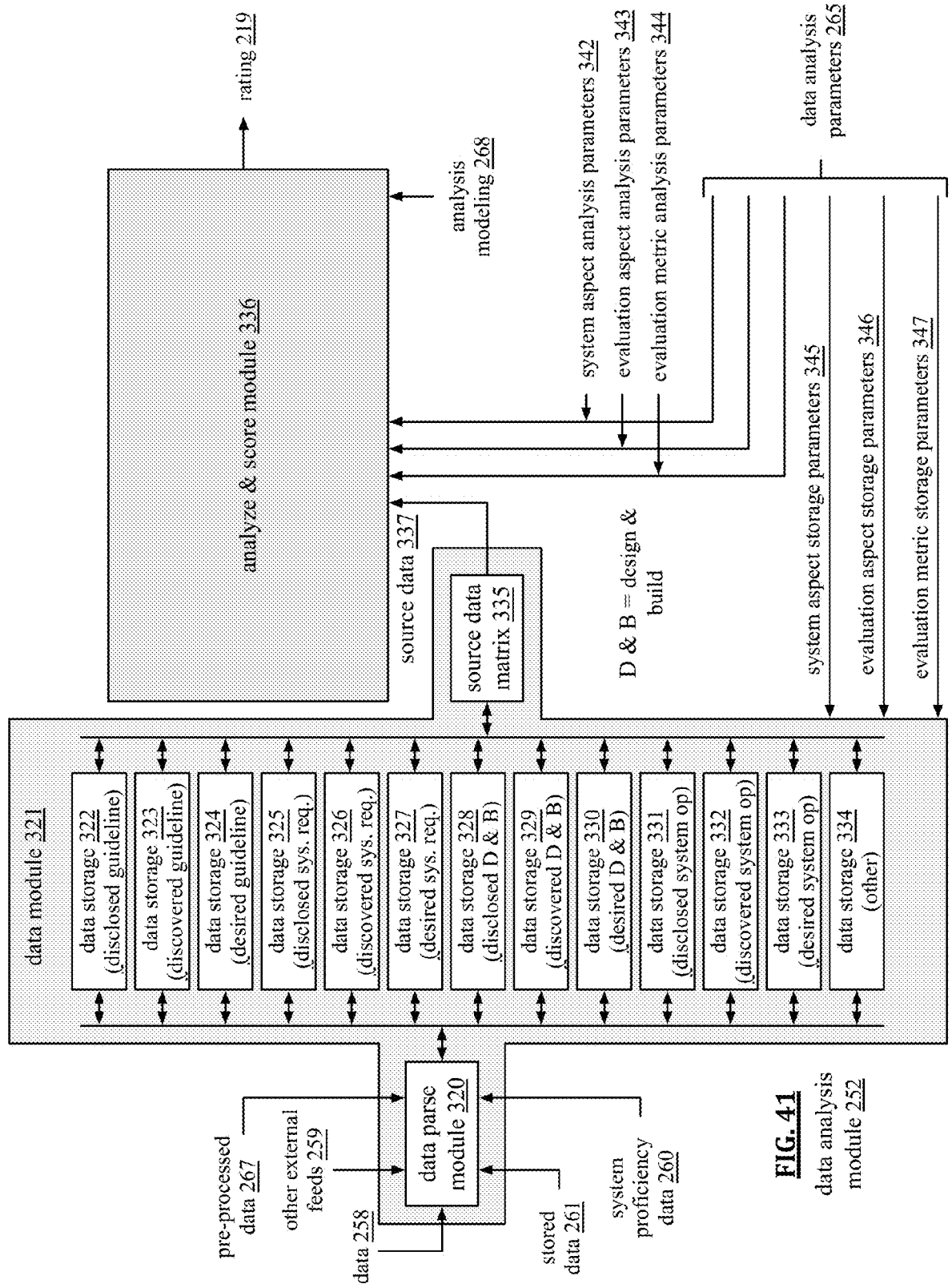
FIG. 41 is a schematic block diagram of an embodiment of a data analysis module of an analysis system in accordance with the present disclosure.

FIG. 41 is a schematic block diagram of an embodiment of a data analysis module 252 of an analysis system 10. The data analysis module 252 includes a data module 321 and an analysis & score module 336. The data module 321 includes a data parse module 320, one or more data storage modules 322-334, and a source data matrix 335. A data storage module 322-334 may be implemented in a variety of ways. For example, a data storage module is a buffer. As another example, a data storage module is a section of memory (45, 56, 57, and/or 62 of the FIG. 2 series) of a computing device (e.g., an allocated, or ad hoc, addressable section of memory). As another example, a data storage module is a storage unit (e.g., a computing device used primarily for storage). As yet another example, a data storage module is a section of a database (e.g., an allocated, or ad hoc, addressable section of a database).

The data module 321 operates to provide the analyze & score module 336 with source data 337 selected from incoming data based on one or more data analysis parameters 265. The data analysis parameter(s) 265 indicate(s) how the incoming data is to be parsed (if at all) and how it is to be stored within the data storage modules 322-334. A data analysis parameter 265 includes system aspect storage parameters 345, evaluation aspect storage parameters 346, and evaluation metric storage parameters 347. A system aspect storage parameter 345 may be null or includes information to identify one or more system aspects (e.g., system element, system criteria, and system mode), how the data relating to system aspects is to be parsed, and how the system aspect parsed data is to be stored.

An evaluation aspect storage parameter 346 may be null or includes information to identify one or more evaluation aspects (e.g., evaluation perspective, evaluation viewpoint, and evaluation category), how the data relating to evaluation aspects is to be parsed, and how the evaluation aspect parsed data is to be stored. An evaluation metric storage parameter 347 may be null or includes information to identify one or more evaluation metrics (e.g., process, policy, procedure, certification, documentation, and automation), how the data relating to evaluation metrics is to be parsed, and how the evaluation metric parsed data is to be stored. Note that the data module 321 interprets the data analysis parameters 265 collectively such that parsing, and storage are consistent with the parameters.

The data parsing module 320 parses incoming data in accordance with the system aspect storage parameters 345, evaluation aspect storage parameters 346, and evaluation metric storage parameters 347, which generally correspond to what part of the system is being evaluation, how the system is being evaluated, the manner of evaluation, and/or a desired analysis output. As such, incoming data may be parsed in a variety of ways. The data storage modules 322-334 are assigned to store parsed data in accordance with the storage parameters 345-347. For example, the incoming data, which includes pre-processed data 267, other external feed data 259, data 258 received via a data extraction module, stored data 261, and/or system proficiency data 260, is parsed based on system criteria (of the system aspect) and evaluation viewpoint (of the evaluation aspect). As a more specific example, the incoming data is parsed into, and stored, as follows:

disclosed guideline data that is stored in a disclosed guideline data storage module 322;
discovered guideline data that is stored in a discovered guideline data storage module 323;
desired guideline data that is stored in a desired guideline data storage module 324;
disclosed system requirement (sys. req.) data that is stored in a disclosed system requirement data storage module 325;
discovered system requirement (sys. req.) data that is stored in a discovered system requirement data storage module 326;
desired system requirement (sys. req.) data that is stored in a desired system requirement data storage module 327;

disclosed design and/or build data that is stored in a disclosed design and/or build data storage module 328;

discovered design and/or build data that is stored in a discovered design and/or build data storage module 329;

desired design and/or build data that is stored in a desired design and/or build data storage module 330;

disclosed system operation data that is stored in a disclosed system operation data storage module 331;

discovered system operation data that is stored in a discovered system operation data storage module 332;

desired system operation data that is stored in a desired system operation data storage module 333; and/or other data that is stored in another data storage module 334.

As another example of parsing, the incoming data is parsed based on a combination of one or more system aspects (e.g., system elements, system criteria, and system mode) or sub-system aspects thereof, one or more evaluation aspects (e.g., evaluation perspective, evaluation viewpoint, and evaluation category) or sub-evaluation aspects thereof, and/or one or more evaluation rating metrics (e.g., process, policy, procedure, certification, documentation, and automation) or sub-evaluation rating metrics thereof. As a specific example, the incoming data is parsed based on the evaluation rating metrics, creating processed parsed data, policy parsed data, procedure parsed data, certification parsed data, documentation parsed data, and automation parsed data. As another specific example, the incoming data is parsed based on the evaluation category of identify and its sub-categories of asset management, business environment, governance, risk assessment, risk management, access control, awareness &, training, and/or data security.

As another example of parsing, the incoming data is not parsed, or is minimally parsed. As a specific example, the data is parsed based on timestamps: data from one time period (e.g., a day) is parsed from data of another time period (e.g., a different day).

The source data matrix 335, which may be a configured processing module, retrieves source data 337 from the data storage modules 322-334. The selection corresponds to the analysis being performed by the analyze & score module 336. For example, if the analyze & score module 336 is evaluating the understanding of the policies, processes, documentation, and automation regarding the assets built for the engineering department, then the source data 337 would be data specific to policies, processes, documentation, and automation regarding the assets built for the engineering department.

The analyze & score module 336 generates one or more ratings 219 for the source data 337 in accordance with the data analysis parameters 265 and analysis modeling 268. The data analysis parameters 265 includes system aspect analysis parameters 342, evaluation aspect analysis parameters 343, and evaluation metric analysis parameters 344. The analyze & score module 336 is discussed in greater detail with reference to FIG. 42.

Figure 42:
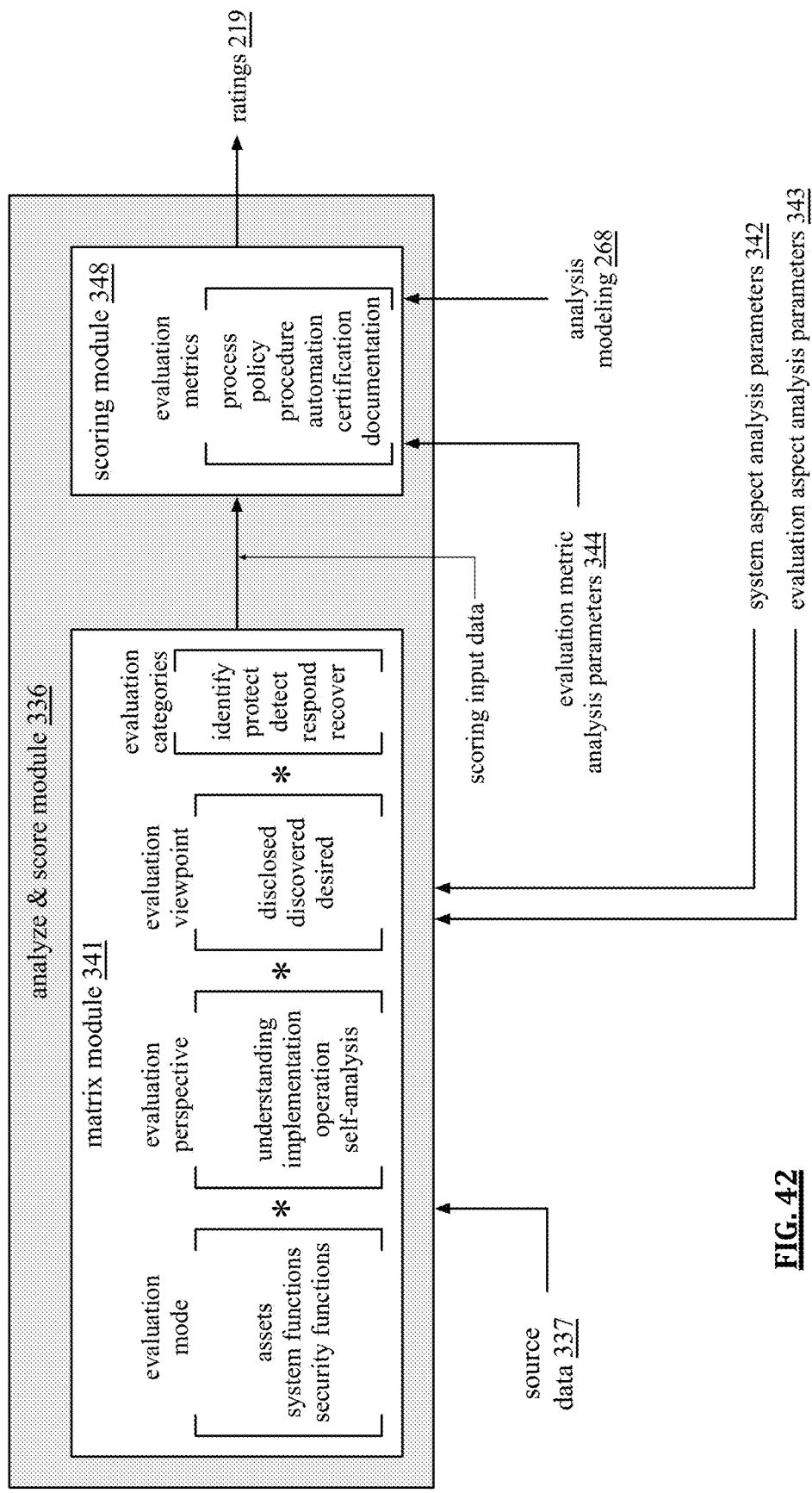
FIG. 42 is a schematic block diagram of an embodiment of an analyze and score module of an analysis system in accordance with the present disclosure.

FIG. 42 is a schematic block diagram of an embodiment of an analyze and score module 336 includes a matrix module 341 and a scoring module 348. The matrix module 341 processes an evaluation mode matrix, an evaluation perspective matrix, an evaluation viewpoint matrix, and an evaluation categories matrix to produce a scoring input. The scoring module 348 includes an evaluation metric matrix to process the scoring input data in accordance with the analysis modeling 268 to produce the rating(s) 219.

For example, the matrix module 341 configures the matrixes based on the system aspect analysis parameters 342 and the evaluation aspect analysis parameters 343 to process the source data 337 to produce the scoring input data. As a specific example, the system aspect analysis parameters 342 and the evaluation aspect analysis parameters 343 indicate assets as the evaluation mode, understanding as the evaluation perspective, discovered as the evaluation viewpoint, and the identify as the evaluation category.

Accordingly, the matrix module 341 communicates with the source data matrix module 335 of the data module 321 to obtain source data 337 relevant to assets, understanding, discovered, and identify. The matrix module 341 may organize the source data 337 using an organization scheme (e.g., by asset type, by evaluation metric type, by evaluation sub-categories, etc.) or keep the source data 337 as a collection of data. The matrix module 341 provides the scoring input data 344 as a collection of data or as organized data to the scoring module 348.

Continuing with the example, the scoring module 248 receives the scoring input data 348 and evaluates in accordance with the evaluation metric analysis parameters 344 and the analysis modeling 268 to produce the rating(s) 219. As a specific example, the evaluation metric analysis parameters 344 indicate analyzing the scoring input data with respect to processes. In this instance, the analysis modeling 268 provides a scoring mechanism for evaluating the scoring input data with respect to processes to the scoring module 248. For instance, the analysis modeling 268 includes six levels regarding processes and a corresponding numerical rating: none (e.g., 0), inconsistent (e.g., 10), repeatable (e.g., 20), standardized (e.g., 30), measured (e.g., 40), and optimized (e.g., 50).

In addition, the analysis modeling 268 includes analysis protocols for interpreting the scoring input data to determine its level and corresponding rating. For example, if there are no processes regarding identifying assess of the discovered data, then an understanding level of processes would be none (e.g., 0), since there are no processes. As another example, if there are some processes regarding identifying assess of the discovered data, but there are gaps in the processes (e.g., identifies some assets, but not all, do not produce consistent results), then an understanding level of processes would be inconsistent (e.g., 10). To determine if there are gaps in the processes, the score module 248 executes the processes of the discovered data to identify assets. The scoring module 248 also executes one or more asset discovery tools to identify assets and then compares the two results. If there are inconsistencies in the identified assets, then there are gaps in the processes.

As a further example, the processes regarding identifying assess of the discovered data are repeatable (e.g., produces consistent results, but there are variations in the processes from process to process, and/or the processes are not all regulated) but not standardized (e.g., produces consistent results, but there are no appreciable variations in the processes from process to process, and/or the processes are regulated). If the processes are repeatable but not standardized, the scoring module establishes an understanding level of the processes as repeatable (e.g., 20).

If the processes are standardized, the scoring module then determines whether the processes are measured (e.g., precise, exact, and/or calculated to the task of identifying assets). If not, the scoring module establishes an understanding level of the processes as standardized (e.g., 30).

If the processes are measured, the scoring module then determines whether the processes are optimized (e.g., up-todate and improvement assessed on a regular basis as part of system protocols). If not, the scoring module establishes an understanding level of the processes as measured (e.g., 40). If so, the scoring module establishes an understanding level of the processes as optimized (e.g., 50).

Figure 43:
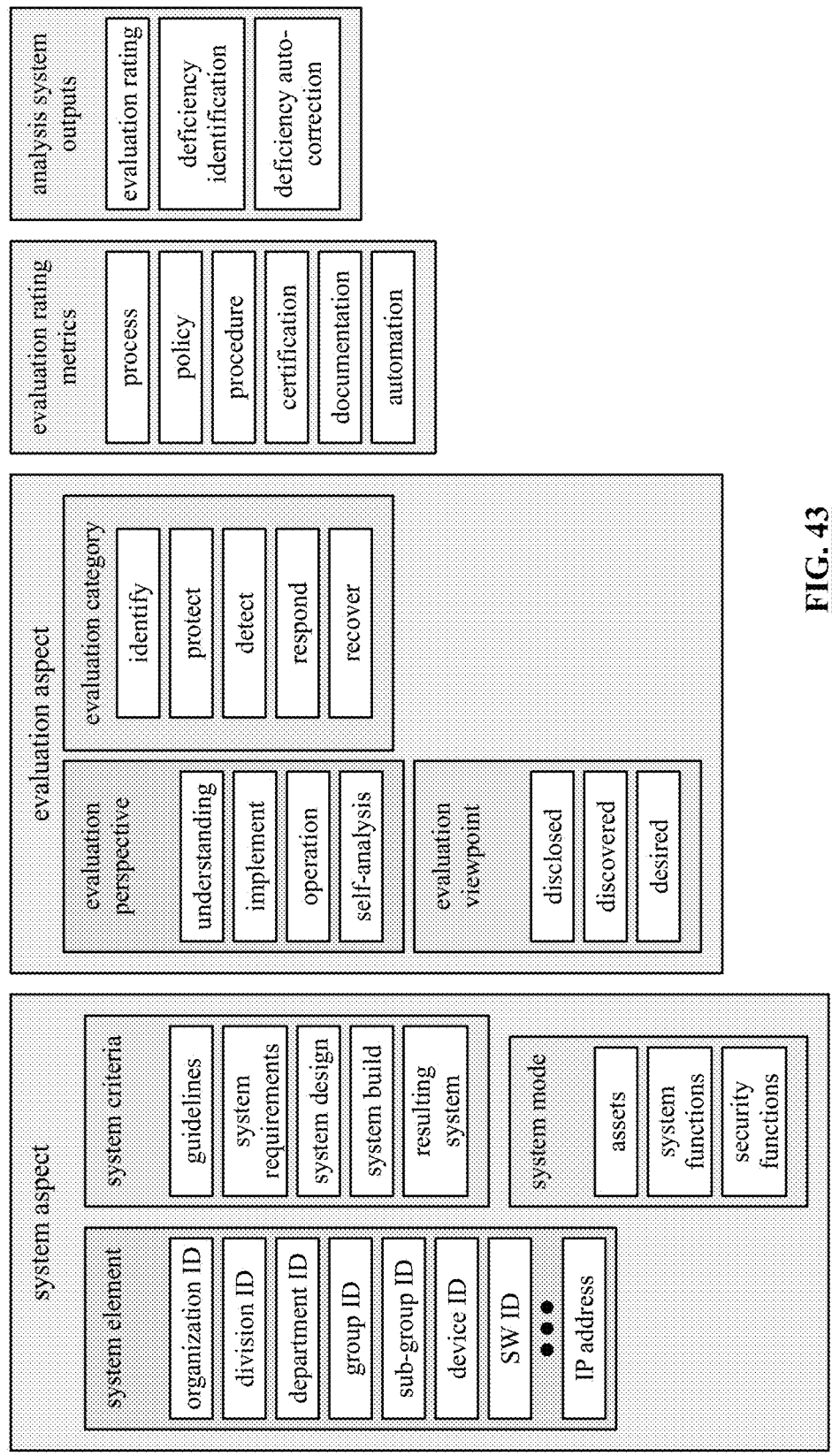
FIG. 43 is a diagram of an example of system aspects, evaluation aspects, evaluation rating metrics, and analysis system output options of an analysis system for analyzing a section of a system in accordance with the present disclosure.

FIG. 43 is a diagram of an example of system aspect, evaluation aspect, evaluation rating metric, and analysis system output options of an analysis system 10 for analyzing a system 11, or portion thereof. The system aspect corresponds to what part of the system is to be evaluated by the analysis system. The evaluation aspect indicates how the system aspect is to be evaluation. The evaluation rating metric indicates the manner of evaluation of the system aspect in accordance with the evaluation aspect. The analysis system output indicates the type of output to be produced by the analysis system based on the evaluation of the system aspect in accordance with the evaluation aspect as per the evaluation rating metric.

The system aspect includes system elements, system criteria, and system modes. A system element includes one or more system assets which is a physical asset and/or a conceptual asset. For example, a physical asset is a computing entity, a computing device, a user software application, a system software application (e.g., operating system, etc.), a software tool, a network software application, a security software application, a system monitoring software application, and the like. As another example, a conception asset is a hardware architecture (e.g., identification of a system's physical components, their capabilities, and their relationship to each other) and/or sub-architectures thereof and a software architecture (e.g., fundamental structures for the system's software, their requirements, and inter-relational operations) and sub-architectures thereof.

A system element and/or system asset is identifiable in a variety of ways. For example, it can be identified by an organization identifier (ID), which would be associated with most, if not all, system elements of a system. As another example, a system element and/or system asset can be identified by a division ID, where the division is one of a plurality of divisions in the organization. As another example, a system element and/or system asset can be identified by a department ID, where the department is one of a plurality of departments in a division. As yet another example, a system element and/or system asset can be identified by a department ID, where the department is one of a plurality of departments in a division. As a further example, a system element and/or system asset can be identified by a group ID, where the department is one of a plurality of groups in a department. As a still further example, a system element and/or system asset can be identified by a sub-group ID, where the department is one of a plurality of sub-groups in a group. With this type of identifier, a collection of system elements and/or system assets can be selected for evaluation by using an organization ID, a division ID, a department ID, a group ID, or a sub-group ID.

A system element and/or system asset may also be identified based on a user ID, a serial number, vendor data, an IP address, etc. For example, a computing device has a serial number and vendor data. As such, the computing device can be identified for evaluation by its serial number and/or the vendor data. As another example, a software application has a serial number and vendor data. As such, the software application can be identified for evaluation by its serial number and/or the vendor data.

In addition, an identifier of one system element and/or system asset may link to one or more other system elements and/or system assets. For example, computing device has a device ID, a user ID, and/or a serial number to identify it. The computing device also includes a plurality of software applications, each with its own serial number. In this example, the software identifiers are linked to the computing device identifier since the software is loaded on the computing device. This type of an identifier allows a single system asset to be identified for evaluation.

The system criteria includes information regarding the development, operation, and/or maintenance of the system 11. For example, a system criteria is a guideline, a system requirement, a system design component, a system build component, the system, and system operation. Guidelines, system requirements, system design, system build, and system operation were discussed with reference to FIG. 25.

The system mode indicates the assets of the system, the system functions of the system, and/or the security functions of the system are to be evaluated. Assets, system functions, and security functions have been previously discussed with reference to one or more of FIGS. 7-24 and 32-34.

The evaluation aspect, which indicates how the system aspect is to be evaluated, includes evaluation perspective, evaluation viewpoint, and evaluation category. The evaluation perspective includes understanding (e.g., how well the system is known, should be known, etc.); implementation, which includes design and/or build, (e.g., how well is the system designed, how well should it be designed); system performance, and/or system operation (e.g., how well does the system perform and/or operate, how well should it perform and/or operate); and self-analysis (e.g., how self-aware is the system, how self-healing is the system, how self-updating is the system).

The evaluation viewpoint includes disclosed data, discovered data, and desired data. Disclosed data is the known data of the system at the outset of an analysis, which is typically supplied by a system administrator and/or is obtained from data files of the system. Discovered data is the data discovered about the system by the analysis system during the analysis. Desired data is the data obtained by the analysis system from system proficiency resources regarding desired guidelines, system requirements, system design, system build, and/or system operation. Differences in disclosed, discovered, and desired data are evaluated to support generating an evaluation rating, to identify deficiencies, and/or to determine and provide auto-corrections.

The evaluation category includes an identify category, a protect category, a detect category, a respond category, and a recover category. In general, the identify category is regarding identifying assets, system functions, and/or security functions of the system; the protect category is regarding protecting assets, system functions, and/or security functions of the system from issues that may adversely affect; the detect category is regarding detecting issues that may, or have, adversely affect assets, system functions, and/or security functions of the system; the respond category is regarding responding to issues that may, or have, adversely affect assets, system functions, and/or security functions of the system; and the recover category is regarding recovering from issues that have adversely affect assets, system functions, and/or security functions of the system. Each category includes one or more sub-categories and each sub-category may include one or more sub-sub categories as discussed with reference to FIGS. 44-49.

The evaluation rating metric includes process, policy, procedure, certification, documentation, and automation. The evaluation rating metric may include more or less topics. The analysis system output options include evaluation rating, deficiency identification, and deficiency auto-correction.

With such a significant number of options with the system aspect, the evaluation aspect, the evaluation rating metrics, and analysis system output options, the analysis system can analyze a system in thousands, or more, combinations. For example, the analysis system 10 could provide an evaluation rating for the entire system with respect to its vulnerability to cyber-attacks. The analysis system 10 could also identify deficiencies in the system's cybersecurity processes, policies, documentation, implementation, operation, assets, and/or security functions based on the evaluation rating. The analysis system 10 could further auto-correct at least some of the deficiencies in the system's cybersecurity processes, policies, documentation, implementation, operation, assets, and/or security functions.

As another example, the analysis system 10 could evaluates the system's requirements for proper use of software (e.g., authorized to use, valid copy, current version) by analyzing every computing device in the system as to the system's software use requirements. From this analysis, the analysis system generates an evaluation rating. The analysis system 10 could also identify deficiencies in the compliance with the system's software use requirements (e.g., unauthorized use, invalid copy, outdated copy). The analysis system 10 could further auto-correct at least some of the deficiencies in compliance with the system's software use requirements (e.g., remove invalid copies, update outdated copies).

Figure 44:
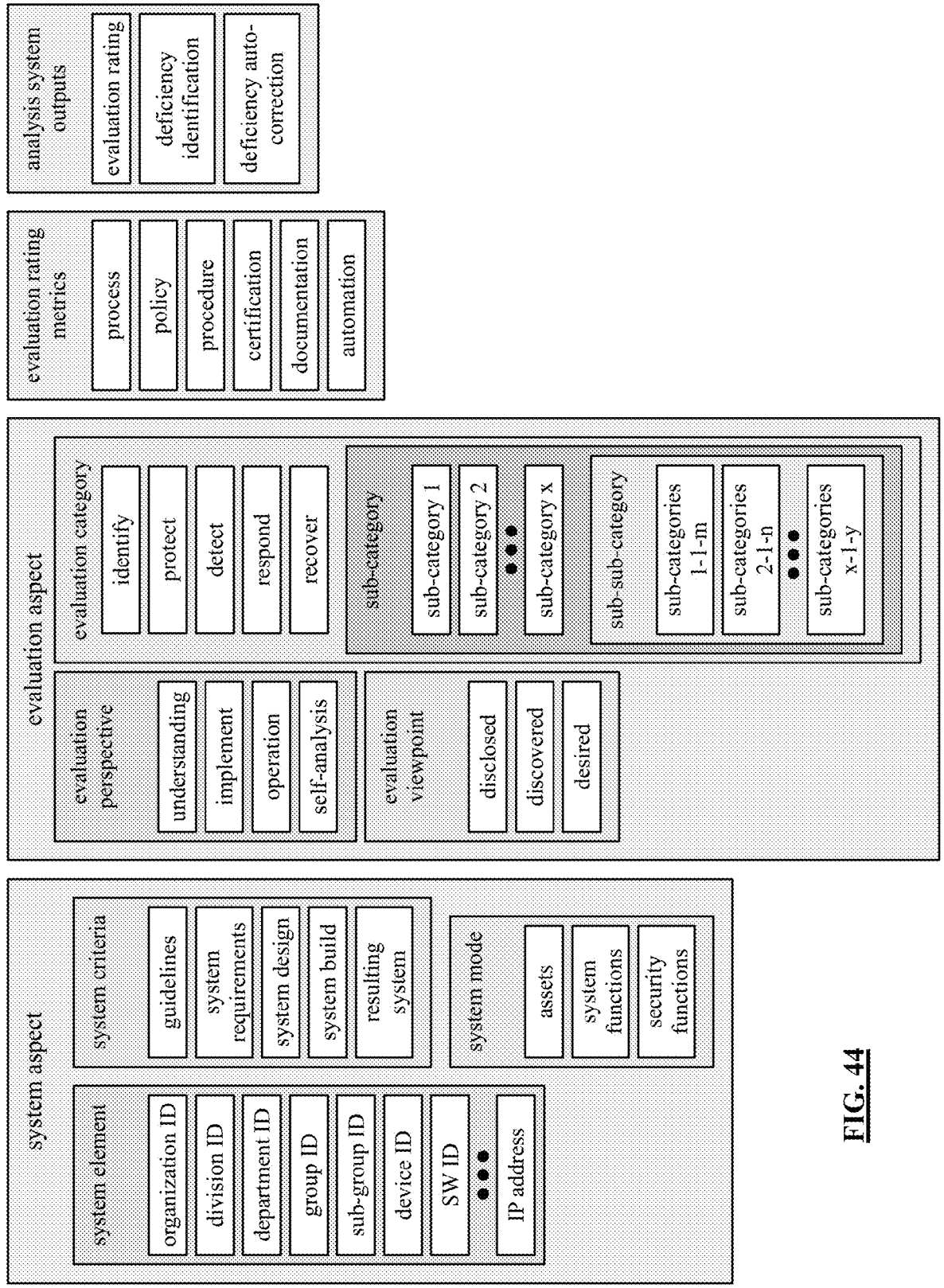
FIG. 44 is a diagram of another example of system aspects, evaluation aspects, evaluation rating metrics, and analysis system output options of an analysis system for analyzing a section of a system in accordance with the present disclosure.

FIG. 44 is a diagram of another example of system aspects, evaluation aspects, evaluation rating metrics, and analysis system output options of an analysis system 11. This diagram is similar to FIG. 43 with the exception that this figure illustrates sub-categories and sub-sub categories. Each evaluation category includes sub-categories, which, in turn, include their own sub-sub categories. The various categories, sub-categories, and sub-sub categories corresponds to the categories, sub-categories, and sub-sub categories identified in the "Framework for Improving Critical Instructure Cybersecurity", Version 1.1, Apr. 16, 2018 by the National Institute of Standards and Technology (NIST).

Figure 45:
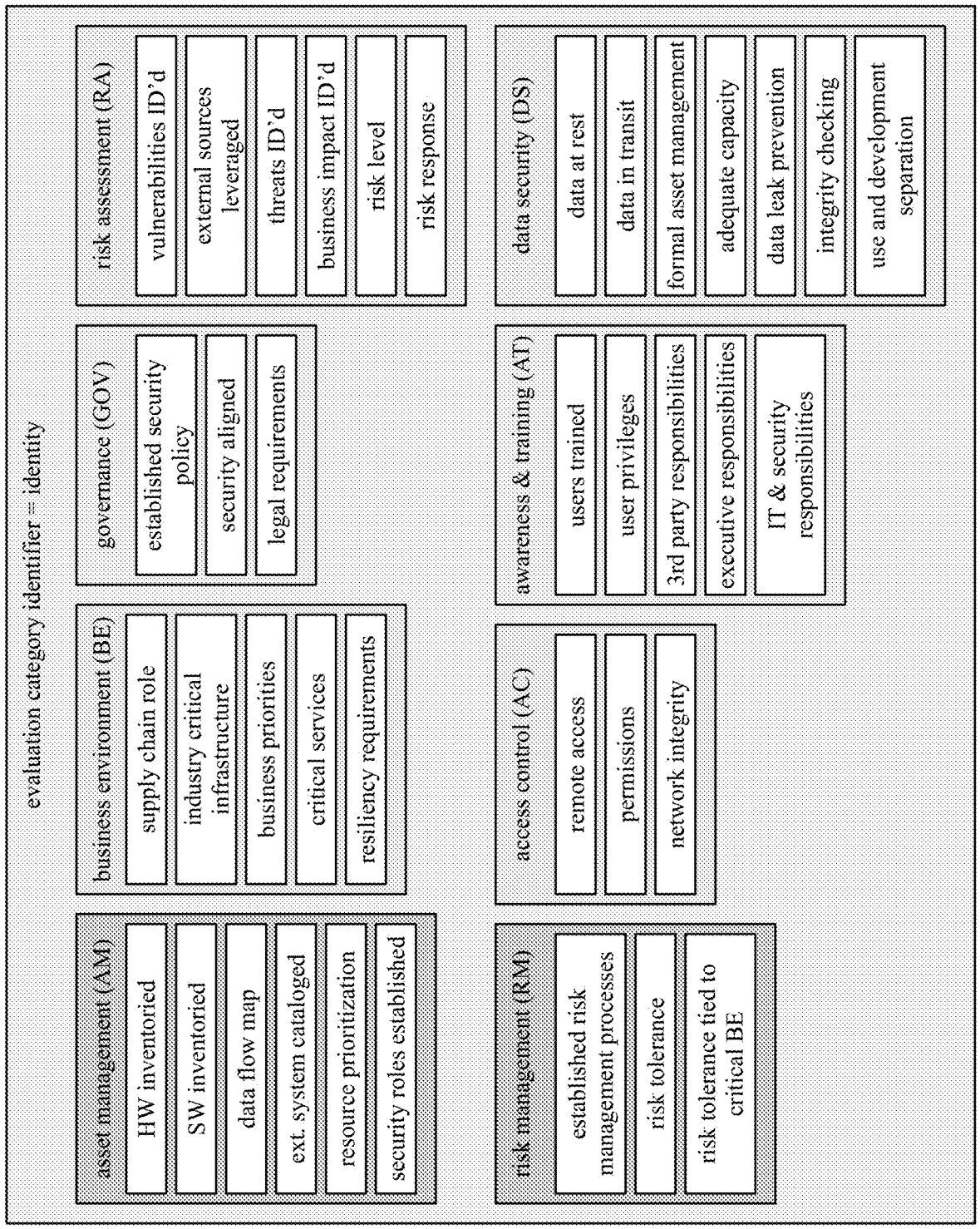
FIG. 45 is a diagram of an example of an identification evaluation category, sub-categories, and sub-sub-categories of the evaluation aspects and in accordance with the present disclosure.

FIG. 45 is a diagram of an example of an identification evaluation category that includes a plurality of sub-categories and each sub-category includes its own plurality of sub-sub-categories. The identify category includes the sub-categories of asset management, business environment, governance, risk management, access control, awareness & training, and data security.

The asset management sub-category includes the sub-sub categories of HW inventoried, SW inventoried, data flow mapped out, external systems cataloged, resources have been prioritized, and security roles have been established. The business environment sub-category includes the sub-sub categories of supply chain roles defined, industry critical infrastructure identified, business priorities established, critical services identified, and resiliency requirements identified.

The governance sub-category includes the sub-sub categories of security policies are established, security factors aligned, and legal requirements are identified. The risk assessment sub-category includes the sub-sub categories of vulnerabilities identified, external sources are leveraged, threats are identified, business impacts are identified, risk levels are identified, and risk responses are identified. The risk management sub-category includes the sub-sub categories of risk management processes are established, risk tolerances are established, and risk tolerances are tied to business environment.

The access control sub-category includes the sub-sub categories of remote access control is defined, permissions are defined, and network integrity is defined. The awareness & training sub-category includes the sub-sub categories of users are trained, user privileges are known, third party responsibilities are known, executive responsibilities are known, and IT and security responsibilities are known. The data security sub-category includes the sub-sub categories of data at rest protocols are established, data in transit protocols are established, formal asset management protocols are established, adequate capacity of the system is established, data leak prevention protocols are established, integrity checking protocols are established, and use and development separation protocols are established.

Figure 46:
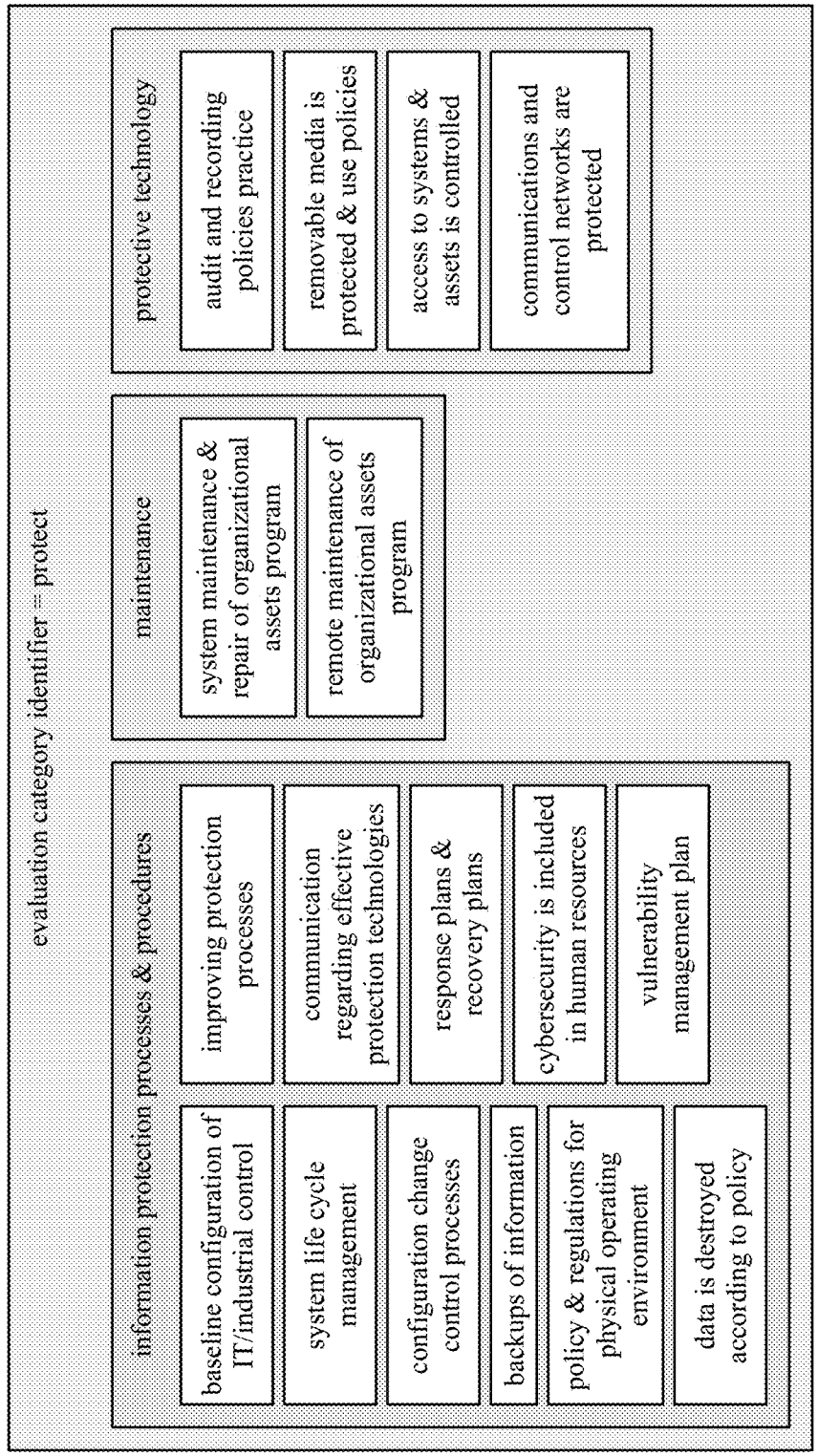
FIG. 46 is a diagram of an example of a protect evaluation category, sub-categories, and sub-sub-categories of the evaluation aspects and in accordance with the present disclosure.

FIG. 46 is a diagram of an example of a protect evaluation category that includes a plurality of sub-categories and each sub-category includes its own plurality of sub-sub-categories. The protect category includes the sub-categories of information protection processes and procedures, maintenance, and protective technology.

The information protection processes and procedures sub-category includes the sub-sub categories of baseline configuration of IT/industrial controls are established, system life cycle management is established, configuration control processes are established, backups of information are implemented, policy & regulations for physical operation environment are established, improving protection processes are established, communication regarding effective protection technologies is embraced, response and recovery plans are established, cybersecurity in is including in human resources, and vulnerability management plans are established.

The maintenance sub-category includes the sub-sub categories of system maintenance & repair of organizational assets programs are established and remote maintenance of organizational assets is established. The protective technology sub-category includes the sub-sub-categories of audit and recording policies are practiced, removable media is protected & use policies are established, access to systems and assets is controlled, and communications and control networks are protected.

Figure 47:
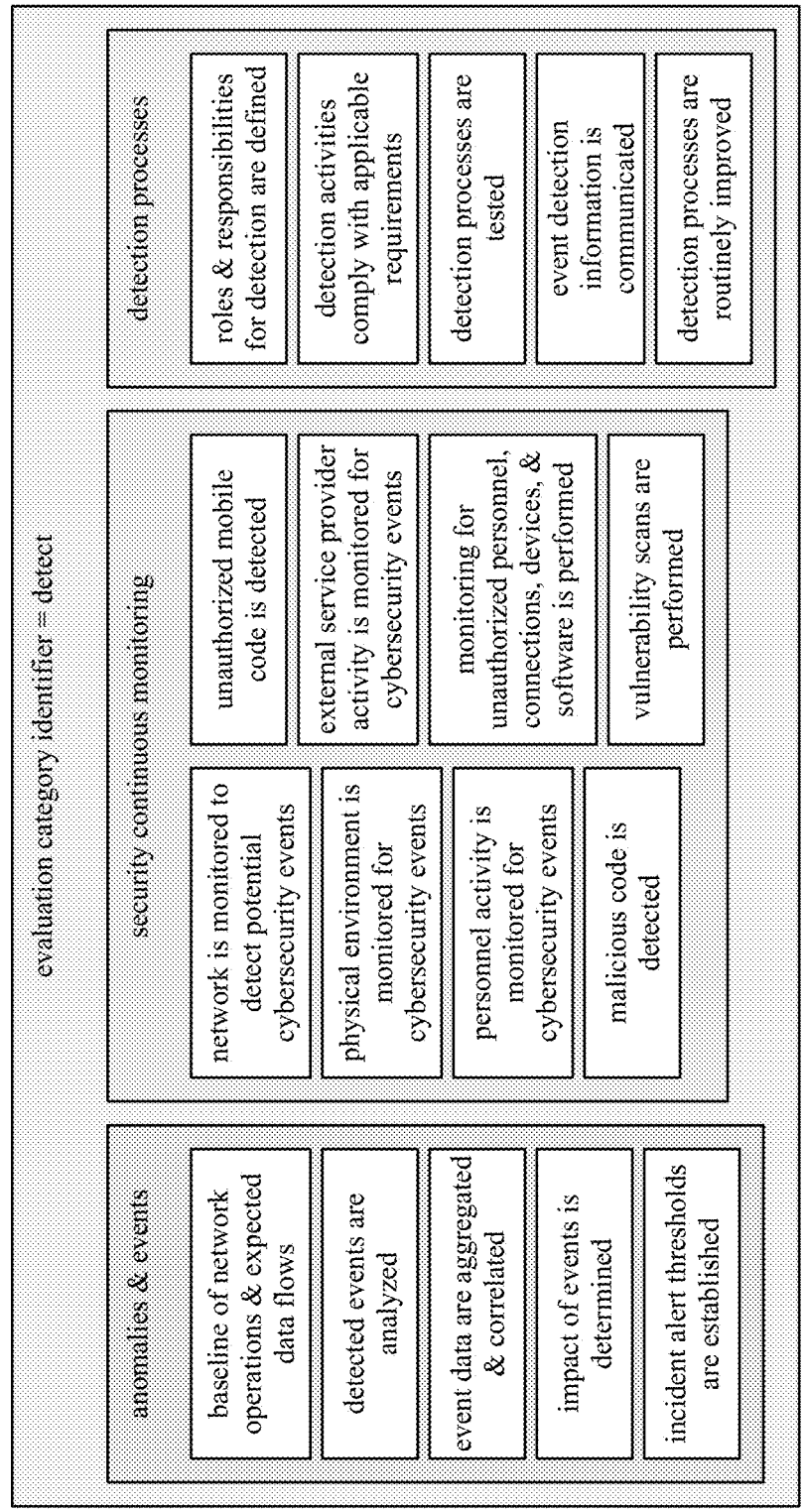
FIG. 47 is a diagram of an example of a detect evaluation category, sub-categories, and sub-sub-categories of the evaluation aspects and in accordance with the present disclosure.

FIG. 47 is a diagram of an example of a detect evaluation category that includes a plurality of sub-categories and each sub-category includes its own plurality of sub-sub-categories. The detect category includes the sub-categories of anomalies and events, security continuous monitoring, and detection processes.

The anomalies and events sub-category includes the sub-sub categories of baseline of network operations and expected data flows are monitored, detected events are analyzed, event data are aggregated and correlated, impact of events is determined, and incident alert thresholds are established. The security continuous monitoring sub-category includes the sub-sub categories of network is monitored to detect potential cybersecurity attacks, physical environment is monitored for cybersecurity events, personnel activity is monitored for cybersecurity events, malicious code is detected, unauthorized mobile codes is detected, external service provider activity is monitored for cybersecurity events, monitoring for unauthorized personnel, connections, devices, and software is performed, and vulnerability scans are performed. The detection processes sub-category includes the sub-sub categories of roles and responsibilities for detection are defined, detection activities comply with applicable requirements, detection processes are tested, event detection information is communicated, and detection processes are routinely improved.

Figure 48:
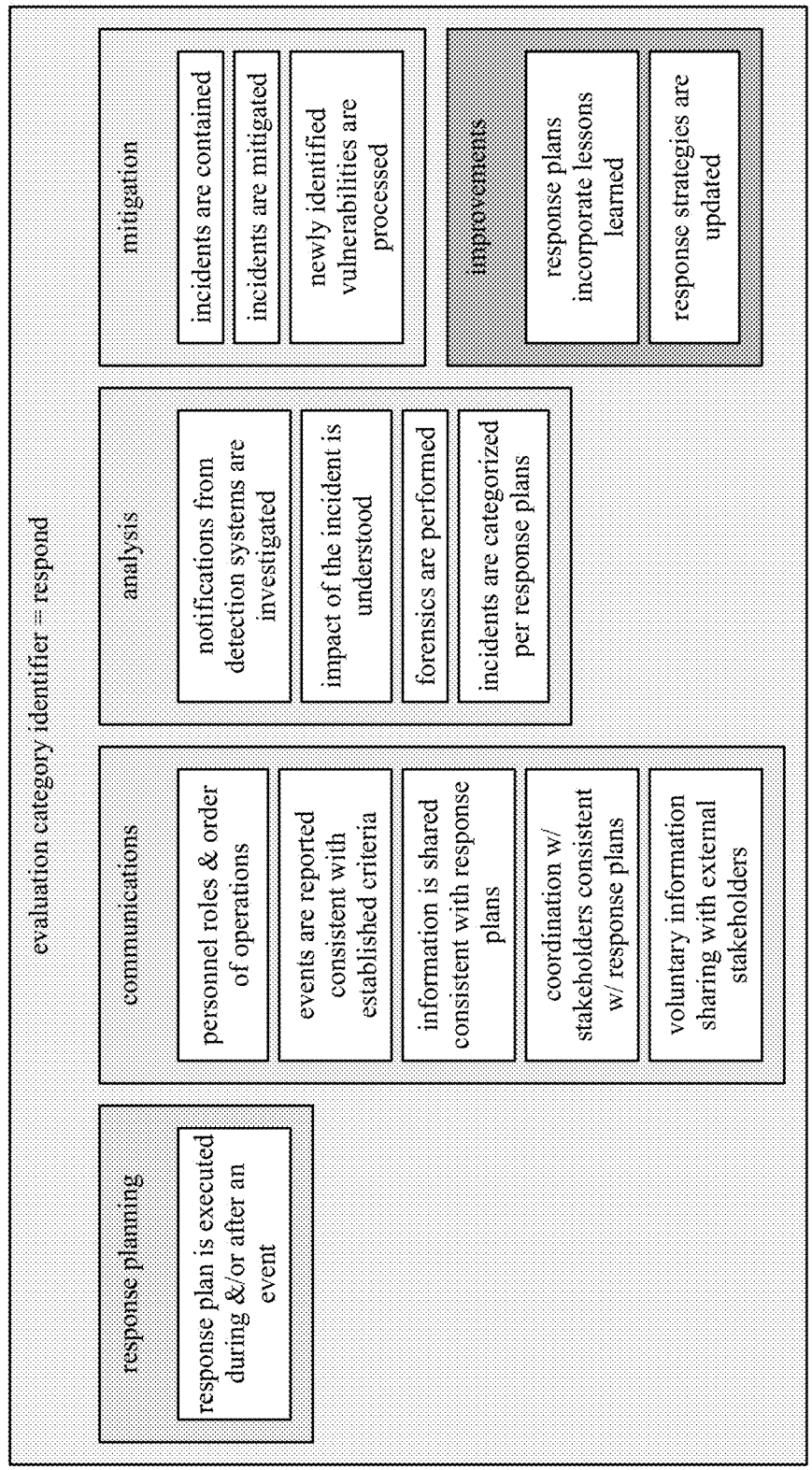
FIG. 48 is a diagram of an example of a respond evaluation category, sub-categories, and sub-sub-categories of the evaluation aspects and in accordance with the present disclosure.

FIG. 48 is a diagram of an example of a respond evaluation category that includes a plurality of sub-categories and each sub-category includes its own plurality of sub-sub-categories. The respond category includes the sub-categories of response planning, communications, analysis, mitigation, and improvements.

The response planning sub-category includes the sub-sub category of response plan is executed during and/or after an event. The communications sub-category includes the sub-sub category of personnel roles and order of operation are established, events are reported consistent with established criteria, information is shared consistently per the response plan, coordination with stakeholders is consistent with the response plan, and voluntary information is shared with external stakeholders.

The analysis sub-category includes the sub-sub categories of notifications form detection systems are investigated, impact of the incident is understood, forensics are performed, and incidents are categorized per response plan. The mitigation sub-category includes the sub-sub categories of incidents are contained, incidents are mitigated, and newly identified vulnerabilities are processed. The improvements sub-categories includes the sub-sub categories of response plans incorporate lessons learned, and response strategies are updated.

Figure 49:
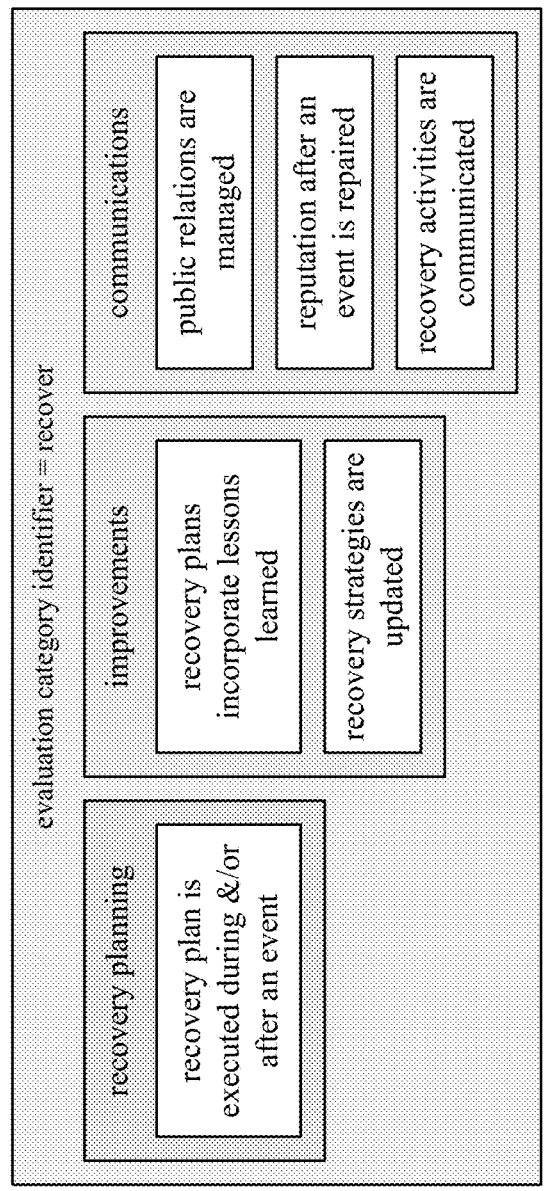
FIG. 49 is a diagram of an example of a recover evaluation category, sub-categories, and sub-sub-categories of the evaluation aspects and in accordance with the present disclosure.

FIG. 49 is a diagram of an example of a recover evaluation category that includes a plurality of sub-categories and each sub-category includes its own plurality of sub-sub-categories. The recover category includes the sub-categories of recovery plan, improvements, and communication. The recovery plan sub-category includes the sub-sub category of recovery plan is executed during and/or after an event.

The improvement sub-category includes the sub-sub categories of recovery plans incorporate lessons learned and recovery strategies are updated. The communications sub-category includes the sub-sub categories of public relations are managed, reputations after an event is repaired, and recovery activities are communicated.

Figure 50:
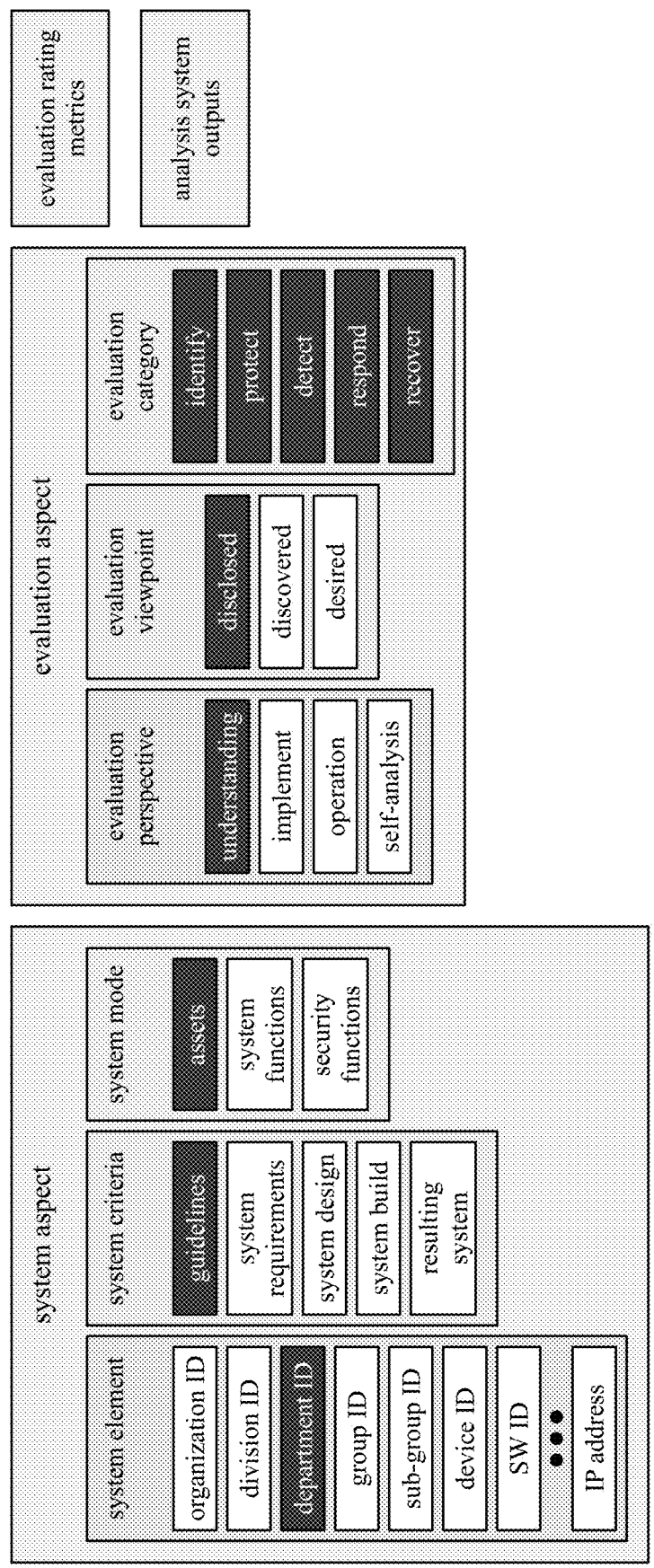
FIG. 50 is a diagram of a specific example of system aspects, evaluation aspects, evaluation rating metrics, and analysis system output options of an analysis system for analyzing a section of a system in accordance with the present disclosure.

FIG. 50 is a diagram of an example of system aspects, evaluation aspects, evaluation rating metrics, and analysis system output options of an analysis system 11 for analyzing a system 11, or portion thereof. For instance, analysis system 11 is evaluating the understanding of the guidelines for identifying assets, protecting the assets from issues, detecting issues that may affect or are affecting the assets, responding to issues that may affect or are affecting the assets, and recovering from issues that affected the assets of a department based on disclosed data.

For this specific example, the analysis system 10 obtains disclosed data from the system regarding the guidelines associated with the assets of the department. From the disclosed data, the analysis system renders an evaluation rating for the understanding of the guidelines for identifying assets. The analysis system renders a second evaluation rating for the understanding of the guidelines regarding protection of the assets from issues. The analysis system renders a third evaluation rating for the understanding of the guidelines regarding detection of issues that may affect or are affecting the assets.

The analysis system renders a fourth evaluation rating for the understanding of the guidelines regarding responds to issues that may affect or are affecting the assets. The analysis system renders a fifth evaluation rating for the understanding of the guidelines regarding recovery from issues that affected the assets of a department based on disclosed data. The analysis system may render an overall evaluation rating for the understanding of the guidelines based on the first through fifth evaluation ratings.

As another example, the analysis system 11 evaluates the understanding of guidelines used to determine what assets should be included in the department, how the assets should be protected from issues, how issues that may affect or are affecting the assets are detect, how to respond to issues that may affect or are affecting the assets, and how the assets will recover from issues that may affect or are affecting them based on disclosed data. In this example, the analysis system renders an evaluation rating for the understanding of the guidelines regarding what assets should be in the department. The analysis system renders a second evaluation rating for the understanding of the guidelines regarding how the assets should be protected from issues. The analysis system renders a third evaluation rating for the understanding of the guidelines regarding how to detect issues that may affect or are affecting the assets.

The analysis system renders a fourth evaluation rating for the understanding of the guidelines regarding how to respond to issues that may affect or are affecting the assets. The analysis system renders a fifth evaluation rating for the understanding of the guidelines regarding how to recover from issues that affected the assets of a department based on disclosed data. The analysis system may render an overall evaluation rating for the understanding based on the first through fifth evaluation ratings.

Figure 51:
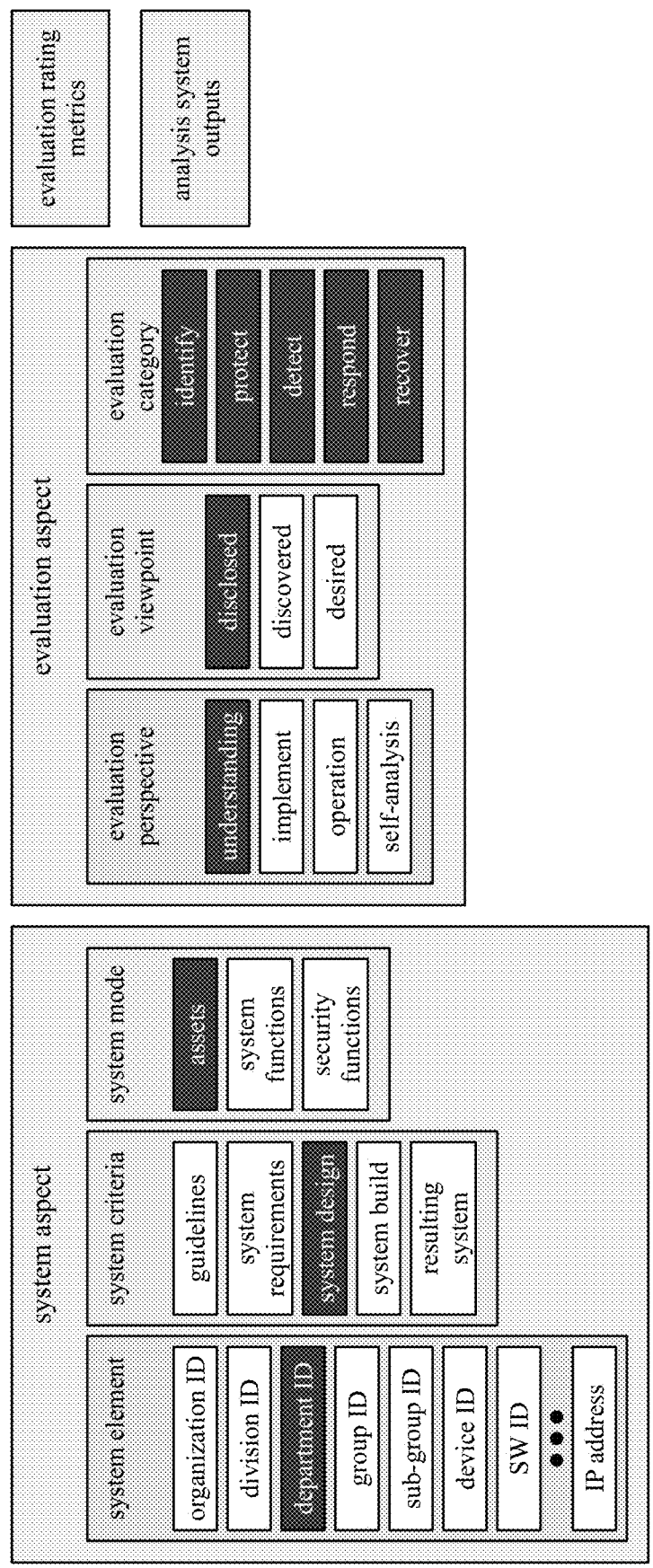
FIG. 51 is a diagram of another specific example of system aspects, evaluation aspects, evaluation rating metrics, and analysis system output options of an analysis system for analyzing a section of a system in accordance with the present disclosure.

FIG. 51 is a diagram of an example of system aspects, evaluation aspects, evaluation rating metrics, and analysis system output options of an analysis system 11 for analyzing a system 11, or portion thereof. For instance, analysis system 11 is evaluating the understanding of the system design for identifying assets, protecting the assets from issues, detecting issues that may affect or are affecting the assets, responding to issues that may affect or are affecting the assets, and recovering from issues that affected the assets of a department based on disclosed data.

For this specific example, the analysis system 10 obtains disclosed data from the system regarding the system design associated with the assets of the department. From the disclosed data, the analysis system renders an evaluation rating for the understanding of the system design for identifying assets. The analysis system renders a second evaluation rating for the understanding of the system design regarding protection of the assets from issues. The analysis system renders a third evaluation rating for the understanding of the system design regarding detection of issues that may affect or are affecting the assets.

The analysis system renders a fourth evaluation rating for the understanding of the system design regarding responds to issues that may affect or are affecting the assets. The analysis system renders a fifth evaluation rating for the understanding of the system design regarding recovery from issues that affected the assets of a department based on disclosed data. The analysis system may render an overall evaluation rating for the understanding based on the first through fifth evaluation ratings.

As another example, the analysis system 11 evaluates the understanding of system design used to determine what assets should be included in the department, how the assets should be protected from issues, how issues that may affect or are affecting the assets are detect, how to respond to issues that may affect or are affecting the assets, and how the assets will recover from issues that may affect or are affecting them based on disclosed data. In this example, the analysis system renders an evaluation rating for the understanding of the system design regarding what assets should be in the department. The analysis system renders a second evaluation rating for the understanding of the system design regarding how the assets should be protected from issues. The analysis system renders a third evaluation rating for the understanding of the system design regarding how to detect issues that may affect or are affecting the assets.

The analysis system renders a fourth evaluation rating for the understanding of the system design regarding how to respond to issues that may affect or are affecting the assets. The analysis system renders a fifth evaluation rating for the understanding of the system design regarding how to recover from issues that affected the assets of a department based on disclosed data. The analysis system may render an overall evaluation rating for the understanding based on the first through fifth evaluation ratings.

Figure 52:
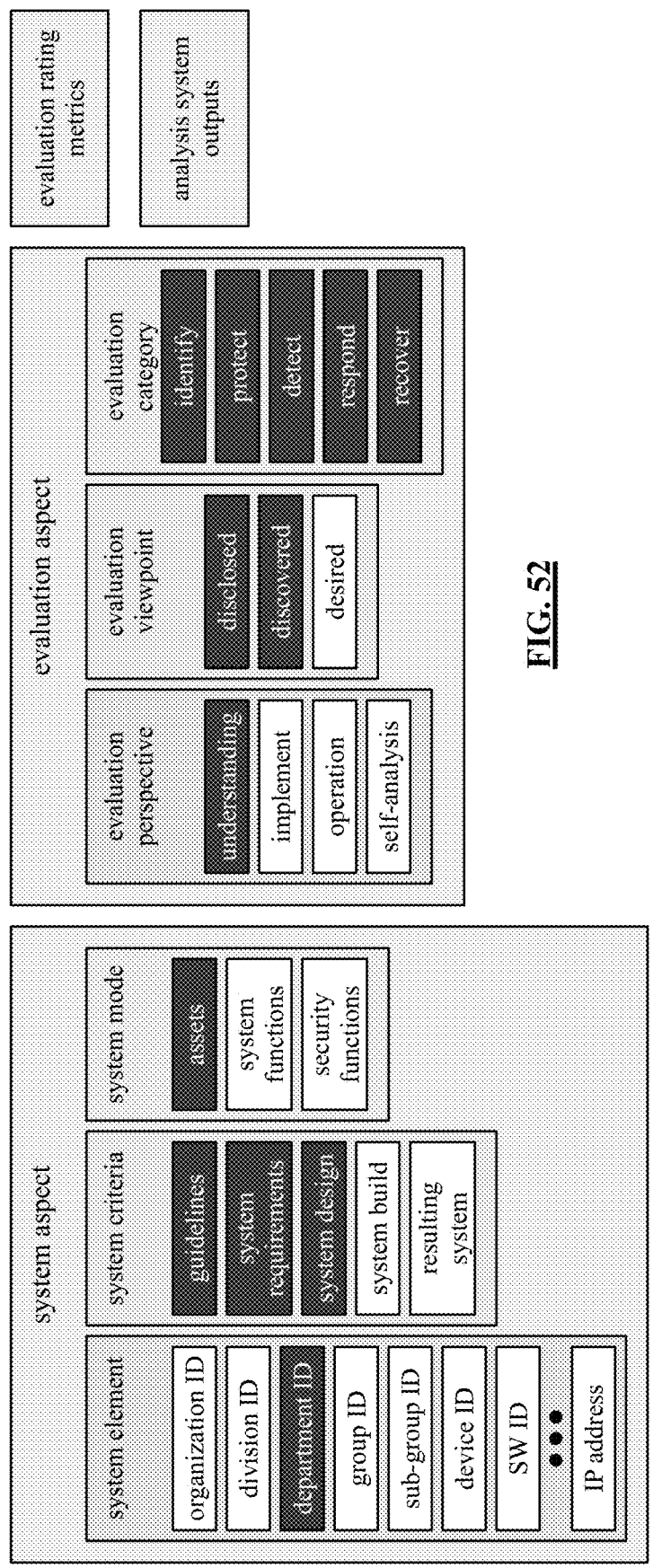
FIG. 52 is a diagram of another specific example of system aspects, evaluation aspects, evaluation rating metrics, and analysis system output options of an analysis system for analyzing a section of a system in accordance with the present disclosure.

FIG. 52 is a diagram of an example of system aspects, evaluation aspects, evaluation rating metrics, and analysis system output options of an analysis system 11 for analyzing a system 11, or portion thereof. For instance, analysis system 11 is evaluating the understanding of the guidelines, system requirements, and system design for identifying assets, protecting the assets from issues, detecting issues that may affect or are affecting the assets, responding to issues that may affect or are affecting the assets, and recovering from issues that affected the assets of a department based on disclosed data and discovered data.

For this specific example, the analysis system 10 obtains disclosed data and discovered from the system regarding guidelines, system requirements, and system design associated with the assets of the department. From the disclosed data and discovered data, the analysis system renders one or more first evaluation ratings (e.g., one for each of guidelines, system requirements, and system design, or one for all three) for the understanding of the guidelines, system requirements, and system design for identifying assets. The analysis system renders one or more second evaluation ratings for the understanding of the guidelines, system requirements, and system design regarding protection of the assets from issues. The analysis system renders one or more third evaluation ratings for the understanding of the guidelines, system requirements, and system design regarding detection of issues that may affect or are affecting the assets.

The analysis system renders one or more fourth evaluation ratings for the understanding of the guidelines, system requirements, and system design regarding responds to issues that may affect or are affecting the assets. The analysis system renders one or more fifth evaluation ratings for the understanding of the guidelines, system requirements, and system design regarding recovery from issues that affected the assets of a department based on disclosed data. The analysis system may render an overall evaluation rating for the understanding based on the one or more first through one or more fifth evaluation ratings.

The analysis system 11 may further render an understanding evaluation rating regarding how well the discovered data correlates with the disclosed data. In other words, evaluate the knowledge level of the system. In this example, the analysis system compares the disclosed data with the discovered data. If they substantially match, the understanding of the system would receive a relatively high evaluation rating. The more the disclosed data differs from the discovered data, the lower the understanding evaluation rating will be.

As another example, the analysis system 11 evaluates the understanding of guidelines, system requirements, and system design used to determine what assets should be included in the department, how the assets should be protected from issues, how issues that may affect or are affecting the assets are detect, how to respond to issues that may affect or are affecting the assets, and how the assets will recover from issues that may affect or are affecting them based on disclosed data and discovered data. In this example, the analysis system renders one or more first evaluation ratings for the understanding of the guidelines, system requirements, and system design regarding what assets should be in the department. The analysis system renders one or more second evaluation ratings for the understanding of the guidelines, system requirements, and system design regarding how the assets should be protected from issues. The analysis system renders one or more third evaluation ratings for the understanding of the guidelines, system requirements, and system design regarding how to detect issues that may affect or are affecting the assets.

The analysis system renders one or more fourth evaluation ratings for the understanding of the guidelines, system requirements, and system design regarding how to respond to issues that may affect or are affecting the assets. The analysis system renders one or more fifth evaluation ratings for the understanding of the guidelines, system requirements, and system design regarding how to recover from issues that affected the assets of a department based on disclosed data. The analysis system may render an overall evaluation rating for the understanding of the guidelines, system requirements, and system design based on the one or more first through the one or more fifth evaluation ratings.

Figure 53:
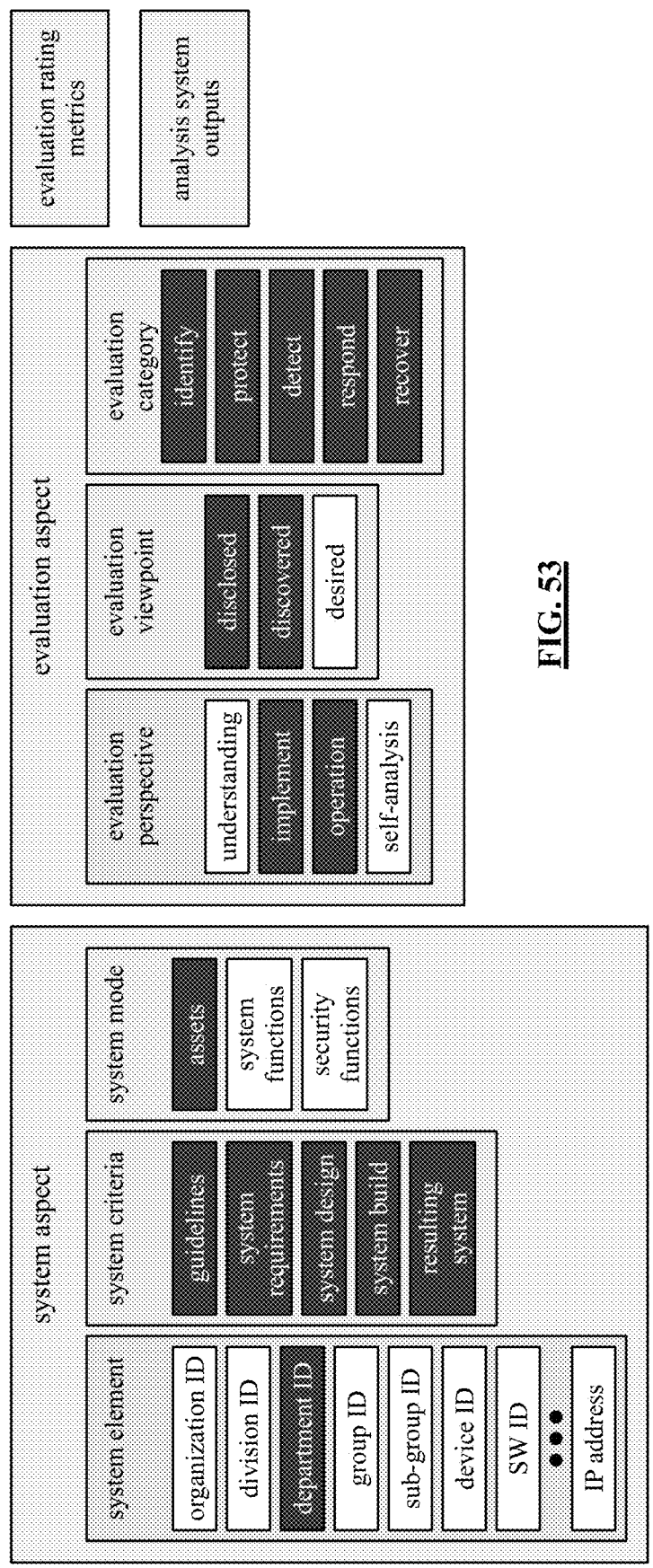
FIG. 53 is a diagram of another specific example of system aspects, evaluation aspects, evaluation rating metrics, and analysis system output options of an analysis system for analyzing a section of a system in accordance with the present disclosure.

FIG. 53 is a diagram of an example of system aspects, evaluation aspects, evaluation rating metrics, and analysis system output options of an analysis system 11 for analyzing a system 11, or portion thereof. For instance, analysis system 11 is evaluating the implementation for and operation of identifying assets of a department, protecting the assets from issues, detecting issues that may affect or are affecting the assets, responding to issues that may affect or are affecting the assets, and recovering from issues that affected the assets per the guidelines, system requirements, system design, system build, and resulting system based on disclosed data and discovered data.

For this specific example, the analysis system 10 obtains disclosed data and discovered data from the system regarding the guidelines, system requirements, system design, system build, and resulting system associated with the assets of the department. From the disclosed data and discovered data, the analysis system renders one or more first evaluation ratings (e.g., one for each of guidelines, system requirements, system design, system build, resulting system with respect to each of implementation and operation or one for all of them) for the implementation and operation of identifying the assets per the guidelines, system requirements, system design, system build, and resulting system. The analysis system renders one or more second evaluation ratings for the implementation and operation of protecting the assets from issues per the guidelines, system requirements, system design, system build, and resulting system.

The analysis system renders one or more third evaluation ratings for the implementation and operation of detecting issues that may affect or are affecting the assets per the guidelines, system requirements, system design, system build, and resulting system. The analysis system renders one or more fourth evaluation ratings for the implementation and operation of responding to issues that may affect or are affecting the assets per the guidelines, system requirements, system design, system build, and resulting system.

The analysis system renders one or more fifth evaluation ratings for the implementation and operation of recovering from issues that may affect or are affecting the assets per the guidelines, system requirements, system design, system build, and resulting system. The analysis system may render an overall evaluation rating for the implementation and/or performance based on the one or more first through one or more fifth evaluation ratings.

Figure 54:
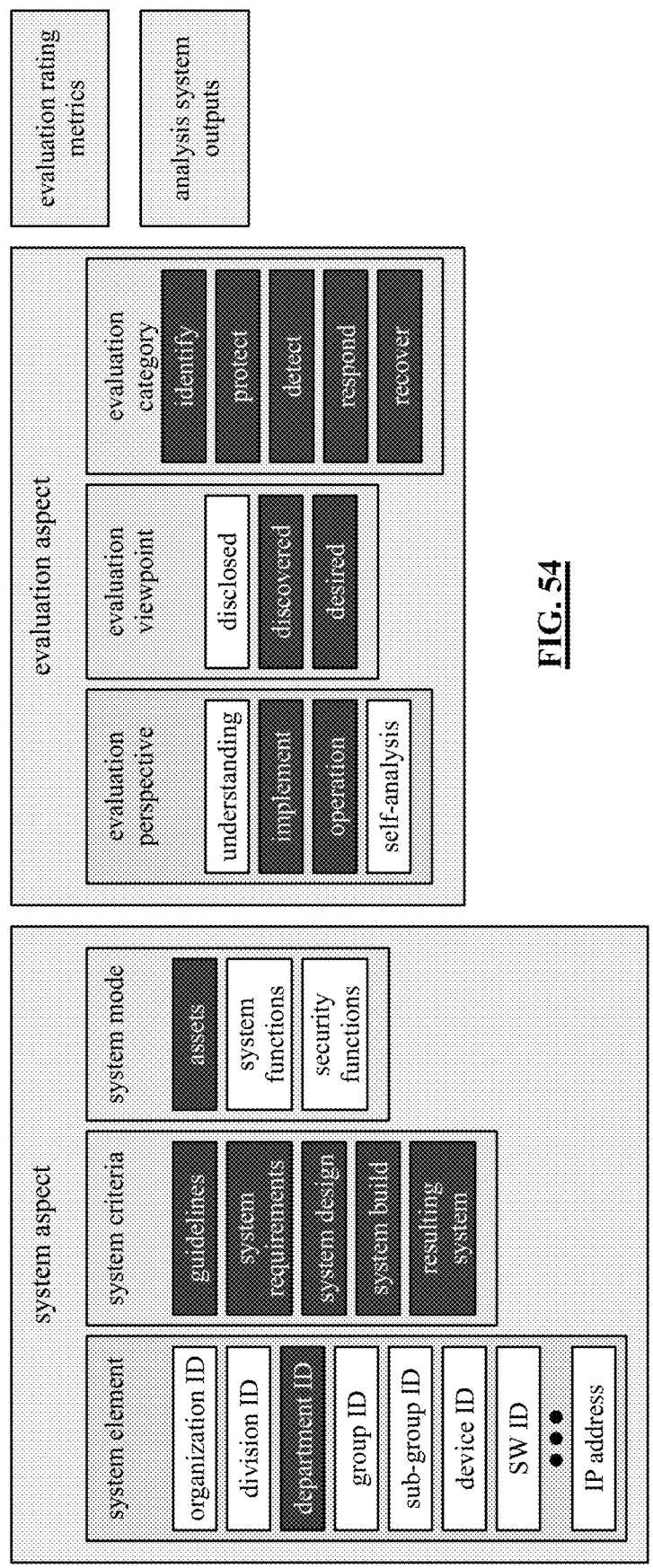
FIG. 54 is a diagram of another specific example of system aspects, evaluation aspects, evaluation rating metrics, and analysis system output options of an analysis system for analyzing a section of a system in accordance with the present disclosure.

FIG. 54 is a diagram of an example of system aspects, evaluation aspects, evaluation rating metrics, and analysis system output options of an analysis system 11 for analyzing a system 11, or portion thereof. For instance, analysis system 11 is evaluating the implementation for and operation of identifying assets of a department, protecting the assets from issues, detecting issues that may affect or are affecting the assets, responding to issues that may affect or are affecting the assets, and recovering from issues that affected the assets per the guidelines, system requirements, system design, system build, and resulting system based on discovered data and desired data.

For this specific example, the analysis system 10 obtains disclosed data and discovered from the system regarding the guidelines, system requirements, system design, system build, and resulting system associated with the assets of the department. From the discovered data and desired data, the analysis system renders one or more first evaluation ratings (e.g., one for each of guidelines, system requirements, system design, system build, resulting system with respect to each of implementation and operation or one for all of them) for the implementation and operation of identifying the assets per the guidelines, system requirements, system design, system build, and resulting system. The analysis system renders one or more second evaluation ratings for the implementation and operation of protecting the assets from issues per the guidelines, system requirements, system design, system build, and resulting system.

The analysis system renders one or more third evaluation ratings for the implementation and operation of detecting issues that may affect or are affecting the assets per the guidelines, system requirements, system design, system build, and resulting system. The analysis system renders one or more fourth evaluation ratings for the implementation and operation of responding to issues that may affect or are affecting the assets per the guidelines, system requirements, system design, system build, and resulting system.

The analysis system renders one or more fifth evaluation ratings for the implementation and operation of recovering from issues that may affect or are affecting the assets per the guidelines, system requirements, system design, system build, and resulting system. The analysis system may render an overall evaluation rating for the implementation and/or performance based on the one or more first through one or more fifth evaluation ratings.

The analysis system 11 may further render an implementation and/or operation evaluation rating regarding how well the discovered data correlates with the desired data. In other words, evaluate the level implementation and operation of the system. In this example, the analysis system compares the disclosed data with the desired data. If they substantially match, the implementation and/or operation of the system would receive a relatively high evaluation rating. The more the discovered data differs from the desired data, the lower the implementation and/or operation evaluation rating will be.

Figure 55:
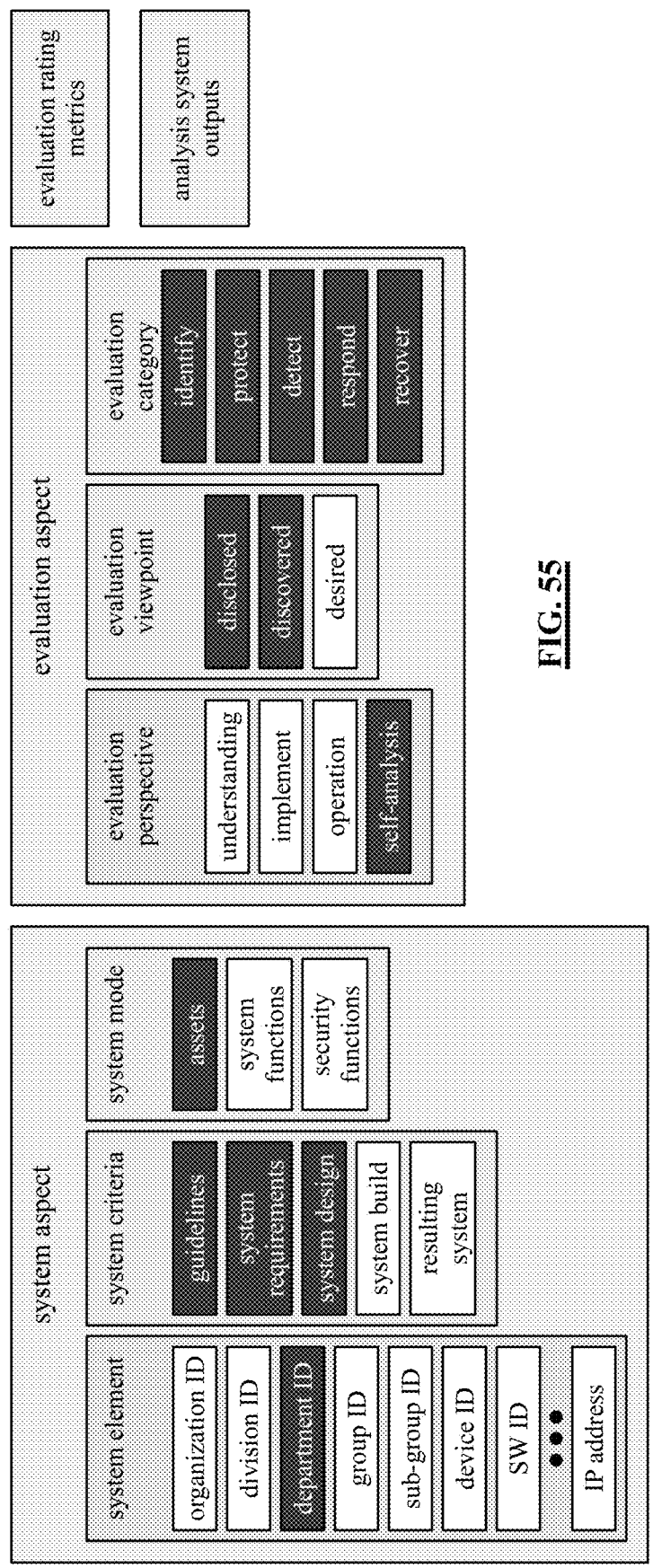
FIG. 55 is a diagram of another specific example of system aspects, evaluation aspects, evaluation rating metrics, and analysis system output options of an analysis system for analyzing a section of a system in accordance with the present disclosure.

FIG. 55 is a diagram of an example of system aspects, evaluation aspects, evaluation rating metrics, and analysis system output options of an analysis system 11 for analyzing a system 11, or portion thereof. For instance, analysis system 11 is evaluating the system's self-evaluation for identifying assets, protecting the assets from issues, detecting issues that may affect or are affecting the assets, responding to issues that may affect or are affecting the assets, and recovering from issues that affected the assets of a department based on disclosed data and discovered data per the guidelines, system requirements, and system design.

For this specific example, the analysis system 10 obtains disclosed data and discovered from the system regarding the guidelines, system requirements, and system design associated with the assets of the department. From the disclosed data and discovered, the analysis system renders one or more first evaluation ratings (e.g., one for each of guidelines, system requirements, and system design, or one for all three) for the self-evaluation of identifying assets per the guidelines, system requirements, and system design. For instance, what resources does the system have with respect to its guidelines, system requirements, and/or system design for self-identifying of assets.

The analysis system renders one or more second evaluation ratings for the self-evaluation of protecting the assets from issues per the guidelines, system requirements, and system design regarding. The analysis system renders one or more third evaluation ratings for the self-evaluation of detecting issues that may affect or are affecting the assets per the guidelines, system requirements, and system design regarding detection.

The analysis system renders one or more fourth evaluation ratings for the self-evaluation of responding to issues that may affect or are affecting the assets per the guidelines, system requirements, and system design. The analysis system renders one or more fifth evaluation ratings for the self-evaluation of recovering from issues that affected the assets per the guidelines, system requirements, and system design. The analysis system may render an overall evaluation rating for the self-evaluation based on the one or more first through one or more fifth evaluation ratings.

Figure 56:
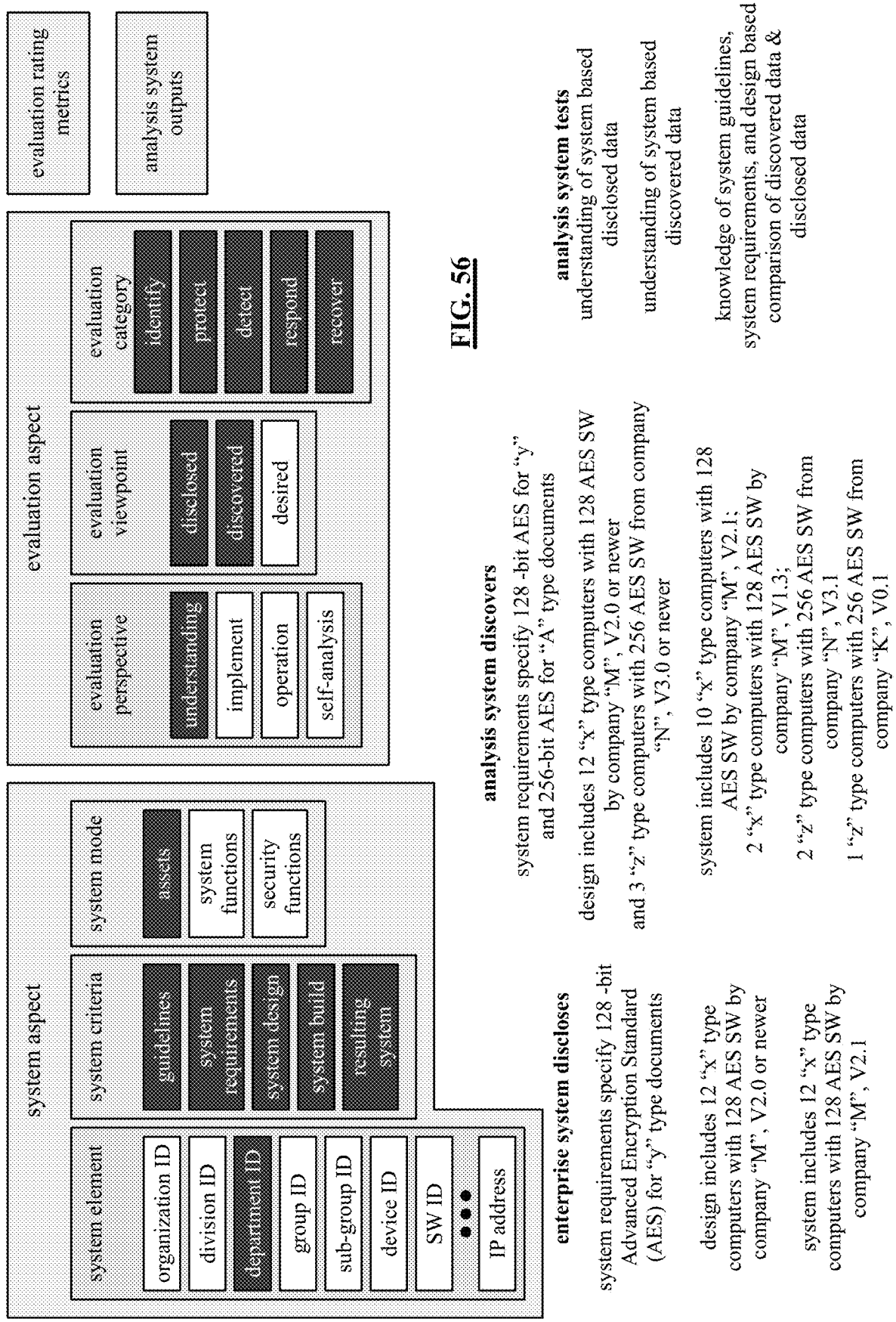
FIG. 56 is a diagram of another specific example of system aspects, evaluation aspects, evaluation rating metrics, and analysis system output options of an analysis system for analyzing a section of a system in accordance with the present disclosure.

FIG. 56 is a diagram of an example of system aspects, evaluation aspects, evaluation rating metrics, and analysis system output options of an analysis system 11 for analyzing a system 11, or portion thereof. For instance, analysis system 11 is evaluating the understanding of the guidelines, system requirements, system design, system build, and resulting system for identifying assets, protecting the assets from issues, detecting issues that may affect or are affecting the assets, responding to issues that may affect or are affecting the assets, and recovering from issues that affected the assets of a department based on disclosed data and discovered data.

For this specific example, the analysis system 10 obtains disclosed data and discovered data from the system regarding guidelines, system requirements, system design, system build, and resulting system associated with the assets of the department. As a specific example, the disclosed data includes guidelines that certain types of data shall be encrypted; a system requirement that specifies 128-bit Advanced Encryption Standard (AES) for "y" types of documents; a system design that includes 12 "x" type computers that are to be loaded with 128-bit AES software by company "M", version 2.0 or newer; and a system build and resulting system that includes 12 "x" type computers that have 128-bit AES software by company "M", version 2.1.

For this specific example, the discovered data includes the same guideline as the disclosed data; a first system requirement that specifies 128-bit Advanced Encryption Standard (AES) for "y" types of documents and a second system requirement that specifies 256-bit Advanced Encryption Standard (AES) for "A" types of documents; a system design that includes 12 "x" type computers that are to be loaded with 128-bit AES software by company "M", version 2.0 or newer, and 3 "z" type computers that are to be loaded with 256-bit AES software by company "N" version 3.0 or newer; and a system build and resulting system that includes 10 "x" type computers that have 128-bit AES software by company "M" version 2.1, 2 "x" type computers that have 128-bit AES software by company "M" version 1.3, 2 "z" type computers that have 256-bit AES software by company "N" version 3.1, and 1 "z" type computer that has 256-bit AES software by company "K" version 0.1.

From just the disclosed data, the analysis system would render a relatively high evaluation rating for the understanding of the guidelines, system requirements, system design, system build, and resulting system associated with the assets of the department. The relatively high evaluation rating would be warranted since the system build and resulting system included what was in the system design (e.g., 12 "x" type computers that have 128-bit AES software by company "M", version 2.1). Further, the system design is consistent with the system reequipments (e.g., 128-bit Advanced Encryption Standard (AES) for "y" types of documents), which is consistent with the guidelines (e.g., certain types of data shall be encrypted).

From the discovered data, however, the analysis system would render a relatively low evaluation rating for the understanding of the guidelines, system requirements, system design, system build, and resulting system associated with the assets of the department. The relatively low evaluation rating would be warranted since the system build and resulting system is not consistent with the system design (e.g., is missing 2 "x" type computers with the right encryption software, only has 2 "z" type computers with the right software, and has a "z" type computer with the wrong software).

The analysis system would also process the evaluation ratings from the disclosed data and from the discovered data to produce an overall evaluation rating for the understanding of the guidelines, system requirements, system design, system build, and resulting system associated with the assets of the department. In this instance, the disclosed data does not substantially match the discovered data, which indicates a lack of understanding of what's really in the system (i.e., knowledge of the system). Further, since the evaluation rating from the discovered data was low, the analysis system would produce a low overall evaluation rating for the understanding.

Figure 57:
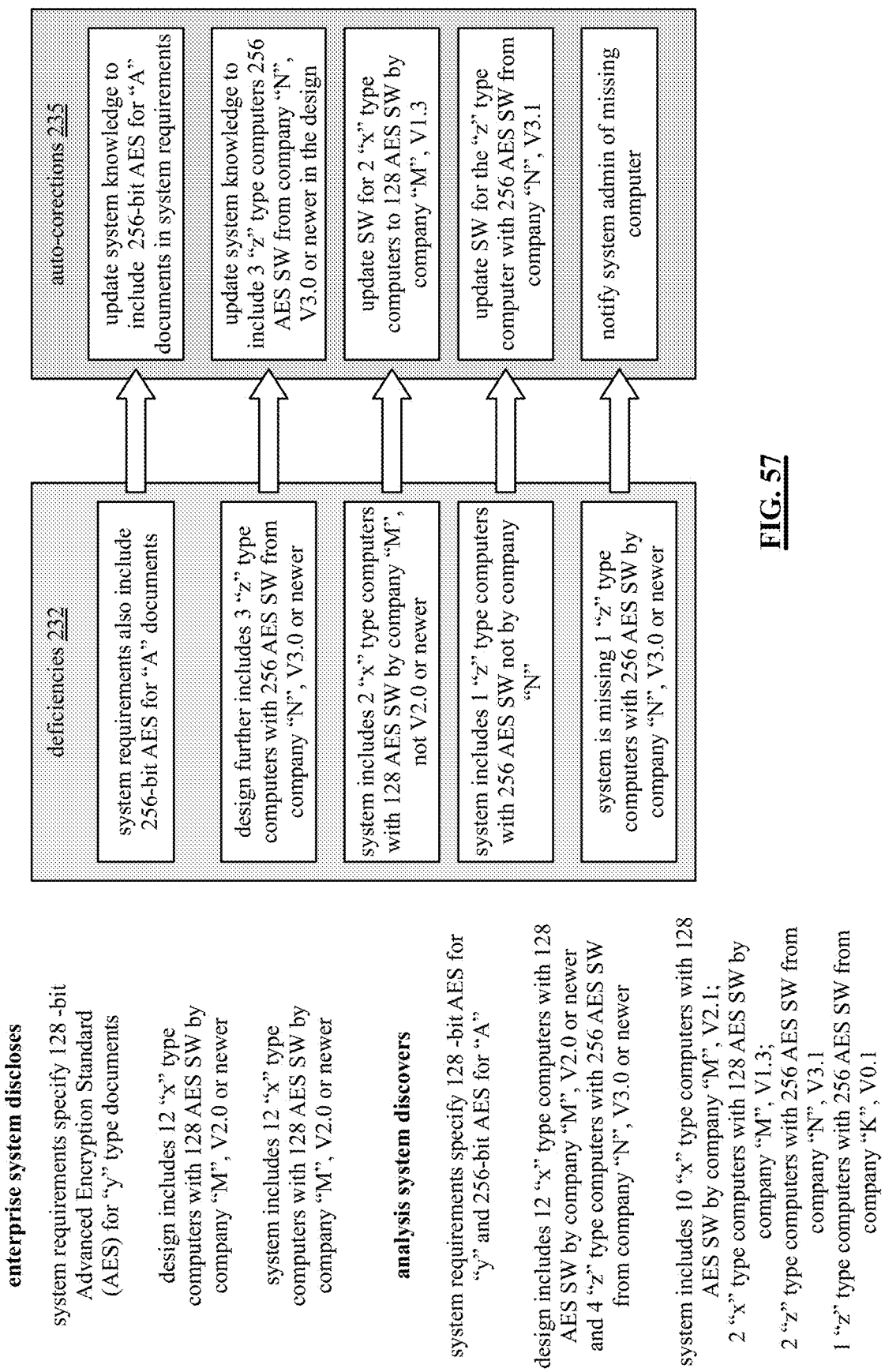
FIG. 57 is a diagram of an example of identifying deficiencies and auto-corrections by an analysis system analyzing a section of a system in accordance with the present disclosure.

FIG. 57 is a diagram of an extension of the example of FIG. 56. In this example, the analysis system processes the data and/or evaluation ratings to identify deficiencies and/or auto-corrections of at least some of the deficiencies. As shown, the disclosed data includes:
  guidelines that certain types of data shall be encrypted;
  a system requirement that specifies 128-bit Advanced Encryption Standard (AES) for "y" types of documents;
  a system design that includes 12 "x" type computers that are to be loaded with 128-bit AES software by company "M", version 2.0 or newer; and
  a system build and resulting system that includes 12 "x" type computers that have 128-bit AES software by company "M", version 2.1.

As is also shown, the discovered data includes:
  the same guideline as the disclosed data;
  a first system requirement that specifies 128-bit Advanced Encryption Standard (AES) for "y" types of documents and a second system requirement that specifies 256-bit Advanced Encryption Standard (AES) for "A" types of documents;
  a system design that includes 12 "x" type computers that are to be loaded with 128-bit AES software by company "M", version 2.0 or newer, and 3 "z" type computers that are to be loaded with 256-bit AES software by company "N", version 3.0 or newer; and
  a system build and resulting system that includes:
  10 "x" type computers that have 128-bit AES software by company "M", version 2.1;
  2 "x" type computers that have 128-bit AES software by company "M", version 1.3;
  2 "z" type computers that have 256-bit AES software by company "N", version 3.1; and
  1 "z" type computer that has 256-bit AES software by company "K", version 0.1.

From this data, the analysis system identifies deficiencies 232 and, when possible, provides auto-corrections 235. For example, the analysis system determines that the system requirements also included a requirement for 256-bit AES for "A" type documents. The analysis system can auto-correct this deficiency by updating the knowledge of the system to include the missing requirement. This may include updating one or more policies, one or more processes, one or more procedures, and/or updating documentation.

As another example, the analysis system identifies the deficiency of the design further included 3 "z" type computers that are to be loaded with 256-bit AES software by company "N", version 3.0 or newer. The analysis system can auto-correct this deficiency by updating the knowledge of the system to include the 3 "z" type computers with the correct software. Again, this may include updating one or more policies, one or more processes, one or more procedures, and/or updating documentation.

As another example, the analysis system identifies the deficiency of 2 "x" type computers having old versions of the encryption software (e.g., have version 1.3 of company M's 128-bit AES software instead of a version 2.0 or newer). The analysis system can auto-correct this deficiency by updating the version of software for the two computers.

As another example, the analysis system identifies the deficiency of 1 "z" type computer has the wrong encryption software (e.g., it has version 0.1 from company K and not version 3.0 or newer from company N). The analysis system can auto-correct this deficiency by replacing the wrong encryption software with the correct encryption software.

As another example, the analysis system identifies the deficiency of 1 "z" type computer is missing from the system. The analysis system cannot auto-correct this deficiency since it is missing hardware. In this instance, the analysis system notifies a system admin of the missing computer.

Figure 58:
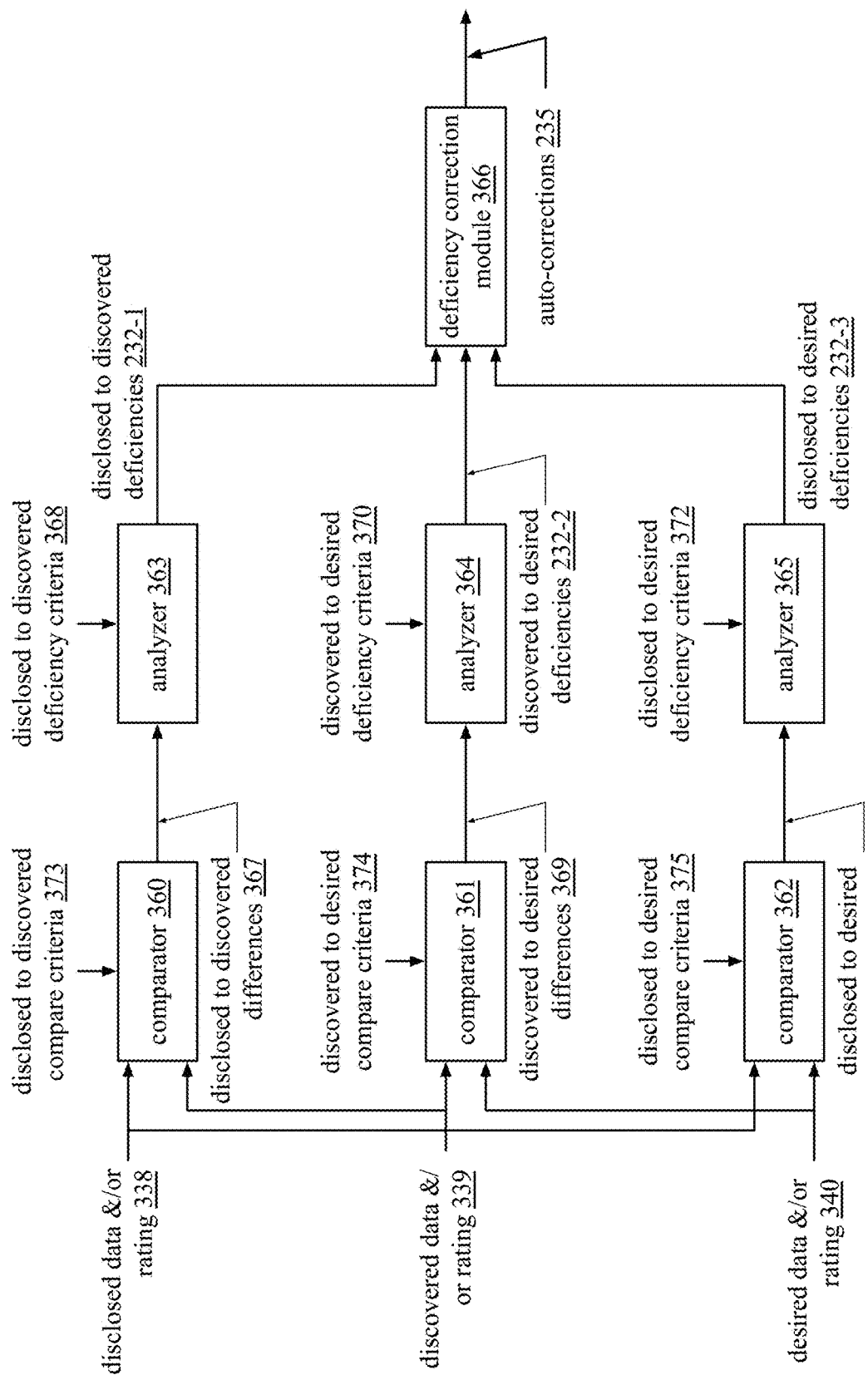
FIG. 58 is a schematic block diagram of an embodiment of an evaluation processing module of an analysis system in accordance with the present disclosure.

FIG. 58 is a schematic block diagram of an embodiment of an evaluation processing module 254 that includes a plurality of comparators 360-362, a plurality of analyzers 363-365, and a deficiency correction module 366. In general, the evaluation processing module 254 identifies deficiencies 232 and, when possible, determines auto-corrections 235 from the ratings 219 and/or inputted data (e.g., disclosed data, discovered data, and/or desired data) based on evaluation parameters 266 (e.g., disclosed to discovered deficiency criteria 368, discovered to desired deficiency criteria 370, disclosed to desired deficiency criteria 372, disclosed to discovered compare criteria 373, discovered to desired compare criteria 374, and disclosed to desired compare criteria 375).

In an example, comparator 360 compares disclosed data and/or ratings 338 and discovered data and/or ratings 339 based on the disclosed to discovered compare criteria 373 to produce, if any, one or more disclosed to discovered differences 367. As a more specific example, the analysis system evaluates disclosed, discovered, and/or desired data to produce one or more evaluation ratings regarding the understanding of the guidelines, system requirements, system design, system build, and resulting system associated with identifying the assets of the department.

Each of the disclosed data, discovered data, and desired data includes data regarding the guidelines, system requirements, system design, system build, and/or resulting system associated with identifying the assets of the department and/or the assets of the department. Recall that disclosed data is the known data of the system at the outset of an analysis, which is typically supplied by a system administrator and/or is obtained from data files of the system. The discovered data is the data discovered about the system by the analysis system during the analysis. The desired data is the data obtained by the analysis system from system proficiency resources regarding desired guidelines, system requirements, system design, system build, and/or system operation.

For the understanding of the guidelines, system requirements, system design, system build, and resulting system associated with identifying the assets of the department, the analysis system may produce one or more evaluation ratings. For example, the analysis system produces an evaluation rating for:

understanding of the guidelines with respect to identifying assets of the department from the disclosed data;
understanding of the guidelines with respect to identifying assets of the department from the discovered data;
understanding of the guidelines with respect to identifying assets of the department from the desired data;
understanding of the system requirements with respect to identifying assets of the department from the disclosed data;
understanding of the system requirements with respect to identifying assets of the department from the discovered data;
understanding of the system requirements with respect to identifying assets of the department from the desired data;
understanding of the system design with respect to identifying assets of the department from the disclosed data;
understanding of the system design with respect to identifying assets of the department from the discovered data;
understanding of the system design with respect to identifying assets of the department from the desired data;
understanding of the system build with respect to identifying assets of the department from the disclosed data;
understanding of the system build with respect to identifying assets of the department from the discovered data;
understanding of the system build with respect to identifying assets of the department from the desired data;
understanding of the resulting system with respect to identifying assets of the department from the disclosed data;
understanding of the resulting system with respect to identifying assets of the department from the discovered data;
understanding of the resulting system with respect to identifying assets of the department from the desired data; and/or
an overall understanding of identifying the assets of the department.

The disclosed to discovered compare criteria 373 specifies the evaluation ratings to be compared and/or which data of the disclosed data is to be compared to data of the discovered data. For example, the disclosed to discovered compare criteria 373 indicates that the "understanding of the guidelines with respect to system design of the department from the disclosed data" is to be compared to the "understanding of the system design with respect to identifying assets of the department from the discovered data". As another example, the disclosed to discovered compare criteria 373 indicates that data regarding system design of the disclosed data is to be compared with the data regarding the system design of the discovered data.

In accordance with the disclosed to discovered compare criteria 373 and for this specific example, the comparator 360 compares the "understanding of the guidelines with respect to system design of the department from the disclosed data" with the "understanding of the system design with respect to identifying assets of the department from the discovered data" to produce, if any, one or more understanding differences. The comparator 360 also compares the data regarding system design of the disclosed data with the data regarding the system design of the discovered data to produce, if any, one or more data differences. The comparator 360 outputs the one or more understanding differences and/or the one or more data differences as the disclosed to discovered differences 367.

The analyzer 363 analyzes the disclosed to discovered differences 267 in accordance with the disclosed to discovered deficiency criteria 368 to determine whether a difference 267 constitutes a deficiency. If so, the analyzer 363 includes it in the disclosed to discovered deficiencies 232-1. The disclosed to discovered deficiency criteria 368 correspond to the disclosed to discovered compare criteria 373 and specify how the differences 367 are to be analyzed to determine if they constitute deficiencies 232-1.

As an example, the disclosed to discovered deficiency criteria 368 specify a series of comparative thresholds based on the impact the differences have on the system. The range of impact is from none to significant with as many granular levels in between as desired. For differences that have a significant impact on the system, the comparative threshold is set to trigger a deficiency for virtually any difference. For example, if the difference is regarding system security, then then threshold is set that any difference is a deficiency.

As another example, if the difference is regarding is inconsequential information, then the threshold is set to not identify the difference as a deficiency. For example, the discovered data includes a PO date on Nov. 2, 2020 for a specific purchase order and the disclosed data didn't include a PO date, but the rest of the information regarding the PO is the same for the disclosed and discovered data. In this instance, the missing PO date is inconsequential and would not be identified as a deficiency.

The deficiency correction module 366 receives the disclosed to discovered deficiencies 232-1, if any, and determines whether one or more of the deficiencies 232-1 can be auto-corrected to produce an auto-correction 235. In many instances, software deficiencies are auto-correctable (e.g., wrong software, missing software, out-of-date software, etc.) while hardware deficiencies are not auto-correctable (e.g., wrong computing device, missing computing device, missing network connection, etc.).

The comparator 361 functions similarly to the comparator 360 to produce discovered to desired differences 369 based on the discovered data and/or rating 339 and the desired data and/or rating 340 in accordance with the discovered to desired compare criteria 374. The analyzer 364 functions similarly to the analyzer 363 to produce discovered to desired deficiencies 232-2 from the discovered to desired differences 369 in accordance with the discovered to desired deficiency criteria 370. The deficiency correction module 366 auto-corrects, when possible, the discovered to desired deficiencies 232-2 to produce auto-corrections 235.

The comparator 362 functions similarly to the comparator 360 to produce disclosed to desired differences 371 based on the disclosed data and/or rating 338 and the desired data and/or rating 340 in accordance with the disclosed to desired compare criteria 375. The analyzer 365 functions similarly to the analyzer 363 to produce disclosed to desired deficiencies 232-3 from the disclosed to desired differences 371 in accordance with the disclosed to desired deficiency criteria 372. The deficiency correction module 366 auto-corrects, when possible, the disclosed to desired deficiencies 232-3 to produce auto-corrections 235.

While the examples were for the understanding of the system with respect to identifying assets of the department, the evaluation processing module 254 processes any combination of system aspects, evaluation aspects, and evaluation metrics in a similar manner. For example, the evaluation processing module 254 processes the implementation of the system with respect to identifying assets of the department to identify deficiencies 232 and auto-corrections in the implementation. As another example, the evaluation processing module 254 processes the operation of the system with respect to identifying assets of the department to identify deficiencies 232 and auto-corrections in the operation of the system.

Figure 59:
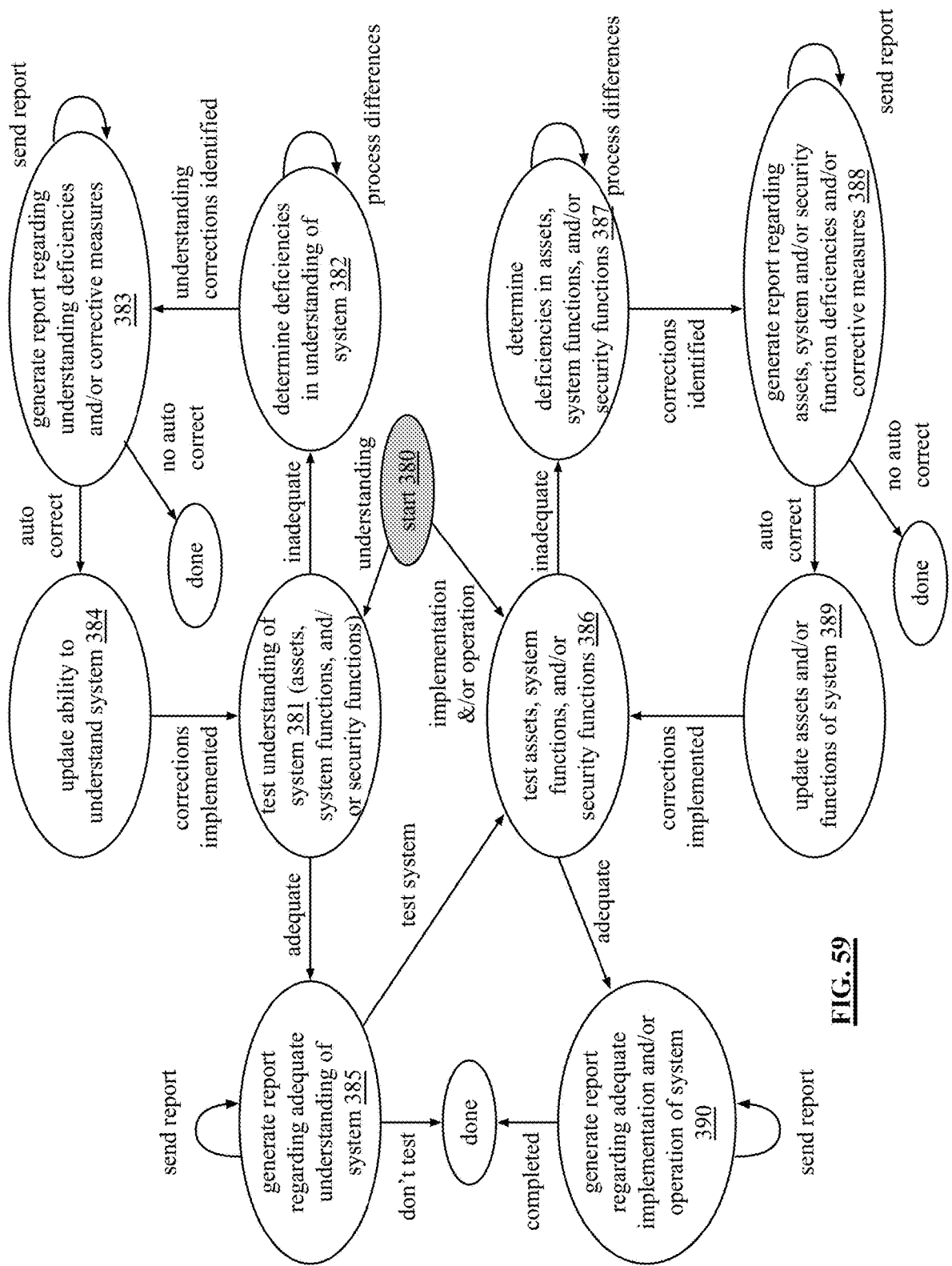
FIG. 59 is a state diagram of an example of an analysis system analyzing a section of a system in accordance with the present disclosure.

FIG. 59 is a state diagram of an example the analysis system analyzing a system. From a start state 380, the analysis proceeds to an understanding of the system state 38) or to a test operations of the assets system functions, and/or security functions of a system state 386 based on the desired analysis to be performed. For testing the understanding, the analysis proceeds to state 381 where the understanding of the assets, system functions, and/or security functions of the system are evaluated. This may be done via documentation of the system, policies of the supported business, based upon a question and answer session with personnel of the owner/operator of the system, and/or as discussed herein.

If the understanding of the system is inadequate, the analysis proceeds to the determine deficiencies in the understanding of the system state 382. In this state 382, the deficiencies in understanding are determined by processing differences and/or as discussed herein.

From state 382, corrections required in understanding the system are identified and operation proceeds to state 383 in which a report is generated regarding understanding deficiencies and/or corrective measures to be taken. In addition, a report is generated and sent to the owner/operator of the other system. If there are no understanding deficiencies and/or corrective measures, no auto correction is needed, and operations are complete at the done state.

If an autocorrect can be done, operation proceeds to state 384 where the analysis system updates a determined ability to understand the other system. Corrections are then implemented, and operation proceeds back to state 381. Note that corrections may be automatically performed for some deficiencies but not others, depending upon the nature of the deficiency.

From state 381, if the tested understanding of the system is adequate, operation proceeds to state 385 where a report is generated regarding an adequate understanding of the system and the report is sent. From state 385 if operation is complete, operations proceed to the done state. Alternately, from state 385 operation may proceed to state 386 where testing of the assets, system functions and/or security functions of the other system is performed. If testing of the assets, system functions, and/or security functions of the system results in an adequate test result, operation proceeds to state 390 where a report is generated indicating adequate implementation and/or operation of the system and the report is sent.

Alternately, at state 386 if the testing of the system results in an inadequate result, operations proceed to state 387 where deficiencies in the assets, system functions, and/or security functions of the system are tested. At state 387 differences are compared to identify deficiencies in the assets, system functions, and/or security functions. The analysis then proceeds from state 387 to state 388 where a report is generated regarding corrective measures to be taken in response to the assets, system functions, and/or security functions deficiencies. The report is then sent to the owner/operator. If there are no deficiencies and/or corrective measures, no auto correction is needed, and operations are complete at the done state. If autocorrect is required, operation proceeds to state 389 where the analysis system updates assets, system functions, and/or security functions of the system. Corrections are then implemented and the analysis proceeds to state 386. Note that corrections may be automatically performed for some deficiencies but not others, depending upon the nature of the deficiency.

Figure 60:
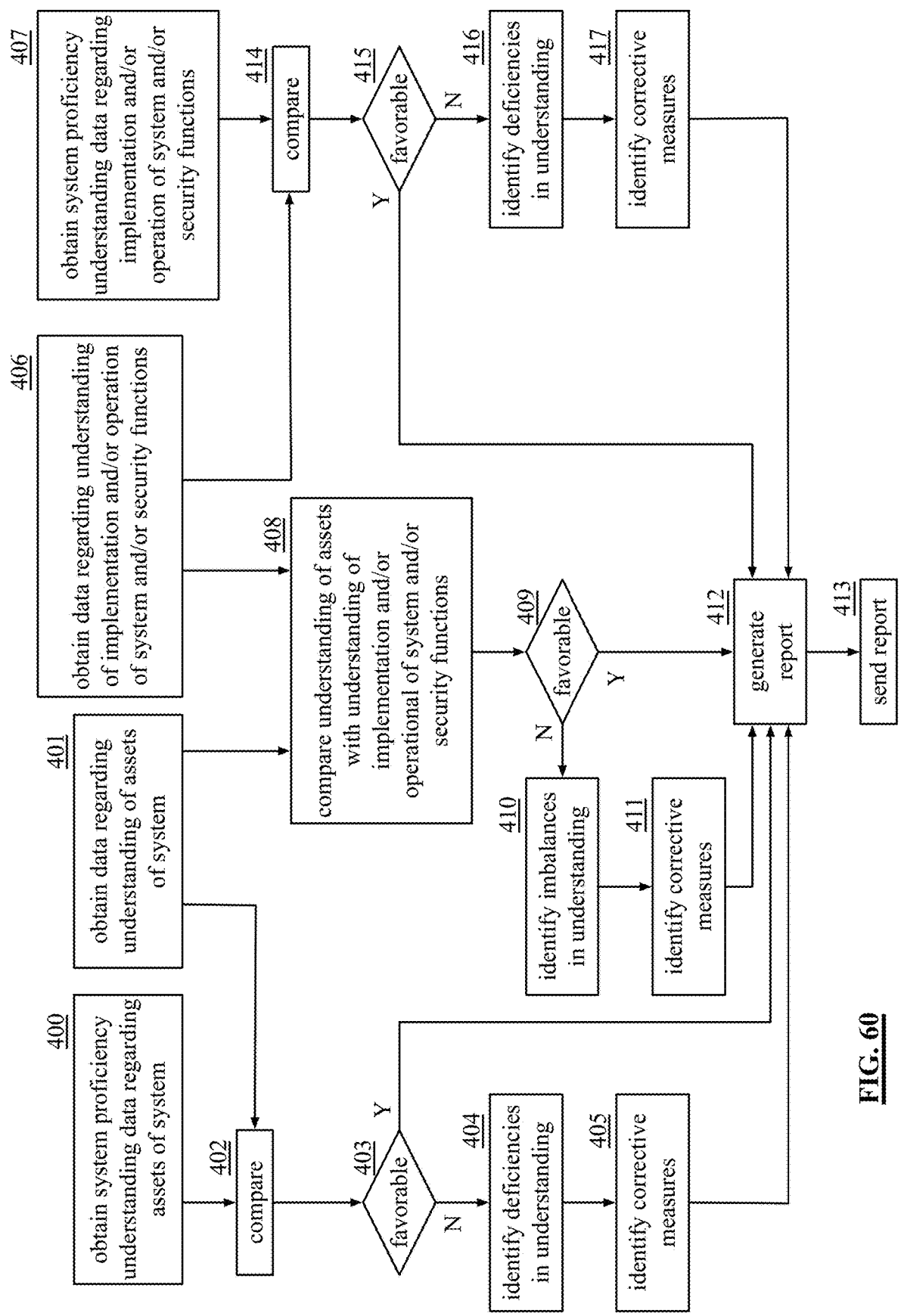
FIG. 60 is a logic diagram of an example of an analysis system analyzing a section of a system in accordance with the present disclosure.

FIG. 60 is a logic diagram of an example of an analysis system analyzing a system, or portion thereof. The method includes the analysis system obtaining system proficiency understanding data regarding the assets of the system (step 400) and obtaining data regarding the owner/operator's understanding of the assets (step 401). System proficiencies of step 400 include industry best practices and regulatory requirements, for example. The data obtained from the system at step 401 is based upon data received regarding the system or received by probing the system.

The data collected at steps 400 and 401 is then compared (step 402) and a determination is made regarding the comparison. If the comparison is favorable, as determined at step 403, meaning that the system proficiency understanding compares favorably to the data regarding understanding, operation is complete, a report is generated (step 412), and the report is sent (step 413). If the comparison is not favorable, as determined at step 403, operation continues with identifying deficiencies in the understanding of the system (step 404), identifying corrective measures (step 405), generating a corresponding report (step 412) and sending the report (step 413).

The method also includes the analysis system obtaining system proficiency understanding data of the system functions and/or security implementation and/or operation of the system (step 406) and obtaining data regarding the owner/operator's understanding of the system functions and/or security functions implementation and/or operation of the system (step 407). System proficiencies of step 406 include industry best practices and regulatory requirements, for example. The data obtained from the system at step 407 is based upon data received regarding the system or received by probing the system.

The data collected at steps 406 and 407 is then compared (step 414) and a determination is made regarding the comparison. If the comparison is favorable, as determined at step 415, meaning that the system proficiency understanding compares favorably to the data regarding understanding, operation is complete, a report is generated (step 412), and the report is sent (step 413). If the comparison is not favorable, as determined at step 415, operation continues with identifying deficiencies in the understanding of the system (step 416), identifying corrective measures (step 417), generating a corresponding report (step 412) and sending the report (step 413).

The method further includes the analysis system comparing the understanding of the physical structure (obtained at step 401) with the understanding of the system functions and/or security functions implementation and/or operation (obtained at step 406) at step 408. Step 408 essentially determines whether the understanding of the assets corresponds with the understanding of the system functions and/or security functions of the implementation and/or operation of the system. If the comparison is favorable, as determined at step 409, a report is generated (step 412), and the report is sent (step 413). If the comparison is not favorable, as determined at step 409, the method continues with identifying imbalances in the understanding (step 410), identifying corrective measures (step 410), generating a corresponding report (step 412), and sending the report (step 413).

Figure 61:
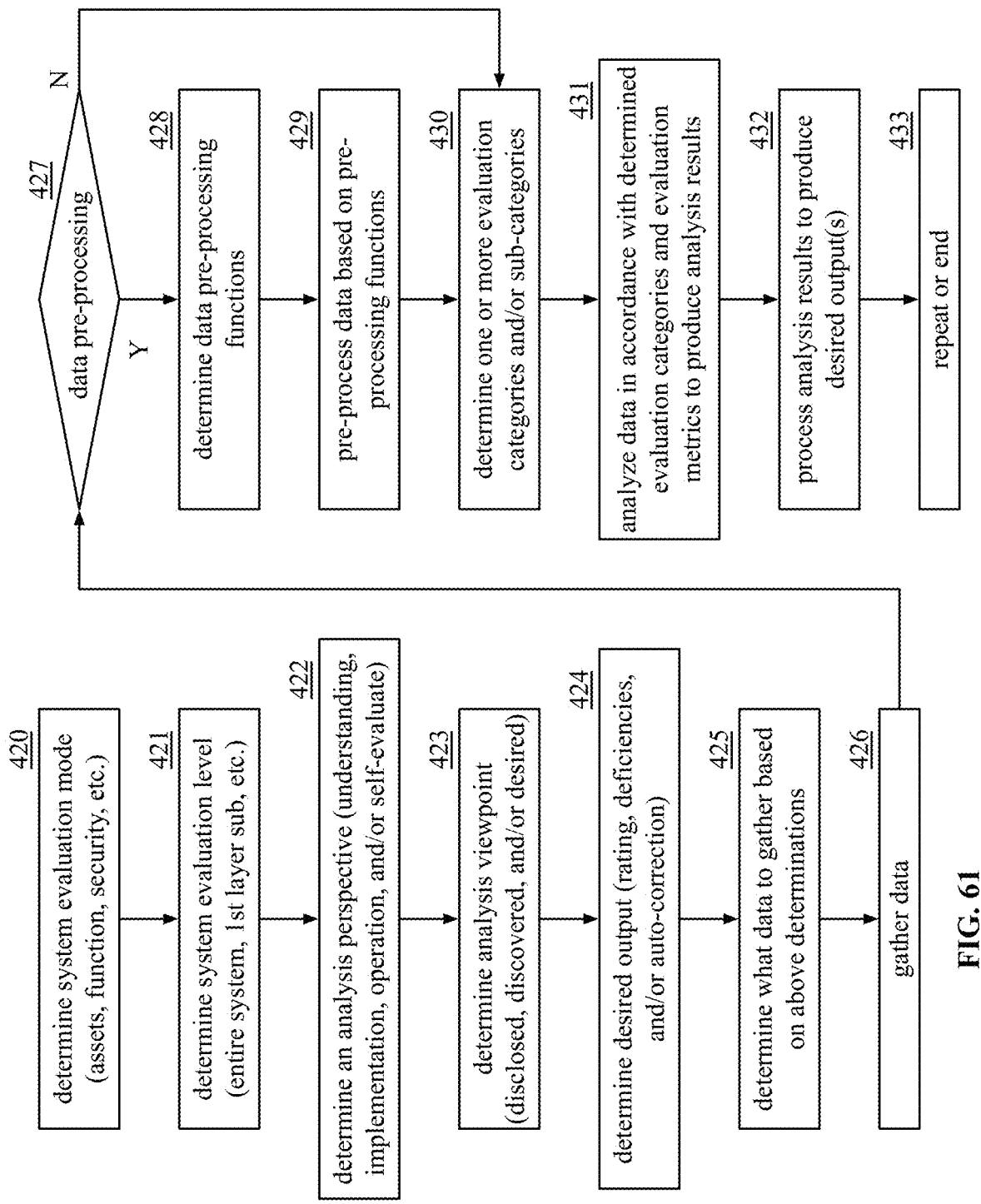
FIG. 61 is a logic diagram of another example of an analysis system analyzing a section of a system in accordance with the present disclosure.

FIG. 61 is a logic diagram of another example of an analysis system analyzing a system, or portion thereof. The method begins at step 420 where the analysis system determines a system evaluation mode (e.g., assets, system functions, and/or security functions) for analysis. The method continues at step 421 where the analysis system determines a system evaluation level (e.g., the system or a portion thereof). For instance, the analysis system identifies one or more system elements for evaluation.

The method continues at step 422 where the analysis system determines an analysis perspective (e.g., understanding, implementation, operation, and/or self-evaluate). The method continues at step 423 where the analysis system determines an analysis viewpoint (e.g., disclosed, discovered, and/or desired). The method continues at step 424 where the analysis system determines a desired output (e.g., evaluation rating, deficiencies, and/or auto-corrections).

The method continues at step 425 where the analysis system determines what data to gather based on the preceding determinations. The method continues at step 426 where the analysis system gathers data in accordance with the determination made in step 425. The method continues at step 427 where the analysis system determines whether the gathered data is to be pre-processed.

If yes, the method continues at step 428 where the analysis system determines data pre-processing functions (e.g., normalize, parse, tag, and/or de-duplicate). The method continues at step 429 where the analysis system pre-processes the data based on the pre-processing functions to produce pre-processed data. Whether the data is pre-processed or not, the method continues at step 430 where the analysis system determines one or more evaluation categories (e.g., identify, protect, detect, respond, and/or recover) and/or sub-categories for evaluation. Note that this may be done prior to step 425 and be part of determining the data to gather.

The method continues at step 431 where the analysis system analyzes the data in accordance with the determine evaluation categories and in accordance with a selected evaluation metric (e.g., process, policy, procedure, automation, certification, and/or documentation) to produce analysis results. The method continues at step 432 where the analysis system processes the analysis results to produce the desired output (e.g., evaluation rating, deficiencies, and/or auto-correct). The method continues at step 432 where the analysis system determines whether to end the method or repeat it for another analysis of the system.

Figure 62:
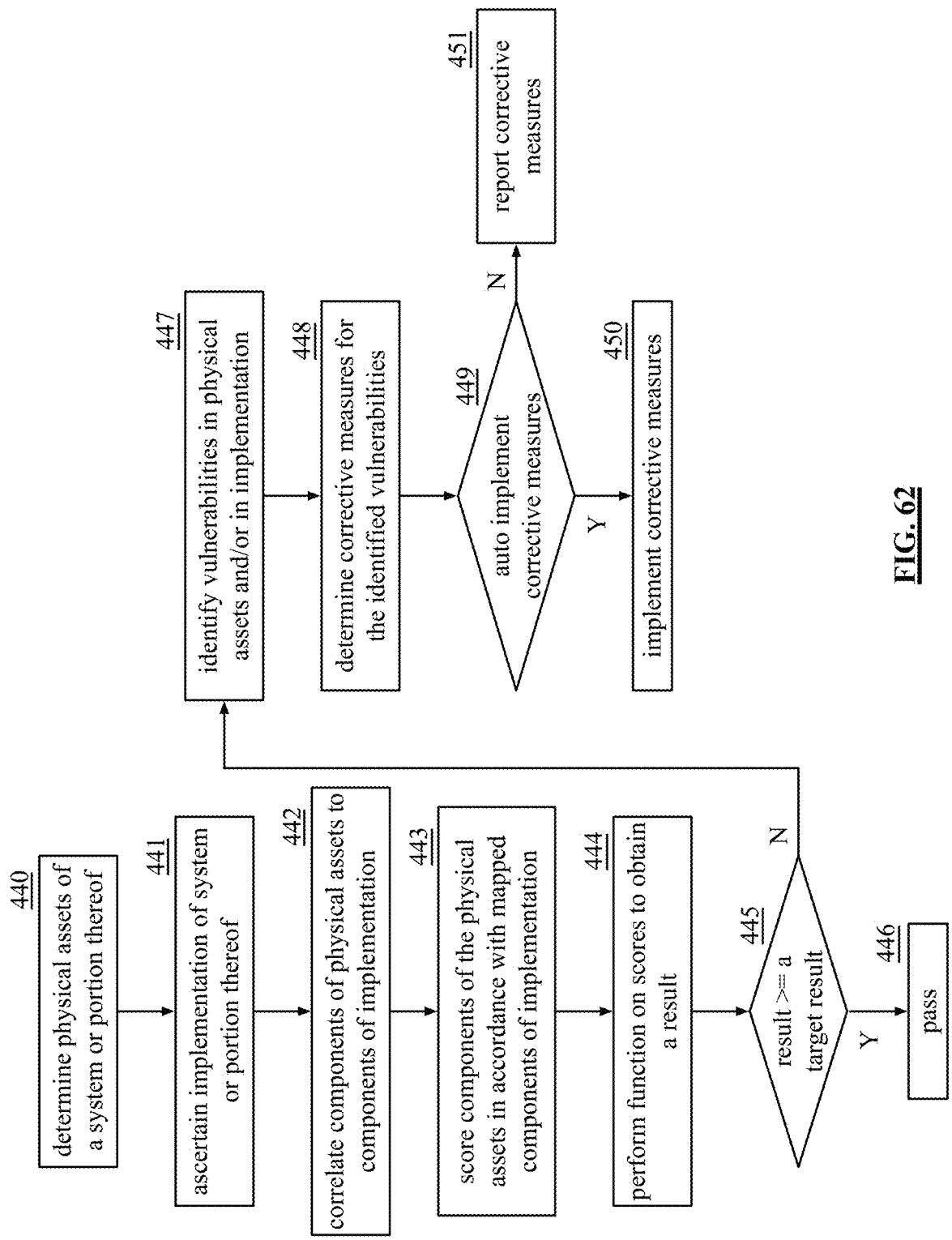
FIG. 62 is a logic diagram of another example of an analysis system analyzing a section of a system in accordance with the present disclosure.

FIG. 62 is a logic diagram of another example of an analysis system analyzing a system or portion thereof. The method begins at step 440 where the analysis system determines physical assets of the system, or portion thereof, to analyze (e.g., assets in the resulting system). Recall that a physical asset is a computing entity, a computing device, a user software application, a system software application (e.g., operating system, etc.), a software tool, a network software application, a security software application, a system monitoring software application, and the like.

The method continues at step 441 where the analysis system ascertains implementation of the system, or portion thereof (e.g., assets designed to be, and/or built, in the system). The method continues at step 442 where the analysis system correlates components of the assets to components of the implementation (e.g., do the assets of the actual system correlate with assets design/built to be in the system).

The method continues at step 443 where the analysis system scores the components of the physical assets in accordance with the mapped components of the implementation. For example, the analysis system scores how well the assets of the actual system correlate with assets design/built to be in the system. The scoring may be based on one or more evaluation metrics (e.g. process, policy, procedure, automation, certification, and/or documentation). The method continues at step 444 where the analysis system performs a function on the scores to obtain a result (e.g., an evaluation rating, identified deficiencies, and/or auto-correction of deficiencies).

The method continues at step 445 where the analysis system determines whether the result is equal or greater than a target result (e.g., the evaluation rating is a certain value). If yes, the method continues at step 446 where the analysis system indicates that the system, or portion thereof, passes this particular test. If the results are less than the target result, the method continues at step 447 where the analysis system identifies vulnerabilities in the physical assets and/or in the implementation. For example, the analysis system determines that a security software application is missing from several computing devices in the system, or portion thereof, being analyzed.

The method continues at step 448 where the analysis system determines, if possible, corrective measures of the identified vulnerabilities. The method continues at step 449 where the analysis system determines whether the corrective measures can be done automatically. If not, the method continues at step 451 where the analysis system reports the corrective measures. If yes, the method continues at step 450 where the analysis system auto-corrects the vulnerabilities.

Figure 63:
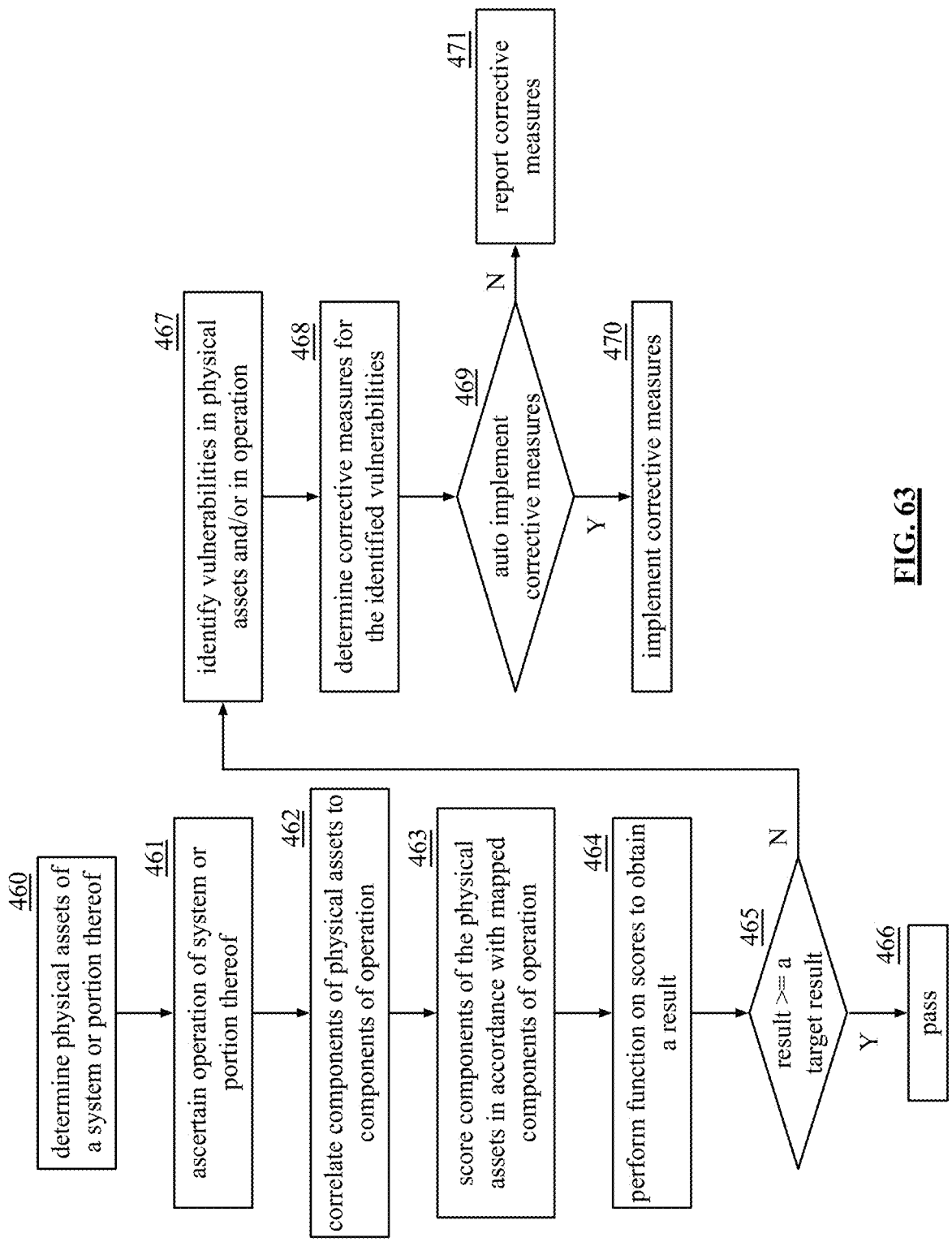
FIG. 63 is a logic diagram of another example of an analysis system analyzing a section of a system in accordance with the present disclosure.

FIG. 63 is a logic diagram of another example of an analysis system analyzing a system or portion thereof. The method begins at step 460 where the analysis system determines physical assets of the system, or portion thereof, to analyze (e.g., assets and their intended operation). The method continues at step 461 where the analysis system ascertains operation of the system, or portion thereof (e.g., the operations actually performed by the assets). The method continues at step 462 where the analysis system correlates components of the assets to components of operation (e.g., do the identified operations of the assets correlate with the operations actually performed by the assets).

The method continues at step 463 where the analysis system scores the components of the physical assets in accordance with the mapped components of the operation. For example, the analysis system scores how well the identified operations of the assets correlate with operations actually performed by the assets. The scoring may be based on one or more evaluation metrics (e.g. process, policy, procedure, automation, certification, and/or documentation). The method continues at step 464 where the analysis system performs a function on the scores to obtain a result (e.g., an evaluation rating, identified deficiencies, and/or auto-correction of deficiencies).

The method continues at step 465 where the analysis system determines whether the result is equal or greater than a target result (e.g., the evaluation rating is a certain value). If yes, the method continues at step 466 where the analysis system indicates that the system, or portion thereof, passes this particular test. If the results are less than the target result, the method continues at step 467 where the analysis system identifies vulnerabilities in the physical assets and/or in the operation.

The method continues at step 468 where the analysis system determines, if possible, corrective measures of the identified vulnerabilities. The method continues at step 469 where the analysis system determines whether the corrective measures can be done automatically. If not, the method continues at step 471 where the analysis system reports the corrective measures. If yes, the method continues at step 470 where the analysis system auto-corrects the vulnerabilities.

Figure 64:
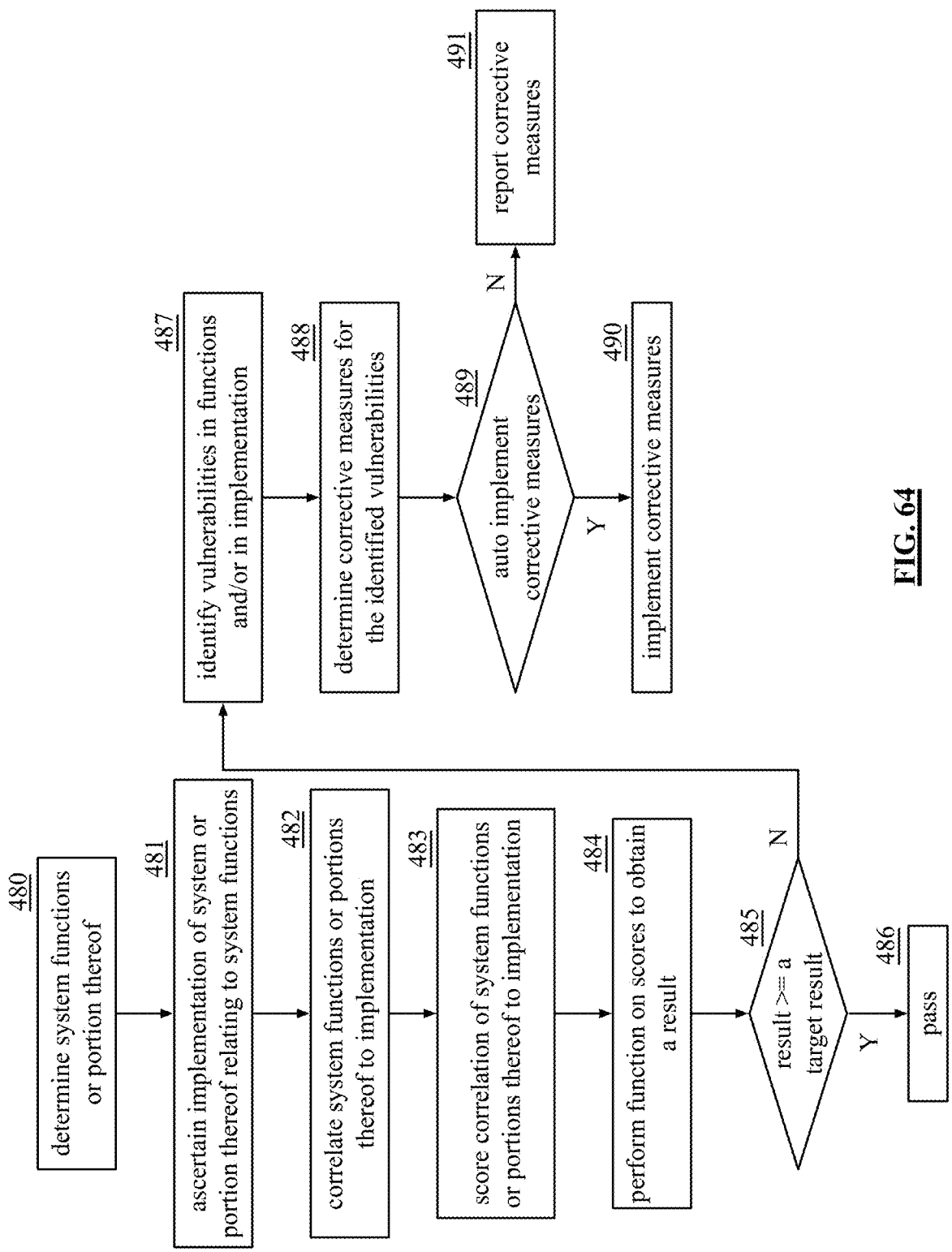
FIG. 64 is a logic diagram of another example of an analysis system analyzing a section of a system in accordance with the present disclosure.

FIG. 64 is a logic diagram of another example of an analysis system analyzing a system or portion thereof. The method begins at step 480 where the analysis system determines system functions of the system, or portion thereof, to analyze. The method continues at step 481 where the analysis system ascertains implementation of the system, or portion thereof (e.g., system functions designed to be, and/or built, in the system). The method continues at step 482 where the analysis system correlates components of the system functions to components of the implementation (e.g., do the system functions of the actual system correlate with system functions design/built to be in the system).

The method continues at step 483 where the analysis system scores the components of the system functions in accordance with the mapped components of the implementation. For example, the analysis system scores how well the system functions of the actual system correlate with system functions design/built to be in the system. The scoring may be based on one or more evaluation metrics (e.g. process, policy, procedure, automation, certification, and/or documentation). The method continues at step 484 where the analysis system performs a function on the scores to obtain a result (e.g., an evaluation rating, identified deficiencies, and/or auto-correction of deficiencies).

The method continues at step 485 where the analysis system determines whether the result is equal or greater than a target result (e.g., the evaluation rating is a certain value). If yes, the method continues at step 486 where the analysis system indicates that the system, or portion thereof, passes this particular test. If the results are less than the target result, the method continues at step 487 where the analysis system identifies vulnerabilities in the physical assets and/or in the implementation.

The method continues at step 488 where the analysis system determines, if possible, corrective measures of the identified vulnerabilities. The method continues at step 489 where the analysis system determines whether the corrective measures can be done automatically. If not, the method continues at step 491 where the analysis system reports the corrective measures. If yes, the method continues at step 490 where the analysis system auto-corrects the vulnerabilities.

Figure 65:
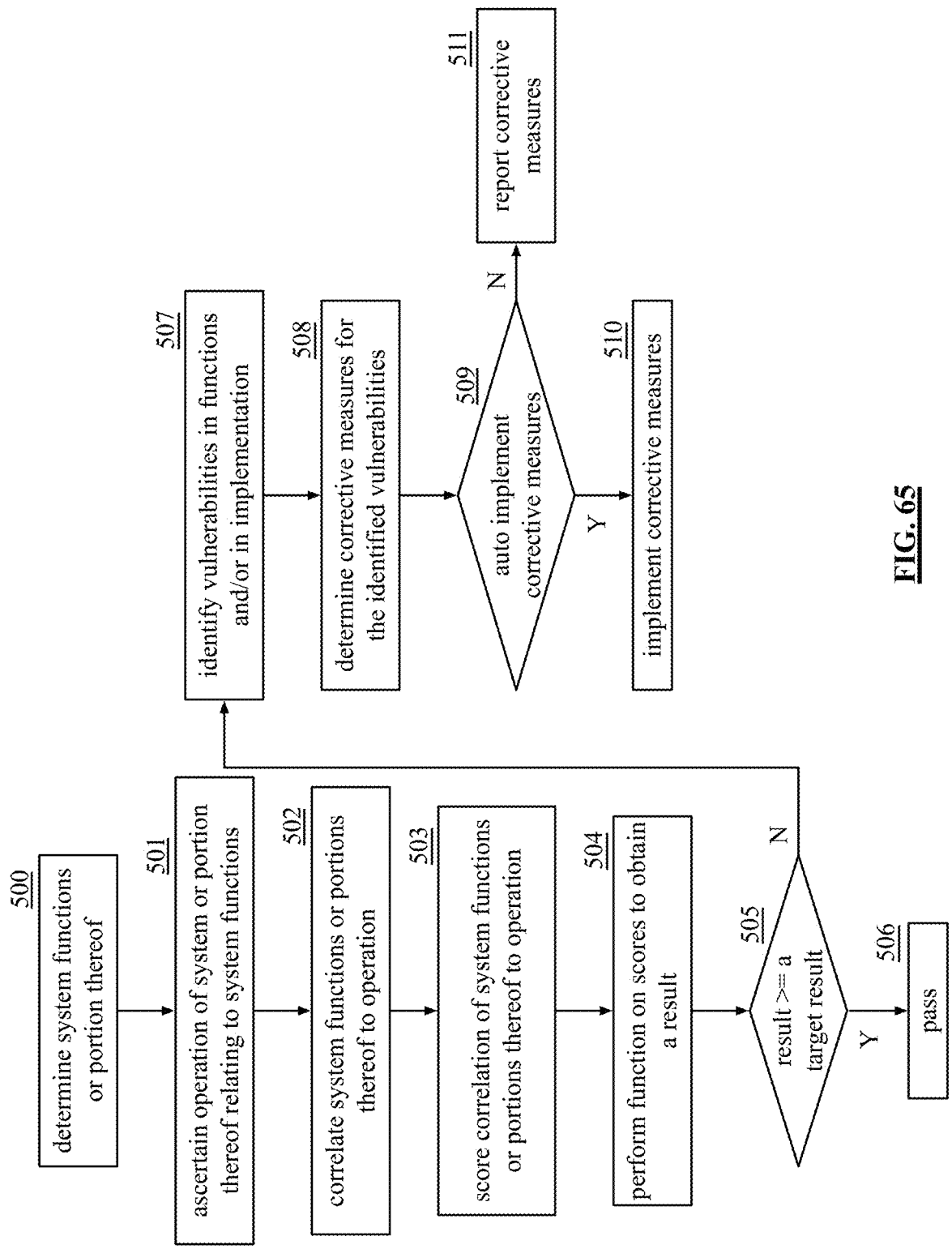
FIG. 65 is a logic diagram of another example of an analysis system analyzing a section of a system in accordance with the present disclosure.

FIG. 65 is a logic diagram of another example of an analysis system analyzing a system or portion thereof. The method begins at step 500 where the analysis system determines system functions of the system, or portion thereof, to analyze. The method continues at step 501 where the analysis system ascertains operation of the system, or portion thereof (e.g., the operations associated with the system functions). The method continues at step 502 where the analysis system correlates components of the system functions to components of operation (e.g., do the identified operations of the system functions correlate with the operations actually performed to provide the system functions).

The method continues at step 503 where the analysis system scores the components of the system functions in accordance with the mapped components of the operation. For example, the analysis system scores how well the identified operations to support the system functions correlate with operations actually performed to support the system functions. The scoring may be based on one or more evaluation metrics (e.g. process, policy, procedure, automation, certification, and/or documentation). The method continues at step 504 where the analysis system performs a function on the scores to obtain a result (e.g., an evaluation rating, identified deficiencies, and/or auto-correction of deficiencies).

The method continues at step 505 where the analysis system determines whether the result is equal or greater than a target result (e.g., the evaluation rating is a certain value). If yes, the method continues at step 506 where the analysis system indicates that the system, or portion thereof, passes this particular test. If the results are less than the target result, the method continues at step 507 where the analysis system identifies vulnerabilities in the physical assets and/or in the operation.

The method continues at step 508 where the analysis system determines, if possible, corrective measures of the identified vulnerabilities. The method continues at step 509 where the analysis system determines whether the corrective measures can be done automatically. If not, the method continues at step 511 where the analysis system reports the corrective measures. If yes, the method continues at step 510 where the analysis system auto-corrects the vulnerabilities.

Figure 66:
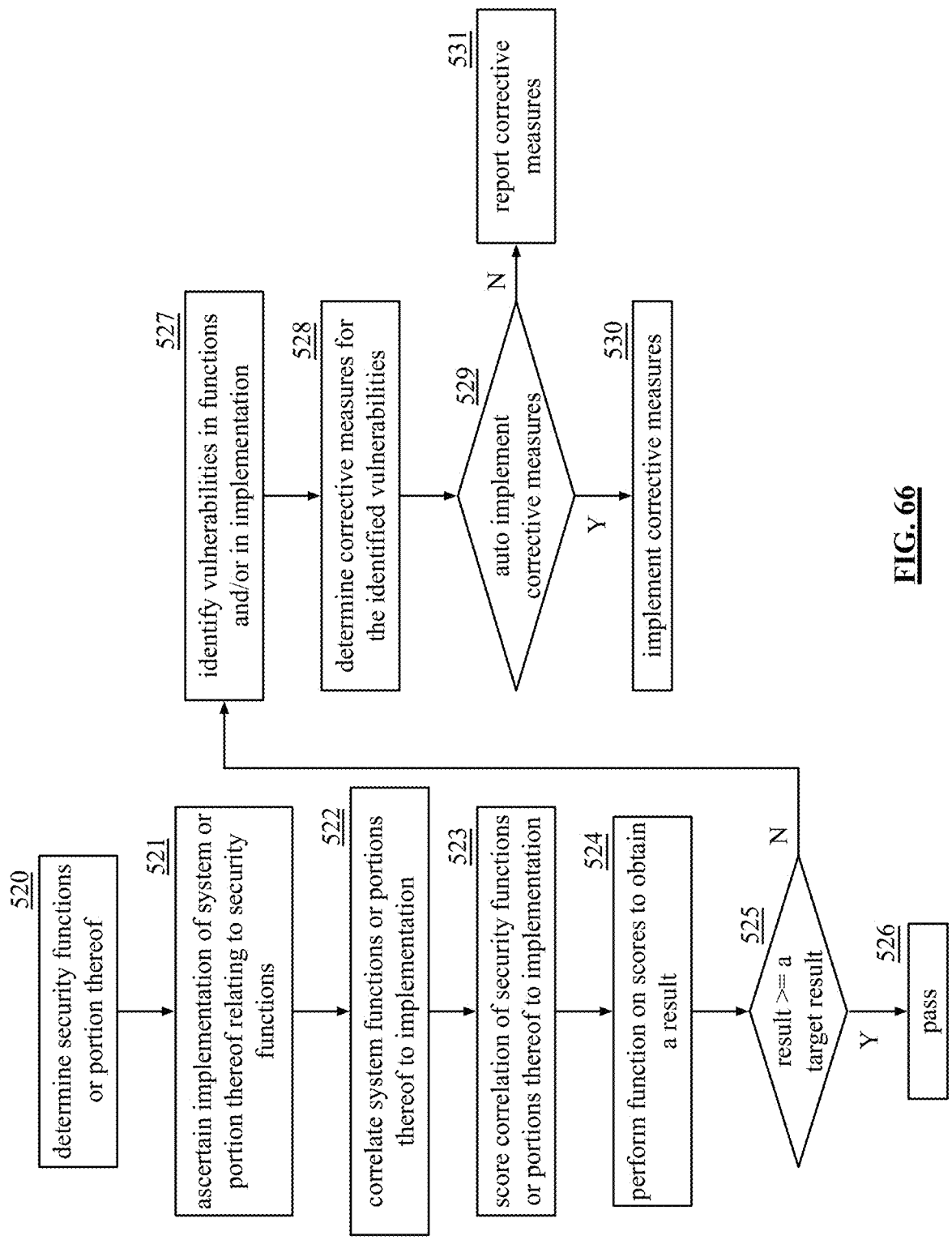
FIG. 66 is a logic diagram of another example of an analysis system analyzing a section of a system in accordance with the present disclosure.

FIG. 66 is a logic diagram of another example of an analysis system analyzing a system or portion thereof. The method begins at step 520 where the analysis system determines security functions of the system, or portion thereof, to analyze. The method continues at step 521 where the analysis system ascertains implementation of the system, or portion thereof (e.g., security functions designed to be, and/or built, in the system). The method continues at step 522 where the analysis system correlates components of the security functions to components of the implementation (e.g., do the security functions of the actual system correlate with security functions design/built to be in the system).

The method continues at step 523 where the analysis system scores the components of the security functions in accordance with the mapped components of the implementation. For example, the analysis system scores how well the security functions of the actual system correlate with security functions design/built to be in the system. The scoring may be based on one or more evaluation metrics (e.g. process, policy, procedure, automation, certification, and/or documentation). The method continues at step 524 where the analysis system performs a function on the scores to obtain a result (e.g., an evaluation rating, identified deficiencies, and/or auto-correction of deficiencies).

The method continues at step 525 where the analysis system determines whether the result is equal or greater than a target result (e.g., the evaluation rating is a certain value). If yes, the method continues at step 526 where the analysis system indicates that the system, or portion thereof, passes this particular test. If the results are less than the target result, the method continues at step 527 where the analysis system identifies vulnerabilities in the physical assets and/or in the implementation.

The method continues at step 528 where the analysis system determines, if possible, corrective measures of the identified vulnerabilities. The method continues at step 529 where the analysis system determines whether the corrective measures can be done automatically. If not, the method continues at step 531 where the analysis system reports the corrective measures. If yes, the method continues at step 530 where the analysis system auto-corrects the vulnerabilities.

Figure 67:
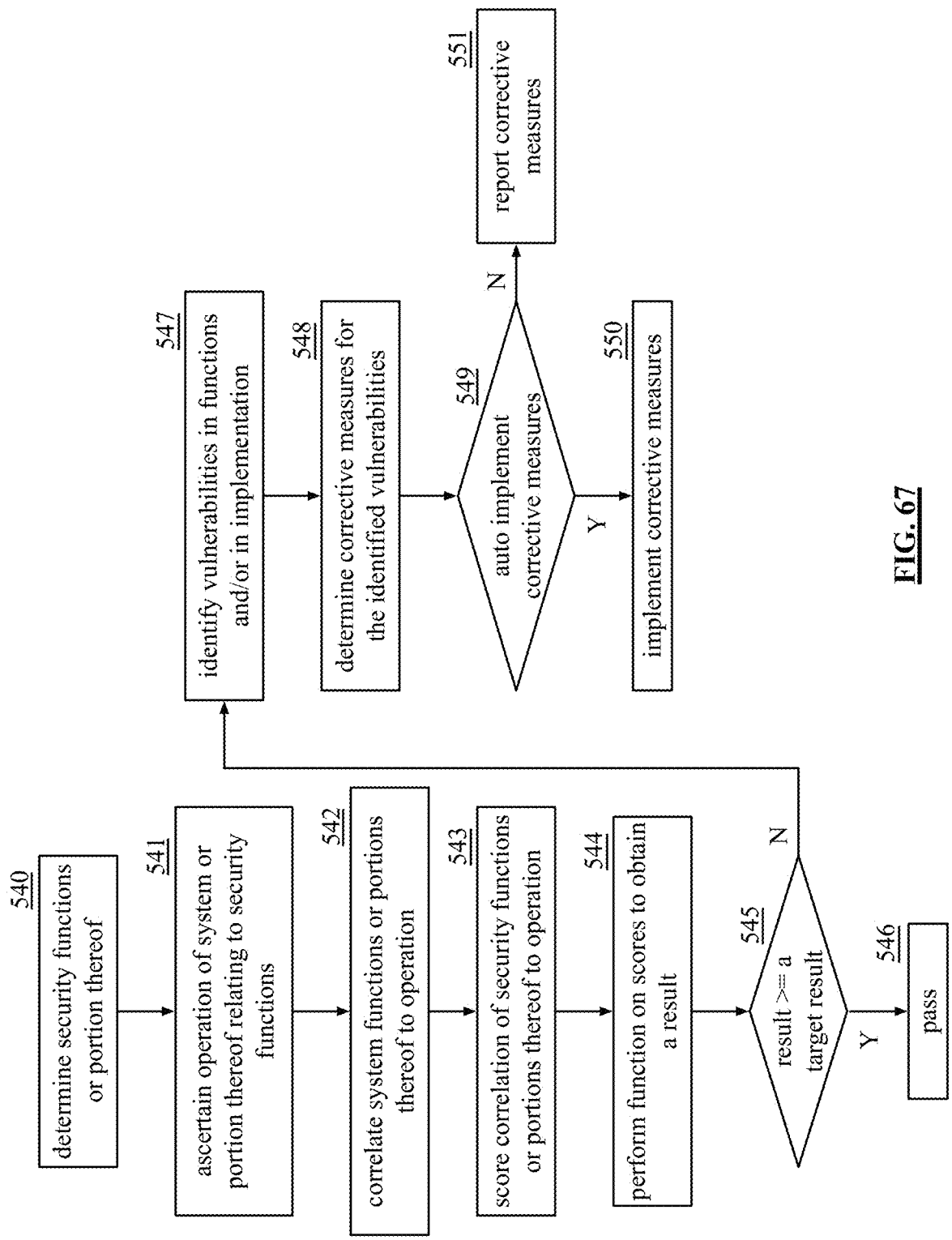
FIG. 67 is a logic diagram of another example of an analysis system analyzing a section of a system in accordance with the present disclosure.

FIG. 67 is a logic diagram of another example of an analysis system analyzing a system or portion thereof. The method begins at step 540 where the analysis system determines security functions of the system, or portion thereof, to analyze. The method continues at step 541 where the analysis system ascertains operation of the system, or portion thereof (e.g., the operations associated with the security functions). The method continues at step 542 where the analysis system correlates components of the security functions to components of operation (e.g., do the identified operations of the security functions correlate with the operations actually performed to provide the security functions).

The method continues at step 543 where the analysis system scores the components of the security functions in accordance with the mapped components of the operation. For example, the analysis system scores how well the identified operations to support the security functions correlate with operations actually performed to support the security functions. The scoring may be based on one or more evaluation metrics (e.g. process, policy, procedure, automation, certification, and/or documentation). The method continues at step 544 where the analysis system performs a function on the scores to obtain a result (e.g., an evaluation rating, identified deficiencies, and/or auto-correction of deficiencies).

The method continues at step 545 where the analysis system determines whether the result is equal or greater than a target result (e.g., the evaluation rating is a certain value). If yes, the method continues at step 546 where the analysis system indicates that the system, or portion thereof, passes this particular test. If the results are less than the target result, the method continues at step 547 where the analysis system identifies vulnerabilities in the physical assets and/or in the operation.

The method continues at step 548 where the analysis system determines, if possible, corrective measures of the identified vulnerabilities. The method continues at step 549 where the analysis system determines whether the corrective measures can be done automatically. If not, the method continues at step 551 where the analysis system reports the corrective measures. If yes, the method continues at step 550 where the analysis system auto-corrects the vulnerabilities.

FIG. 68 is a logic diagram of an example of an analysis system generating an evaluation output. The method begins at step 560 where an analysis unit of the analysis system obtains (e.g., receives, gathers, inputs, and/or other means) a collection of data for a particular evaluation of a system aspect (e.g., what is being evaluated with respect to one or more system elements, one or more system criteria, and/or one or more system modes). The particular evaluation indicates how to evaluate the system aspect by specifying an evaluation aspect, indicates a manner of evaluation by specifying one or more evaluation metrics, indicates an evaluation output.

The method continues at step 561 where the analysis unit acquires (e.g., receives, generates, determines, and/or other means) data analysis parameters regarding the particular evaluation of the system aspect. An example of data analysis parameters were discussed with reference to FIG. 35 and other examples will be discussed with reference to one or more of 89-138.

The method continues at step 562 where the analysis unit determines one or more evaluation perspectives based on the data analysis parameters. An evaluation perspective is understanding (e.g., knowledge and/or intent of system), implementation (e.g., how the system was developed), operation (e.g., how the system fulfills its objectives), or self-analysis (e.g., the system's self-protecting, self-healing, etc.).

The method continues at step 563 where the analysis unit determines one or more evaluation modalities based on the data analysis parameters. An evaluation modality is sufficiency, effectiveness, a measure of use, a measure of appropriate of use, or a measure of consistency of use. Sufficiency is regarding an adequate quantity of data for an evaluation metric (e.g., process, policy, procedure, documentation, certification, and/or automation) associated with the system aspect. Effectiveness is regarding adequate content of the data of an evaluation metric with respect to one or more objectives of the system aspect. The measure of use is regarding the quantity of use of the data of an evaluation metric with respect to supporting the one or more objectives of the system aspect. The measure of appropriate use is regarding the conditions of use of the data of an evaluation metric with respect to supporting the one or more objectives of the system aspect. The measure of consistency of use is regarding the situations of use of data of the evaluation metric with respect to supporting the one or more objectives of the system aspect.

The method continues at step 564 where the analysis unit determines one or more evaluation metrics based on the data analysis parameters. An evaluation metric is one or more processes, one or more policies, one or more procedures; one or more documents, one or more automations, or one or more certifications. The method may further include the analysis unit determining one or more evaluation viewpoints based on the data analysis parameters. An evaluation viewpoint is a disclosed data viewpoint, a discovered data viewpoint, or a desired data viewpoint.

The method continues at step 565 where the analysis unit evaluates the collection of data in accordance with the one or more evaluation metrics, the one or more evaluation perspectives, and the one or more evaluation modalities to produce one or more evaluation outputs. An evaluation output is one or more evaluation ratings, one or more system aspect deficiencies, or one or more auto-corrections of the one or more system aspect deficiencies.

FIG. 69 is a logic diagram of a further example of an analysis system generating an evaluation output when the evaluation modality is a sufficiency modality. The method includes step 566 where the analysis unit quantifies (e.g., counts, verifies via a checklist, or other means) data of the collection of data regarding an evaluation metric to produce quantified data. The method continues at step 567 where the analysis unit determines a reference scale based on an evaluation perspective (e.g., understanding, implementation, operation, and/or self-analysis) of the system aspect for the evaluation metric.

The method continues at step 568 where the analysis unit compares the quantified data with the reference scale to produce an evaluation rating regarding sufficiency of the evaluation metric for the system aspect from the evaluation perspective. In general terms, the sufficiency modality is an evaluation as to whether there are enough policies, processes, procedures, documentation, automation, and/or certifications to support the objectives of the system aspect. Examples of this method will be discussed with reference to one or more subsequent figures.

FIG. 70 is a logic diagram of a further example of an analysis system generating an evaluation output when the evaluation modality is an effectiveness modality. The method includes step 569 where the analysis unit determines a reference scale based on an evaluation perspective (e.g., understanding, implementation, operation, or self-analysis) of the one or more evaluation perspectives and one or more objectives of the system aspect for an evaluation metric. The method continues at step 570 where the analysis unit evaluates data of the collection of data regarding the evaluation metric with respect to the reference scale to produce an evaluation rating regarding how effective the evaluation metric supports the one or more objectives of the system aspect from the evaluation perspective.

In general terms, the effectiveness modality is an evaluation as to whether the system's policies, processes, procedures, documentation, automation, and/or certifications are effective at supporting the objectives of the system aspect from the evaluation perspective. Examples of this method will be discussed with reference to one or more subsequent figures.

FIG. 71 is a logic diagram of a further example of an analysis system generating an evaluation output when the evaluation modality is a measure of use modality. The method includes step 571 where the analysis unit determines a reference scale based on an evaluation perspective of the one or more evaluation perspectives and one or more objectives of the system aspect for an evaluation metric. The method continues at step 572 where the analysis unit evaluates data of the collection of data regarding the evaluation metric with respect to the reference scale to produce an evaluation rating regarding quantity of use of the evaluation metric to support the one or more objectives of the system aspect from the evaluation perspective.

In general terms, the measure of use modality is an evaluation as to whether the quantity of use of the system's policies, processes, procedures, documentation, automation, and/or certifications is adequate (e.g., about right amount of use expected for such a system) to support the objectives of the system aspect from the evaluation perspective.

FIG. 72 is a logic diagram of a further example of an analysis system generating an evaluation output when the evaluation modality is a measure of appropriate use modality. The method includes step 573 where the analysis unit determines a reference scale based on an evaluation perspective of the one or more evaluation perspectives and one or more objectives of the system aspect for an evaluation metric. The method continues at step 574 where the analysis unit evaluates data of the collection of data regarding the evaluation metric with respect to the reference scale to produce an evaluation rating regarding appropriate use of the evaluation metric to support the one or more objectives of the system aspect from the evaluation perspective.

In general terms, the measure of appropriate use modality is an evaluation as to whether the conditions of use of the system's policies, processes, procedures, documentation, automation, and/or certifications is appropriate (e.g., used when expected and not used when not expected) to support the objectives of the system aspect from the evaluation perspective.

FIG. 73 is a logic diagram of a further example of an analysis system generating an evaluation output when the evaluation modality is a measure of consistency of use modality. The method includes step 575 where the analysis unit determines a reference scale based on an evaluation perspective of the one or more evaluation perspectives and one or more objectives of the system aspect for an evaluation metric. The method continues at step 576 where the analysis unit evaluates data of the collection of data regarding the evaluation metric with respect to the reference scale to produce an evaluation rating regarding consistency of use of the evaluation metric to support the one or more objectives of the system aspect from the evaluation perspective.

In general terms, the measure of consistency of use modality is an evaluation as to whether the situations of use of the system's policies, processes, procedures, documentation, automation, and/or certifications is appropriate (e.g., always used of a given situation and never used for a different given situation) to support the objectives of the system aspect from the evaluation perspective.

FIG. 74 is a diagram of an example of an analysis system generating an evaluation output for a selected portion of a system. In this example, the analysis system has three high-level tasks: (1) select a system portion (e.g., system aspect or system sector); (2) determine what's being evaluated for the selected system portion; and (3) determine the level of evaluation to produce an evaluation output. In an example, the analysis system receives inputs to select the system portion, to determine what's being evaluated, and/or to determine the level of evaluation. In another example, the analysis system selects the system portion, determines what's being evaluated, and/or determines the level of evaluation based on the system under test.

In an embodiment, the system portion is selected based on an identifier. For example, the identifier identifies the entire system as the system portion to be evaluated. As another example, the identifier identifies the system portion based on a division of the organization operating the system. As yet another example, the identifier identifies the system portion based on a department of a division of the organization operating the system. As yet another example, the identifier identifies the system portion based on a group of a department of a division of the organization operating the system. As yet another example, the identifier identifies the system portion based on a sub-group of a group of a department of a division of the organization operating the system.

As a further example, the identifier identifies one or more system assets of the system to be the system portion. As a still further example, the identifier identifies one or more system elements of the system to be the system portion, where a system element includes one or more system assets and a system asset is one or more physical assets and/or one or more conceptual assets. As a still further example, the identifier identifies one or more physical assets of the system to be the system portion. As a still further example, the identifier identifies one or more system functions of the system to be the system portion. As a still further example, the identifier identifies one or more security functions of the system to be the system portion.

Having identified the system portion, the analysis determines what's of the system portion is to be evaluated. At a high level, the evaluation options are the evaluation perspectives of understanding (e.g., knowledge and/or intent of the system), implementation (e.g., how the system was developed), and operation (e.g., how the system fulfills its objectives).

For the understanding evaluation perspective, the analysis system can evaluate the understanding of the guidelines; the understanding of the system requirements; the understanding of the system design; the understanding of the system build; the understanding of the system functions; the understanding of the security functions; and/or the understanding of the system assets.

For the implementation evaluation perspective, the analysis system can evaluate the development of the guidelines; the development of the system requirements; the development of the system design; the development of the system build; the development of the system functions; the development of the security functions; and/or the development of the system assets.

For the operation evaluation perspective, the analysis system can evaluate the fulfillment of the guidelines by the system requirements; the fulfillment of the guidelines and/or the system requirements by the system design; the fulfillment of the guidelines, the system requirements, and/or the system design by the system build; the system functions' fulfillment of the guidelines, the system requirements, the system design, and/or the system build; the security functions' fulfillment of the guidelines, the system requirements, the system design, and/or the system build; and/or the system assets' fulfillment of the guidelines, the system requirements, the system design, and/or the system build.

The level of evaluation includes selecting one or more evaluation metrics, selecting one or more evaluation modalities for each selected evaluation metric, and selecting one or more evaluation outputs for the evaluation. The evaluation metrics include process, policy, procedure, documentation, automation, and/or certification. The evaluation modalities include sufficiency, effectiveness, quantity of use, appropriate use, and/or consistency of use. The outputs includes evaluation ratings, identifying deficiencies, and/or auto-correcting deficiencies.

As an example, the system portion is selected to be a particular department. As such, all system assets associated with the particular department are included in the system portion. Continuing with the example, the understanding of the system requirements of the selected system portion is to be evaluated. For this evaluation, all six evaluation metrics will be used and all five evaluation modalities will be used to produce an evaluation rating of understanding (e.g., knowledge and/or intent) of the system requirements for the system assets of the particular department. The resulting evaluation rating may be a combination of a plurality of evaluations ratings, where an evaluation rating of the plurality of evaluation rating is for a specific combination of an evaluation metric and an evaluation modality (e.g., sufficiency of processes, effectiveness of policies, etc.).

Figure 75:
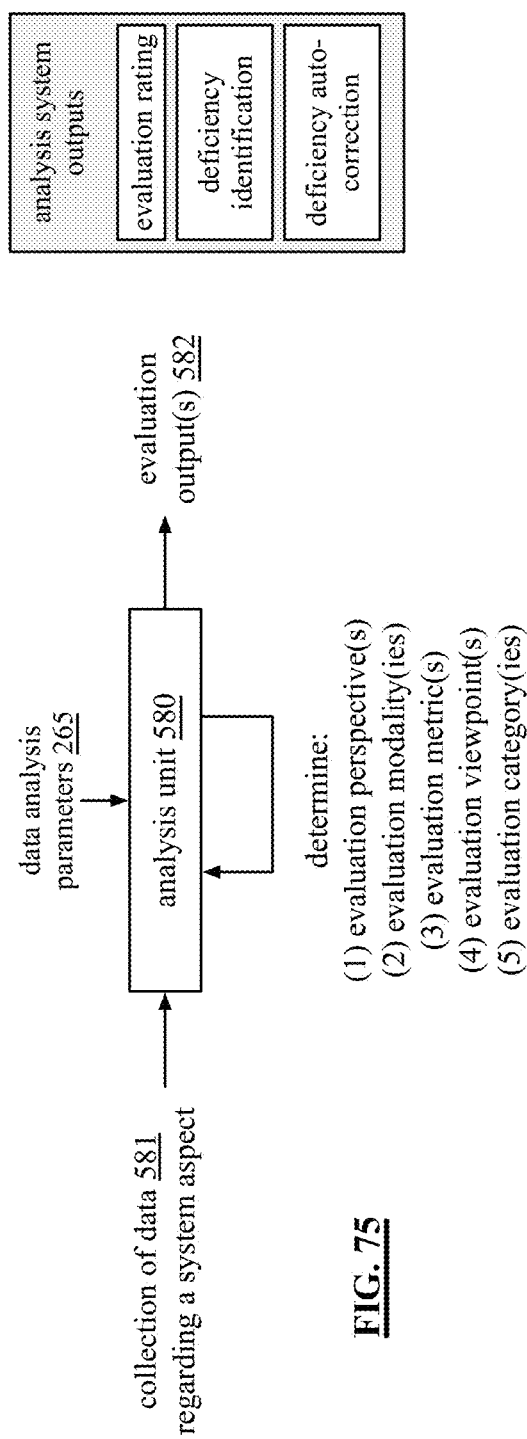
FIG. 75 is a schematic block diagram of an embodiment of an analysis unit of an analysis system in accordance with the present disclosure.

FIG. 75 is a schematic block diagram of an embodiment of an analysis unit 580 of an analysis system 10. The analysis unit 580, which may be one or more processing modules of one or more computing entities, receives a collection of data 581 regarding a system aspect and receives data analysis parameters 265. From the data analysis parameters 265, the analysis unit 580 determines one or more evaluation perspectives, one or more evaluation modalities, one or more evaluation metrics, one or more evaluation viewpoints, and/or one or more evaluation categories.

The analysis unit 580 processes the collection of data 581 in accordance with one or more evaluation perspectives, one or more evaluation modalities, one or more evaluation metrics, one or more evaluation viewpoints, and/or one or more evaluation categories to produce one or more evaluation outputs 582. The collection of data 581 is at least part of the pre-processed data 414 received by the data analysis module 252 of FIG. 35, which, for this embodiment, is at least part of the evaluation unit 580. The collection of data 581, the processing of the evaluation unit 580, the system aspect, the evaluation metrics, and an evaluation aspect will discussed in greater detail with reference to one or more subsequent figures.

Figure 76:
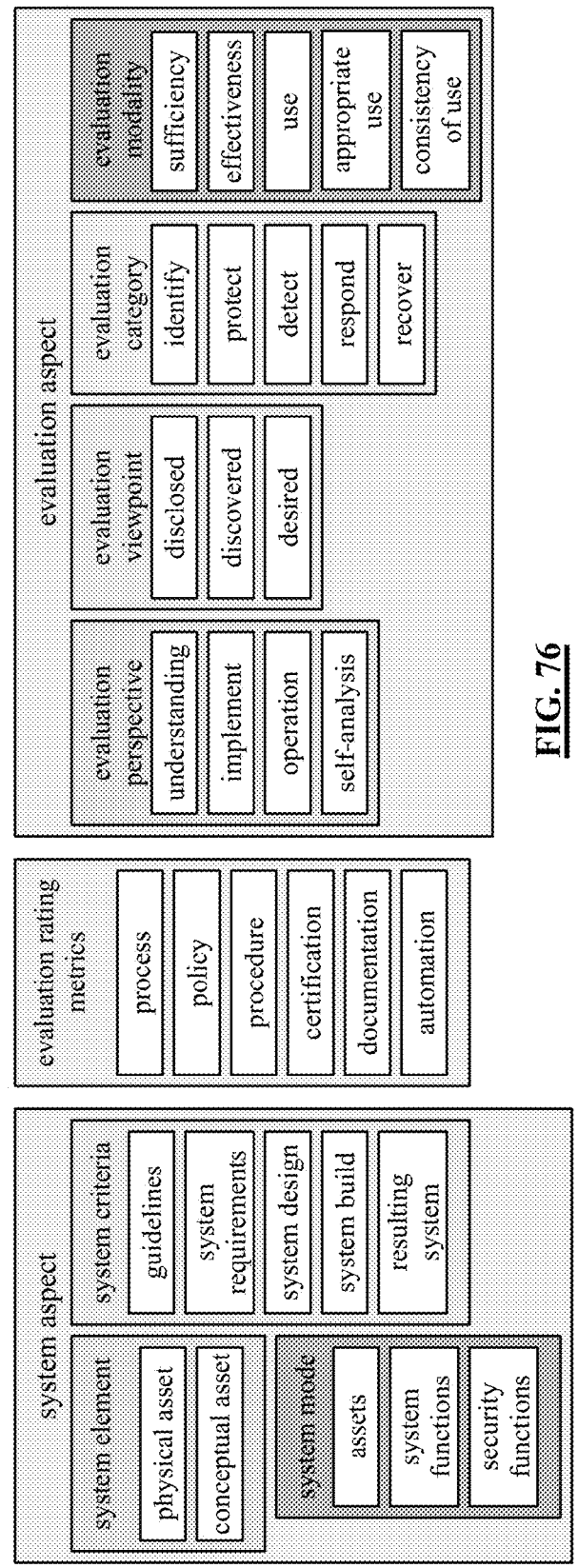
FIG. 76 is a diagram of an example of a system aspect, evaluation rating metrics, and an evaluation aspect of a system in accordance with the present disclosure.

FIG. 76 is a diagram of an example of a system aspect, evaluation rating metrics, and an evaluation aspect of a system. FIG. 76 is similar to FIGS. 43 and 44 and is shown on the same sheet with FIG. 75 for convenience. With respect to the analysis unit 580 and its operations, the system aspect includes one or more system elements, one or more system modes, and/or one or more system criteria; the evaluation metrics includes one or more processes, one or more policies, one or more procedures, one or more documents, one or more certifications, and/or one or more automations; and the evaluation aspect includes one or more evaluation perspectives, one or more evaluation viewpoints, one or more evaluation categories (and/or sub-categories), and/or one or more evaluation modalities.

Figure 77:
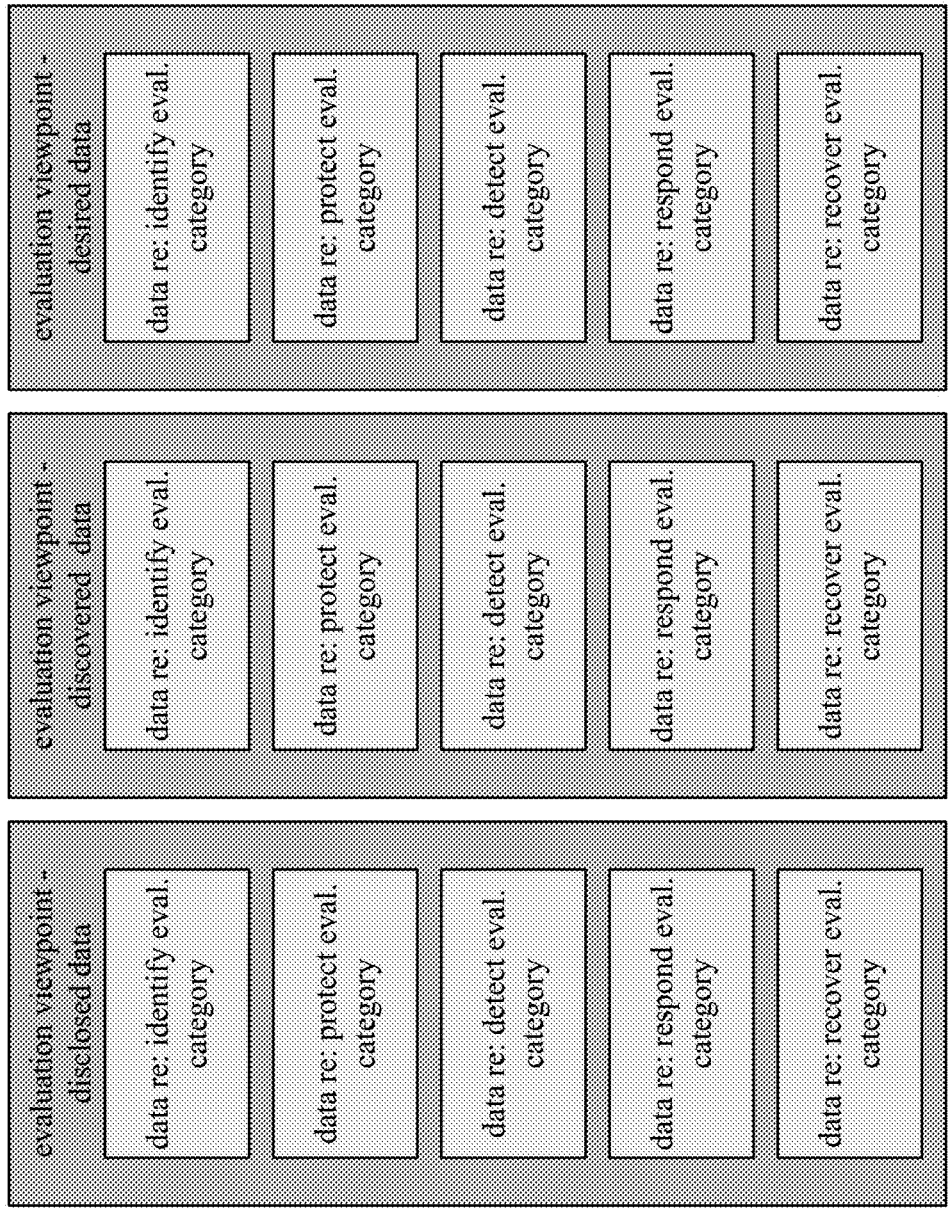
FIG. 77 is a diagram of an example of a collection of data in accordance with the present disclosure.

FIG. 77 is a diagram of an example of a collection of data 581 that is organized based on evaluation viewpoint. A first grouping of data is regarding disclosed data; a second grouping of data is regarding discovered data; and a third grouping is regarding desired data. Within each evaluation viewpoint grouping, the data is further organized based on evaluation categories of identify, protect, detect, respond, and recover.

Each data group based on evaluation categories may be further organized. For example, as shown in FIG. 78, each evaluation category data is further organized based on system element data, system mode data, system criteria data, system objectives data, and evaluation metric data. The data may further still further organized as shown in FIG. 79.

Figure 79:
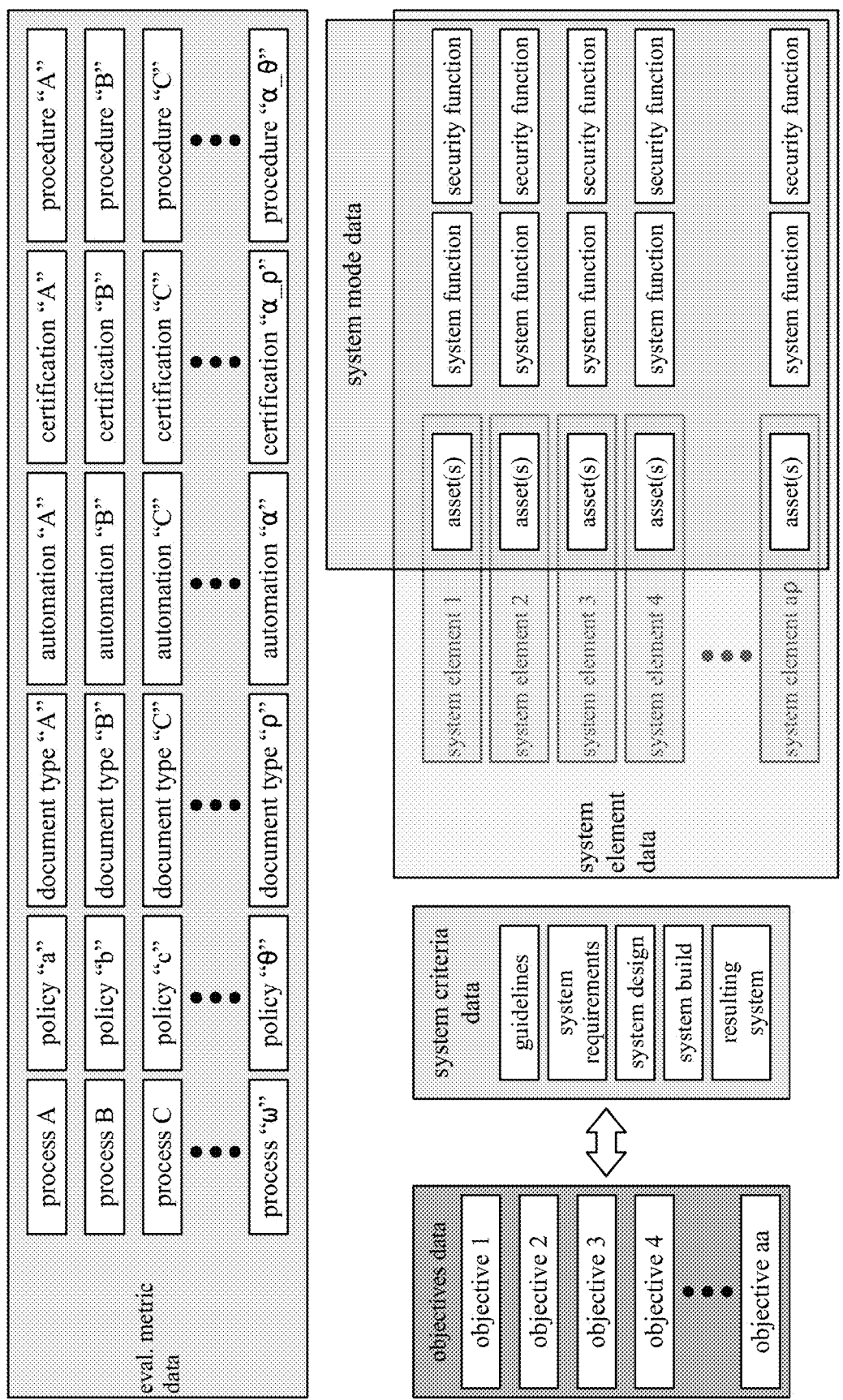
FIG. 79 is a diagram of another example of a collection of data in accordance with the present disclosure.

In FIG. 79, the evaluation metric data is organized by process, policy, document, automation, certification, and procedure. For example, each process relating to an evaluation category of an evaluation viewpoint is an individual piece of data that can evaluated. The objectives data is further organized based on relevant objectives of the evaluation category of the evaluation viewpoint for the system aspect. Similarly, the system criteria data is further organized by guidelines, system requirements, system design, system build, and resulting system.

The system element data is further organized based on system functions, security functions, and/or system elements, which one or more assets (physical and/or conceptual). The system mode data intersects with part of the system element data with respect to assets, system functions, and security functions.

By organizing the data into particular groups, the particular groups can be individually evaluated to produce a specific evaluation rating, which can be combined with other evaluation ratings to produce an overall evaluation rating. For example, an evaluation is conducted on disclosed data regarding the evaluation category of protect for the selected system portion. To perform the evaluation, the analysis system utilizes the evaluation metric data pertaining to protection of the selected system portion, the objective data pertaining to protection of the selected system portion, the system criteria data pertaining to protection of the selected system portion, the system element data pertaining to protection of the selected system portion, and/or the system mode data pertaining to protection of the selected system portion.

Figure 80:
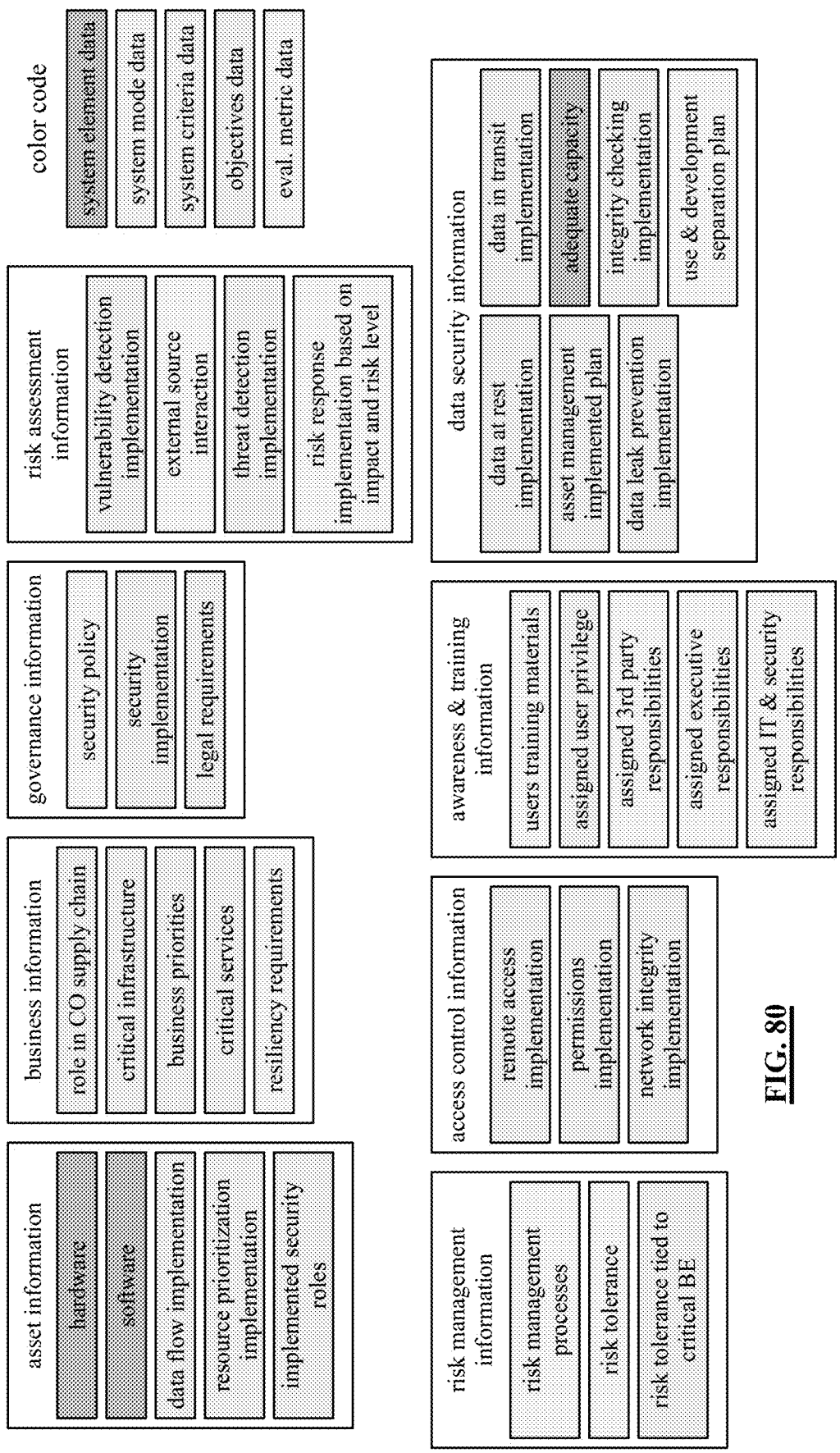
FIG. 80 is a diagram of another example of a collection of data in accordance with the present disclosure.

FIG. 80 is a diagram of an example of at least some data of a collection of data for use by an analysis system to generate an evaluation rating for a system, or portion thereof. For the evaluation category of identify, the sub-categories and/or sub-sub categories are cues for determining what data to gather for an identify evaluation. The sub-categories include asset management, business environment, governance, risk management, access control, awareness & training, and data security.

The asset management sub-category includes the sub-sub categories of HW inventoried, SW inventoried, data flow mapped out, external systems cataloged, resources have been prioritized, and security roles have been established. The business environment sub-category includes the sub-sub categories of supply chain roles defined, industry critical infrastructure identified, business priorities established, critical services identified, and resiliency requirements identified.

The governance sub-category includes the sub-sub categories of security policies are established, security factors aligned, and legal requirements are identified. The risk assessment sub-category includes the sub-sub categories of vulnerabilities identified, external sources are leveraged, threats are identified, business impacts are identified, risk levels are identified, and risk responses are identified. The risk management sub-category includes the sub-sub categories of risk management processes are established, risk tolerances are established, and risk tolerances are tied to business environment.

The access control sub-category includes the sub-sub categories of remote access control is defined, permissions are defined, and network integrity is defined. The awareness & training sub-category includes the sub-sub categories of users are trained, user privileges are known, third party responsibilities are known, executive responsibilities are known, and IT and security responsibilities are known. The data security sub-category includes the sub-sub categories of data at rest protocols are established, data in transit protocols are established, formal asset management protocols are established, adequate capacity of the system is established, data leak prevention protocols are established, integrity checking protocols are established, and use and development separation protocols are established.

The sub-categories and sub-sub categories of other categories may also be used as cues for identifying data to be part of the collection of data. The various sub-categories and sub-sub categories of the other categories are discussed with reference to FIGS. 46-49.

Figure 81:
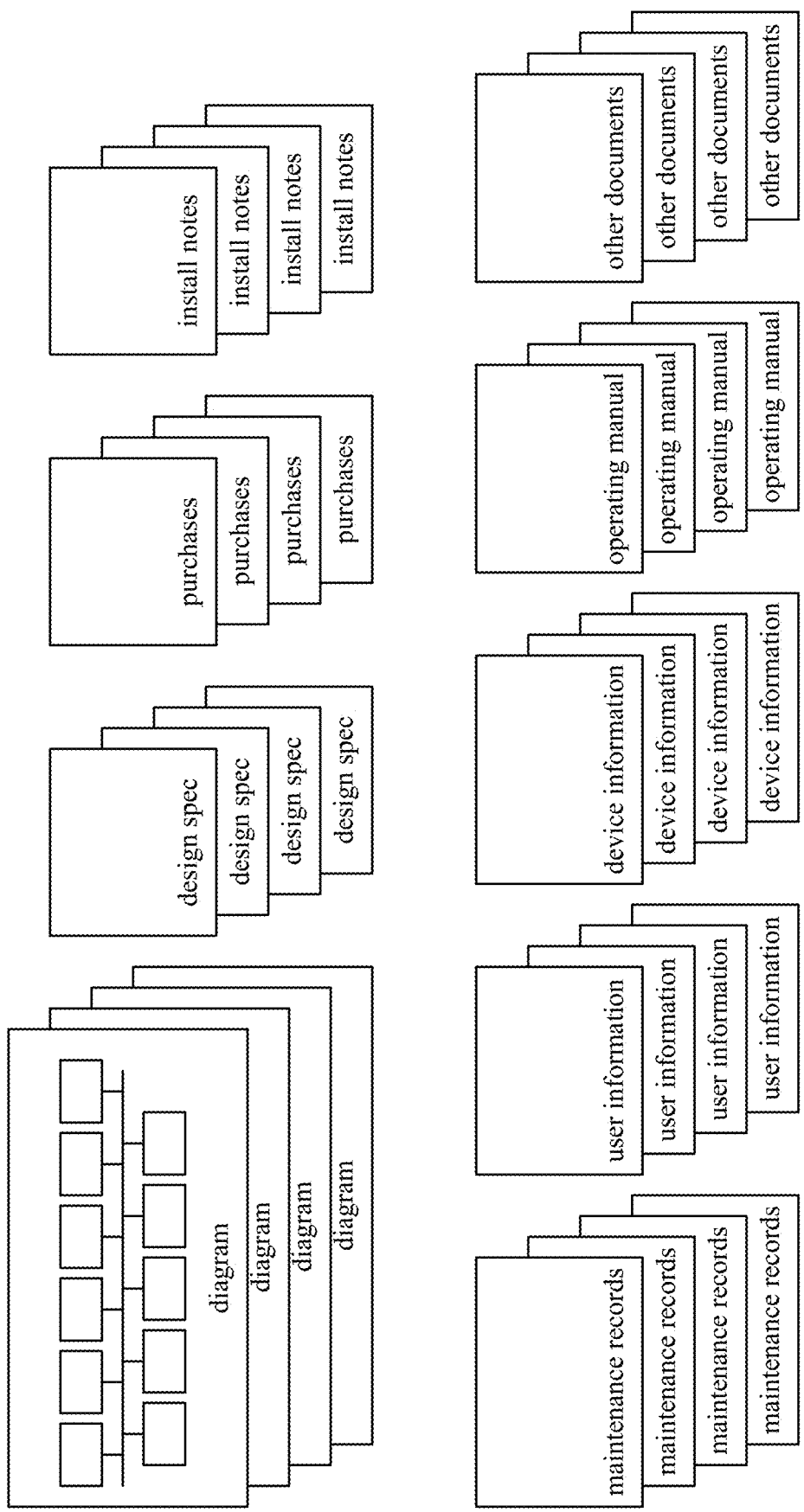
FIG. 81 is a diagram of another example of a collection of data in accordance with the present disclosure.

FIG. 81 is a diagram of another example of at least some data a collection of data for use by an analysis system to generate an evaluation rating for a system, or portion thereof. In this example, the data includes one or more of diagrams, one or more design specifications, one or more purchases, one or more installation notes, one or more maintenance records, one or more user information records, one or more device information records, one or more operating manuals, and/or one or more other documents regarding a system aspect.

A diagram is a data flow diagram, an HLD diagram, an LLD diagram, a DLD diagram, an operation flowchart, a software architecture diagram, a hardware architecture diagram, and/or other diagram regarding, the design, build, and/or operation of the system, or a portion thereof. A design specification is a security specification, a hardware specification, a software specification, a data flow specification, a business operation specification, a build specification, and/or other specification regarding the system, or a portion thereof.

A purchase is a purchase order, a purchase fulfillment document, bill of laden, a quote, a receipt, and/or other information regarding purchases of assets of the system, or a portion thereof. An installation note is a record regarding the installation of an asset of the system, or portion thereof. A maintenance record is a record regarding each maintenance service performed on an asset of the system, or portion thereof.

User information includes affiliation of a user with one or more assets of the system, or portion thereof. User information may also include a log of use of the one or more assets by the user or others. User information may also include privileges and/or restrictions imposed on the use of the one or more assets.

Device information includes an identity for an asset of the system, or portion thereof. A device is identified by vendor information (e.g., name, address, contact person information, etc.), a serial number, a device description, a device model number, a version, a generation, a purchase date, an installation date, a service date, and/or other mechanism for identifying a device.

FIG. 82 is a diagram of another example of at least some data of a collection of data for use by an analysis system to generate an evaluation rating for a system, or portion thereof. In particular, this example illustrates assets of the system, or portion thereof, that would be part of the data and/or engaged with to obtain further information, which may become part of the collection of data.

As shown, asset information of the system, or portion thereof, includes a list of network devices (e.g., hardware and/or software), a list of networking tools, a list of security devices (e.g., hardware and/or software), a list of security tools, a list of storage devices (e.g., hardware and/or software), a list of servers (e.g., hardware and/or software), a list of user applications, a list of user devices (e.g., hardware and/or software), a list of design tools, an list of system applications, and/or a list of verification tools. Recall that a tool is a program that functions to develop, repair, and/or enhance other programs and/or hardware of the system, or portion thereof.

Each list of devices includes vendor information (e.g., name, address, contact person information, etc.), a serial number, a device description, a device model number, a version, a generation, a purchase date, an installation date, a service date, and/or other mechanism for identifying a device. Each list of software includes vendor information (e.g., name, address, contact person information, etc.), a serial number, a software description, a software model number, a version, a generation, a purchase date, an installation date, a service date, and/or other mechanism for identifying software. Each list of tools includes vendor information (e.g., name, address, contact person information, etc.), a serial number, a tool description, a tool model number, a version, a generation, a purchase date, an installation date, a service date, and/or other mechanism for identifying a tool.

FIG. 83 is a diagram of another example of at least some data of a collection of data for use by an analysis system to generate an evaluation rating for a system, or portion thereof. In particular, this example illustrates a list of user devices in a tabular form. The list includes a plurality of columns for various pieces of information regarding a user device and a plurality of rows; one row for each user device.

The columns include a user ID, a user level, a user role, hardware (HW) information, an IP address, user application software (SW) information, device application SW information, device use information, and/or device maintenance information. The user ID includes an individual identifier if a user and may further include an organization ID, a division ID, a department ID, a group ID, and/or a sub-group ID. The user level will be described in greater detail with reference to FIG. 84 and the user role will be described in greater detail with reference to FIG. 85.

The HW information field stores information regarding the hardware of the device. For example, the HW information includes information regarding a computing device such as vendor information, a serial number, a description of the computing device, a computing device model number, a version of the computing device, a generation of the computing device, and/or other mechanism for identifying a computing device. The HW information may further store information regarding the components of the computing device such as the motherboard, the processor, video graphics card, network card, connection ports, and/or memory.

The user application SW information field stores information regarding the user applications installed on the user's computing device. For example, the user application SW information includes information regarding a SW program (e.g., spreadsheet, word processing, database, email, etc.) such as vendor information, a serial number, a description of the program, a program model number, a version of the program, a generation of the program, and/or other mechanism for identifying a program. The device SW information includes similar information, but for device applications (e.g., operating system, drivers, security, etc.).

The device use data field stores data regarding the use of the device (e.g., use of the computing device and software running on it). For example, the device use data includes a log of use of a user application, or program (e.g., time of day, duration of use, date information, etc.). As another example, the device use data includes a log of data communications to and from the device. As yet another example, the device use data includes a log of network accesses. As a further example, the device use data includes a log of server access (e.g., local and/or remote servers). As still further example, the device use data includes a log of storage access (e.g., local and/or remote memory).

The maintenance field stores data regarding the maintenance of the device and/or its components. As an example, the maintenance data includes a purchase date, purchase information, an installation date, installation notes, a service date, services notes, and/or other maintenance data of the device and/or its components.

FIG. 84 is a diagram of another example of user levels of the device information of FIG. 83. In this illustration there are three user levels (e.g., C-Level, director level, general level). In practice, there may be more or less user levels than three. For each user level there are options for data access privileges, data access restrictions, network access privileges, network access restrictions, server access privileges, server access restrictions, storage access privileges, storage access restrictions, required user applications, required device applications, and/or prohibited user applications.

FIG. 85 is a diagram of another example of user roles of the device information of FIG. 83. In this illustration there are four user roles (e.g., project manager, engineer, quality control, administration). In practice, there may be more or less user roles than four. For each user role there are options for data access privileges, data access restrictions, network access privileges, network access restrictions, server access privileges, server access restrictions, storage access privileges, storage access restrictions, required user applications, required device applications, and/or prohibited user applications.

Figure 86:
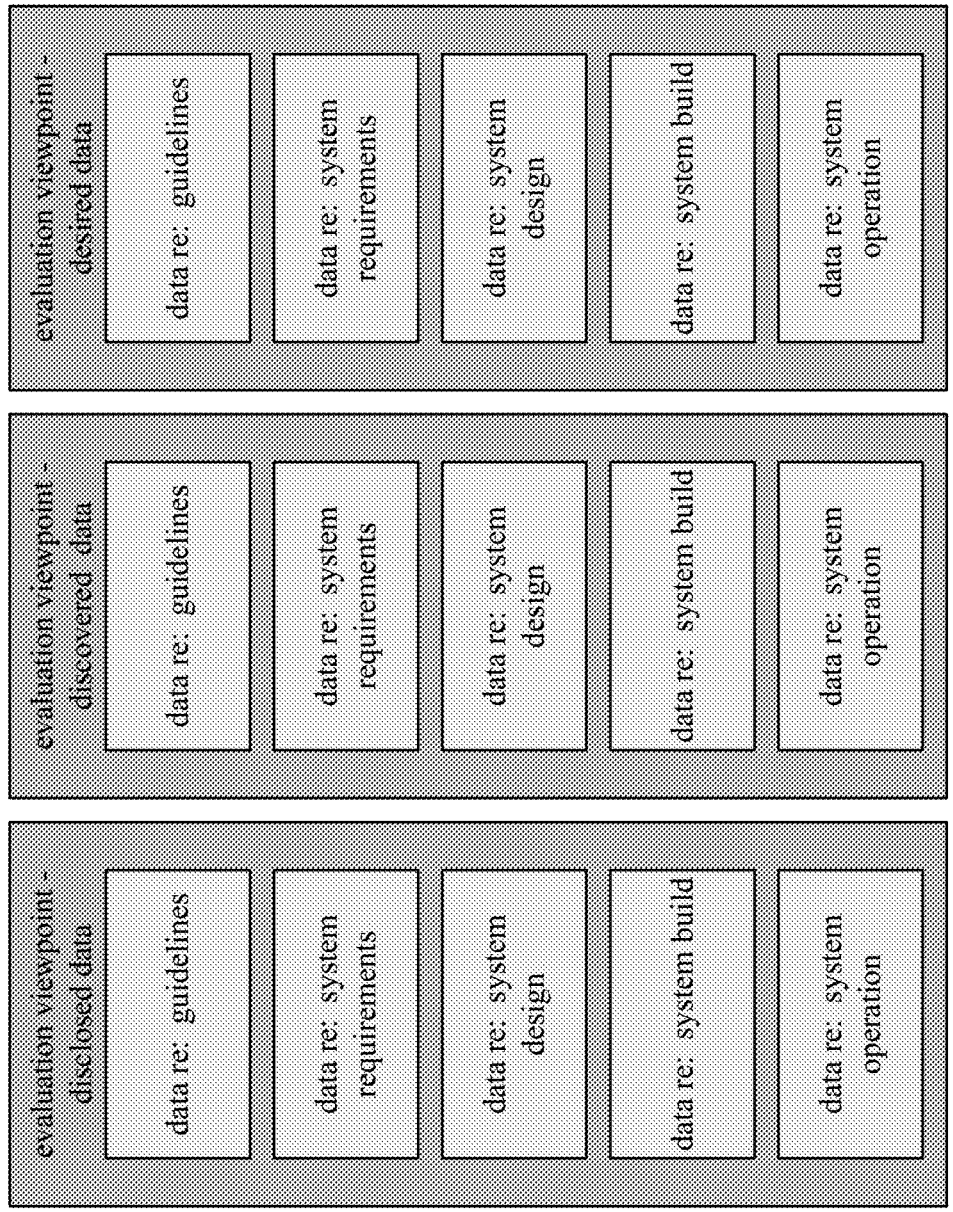
FIG. 86 is a diagram of another example of a collection of data in accordance with the present disclosure.

FIG. 86 is a diagram of another example of a collection of data 581 that is organized based on evaluation viewpoint. A first grouping of data is regarding disclosed data; a second grouping of data is regarding discovered data; and a third grouping is regarding desired data. Within each evaluation viewpoint grouping, the data is further organized based on system criteria of guidelines, system requirements, design, build, and/or operation of the resulting system. The collection of data may be further organized as shown in FIG. 87. In FIG. 87 each system criteria is further organized by system element, system model, evaluation category, objectives, and/or evaluation metric.

Figure 88:
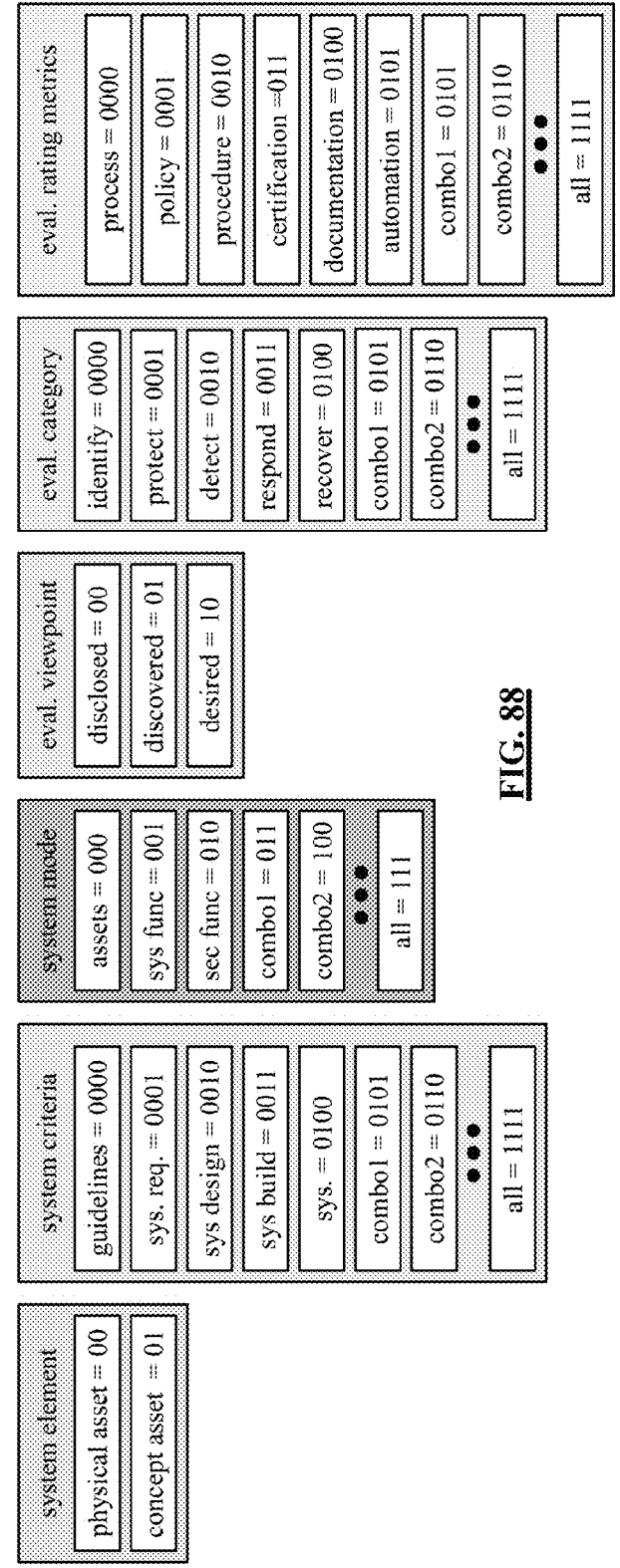
FIG. 88 is a diagram of another example of a collection of data in accordance with the present disclosure.

FIG. 88 is a diagram of an example of a table for storing at least some data of a collection of data. The table includes a plurality of columns and a plurality of rows. The rows include a header row and a row for each piece of data being stored. The columns include a name field, a record number field, a system element ID field, a system criteria ID field, a system mode ID field, an evaluation viewpoint ID field, an evaluation category ID field (which could include sub-category identifiers and/or sub-sub category identifies), an evaluation metric ID field, and a data field.

Each of the record number field, the system element ID field, the system criteria ID field, the system mode ID field, the evaluation viewpoint ID field, the evaluation category ID field, and the evaluation metric ID field may use a coding scheme to specifically identify the appropriate data for the field. As an example, a system element includes one or more system assets which include one or more physical and conceptual assets (e.g., a physical asset (code 00) or a conceptual asset (code 01)). Thus, the system element field for each piece of data would indicate a physical asset or a conceptual asset. As another example, the system criteria field could use the following code structure:

0000 for guidelines;
0001 for system requirements;
0010 for system design;
0011 for system build;
0100 for the resulting system;
1111 for all of the system criteria;
0101 for a $1^{st}$ combination (e.g., design and build); and so on.

With such an organizational structure, data can be retrieved in a variety of ways to support a variety of evaluation analysis. For example, an evaluation regarding the processes to develop guidelines, data having a system criteria code of 0000 and an evaluation metric code of 0000 can be readily retrieved and evaluated.

Figure 89:
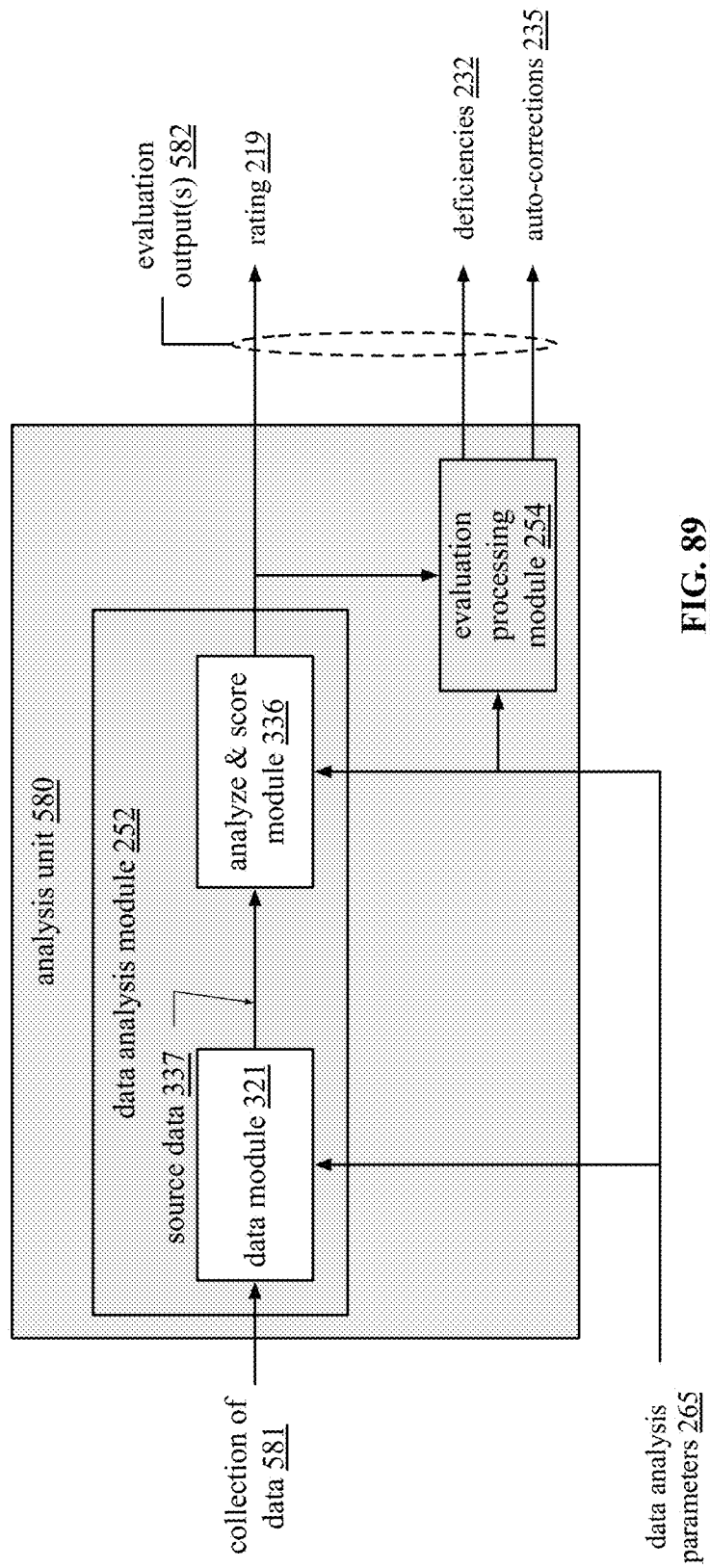
FIG. 89 is a schematic block diagram of another embodiment of an analysis unit in accordance with the present disclosure.

FIG. 89 is a schematic block diagram of another embodiment of an analysis unit 580 that includes the data analysis module 252 and the evaluation processing module 254 of FIG. 35. The data analysis module 252 includes a data module 321 and an analyze & score module 336.

In an example, the data module 321 outputs source data 337 of the collection of data 581 in accordance with the data analysis parameters. An example of this was discussed with reference to FIG. 41. The analyze & score module 336 generates one or more evaluation ratings 219 based on the source data 337 and in accordance with the data analysis parameters 265. Further examples of this will be discussed with reference to one or more of the subsequent figures.

The evaluation processing module 254 processes the rating(s) 219 in accordance with the data analysis parameters 265 to produce deficiencies 232 and/or auto-corrections 235. An example of this was discussed with reference to FIG. 35.

Figure 90:
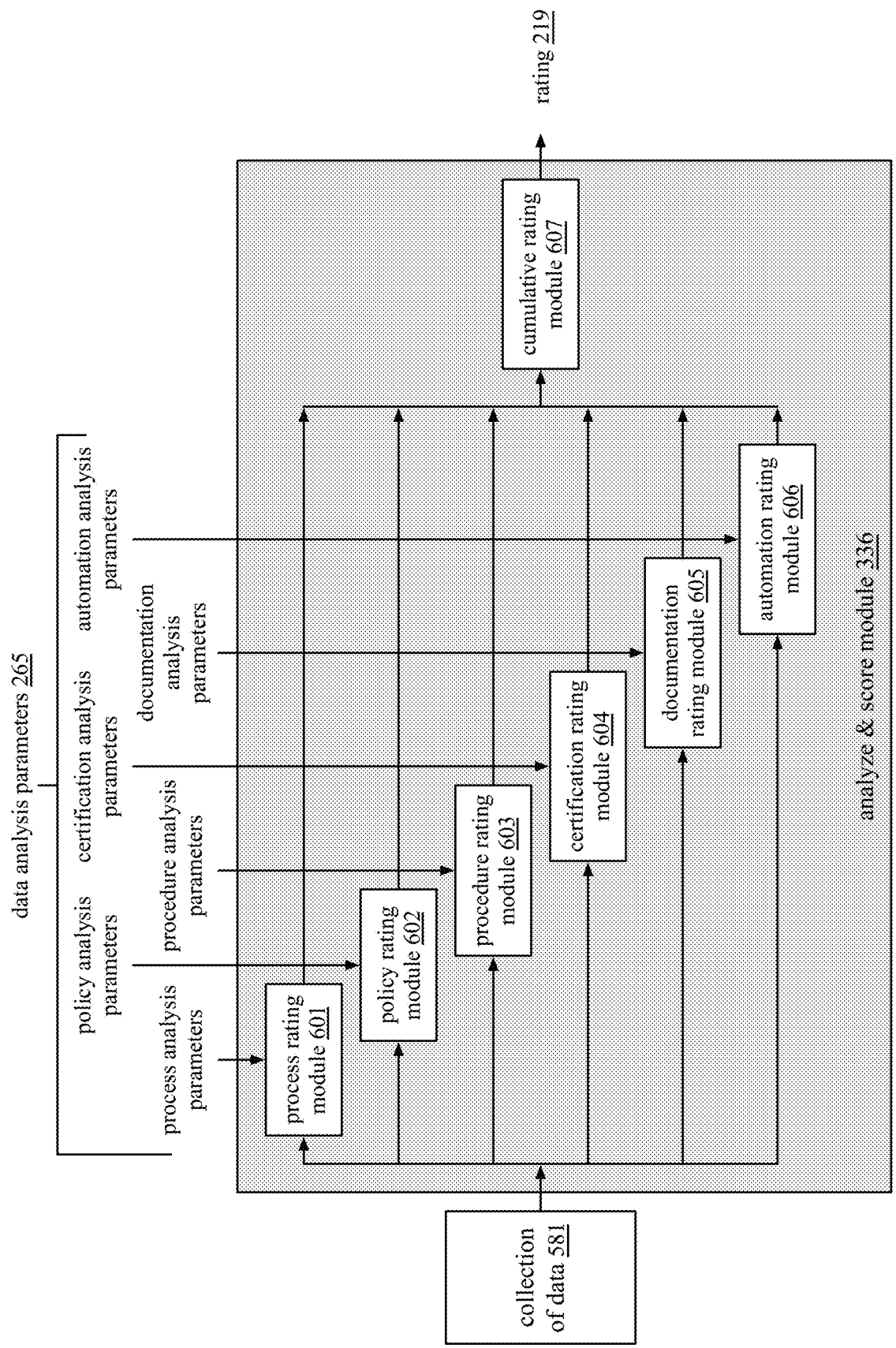
FIG. 90 is a schematic block diagram of an embodiment of an analyze & score module in accordance with the present disclosure.

FIG. 90 is a schematic block diagram of an embodiment of an analyze & score module 336 that includes a process rating module 601, a policy rating module 602, a procedure rating module 603, a certification rating module 604, a documentation rating module 605, an automation rating module 606, and a cumulative rating module 607. In general, the analyze & score module generates an evaluation rating 219 from a collection of data 581 based on data analysis parameters 265.

The process rating module 601 evaluates the collection of data 581, or portion thereof, (e.g., at least part of the pre-processed data of FIG. 35) to produce a process evaluation rating in accordance with process analysis parameters of the data analysis parameters 265. The process analysis parameters indicate how the collection of data is to be evaluated with respect to processes of the system, or portion thereof. As an example, the process analysis parameters include:
- an instruction to compare processes of the data 581 with a list of processes the system, or portion thereof, should have;
- an instruction to count the number of processes of data 581 and compare it with a quantity of processes the system, or portion thereof, should have;
- an instruction to determine last revisions of processes of data 581 and/or to determine an age of last revisions;
- an instruction to determine frequency of use of processes of data 581;
- an instruction to determine a volume of access of processes of data 581;
- an instruction to evaluate a process of data 581 with respect to a checklist regarding content of the process (e.g., what should be in the process);
- a scaling factor based on the size of the system, or portion thereof;
- a scaling factor based on the size of the organization;
- an instruction to compare a balance of local processes with respect to system-wide processes;
- an instruction to compare topics of the processes of data 581 with desired topics for processes (which may be at least partially derived from the evaluation category and/or sub-categories); and/or
- an instruction to evaluate language use within processes of data 581.

The process rating module 601 can rate the data 581 at three or more levels. The first level is that the system has processes, the system has the right number of processes, and/or the system has processes that address the right topics. The second level digs into the processes themselves to determine whether they are adequately covering the requirements of the system. The third level evaluates how well the processes are used and how well they are adhered to.

As an example, the process rating module 601 generates a process evaluation rating based on a comparison of the processes of the data 581 with a list of processes the system, or portion thereof, should have. If all of the processes on the list are found in the data 581, then the process evaluation rating is high. The fewer processes on the list that found in the data 581, the lower the process evaluation rating will be.

As another example, the process rating module 601 generates a process evaluation rating based on a determination of the last revisions of processes of data 581 and/or to determine an age of last revisions. As a specific example, if processes are revised at a rate that corresponds to a rate of revision in the industry, then a relatively high process evaluation rate would be produced. As another specific example, if processes are revised at a much lower rate that corresponds to a rate of revision in the industry, then a relatively low process evaluation rate would be produced (implies a lack of attention to the processes). As yet another specific example, if processes are revised at a much higher rate that corresponds to a rate of revision in the industry, then a relatively low process evaluation rate would be produced (implies processes are inaccurate, incomplete, and/or created with a lack of knowledge as to what's needed).

As another example, the process rating module 601 generates a process evaluation rating based on a determination of frequency of use of processes of data 581. As a specific example, if processes are used at a frequency (e.g., x times per week) that corresponds to a frequency of use in the industry, then a relatively high process evaluation rate would be produced. As another specific example, if processes are used at a much lower frequency that corresponds to a frequency of use in the industry, then a relatively low process evaluation rate would be produced (implies a lack of using and adhering to the processes). As yet another specific example, if processes are used at a much higher frequency that corresponds to a frequency of use in the industry, then a relatively low process evaluation rate would be produced (implies processes are inaccuracy, incompleteness, and/or difficult to use).

As another example, the process rating module 601 generates a process evaluation rating based on an evaluation of a process of data 581 with respect to a checklist regarding content of the policy (e.g., what should be in the policy, which may be based, at least in part, on an evaluation category, sub-category, and/or sub-sub category). As a specific example, the topics contained in the process of data 581 is compared to a checklist of desired topics for such a process. If all of the topics on the checklist are found in the process of data 581, then the process evaluation rating is high. The fewer topics on the checklist that found in the process of data 581, the lower the process evaluation rating will be.

As another example, the process rating module 601 generates a process evaluation rating based on a comparison of balance between local processes of data 581 and system-wide processes of data 581. As a specific example, most security processes should be system-wide. Thus, if there are a certain percentage (e.g., less than 10%) of security processes that are local, then a relatively high process evaluation rating will be generated. Conversely, the greater the percentage of local security processes, the lower the process evaluation rating will be.

As another example, the process rating module 601 generates a process evaluation rating based on evaluation of language use within processes of data 581. As a specific example, most security requirements are mandatory. Thus, if the policy includes too much use of the word "may" (which implies optionality) versus the word "shall (which implies must), the lower the process evaluation rating will be.

The process rating module 601 may perform a plurality of the above examples of process evaluation to produce a plurality of process evaluation ratings. The process rating module 601 may output the plurality of the process evaluation ratings to the cumulative rating module 607. Alternatively, the process rating module 601 may perform a function (e.g., a weight average, standard deviation, statistical analysis, etc.) on the plurality of process evaluation ratings to produce a process evaluation rating that's provided to the cumulative rating module 607.

The policy rating module 602 evaluates the collection of data 581, or portion thereof, (e.g., pre-processed data of FIG. 35) to produce a policy evaluation rating in accordance with policy analysis parameters of the data analysis parameters 265. The policy analysis parameters indicate how the collection of data is to be evaluated with respect to policies of the system, or portion thereof. As an example, the policy analysis parameters include:

an instruction to compare policies of the data 581 with a list of policies the system, or portion thereof, should have;

an instruction to count the number of policies of data 581 and compare it with a quantity of policies the system, or portion thereof, should have;

an instruction to determine last revisions of policies of data 581 and/or to determine an age of last revisions;

an instruction to determine frequency of use of policies of data 581;

an instruction to determine a volume of access of policies of data 581;

an instruction to evaluate a policy of data 581 with respect to a checklist regarding content of the policy (e.g., what should be in the policy);

a scaling factor based on the size of the system, or portion thereof;

a scaling factor based on the size of the organization;

an instruction to compare a balance of local policies with respect to system-wide policies;

an instruction to compare topics of the policies of data 581 with desired topics for policies (which may be at least partially derived from the evaluation category and/or sub-categories); and/or an instruction to evaluate language use within policies of data 581.

The policy rating module 602 can rate the data 581 at three or more levels. The first level is that the system has policies, the system has the right number of policies, and/or the system has policies that address the right topics. The second level digs into the policies themselves to determine whether they are adequately covering the requirements of the system. The third level evaluates how well the policies are used and how well they are adhered to.

The procedure rating module 603 evaluates the collection of data 581, or portion thereof, (e.g., pre-processed data of FIG. 35) to produce a procedure evaluation rating in accordance with procedure analysis parameters of the data analysis parameters 265. The procedure analysis parameters indicate how the collection of data is to be evaluated with respect to procedures of the system, or portion thereof. As an example, the procedure analysis parameters include:

an instruction to compare procedures of the data 581 with a list of procedures the system, or portion thereof, should have;

an instruction to count the number of procedures of data 581 and compare it with a quantity of procedures the system, or portion thereof, should have;

an instruction to determine last revisions of procedures of data 581 and/or to determine an age of last revisions;

an instruction to determine frequency of use of procedures of data 581;

an instruction to determine a volume of access of procedures of data 581;

an instruction to evaluate a procedure of data 581 with respect to a checklist regarding content of the procedure (e.g., what should be in the procedure);

a scaling factor based on the size of the system, or portion thereof;

a scaling factor based on the size of the organization;

an instruction to compare a balance of local procedures with respect to system-wide procedures;

an instruction to compare topics of the procedures of data 581 with desired topics for procedures (which may be at least partially derived from the evaluation category and/or sub-categories); and/or an instruction to evaluate language use within procedures of data 581.

The procedure rating module 603 can rate the data 581 at three or more levels. The first level is that the system has procedures, the system has the right number of procedures, and/or the system has procedures that address the right topics. The second level digs into the procedures themselves to determine whether they are adequately covering the requirements of the system. The third level evaluates how well the procedures are used and how well they are adhered to.

The certification rating module 604 evaluates the collection of data 581, or portion thereof, (e.g., pre-processed data of FIG. 35) to produce a certification evaluation rating in accordance with certification analysis parameters of the data analysis parameters 265. The certification analysis parameters indicate how the collection of data is to be evaluated with respect to certifications of the system, or portion thereof. As an example, the certification analysis parameters include:

an instruction to compare certifications of the data 581 with a list of certifications the system, or portion thereof, should have;

an instruction to count the number of certifications of data 581 and compare it with a quantity of certifications the system, or portion thereof, should have;

an instruction to determine last revisions of certifications of data 581 and/or to determine an age of last revisions;

an instruction to evaluate a certification of data 581 with respect to a checklist regarding content of the certification (e.g., what should be certified and/or how it should be certified);

a scaling factor based on the size of the system, or portion thereof;

a scaling factor based on the size of the organization; and an instruction to compare a balance of local certifications with respect to system-wide certifications.

The certification rating module 603 can rate the data 581 at three or more levels. The first level is that the system has certifications, the system has the right number of certifications, and/or the system has certifications that address the right topics. The second level digs into the certifications themselves to determine whether they are adequately covering the requirements of the system. The third level evaluates how well the certifications are maintained and updated.

The documentation rating module 603 evaluates the collection of data 581, or portion thereof, (e.g., pre-processed data of FIG. 35) to produce a documentation evaluation rating in accordance with documentation analysis parameters of the data analysis parameters 265. The documentation analysis parameters indicate how the collection of data is to be evaluated with respect to documentation of the system, or portion thereof. As an example, the documentation analysis parameters include:

- an instruction to compare documentation of the data 581 with a list of documentation the system, or portion thereof, should have;
- an instruction to count the number of documentation of data 581 and compare it with a quantity of documentation the system, or portion thereof, should have;
- an instruction to determine last revisions of documentation of data 581 and/or to determine an age of last revisions;
- an instruction to determine frequency of use and/or creation of documentation of data 581;
- an instruction to determine a volume of access of documentation of data 581;
- an instruction to evaluate a document of data 581 with respect to a checklist regarding content of the document (e.g., what should be in the document);
- a scaling factor based on the size of the system, or portion thereof;
- a scaling factor based on the size of the organization;
- an instruction to compare a balance of local documents with respect to system-wide documents;
- an instruction to compare topics of the documentation of data 581 with desired topics for documentation (which may be at least partially derived from the evaluation category and/or sub-categories); and/or
- an instruction to evaluate language use within documentation of data 581.

The documentation rating module 605 can rate the data 581 at three or more levels. The first level is that the system has documentation, the system has the right number of documents, and/or the system has documents that address the right topics. The second level digs into the documents themselves to determine whether they are adequately covering the requirements of the system. The third level evaluates how well the documentation is used and how well it is maintained.

The automation rating module 606 evaluates the collection of data 581, or portion thereof, (e.g., pre-processed data of FIG. 35) to produce an automation evaluation rating in accordance with automation analysis parameters of the data analysis parameters 265. The automation analysis parameters indicate how the collection of data is to be evaluated with respect to automation of the system, or portion thereof. As an example, the automation analysis parameters include:

- an instruction to compare automation of the data 581 with a list of automation the system, or portion thereof, should have;
- an instruction to count the number of automation of data 581 and compare it with a quantity of automation the system, or portion thereof, should have;
- an instruction to determine last revisions of automation of data 581 and/or to determine an age of last revisions;
- an instruction to determine frequency of use of automation of data 581;
- an instruction to determine a volume of access of automation of data 581;
- an instruction to evaluate an automation of data 581 with respect to a checklist regarding content of the automation (e.g., what the automation should do);
- a scaling factor based on the size of the system, or portion thereof;
- a scaling factor based on the size of the organization;
- an instruction to compare a balance of local automation with respect to system-wide automation;
- an instruction to compare topics of the automation of data 581 with desired topics for automation (which may be at least partially derived from the evaluation category and/or sub-categories); and/or
- an instruction to evaluate operation use of automation of data 581.

The automation rating module 606 can rate the data 581 at three or more levels. The first level is that the system has automation, the system has the right number of automation, and/or the system has automation that address the right topics. The second level digs into the automation themselves to determine whether they are adequately covering the requirements of the system. The third level evaluates how well the automations are used and how well they are adhered to.

The cumulative rating module 607 receives one or more process evaluation ratings, one or more policy evaluation ratings, one or more procedure evaluation ratings, one or more certification evaluation ratings, one or more documentation evaluation ratings, and/or one or more automation evaluation ratings. The cumulative rating module 607 may output the evaluation ratings it receives as the identification rating 608. Alternatively, the cumulative rating module 607 performs a function (e.g., a weight average, standard deviation, statistical analysis, etc.) on the evaluation ratings it receives to produce the identification rating 608.

Figure 91:
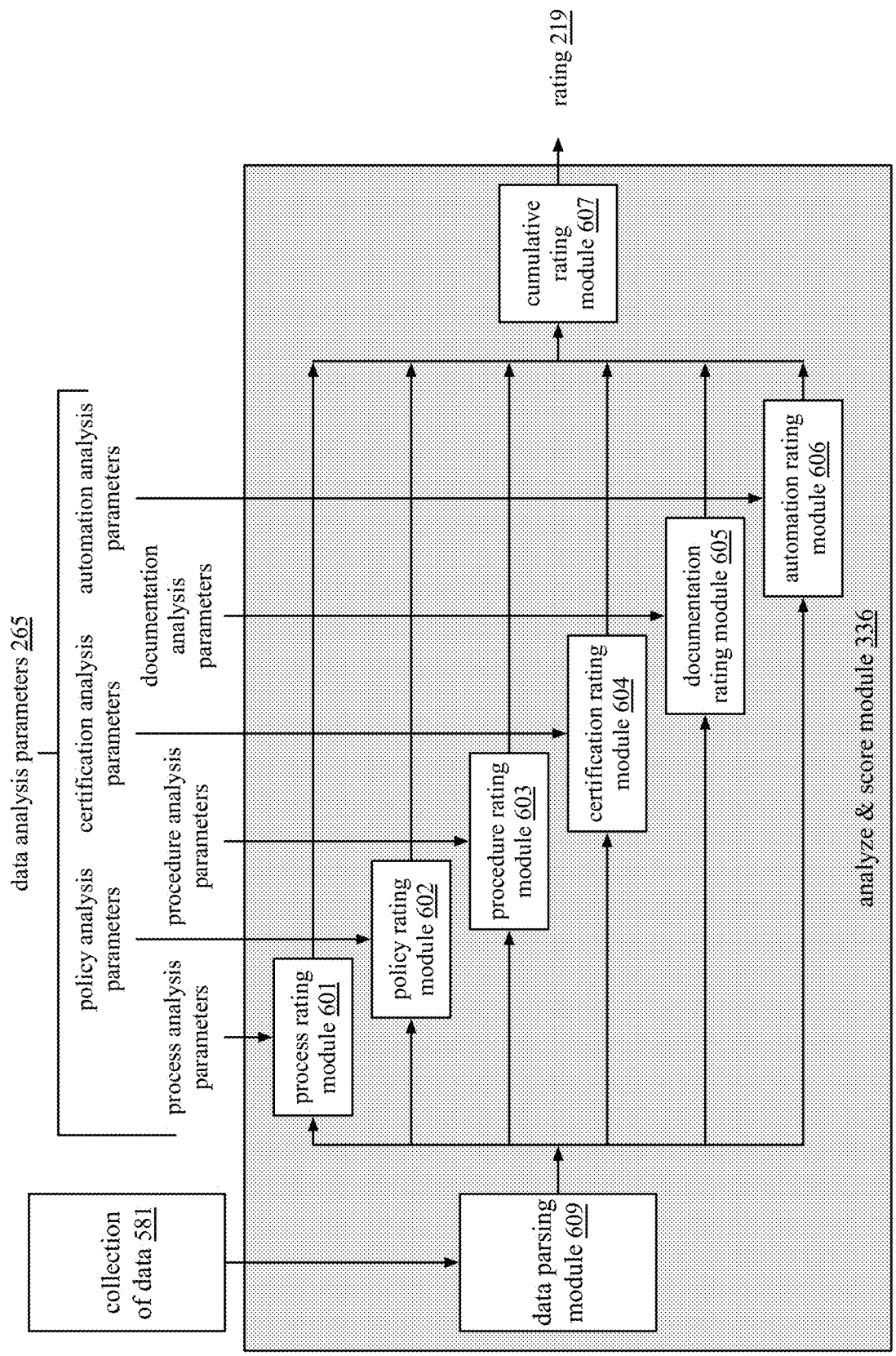
FIG. 91 is a schematic block diagram of another embodiment of an analyze & score module in accordance with the present disclosure.

FIG. 91 is a schematic block diagram of another embodiment of an analyze & score module 336 that is similar to the data analysis module of FIG. 90. In this embodiment, the analyze & score module 336 includes a data parsing module 609, which parses the data 581 into process data, policy data, procedure data, certification data, documentation data, and/or automation data prior to processing by the respective modules 601-606.

Figure 92:
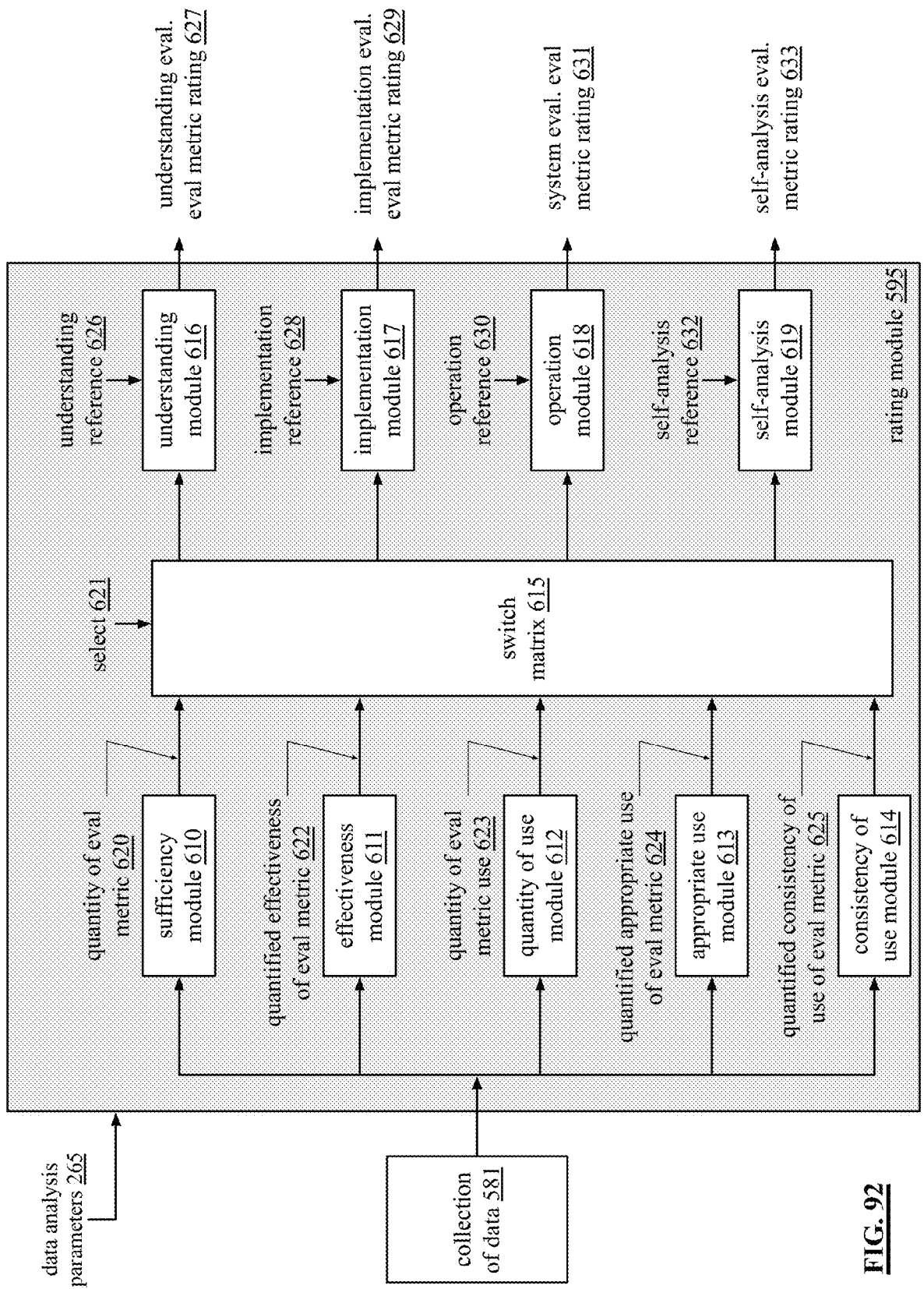
FIG. 92 is a schematic block diagram of an embodiment of a rating module in accordance with the present disclosure.

FIG. 92 is a schematic block diagram of an embodiment of a rating module 595, which is representative of the structure and general functioning of the process rating module 601, the policy rating module 602, the procedure rating module 603, the certification rating module 604, the documentation rating module 605, and/or the automation rating module 606. The rating module 595 includes a sufficiency module 610, an effectiveness module 611, a quantity of use module 612, an appropriate use module 613, a consistency of use module 614, a switch matrix 615, an understanding module 616, an implementation module 617, an operation module 618, and a self-analysis module 619.

In an example, the sufficiency module 610 receives at least some of the collection of data 581 to produce a quantity of evaluation metric 620. For example, when the rating module 595 is the process rating module 601, the sufficiency module 610 evaluates the quantity of processes of the data 581 with respect to the particular evaluation as indicated per the data analysis parameters 265 (e.g., processes with respect to creating system requirements; processes regarding security functions for a group; etc.). In a more specific example, the sufficiency module 610 counts the number of relevant processes of the data 581 and compares the count to an expected number of relevant processes to generate the quantity of evaluation metric 620 for the processes. As another specific example, the sufficiency module 610 compares the relevant processes of the data 581 with a checklist of expected processes to generate the quantity of evaluation metric 620 for the processes.

When the rating module 595 is the policy rating module 602, the sufficiency module 610 evaluates the quantity of policies of the data 581 with respect to the particular evaluation as indicated per the data analysis parameters 265 (e.g., policies with respect to creating system requirements; policies regarding security functions for a group; etc.). In a more specific example, the sufficiency module 610 counts the number of relevant policies of the data 581 and compares the count to an expected number of relevant policies to generate the quantity of evaluation metric 620 for the policies. As another specific example, the sufficiency module 610 compares the relevant policies of the data 581 with a checklist of expected policies to generate the quantity of evaluation metric 620 for the policies.

When the rating module 595 is the procedure rating module 603, the sufficiency module 610 evaluates the quantity of procedures of the data 581 with respect to the particular evaluation as indicated per the data analysis parameters 265 (e.g., procedures with respect to creating system requirements; procedures regarding security functions for a group; etc.). In a more specific example, the sufficiency module 610 counts the number of relevant procedures of the data 581 and compares the count to an expected number of relevant procedures to generate the quantity of evaluation metric 620 for the procedures. As another specific example, the sufficiency module 610 compares the relevant procedures of the data 581 with a checklist of expected procedures to generate the quantity of evaluation metric 620 for the procedures.

When the rating module 595 is the certification rating module 604, the sufficiency module 610 evaluates the quantity of certificates of the data 581 with respect to the particular evaluation as indicated per the data analysis parameters 265 (e.g., certificates with respect to creating system requirements; certificates regarding security functions for a group; etc.). In a more specific example, the sufficiency module 610 counts the number of relevant certificates of the data 581 and compares the count to an expected number of relevant certificates to generate the quantity of evaluation metric 620 for the certificates. As another specific example, the sufficiency module 610 compares the relevant certificates of the data 581 with a checklist of expected certificates to generate the quantity of evaluation metric 620 for the certificates.

When the rating module 595 is the documentation rating module 605, the sufficiency module 610 evaluates the quantity of documents of the data 581 with respect to the particular evaluation as indicated per the data analysis parameters 265 (e.g., documents with respect to creating system requirements; documents regarding security functions for a group; etc.). In a more specific example, the sufficiency module 610 counts the number of relevant documents of the data 581 and compares the count to an expected number of relevant documents to generate the quantity of evaluation metric 620 for the documents. As another specific example, the sufficiency module 610 compares the relevant documents of the data 581 with a checklist of expected documents to generate the quantity of evaluation metric 620 for the documents.

When the rating module 595 is the automation rating module 606, the sufficiency module 610 evaluates the quantity of automations of the data 581 with respect to the particular evaluation as indicated per the data analysis parameters 265 (e.g., automations with respect to creating system requirements; automations regarding security functions for a group; etc.). In a more specific example, the sufficiency module 610 counts the number of relevant automations of the data 581 and compares the count to an expected number of relevant automations to generate the quantity of evaluation metric 620 for the automations. As another specific example, the sufficiency module 610 compares the relevant automations of the data 581 with a checklist of expected automations to generate the quantity of evaluation metric 620 for the automations.

Within the rating module 595, the effectiveness module 611 receives at least some of the collection of data 581 to produce a quantified effectiveness of evaluation metric 622. For example, when the rating module 595 is the process rating module 601, the effectiveness module 611 evaluates the effectiveness of processes of the data 581 with respect to the particular evaluation as indicated per the data analysis parameters 265 (e.g., processes with respect to creating system requirements; processes regarding security functions for a group; etc.). In a more specific example, the effectiveness module 611 compares the content of relevant processes of the data 581 with an expected content of processes to generate the quantified effectiveness of evaluation metric 622 for the processes.

When the rating module 595 is the policy rating module 602, the effectiveness module 611 evaluates the effectiveness of policies of the data 581 with respect to the particular evaluation as indicated per the data analysis parameters 265 (e.g., policies with respect to creating system requirements; policies regarding security functions for a group; etc.). In a more specific example, the effectiveness module 611 compares the content of relevant policies of the data 581 with an expected content of polices to generate the quantified effectiveness of evaluation metric 622 for the policies.

When the rating module 595 is the procedure rating module 603, the effectiveness module 611 evaluates the effectiveness of procedures of the data 581 with respect to the particular evaluation as indicated per the data analysis parameters 265 (e.g., procedures with respect to creating system requirements; procedures regarding security functions for a group; etc.). In a more specific example, the effectiveness module 611 compares the content of relevant procedures of the data 581 with an expected content of procedures to generate the quantified effectiveness of evaluation metric 622 for the procedures.

When the rating module 595 is the certification rating module 604, the effectiveness module 611 evaluates the effectiveness of certificates of the data 581 with respect to the particular evaluation as indicated per the data analysis parameters 265 (e.g., certificates with respect to creating system requirements; certificates regarding security functions for a group; etc.). In a more specific example, the effectiveness module 611 compares the content of relevant certificates of the data 581 with an expected content of certificates to generate the quantified effectiveness of evaluation metric 622 for the certificates.

When the rating module 595 is the documentation rating module 605, the effectiveness module 611 evaluates the effectiveness of documents of the data 581 with respect to the particular evaluation as indicated per the data analysis parameters 265 (e.g., documents with respect to creating system requirements; documents regarding security functions for a group; etc.). In a more specific example, the effectiveness module 611 compares the content of relevant documents of the data 581 with an expected content of documents to generate the quantified effectiveness of evaluation metric 622 for the documents.

When the rating module 595 is the automation rating module 606, the effectiveness module 611 evaluates the effectiveness of automations of the data 581 with respect to the particular evaluation as indicated per the data analysis parameters 265 (e.g., automation with respect to creating system requirements; automation regarding security functions for a group; etc.). In a more specific example, the effectiveness module 611 compares the content of relevant automation of the data 581 with an expected content of automation to generate the quantified effectiveness of evaluation metric 622 for the automation.

Within the rating module 595, the quantity of use module 612 receives at least some of the collection of data 581 to produce a quantity of evaluation metric use 623. For example, when the rating module 595 is the process rating module 601, the quantity of use module 612 evaluates the quantity of use of processes of the data 581 with respect to the particular evaluation as indicated per the data analysis parameters 265 (e.g., use of processes with respect to creating system requirements; use of processes regarding security functions for a group; etc.). In a more specific example, the quantity of use module 612 compares a count of use of relevant processes of the data 581 with an expected number of use of processes to generate the quantity of evaluation metric use 623 for the processes.

When the rating module 595 is the policy rating module 602, the quantity of use module 612 evaluates the quantity of use of policies of the data 581 with respect to the particular evaluation as indicated per the data analysis parameters 265 (e.g., use of policies with respect to creating system requirements; use of policies regarding security functions for a group; etc.). In a more specific example, the quantity of use module 612 compares a count of use of relevant policies of the data 581 with an expected number of use of policies to generate the quantity of evaluation metric use 623 for the policies.

When the rating module 595 is the procedure rating module 603, the quantity of use module 612 evaluates the quantity of use of procedures of the data 581 with respect to the particular evaluation as indicated per the data analysis parameters 265 (e.g., use of procedures with respect to creating system requirements; use of procedures regarding security functions for a group; etc.). In a more specific example, the quantity of use module 612 compares a count of use of relevant procedures of the data 581 with an expected number of use of procedures to generate the quantity of evaluation metric use 623 for the procedures.

When the rating module 595 is the certification rating module 604, the quantity of use module 612 evaluates the quantity of use of certificates of the data 581 with respect to the particular evaluation as indicated per the data analysis parameters 265 (e.g., use of certificates with respect to creating system requirements; use of certificates regarding security functions for a group; etc.). In a more specific example, the quantity of use module 612 compares a count of use of relevant certificates of the data 581 with an expected number of use of certificates to generate the quantity of evaluation metric use 623 for the certificates.

When the rating module 595 is the documentation rating module 605, the quantity of use module 612 evaluates the quantity of use of documents of the data 581 with respect to the particular evaluation as indicated per the data analysis parameters 265 (e.g., use of documents with respect to creating system requirements; use of documents regarding security functions for a group; etc.). In a more specific example, the quantity of use module 612 compares a count of use of relevant documents of the data 581 with an expected number of use of documents to generate the quantity of evaluation metric use 623 for the documentation.

When the rating module 595 is the automation rating module 606, the quantity of use module 612 evaluates the quantity of use of automation of the data 581 with respect to the particular evaluation as indicated per the data analysis parameters 265 (e.g., use of automation with respect to creating system requirements; use of automation regarding security functions for a group; etc.). In a more specific example, the quantity of use module 612 compares a count of use of relevant automation of the data 581 with an expected number of use of automation to generate the quantity of evaluation metric use 623 for the automation.

Within the rating module 595, the appropriate use module 613 receives at least some of the collection of data 581 to produce a quantified appropriate use of evaluation metric 624. For example, when the rating module 595 is the process rating module 601, the appropriate use module 613 evaluates the conditions of use of processes of the data 581 with respect to the particular evaluation as indicated per the data analysis parameters 265 (e.g., conditions of use of processes with respect to creating system requirements; conditions use of processes regarding security functions for a group; etc.). In a more specific example, the appropriate use module 613 compares the conditions of use of relevant processes of the data 581 with an expected conditions of use of processes to generate the quantified appropriate use of evaluation metric 624 for the processes.

When the rating module 595 is the policy rating module 602, the appropriate use module 613 evaluates the conditions of use of policies of the data 581 with respect to the particular evaluation as indicated per the data analysis parameters 265 (e.g., conditions of use of policies with respect to creating system requirements; conditions use of policies regarding security functions for a group; etc.). In a more specific example, the appropriate use module 613 compares the conditions of use of relevant policies of the data 581 with an expected conditions of use of policies to generate the quantified appropriate use of evaluation metric 624 for the policies.

When the rating module 595 is the procedure rating module 603, the appropriate use module 613 evaluates the conditions of use of procedures of the data 581 with respect to the particular evaluation as indicated per the data analysis parameters 265 (e.g., conditions of use of procedures with respect to creating system requirements; conditions use of procedures regarding security functions for a group; etc.). In a more specific example, the appropriate use module 613 compares the conditions of use of relevant procedures of the data 581 with an expected conditions of use of procedures to generate the quantified appropriate use of evaluation metric 624 for the procedures.

When the rating module 595 is the certification rating module 604, the appropriate use module 613 evaluates the conditions of use of certificates of the data 581 with respect to the particular evaluation as indicated per the data analysis parameters 265 (e.g., conditions of use of certificates with respect to creating system requirements; conditions use of certificates regarding security functions for a group; etc.). In a more specific example, the appropriate use module 613 compares the conditions of use of relevant certificates of the data 581 with an expected conditions of use of certificates to generate the quantified appropriate use of evaluation metric 624 for the certificates.

When the rating module 595 is the documentation rating module 605, the appropriate use module 613 evaluates the conditions of use of documents of the data 581 with respect to the particular evaluation as indicated per the data analysis parameters 265 (e.g., conditions of use of documents with respect to creating system requirements; conditions use of documents regarding security functions for a group; etc.). In a more specific example, the appropriate use module 613 compares the conditions of use of relevant documents of the data 581 with an expected conditions of use of documents to generate the quantified appropriate use of evaluation metric 624 for the certificates.

When the rating module 595 is the automation rating module 606, the appropriate use module 613 evaluates the conditions of use of automation of the data 581 with respect to the particular evaluation as indicated per the data analysis parameters 265 (e.g., conditions of use of automation with respect to creating system requirements; conditions use of automation regarding security functions for a group; etc.). In a more specific example, the appropriate use module 613 compares the conditions of use of relevant automation of the data 581 with an expected conditions of use of automation to generate the quantified appropriate use of evaluation metric 624 for the automation.

Within the rating module 595, the consistency of use module 614 receives at least some of the collection of data 581 to produce a quantified consistency of use of evaluation metric 625. For example, when the rating module 595 is the process rating module 601, the consistency of use module 614 evaluates the situations of use of processes of the data 581 with respect to the particular evaluation as indicated per the data analysis parameters 265 (e.g., situations of use of processes with respect to creating system requirements; situations use of processes regarding security functions for a group; etc.). In a more specific example, the consistency of use module 614 compares the situations of use of relevant processes of the data 581 with an expected situations of use of processes to generate the quantified consistency of use of evaluation metric 625 for the processes.

When the rating module 595 is the policy rating module 602, the consistency of use module 614 evaluates the situations of use of policies of the data 581 with respect to the particular evaluation as indicated per the data analysis parameters 265 (e.g., situations of use of policies with respect to creating system requirements; situations use of policies regarding security functions for a group; etc.). In a more specific example, the consistency of use module 614 compares the situations of use of relevant policies of the data 581 with an expected situations of use of policies to generate the quantified consistency of use of evaluation metric 625 for the polices.

When the rating module 595 is the procedure rating module 603, the consistency of use module 614 evaluates the situations of use of procedures of the data 581 with respect to the particular evaluation as indicated per the data analysis parameters 265 (e.g., situations of use of procedures with respect to creating system requirements; situations use of procedures regarding security functions for a group; etc.). In a more specific example, the consistency of use module 614 compares the situations of use of relevant procedures of the data 581 with an expected situations of use of procedures to generate the quantified consistency use of evaluation metric 625 for the procedures.

When the rating module 595 is the certification rating module 604, the consistency of use module 614 evaluates the situations of use of certificates of the data 581 with respect to the particular evaluation as indicated per the data analysis parameters 265 (e.g., situations of use of certificates with respect to creating system requirements; situations use of certificates regarding security functions for a group; etc.). In a more specific example, the consistency of use module 614 compares the situations of use of relevant certificates of the data 581 with an expected situations of use of certificates to generate the quantified consistency of use of evaluation metric 625 for the certificates.

When the rating module 595 is the documentation rating module 605, the consistency of use module 614 evaluates the situations of use of documents of the data 581 with respect to the particular evaluation as indicated per the data analysis parameters 265 (e.g., situations of use of documents with respect to creating system requirements; situations use of documents regarding security functions for a group; etc.). In a more specific example, the consistency of use module 614 compares the situations of use of relevant documents of the data 581 with an expected situations of use of documents to generate the quantified appropriate use of evaluation metric 625 for the documents.

When the rating module 595 is the automation rating module 606, the consistency of use module 614 evaluates the situations of use of automation of the data 581 with respect to the particular evaluation as indicated per the data analysis parameters 265 (e.g., situations of use of automation with respect to creating system requirements; situations use of automation regarding security functions for a group; etc.). In a more specific example, the consistency of use module 614 compares the situations of use of relevant automation of the data 581 with an expected situations of use of automation to generate the quantified appropriate use of evaluation metric 625 for the automation.

The understanding module 616 receives the quantity of evaluation metric 620, the quantified effectiveness of evaluation metric 622, the quantity of evaluation metric use 623, the quantified appropriate use of evaluation metric 624, and/or the quantified consistency of use of evaluation metric 625 via the switch matrix 615 as indicated by a selection signal 621. The understanding module 616 processes the received input in accordance with an understanding reference 626 to produce an understanding evaluation metric rating 627.

The implementation module 617 receives the quantity of evaluation metric 620, the quantified effectiveness of evaluation metric 622, the quantity of evaluation metric use 623, the quantified appropriate use of evaluation metric 624, and/or the quantified consistency of use of evaluation metric 625 via the switch matrix 615 as indicated by a selection signal 621. The implementation module 617 processes the received input in accordance with an implementation reference 628 to produce an implementation evaluation metric rating 629.

The operation module 618 receives the quantity of evaluation metric 620, the quantified effectiveness of evaluation metric 622, the quantity of evaluation metric use 623, the quantified appropriate use of evaluation metric 624, and/or the quantified consistency of use of evaluation metric 625 via the switch matrix 615 as indicated by a selection signal 621. The operation module 618 processes the received input in accordance with an operation reference 630 to produce system evaluation metric rating 629 regarding assets, system functions, and/or security functions.

The self-analysis module 619 receives the quantity of evaluation metric 620, the quantified effectiveness of evaluation metric 622, the quantity of evaluation metric use 623, the quantified appropriate use of evaluation metric 624, and/or the quantified consistency of use of evaluation metric 625 via the switch matrix 615 as indicated by a selection signal 621. The self-analysis module 619 processes the received input in accordance with a self-analysis reference 632 to produce a self-analysis evaluation metric rating 633.

FIG. 93 is a diagram of an example an evaluation matrix that includes evaluation perspectives and evaluation modalities. The evaluation perspectives includes understanding, implementation, and operation. Understanding is regarding the knowledge of the system, or portion thereof. For example, an understanding evaluation rating is reflective of how well the system is understood with respect to system objectives, how well the system objectives are understood, how good are the system objectives, and/or how well should the system be understood with respect to the system objectives.

The system objectives are regarding the various things the system is supposed to do. For example, system objectives include, but are not limited to, business operations (e.g., corporate, finance, engineering, manufacturing, sales, marketing, etc.), data storage, data uses, data transmission, data security, data control, data sharing, authorized use, system speed, system hardware architecture, system software architecture, maintenance requirements, expansion protocols, etc.

Implementation is regarding the accuracy, thoroughness, and/or structure of the development of the system, or portion thereof. For example, an implementation evaluation rating is reflective of how good are the guidelines, system requirements, system design, system build, and/or resulting system for fulfilling the system objectives. As another example, an implementation evaluation rating is reflective of well the system requirements were developed from the guidelines. As another example, an implementation evaluation rating is reflective of well the system design was developed from the guidelines and/or the system requirements. As another example, an implementation evaluation rating is reflective of well the system build was developed from the guidelines, the system requirements, and/or the system design. As another example, an implementation evaluation rating is reflective of well the resulting system was developed from the guidelines, the system requirements, system design, and/or the system build.

The evaluation modalities includes sufficiency, effectiveness, quantity of use, appropriate use, and consistency of use. The sufficiency modality is regarding a count and/or checklist of data regarding each evaluation metric that is found (e.g., is part of the disclosed and/or discovered data) and/or that the system should include (e.g., is part of the desired data). The evaluation metrics include processes, policies, procedures, documents, certifications, automations, and/or one or more other measures regarding efficiency, completeness, reliability, capacity, accuracy, execution speed, bandwidth, and/or other characteristic of the system or portion thereof.

The effectiveness modality is regarding content review of the data for one or more of the evaluation metrics. The quantity of use modality is regarding a count of the use of the data for one or more of the evaluation metrics. The appropriate use modality is regarding conditions in which the data for one or more of the evaluation metrics was used (e.g., relied on, created, edited, interpreted, etc.). The consistency of use modality is regarding situations in which the data for one or more of the evaluation metrics was used.

In an embodiment, the analysis system employs the evaluation matrix to assist in producing one or more evaluation ratings for a system, or portion thereof. At a high-level, the analysis system can create fifteen evaluation ratings from the evaluation matrix:
 a sufficiency based understanding evaluation rating,
 a sufficiency based implementation evaluation rating,
 a sufficiency based operation evaluation rating,
 an effectiveness based understanding evaluation rating,
 an effectiveness based implementation evaluation rating,
 an effectiveness based operation evaluation rating,
 a quantity of use based understanding evaluation rating,
 a quantity of use based implementation evaluation rating,
 a quantity of use based operation evaluation rating,
 an appropriate use based understanding evaluation rating,
 an appropriate use based implementation evaluation rating,
 an appropriate use based operation evaluation rating,
 a consistency of use based understanding evaluation rating,
 a consistency of use based implementation evaluation rating, and
 a consistency of use based operation evaluation rating.

Each of the fifteen high-level evaluation ratings can be divided into a plurality of lower-level evaluation ratings. For example, a lower level evaluation rating can be created for each evaluation metric of processes, policies, procedures, certifications, documentation, automation and other measure of the system, or portion thereof. As another example, a lower level evaluation rating is created for a combination of evaluation metrics (e.g., processes and policies). As a further example, a lower level evaluation rating can be created for each system element of the system, each system function of the system, and/or each security function of the system.

An evaluation rating may be created for an even lower level. For example, each process is evaluated to produce its own evaluation rating. As another example, processes regarding a particular objective of the system (e.g., software updates) are evaluated to produce an evaluation rating.

Figure 94:
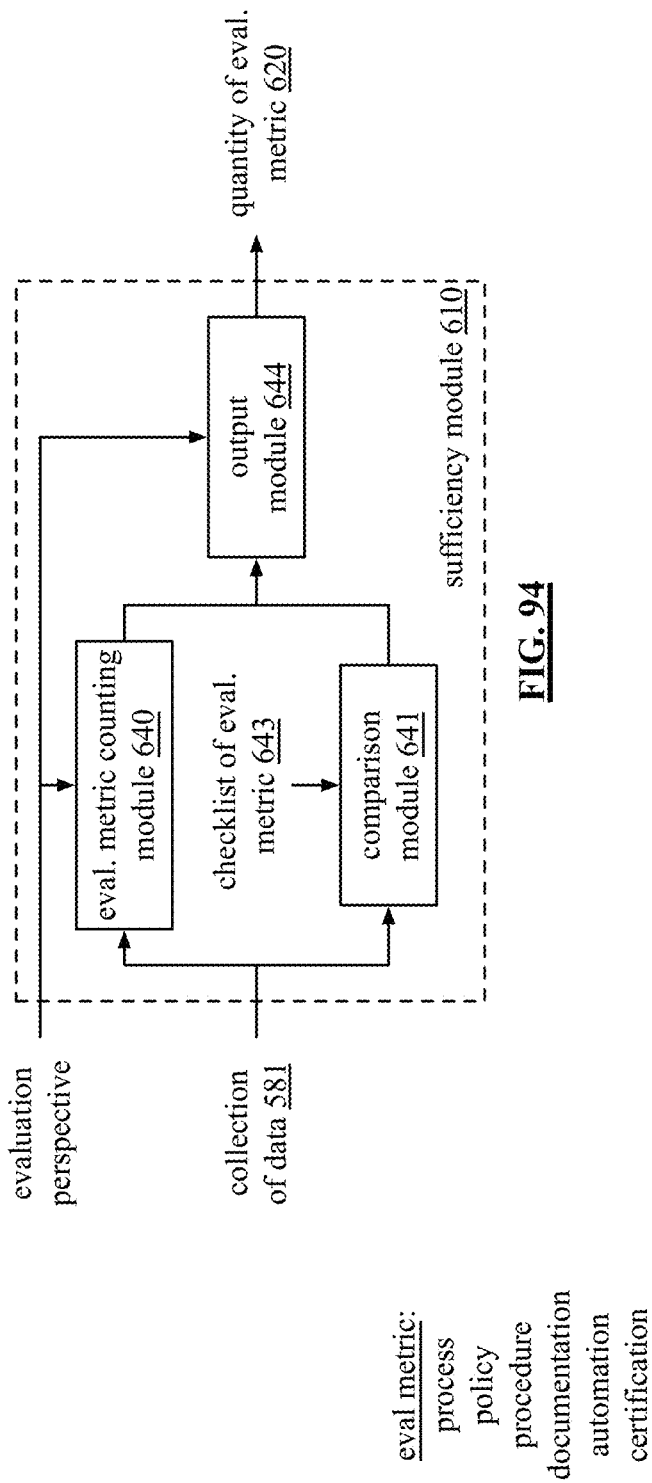
FIG. 94 is a schematic block diagram of an embodiment of a sufficiency module in accordance with the present disclosure.

FIG. 94 is a schematic block diagram of an embodiment of a sufficiency module 610 that includes an evaluation metric counting module 640, a comparison module 641, and an output module 644. Each of the comparison module 641 and the evaluation metric counting module 640 receive at least some data of the collection of data 581. The sufficiency module 610 generates a quantity of evaluation metric indication 620 based on the data 581 and in accordance with an evaluation perspective (e.g., understanding, implementation, operation, or self-analysis). For example, the sufficiency module generates, for the system (or portion thereof) being evaluated, a quantity of evaluation metric indication 620 for:
 understanding of processes (e.g., quantity of all identified relevant processes compared to an expected quantity of all relevant processes and/or checklist comparison of identified relevant processes);
 processes regarding implementation (e.g., quantity of all identified relevant processes regarding design and/or build of the system (or portion thereof) compared to an expected quantity of all relevant processes regarding design and/or build of the system (or portion thereof) and/or checklist comparison of identified relevant processes regarding design and/or build of the system (or portion thereof));
 processes regarding operation (e.g., quantity of all identified relevant processes regarding operation of the system (or portion thereof) compared to an expected quantity of all relevant processes regarding operation of the system (or portion thereof) and/or checklist comparison of identified relevant processes regarding operation of the system (or portion thereof));
 processes regarding self-analysis (e.g., quantity of all identified relevant processes regarding self-analysis of the system (or portion thereof) compared to an expected quantity of all relevant processes regarding self-analysis of the system (or portion thereof) and/or checklist comparison of identified relevant processes regarding self-analysis of the system (or portion thereof));
 understanding of policies;
 policies regarding implementation;

policies regarding operation;
policies regarding self-analysis;
understanding of procedures;
procedures regarding implementation;
procedures regarding operation;
procedures regarding self-analysis;
understanding of certificates;
certificates regarding implementation;
certificates regarding operation;
certificates regarding self-analysis;
understanding of documentation;
documentation regarding implementation;
documentation regarding operation;
documentation regarding self-analysis;
understanding of automation;
automation regarding implementation;
automation regarding operation;
automation regarding self-analysis;
understanding of another evaluation metric;
another evaluation metric regarding implementation;
another evaluation metric regarding operation; and/or
another evaluation metric regarding self-analysis.

For a piece of data that relates to a particular evaluation metric and a particular evaluation perspective (e.g., understanding of processes), the evaluation metric counting module 640 increments a count. In addition, or in the alternative, the comparison module 641 compares the piece of data to a checklist 643 regarding the particular evaluation metric and the particular evaluation perspective (e.g., understanding of processes). Note that the checklist is part of, or derived from, the data analysis parameters 265.

For example, when the piece of data is a process, the comparison module 641 determines whether the process is on a process checklist for a particular evaluation perspective. The comparison module 641 then records the results of the comparison: yes, if the process is on the checklist or no, if the process is not on the checklist to produce checklist data. As another example, when the piece of data is a policy, the comparison module 641 determines whether the document is on a document checklist and records the result. As another example, when the piece of data is a document, the comparison module 641 determines a type of document (e.g., test result, maintenance record, SW update record, performance data, use data, etc.) and obtains a document type checklist. The comparison module 641 determines whether the document of the specific type is on a specific type document checklist and records the result as part of the checklist data.

The output module 644 receives the counts from the evaluation metric counting module 640 and/or the checklist comparison of the comparison module 640 to produce the quantity of evaluation metric 620. For example, the output module 644 receives a count value for each of the evaluation metrics-evaluation perspective combinations and produces the quantity of evaluation metric 620 as an aggregation, combination, or a function of the individual counts. As a further example, a function is an average function, a mean function, a weighted average, a standard deviation, and/or other mathematical way to express a set of count values.

As another example, the output module 644 receives checklist data for each of the evaluation metrics-evaluation perspectives. For example, the checklist data for processes is 10 of 12 processes; the check list data for policies is 5 of 6 policies; the checklist data for documents is 99 of 104 documents; and the checklist data for automation is 3 of 3 automations for an evaluation perspective of implementation. For this example, the output module 644 produces the quantity of evaluation metric 620 as an aggregation, combination, or a function of the individual checklist data. As a further example, a function is an average function, a mean function, a weighted average, a standard deviation, and/or other mathematical way to express a set of checklist data values.

As another example, the checklist data for processes identifies, for a particular evaluation perspective, 10 processes found in the collection of data and identifies 2 processes that were not found in the collection of data; the checklist data for policies identifies 5 policies found in the collection of data and identifies 1 policy that was not found in the collection of data; the checklist data for documents identifies 99 documents found in the collection of data and identifies 5 documents that were not found in the collection of data; and the checklist data for automation identifies 3 automations found in the collection of data and identifies that 0 automations were not found in the collection of data. For this example, the output module 644 produces the quantity of evaluation metric 620 as an aggregation and/or combination of the individual checklist data for the particular evaluation perspective.

As yet another example, the output module 644 generates, for a particular evaluation perspective, the quantity of evaluation metric 620 from the individual check list data and the individual count of data regarding an evaluation metric. In this example, the quantity of evaluation metric 620 is an aggregation and/or combination of the individual check list data and the individual count of data regarding an evaluation metric.

Figure 95:
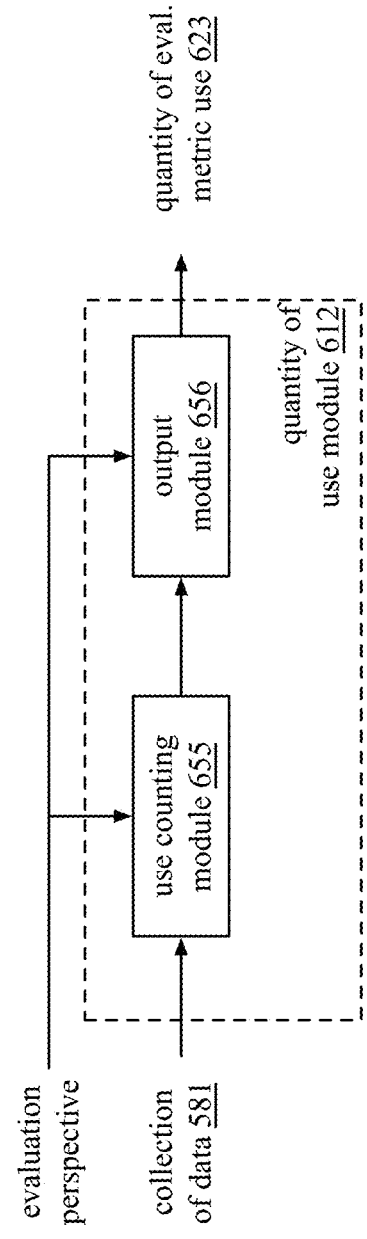
FIG. 95 is a schematic block diagram of an embodiment of a quantity of use module in accordance with the present disclosure.

FIG. 95 is a schematic block diagram of an embodiment of a quantity of use module 612 that includes a use counting module 655 and an optional output module 656. The comparison use counting module 655 receive at least some data of the collection of data 581. The quantity of module 612 generates a quantity of use of evaluation metric indication 623 based on the data 581 and in accordance with an evaluation perspective (e.g., understanding, implementation, operation, or self-analysis). For example, the quantity of module generates, for the system (or portion thereof) being evaluated, a quantity of use of an evaluation metric indication 623 for:

understanding of processes (e.g., quantity of use of all identified relevant processes compared to an expected quantity of all relevant processes);
processes regarding implementation (e.g., quantity of use of all identified relevant processes regarding design and/or build of the system (or portion thereof) compared to an expected quantity of all relevant processes regarding design and/or build of the system (or portion thereof));
processes regarding operation (e.g., quantity of use of all identified relevant processes regarding operation of the system (or portion thereof) compared to an expected quantity of all relevant processes regarding operation of the system (or portion thereof)); processes regarding self-analysis (e.g., quantity of use of all identified relevant processes regarding self-analysis of the system (or portion thereof) compared to an expected quantity of all relevant processes regarding self-analysis of the system (or portion thereof));
understanding of policies;
policies regarding implementation;
policies regarding operation;
policies regarding self-analysis;
understanding of procedures;
procedures regarding implementation;
procedures regarding operation;

procedures regarding self-analysis;
understanding of certificates;
certificates regarding implementation;
certificates regarding operation;
certificates regarding self-analysis;
understanding of documentation;
documentation regarding implementation;
documentation regarding operation;
documentation regarding self-analysis;
understanding of automation;
automation regarding implementation;
automation regarding operation;
automation regarding self-analysis;
understanding of another evaluation metric;
another evaluation metric regarding implementation;
another evaluation metric regarding operation; and/or
another evaluation metric regarding self-analysis.

For a piece of data that relates to use of a particular evaluation metric-evaluation perspective combination, the use counting module 655 increments a use count for the particular evaluation metric-evaluation perspective combination. As an example of data that relates to use, a piece of data indicates that a process was used (e.g., a log of purchasing a SW product in accordance with a software purchase process). As another example of data that relates to use, a piece of data indicates that a document was use (e.g., the logging of a purchase of a SW product). As yet another example of data that relates to use, a piece of data indicates that an automation was used (e.g., a log that a SW product was automatically updated).

The output module 656, if included, receives the use counts from the use counting module 655 to produce the quantity of evaluation metric use 623. For example, the output module 656 receives a use count value for each piece of data relating to the use of the evaluation metric-evaluation perspective combination and produces the quantity of evaluation metric use 623 as an aggregation, combination, or a function of the individual use counts. As a further example, a function is an average function, a mean function, a weighted average, a standard deviation, and/or other mathematical way to express a set of count values. If the output module 656 is omitted, the use count module 655 produces the quantity of evaluation metric use 623.

Figure 96:
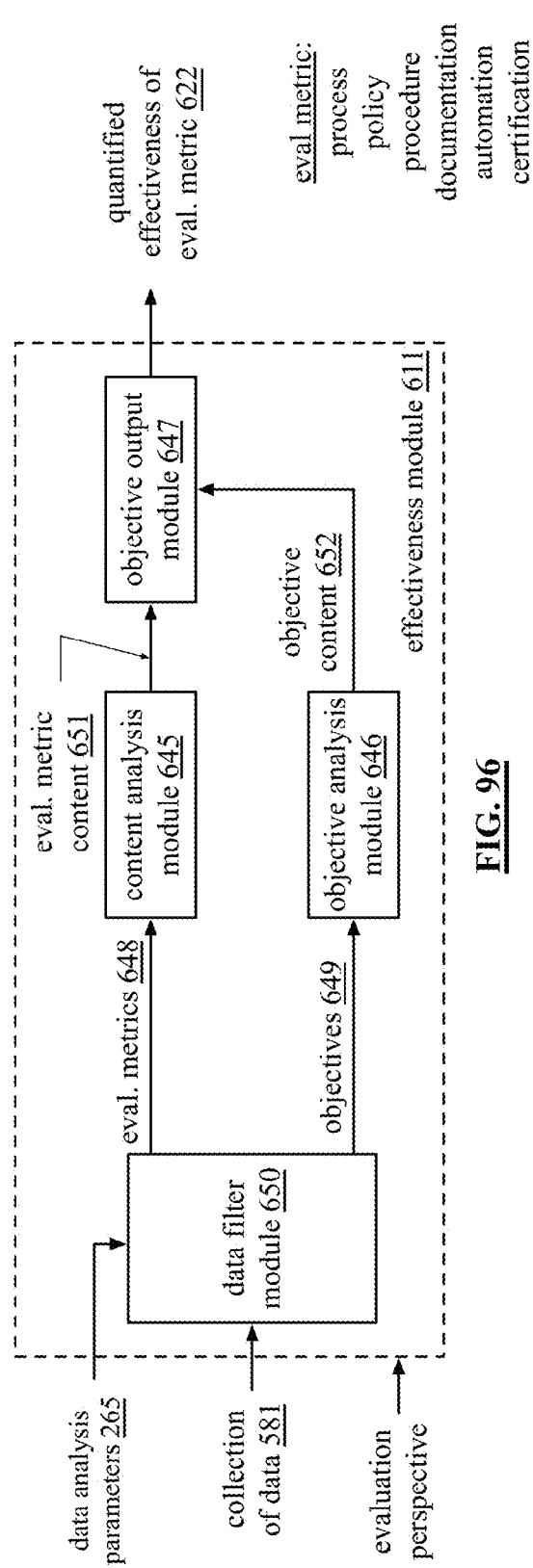
FIG. 96 is a schematic block diagram of an embodiment of an effectiveness module in accordance with the present disclosure.

FIG. 96 is a schematic block diagram of an embodiment of an effectiveness module 611 that includes a data filter module 650, a content analysis module 645, an objective analysis module 646, and an objective output module 647. The effectiveness module 611 generates a quantified effectiveness of evaluation metric indication 622 based on the data 581 and in accordance with an evaluation perspective (e.g., understanding, implementation, operation, or self-analysis). For example, the effectiveness module generates, for the system (or portion thereof) being evaluated, a quantified effectiveness evaluation metric indication 622 for:

understanding of processes (e.g., content of all identified relevant processes compared to an expected content of all relevant processes);
processes regarding implementation (e.g., content of all identified relevant processes regarding design and/or build of the system (or portion thereof) compared to expected content of all relevant processes regarding design and/or build of the system (or portion thereof));
processes regarding operation (e.g., content of all identified relevant processes regarding operation of the system (or portion thereof) compared to expected content of all relevant processes regarding operation of the system (or portion thereof));
processes regarding self-analysis (e.g., content of all identified relevant processes regarding self-analysis of the system (or portion thereof) compared to expected content of all relevant processes regarding self-analysis of the system (or portion thereof));
understanding of policies;
policies regarding implementation;
policies regarding operation;
policies regarding self-analysis;
understanding of procedures;
procedures regarding implementation;
procedures regarding operation;
procedures regarding self-analysis;
understanding of certificates;
certificates regarding implementation;
certificates regarding operation;
certificates regarding self-analysis;
understanding of documentation;
documentation regarding implementation;
documentation regarding operation;
documentation regarding self-analysis;
understanding of automation;
automation regarding implementation;
automation regarding operation;
automation regarding self-analysis;
understanding of another evaluation metric;
another evaluation metric regarding implementation;
another evaluation metric regarding operation; and/or
another evaluation metric regarding self-analysis.

The data filter module 650 filters the collection of data 581 into evaluation metric data 648 and objectives data 649 based on the data analysis parameters 265. The content analysis module 645 produces evaluation metric content data 651 from the evaluation metric data 649. The objective analysis module 646 produces objective content 652 from the objectives data 649. The objective output module 647 compares the evaluation metric content data 651 with the object content data 652 to produce the quantified effectiveness of evaluation metrics 622.

In an embodiment, the content analysis module 645 interprets, for a particular evaluation perspective, process data of the evaluation metric data 648 to determine the content of one or more processes (e.g., steps, requirements, etc.) of the data 648 to produce process content data. The content analysis module 645 also interprets, for a particular evaluation perspective, policy data of the evaluation metric data 648 to determine the content of one or more policies of the data 648 to produce policy content data. The content analysis module 645 also interprets, for a particular evaluation perspective, procedure data of the evaluation metric data 648 to determine the content of one or more procedures of the data 648 to produce procedure content data.

The content analysis module 645 also interprets, for a particular evaluation perspective, certification data of the evaluation metric data 648 to determine the content of one or more certificates (e.g., issued by, issue date, expiration date, what's being certified, etc.) of the data 648 to produce certificate content data. The content analysis module 645 also interprets, for a particular evaluation perspective, documentation data of the evaluation metric data 648 to determine the content of one or more documents (e.g., creation date, creator, subject matter, edits, etc.) of the data 648 to produce documentation content data. The content analysis module 645 also interprets, for a particular evaluation perspective, automation data of the evaluation metric data 648 to determine the content of one or more automations (e.g., trigger events for an automatic function, nature of the automatic function, supplier of automatic function, etc.) of the data 648 to produce automation content data.

In an embodiment, the objective output module 647 interprets the objectives data 649 to produce content for each of the objectives (e.g., of the guidelines, system requirements, etc.). For example, the objective analysis module 646 interprets, for a particular evaluation perspective, objective filtered guidelines, system requirements, system design data, system build data, system function data, security function data, asset data, and/or supplemental data of the collection of data 581 to identify business operation objectives (e.g., corporate objectives, finance objectives, engineering objectives, manufacturing objectives, sales objectives, marketing objectives, etc.) to produce objective content. As a specific example, the objective analysis module 646 interprets guideline data to identify a specific manufacturing objective of five nines of manufacturing quality.

As further examples, the objective analysis module 646 interprets objective filtered guidelines, system requirements, system design data, system build data, system function data, security function data, asset data, and/or supplemental data of the collection of data 581 to identify data storage objectives, data use objectives, data transmission objectives, data security objectives, data control objectives, data sharing objectives, authorized use objectives, system speed objectives, system hardware architecture objectives, system software architecture objectives, maintenance requirements objectives, expansion protocol objectives, etc.

The objective output module 647 aligns, for a particular evaluation perspective, topic related evaluation metric content data 651 with objective content data 647 to determine how well the evaluation metric data fulfills the corresponding objective. The determination is a component of the quantified effectiveness of evaluation metric 622. As an example, the specific manufacturing objective of five nines of manufacturing quality is aligned with process data, policy data, procedure data, certification data, documentation data, automation data, and/or other metric data regarding manufacturing. The objective output module 647 determines how well the process data, policy data, procedure data, certification data, documentation data, automation data, and/or other metric data regarding manufacturing fulfill the five nines of manufacturing quality objective to produce the quantified effectiveness of evaluation metric 622 with respect to this particular objective.

As a more specific example, the objective output module 647 determines how well the process data regarding manufacturing address processes for fulfilling the five nines of manufacturing quality objective to produce the quantified effectiveness of processes 622 with respect to this particular objective. As another more specific example, the objective output module 647 determines how well the policy data regarding manufacturing address policies for fulfilling the five nines of manufacturing quality objective to produce the quantified effectiveness of policies 622 with respect to this particular objective. As another more specific example, the objective output module 647 determines how well the procedure data regarding manufacturing address procedures for fulfilling the five nines of manufacturing quality objective to produce the quantified effectiveness of procedures 622 with respect to this particular objective.

As another more specific example, the objective output module 647 determines how well the certification data regarding manufacturing address certifications for fulfilling the five nines of manufacturing quality objective to produce the quantified effectiveness of certification 622 with respect to this particular objective. As another more specific example, the objective output module 647 determines how well the documentation data regarding manufacturing address documentation for fulfilling the five nines of manufacturing quality objective to produce the quantified effectiveness of documentation 622 with respect to this particular objective.

As another more specific example, the objective output module 647 determines how well the automation data regarding manufacturing address automation for fulfilling the five nines of manufacturing quality objective to produce the quantified effectiveness of automation 622 with respect to this particular objective. As another more specific example, the objective output module 647 determines how well the other metric data regarding manufacturing address the other metric for fulfilling the five nines of manufacturing quality objective to produce the quantified effectiveness of the other metric 622 with respect to this particular objective.

Figure 97:
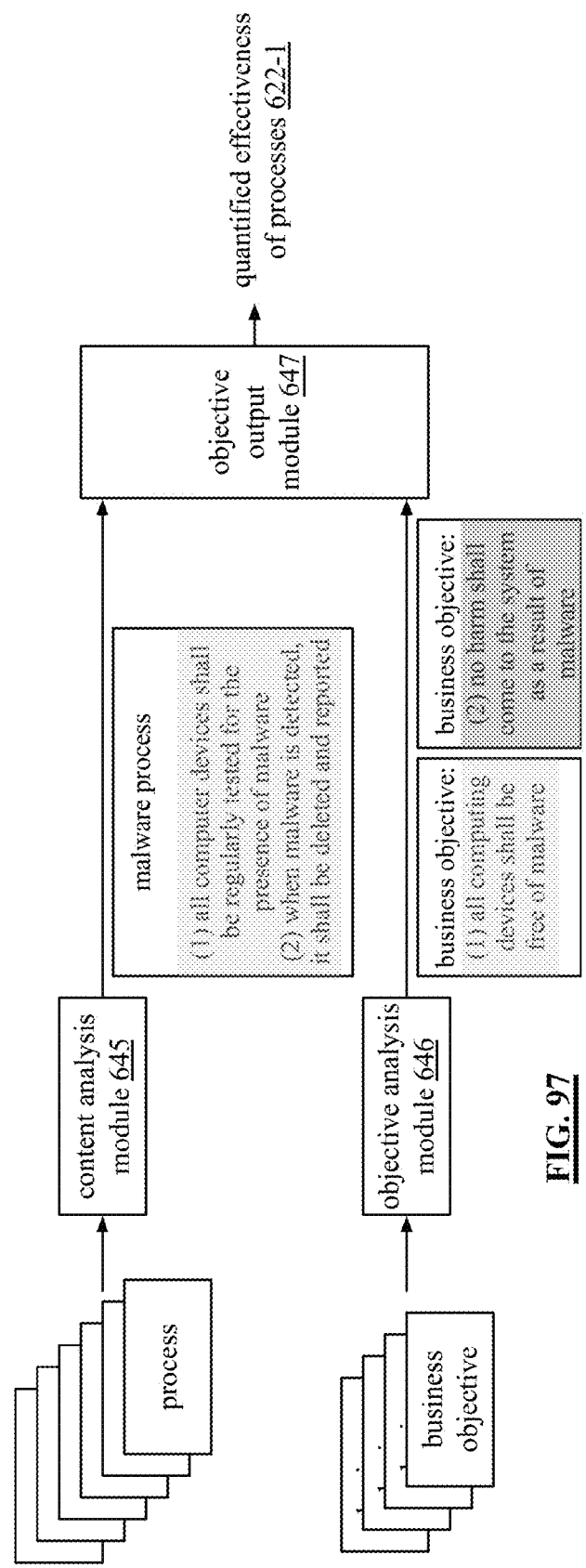
FIG. 97 is a diagram of an example of an effectiveness module producing a quantified effectiveness of an evaluation metric in accordance with the present disclosure.

FIG. 97 is a diagram of an example of an effectiveness module producing a quantified effectiveness of an evaluation metric. In this example, the objective analysis module 646 has identified content of objectives into include (1) all computing devices shall be free of malware; and (2) no harm shall come to the system as a result of malware (e.g., any software that is designed to cause harm to a system such as a virus, worms, Trojan horse, ransomware, spyware, adware, etc.).

The content analysis module 645 has identified a malware process that includes two elements: (1) all computing devices shall be regularly tested for the presence of malware; and (2) when malware is detected, it shall be deleted and reported. The objective output module 647 analyzes the malware process and the two objectives to determine the quantified effective of the process 622-1. The objective output module 647 determines that (1) the process meets the objective of computing devices being free of malware; and (2) the process does not address the objective of no harm shall come to the system.

Assuming a rating scale of 0-10 for each objective, the objective output module 647 would assign a 10 of 10 score for meeting the computing devices being free of malware and would assign a 0 of 10 score for not addressing the no harm objective. The objective output module 647 processes the two scores to produce a final score for the quantified effectiveness of this process 622-1. For example, the final score is 10 of 20 (e.g., a summation function). As another example, the final score is 0.5 (e.g., an average function). As another example, the final score is 7.5 of 20 (e.g., a weighted average that emphasizes lower scores).

FIG. 98 is a schematic block diagram of an embodiment of an appropriate use module 613 that includes a data filter module 663, a use specify analysis module 660, a use condition analysis module 661, and an output module 662. The appropriate use module 613 generates a quantified appropriate use of evaluation metric indication 624 based on the data 581 and in accordance with an evaluation perspective (e.g., understanding, implementation, operation, or self-analysis). For example, the appropriate use module generates, for the system (or portion thereof) being evaluated, a quantified appropriate use evaluation metric indication 624 for:

understanding of processes (e.g., conditions of when identified relevant processes were used in comparison to expected conditions as to when relevant processes are to be used);

processes regarding implementation (e.g., conditions of when identified relevant processes regarding design and/or build of the system (or portion thereof) were used compared to expected conditions of when relevant processes regarding design and/or build of the system (or portion thereof) are to be used);

processes regarding operation (e.g., conditions of when identified relevant processes regarding operation of the system (or portion thereof) were used compared to expected conditions of relevant processes regarding operation of the system (or portion thereof) are to be used);

processes regarding self-analysis (e.g., conditions of when identified relevant processes regarding self-analysis of the system (or portion thereof) were used compared to expected conditions of relevant processes regarding self-analysis of the system (or portion thereof) are to be used);

understanding of policies;
policies regarding implementation;
policies regarding operation;
policies regarding self-analysis;
understanding of procedures;
procedures regarding implementation;
procedures regarding operation;
procedures regarding self-analysis;
understanding of certificates;
certificates regarding implementation;
certificates regarding operation;
certificates regarding self-analysis;
understanding of documentation;
documentation regarding implementation;
documentation regarding operation;
documentation regarding self-analysis;
understanding of automation;
automation regarding implementation;
automation regarding operation;
automation regarding self-analysis;
understanding of another evaluation metric;
another evaluation metric regarding implementation;
another evaluation metric regarding operation; and/or
another evaluation metric regarding self-analysis.

The data filter module 663 filters the collection of data 581 in accordance with the data analysis parameters to produce evaluation metric data 664 and use of evaluation metric data 665. The use specify analysis module 660 produces, for a particular evaluation perspective, evaluation metric use data 666 (i.e., specified conditions of use for the evaluation metrics) from the evaluation metric data 664. The use condition analysis module 661 produces, for a particular evaluation perspective, use condition data 667 (i.e., the recorded conditions of use) from the use of evaluation metric data 665 (use data). The output module 662 compares the evaluation metric use data 666 with the use condition data 652 to produce the quantified appropriate use of evaluation metric 624 for a particular evaluation perspective.

In an embodiment, the use specify analysis module 660 interprets, for a particular evaluation perspective, process data of the evaluation metric data 664 to determine conditions as to when one or more processes should be used. For example, the use specify analysis module 660 determines that process 1 is to be used when granting user access privileges for level 4 employees. The use specify analysis module 660 also interprets, for a particular evaluation perspective, policy data of the evaluation metric data 664 to determine conditions as to when one or more policies should be used. The use specify analysis module 660 also interprets, for a particular evaluation perspective, procedure data of the evaluation metric data 664 to determine conditions as to when one or more procedures should be used.

The use specify analysis module 660 also interprets, for a particular evaluation perspective, documentation data of the evaluation metric data 664 to determine conditions as to when one or more documents should be used (e.g., interpreted, created, edited, signed, etc.). The use specify analysis module 660 also interprets, for a particular evaluation perspective, certification data of the evaluation metric data 664 to determine conditions as to when one or more certificates should be used (e.g., verified, created, updated, signed, etc.). The use specify analysis module 660 also interprets, for a particular evaluation perspective, automation data of the evaluation metric data 664 to determine conditions as to when one or more automations should be used.

The use condition analysis module 661 interprets, for a particular evaluation perspective, the use data 665 to determine the conditions when processes here used. For example, process 1 was used for employees 7-22 all of whom are level 4 employees and process 1 was used for employee 74 who is a level 3 employee. The use condition analysis module 661 also interprets, for a particular evaluation perspective, the use data 665 to determine the conditions when policies were used. The use condition analysis module 661 also interprets, for a particular evaluation perspective, the use data 665 to determine the conditions when procedures were used.

The use condition analysis module 661 also interprets, for a particular evaluation perspective, the use data 665 to determine the conditions when documents were used. The use condition analysis module 661 also interprets, for a particular evaluation perspective, the use data 665 to determine the conditions when certificates were used. The use condition analysis module 661 also interprets, for a particular evaluation perspective, the use data 665 to determine the conditions when automations were used.

The output module 662 aligns, for a particular evaluation perspective, conditions of the evaluation metric use content data 666 (i.e., specified conditions of use for the evaluation metrics) with conditions of use of the use condition data 667 (i.e., the recorded conditions of use) for a given process, policy, procedure, document, certificate, automation, and/or other evaluation metric. The output module 662 then interprets the specified use conditions for a particular evaluation metric (e.g., process) in light the actual use conditions for the particular evaluation metric to produce a quantified appropriate use of evaluation metric indication 624, or portion thereof, for a particular evaluation perspective.

As an example, the evaluation metric use content data 666 indicates that process 1 is to be used when granting user access privileges for level 4 employees. The use condition data 667 indicates that process 1 was used for employees 7-22 all of whom are level 4 employees and process 1 was also used for employee 74 who is a level 3 employee. The output module 662 generates the quantified appropriate use of evaluation metric indication 624, or portion thereof, to reflect that process 1 was used inappropriately once (e.g., for employee 74) and may further indicate that process 1 was appropriately used 16 times for employees 7-22. The quantified appropriate use of evaluation metric indication 624 may be a numerical value (e.g., 1 for inappropriate use; 16/17 for percentage of appropriate use, 1:16 for a ratio of inappropriate use to appropriate use, etc.) and/or a text value (e.g., 1 inappropriate use, 16 appropriate uses, etc.).

FIG. 99 is a diagram of an example of an appropriate use module 613 producing a quantified appropriate of use of an evaluation metric 624-1. In this example, the use specify analysis module 660 identified three conditions for use of one or more processes. Condition 1 is the daily testing of all computing devices for the presence of malware. Condition 2 is the deleting of malware if it is detected. Condition 3 is the reporting of the testing and its results when testing is completed.

The use condition analysis module 661 interprets security verification data to identify uses the of the malware process (es). In this example, the use condition analysis module 661 produced two use condition data elements. Data element 1 indicates that all computing devices were tested three times on Oct. 1, 2020, no malware was detected, and a report was generated. Data element 2 indicates that all computing devices were tested on Oct. 2, 2020, one malware was detected and deleted, and a report was generated. The output module 662 determines that (1) the malware process(es) were not appropriately used on Oct. 1, 2020 since it was used three times when the condition is daily; and (2) the malware process(es) was appropriately used on Oct. 2, 2020.

Assuming a rating scale of 0-10 for each data element, the output module 662 would assign, for example, a 6 of 10 score for data element 1 (e.g., over used but better than under used) and a 10 of 10 score data element 2. The output module 662 processes the two scores to produce a final score for the quantified appropriate use of the process(es) 624-1. For example, the final score is 15 of 20 (e.g., a summation function). As another example, the final score is 0.75 (e.g., an average function). As another example, the final score is 12.5 of 20 (e.g., a weighted average that emphasizes lower scores).

Figures 100, 101:
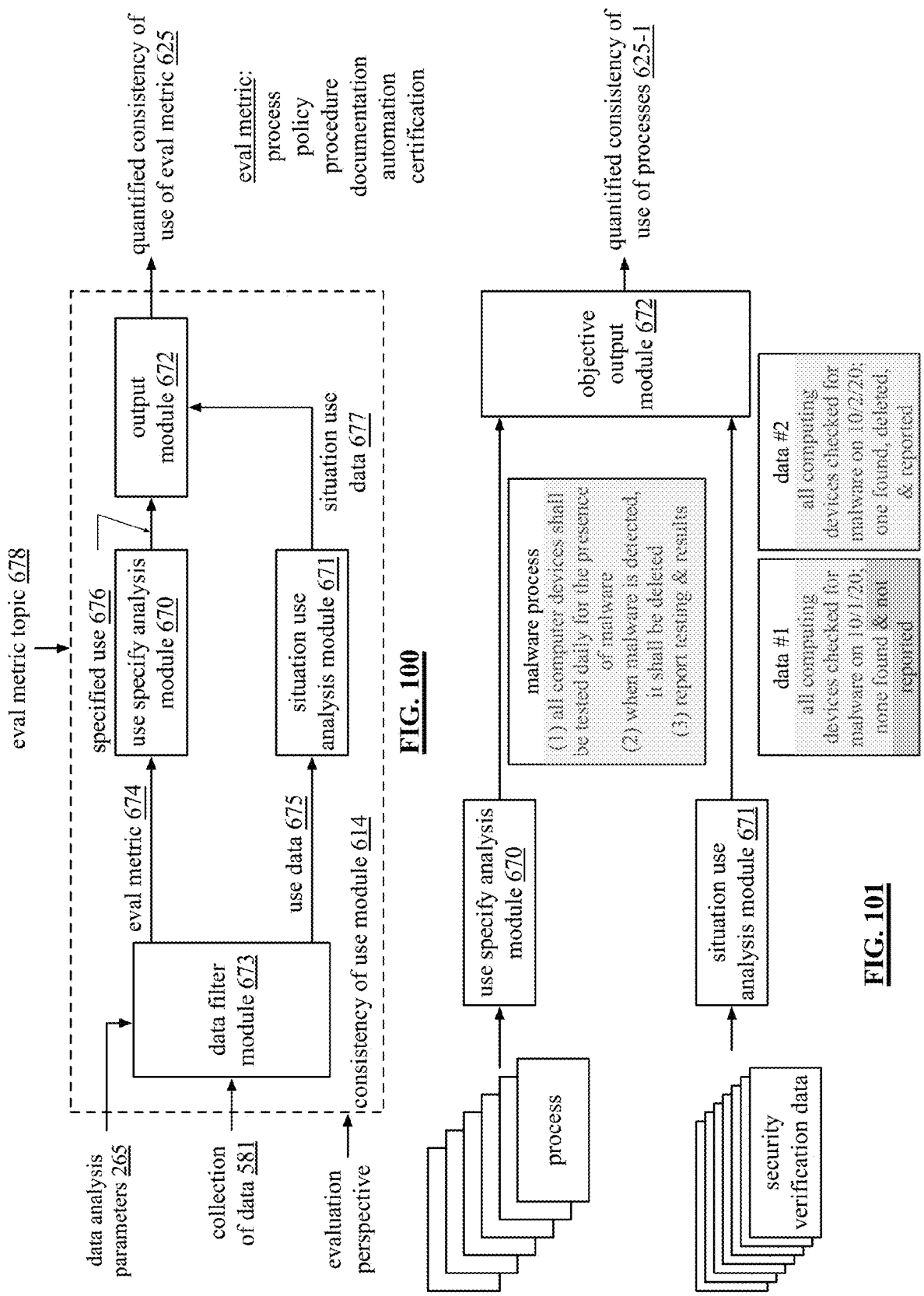
FIG. 100 is a schematic block diagram of an embodiment of a consistency of use module in accordance with the present disclosure.
FIG. 101 is a diagram of an example of a consistency of use module producing a quantified consistency of use of an evaluation metric in accordance with the present disclosure.

FIG. 100 is a schematic block diagram of an embodiment of a consistency of use module 614 that includes a data filter module 673, a use specify analysis module 670, a use situation use analysis module 671, and an output module 672. The consistency of use module 614 generates a quantified consistency of use of evaluation metric indication 625 based on the data 581 and in accordance with an evaluation perspective (e.g., understanding, implementation, operation, or self-analysis). For example, the consistency of use module generates, for the system (or portion thereof) being evaluated, a quantified consistency of use evaluation metric indication 625 for:

understanding of processes (e.g., situations of when identified relevant processes were used in comparison to expected situations as to when relevant processes are to be used);
processes regarding implementation (e.g., situations of when identified relevant processes regarding design and/or build of the system (or portion thereof) were used compared to expected situations of when relevant processes regarding design and/or build of the system (or portion thereof) are to be used);
processes regarding operation (e.g., situations of when identified relevant processes regarding operation of the system (or portion thereof) were used compared to expected situations of relevant processes regarding operation of the system (or portion thereof) are to be used);
processes regarding self-analysis (e.g., situations of when identified relevant processes regarding self-analysis of the system (or portion thereof) were used compared to expected situations of relevant processes regarding self-analysis of the system (or portion thereof) are to be used);
understanding of policies;
policies regarding implementation;
policies regarding operation;
policies regarding self-analysis;
understanding of procedures;
procedures regarding implementation;
procedures regarding operation;
procedures regarding self-analysis;
understanding of certificates;
certificates regarding implementation;
certificates regarding operation;
certificates regarding self-analysis;
understanding of documentation;
documentation regarding implementation;
documentation regarding operation;
documentation regarding self-analysis;
understanding of automation;
automation regarding implementation;
automation regarding operation;
automation regarding self-analysis;
understanding of another evaluation metric;
another evaluation metric regarding implementation;
another evaluation metric regarding operation; and/or
another evaluation metric regarding self-analysis.

The data filter module 673 filters the collection of data 581 in accordance with the data analysis parameters to produce evaluation metric data 6764 and use of evaluation metric data 675. The use specify analysis module 670 produces, for a particular evaluation perspective, evaluation metric specific use data 676 (i.e., specified situation for when the evaluation metrics should be used) from the evaluation metric data 674. The situation use analysis module 671 produces, for a particular evaluation perspective, situation use data 677 (i.e., the recorded situations of when evaluation metrics were actually used) from the use of evaluation metric data 675 (use data). The output module 672 compares the evaluation metric specific use data 676 with the situation use data 677 to produce the quantified consistency of use of evaluation metric indication 625 for a particular evaluation perspective.

In an embodiment, the use specify analysis module 670 interprets, for a particular evaluation perspective, process data of the evaluation metric data 674 to determine situations as to when one or more processes should be used. For example, the use specify analysis module 670 determines that use of process 1, which is regarding granting user access privileges for level 4 employees, was to be used for employees 1-22. The use specify analysis module 670 also interprets, for a particular evaluation perspective, policy data of the evaluation metric data 674 to determine situations as to when one or more policies should be used. The use specify analysis module 670 also interprets, for a particular evaluation perspective, procedure data of the evaluation metric data 674 to determine situations as to when one or more procedures should be used.

The use specify analysis module 670 also interprets, for a particular evaluation perspective, documentation data of the evaluation metric data 674 to determine situations as to when one or more documents should be used (e.g., interpreted, created, edited, signed, etc.). The use specify analysis module 670 also interprets, for a particular evaluation perspective, certification data of the evaluation metric data 674 to determine situations as to when one or more certificates should be used (e.g., verified, created, updated, signed, etc.). The use specify analysis module 670 also interprets, for a particular evaluation perspective, automation data of the evaluation metric data 674 to determine situations as to when one or more automations should be used.

The situation use analysis module 671 interprets, for a particular evaluation perspective, the use data 675 to determine the situations as to when processes should be used. For example, process 1 was used to grant access employees 7-22 all of whom are level 4 employees. The situation use analysis module 671 also interprets, for a particular evaluation perspective, the use data 675 to determine the situations when policies were used. The situation use analysis module 671 also interprets, for a particular evaluation perspective, the use data 675 to determine the situations when procedures were used.

The situation use analysis module 671 also interprets, for a particular evaluation perspective, the use data 675 to determine the situations when documents were used. The situation use analysis module 671 also interprets, for a particular evaluation perspective, the use data 675 to determine the situations when certificates were used. The situation use analysis module 671 also interprets, for a particular evaluation perspective, the use data 675 to determine the situations when automations were used. Note that the situation use analysis module 671 functions similarly to the use condition analysis module 661 of the appropriate use module 614.

The output module 672 aligns, for a particular evaluation perspective, situations of the evaluation metric use content data 676 (i.e., specified conditions of when evaluation metric data should be used) with situations of use of the situation use data 677 (i.e., the recorded situations of use) for a given process, policy, procedure, document, certificate, automation, and/or other evaluation metric. The output module 672 then interprets, for a particular evaluation perspective, the specified use situations for a particular evaluation metric (e.g., process) in light the actual use situations for the particular evaluation metric to produce a quantified consistency of use of evaluation metric indication 625, or portion thereof.

As an example, the evaluation metric use content data 676 indicates that process 1, which is regarding granting user access privileges for level 4 employees, was to be used to grant access to employees 1-22. The situation use data 677 indicates that process 1 was used for employees 7-22 all of whom are level 4 employees. The output module 672 generates the quantified consistency of use of evaluation metric indication 625, or portion thereof, to reflect that process 1 was used inconsistently (e.g., was not used for employees 1-6, but was used for employees 7-22). The quantified consistency of use of evaluation metric indication 625 may be a numerical value (e.g., 6 for missing uses; 16/22 for percentage of consistent use, 6:16 for a ratio of missing use to actual use, etc.) and/or a text value (e.g., 6 missing uses, 16 actually uses, etc.).

FIG. 101 is a diagram of an example of a consistency of use module 614 producing a quantified consistency of use of an evaluation metric 625-1. In this example, the use specify analysis module 670 identified three situations for use of one or more processes. Situation 1 is the all computing devices are to be tested daily for the presence of malware. Situation 2 is that any malware found is to be deleted. Situation 3 is that all testing and findings regarding malware is to be reported.

The situation use analysis module 671 interprets security verification data to identify uses the of the malware process(es). In this example, the situation use analysis module 671 produced two use condition data elements. Data element 1 indicates that all computing devices were tested three times on Oct. 1, 2020, no malware was detected, but a report was not generated. Data element 2 indicates that all computing devices were tested on Oct. 2, 2020, one malware was detected and deleted, and a report was generated. The output module 672 determines that (1) the malware process(es) were not consistently used since a report was not generated on Oct. 1, 2020.

Assuming a rating scale of 0-10 for each expected use of a malware process. For this example, there are six expected uses: test, delete if found, and report for each of the two day. Since, on Oct. 1, 2020 a report was not generated, this expected process would receive a 0 of 10 score. If part of the report were generated, but not a full report, the score would be greater than 0 of 10, but less than 10 of 10. The other expected uses would receive a 10 of 10 score since they were used as expected and fully. The output module 672 processes the six scores to produce a final score for the quantified consistency of use of the process(es) 625-1. For example, the final score is 50 of 60 (e.g., a summation function). As another example, the final score is 0.833 (e.g., an average function). As another example, the final score is 45 of 60 (e.g., a weighted average that emphasizes lower scores).

Figure 102:
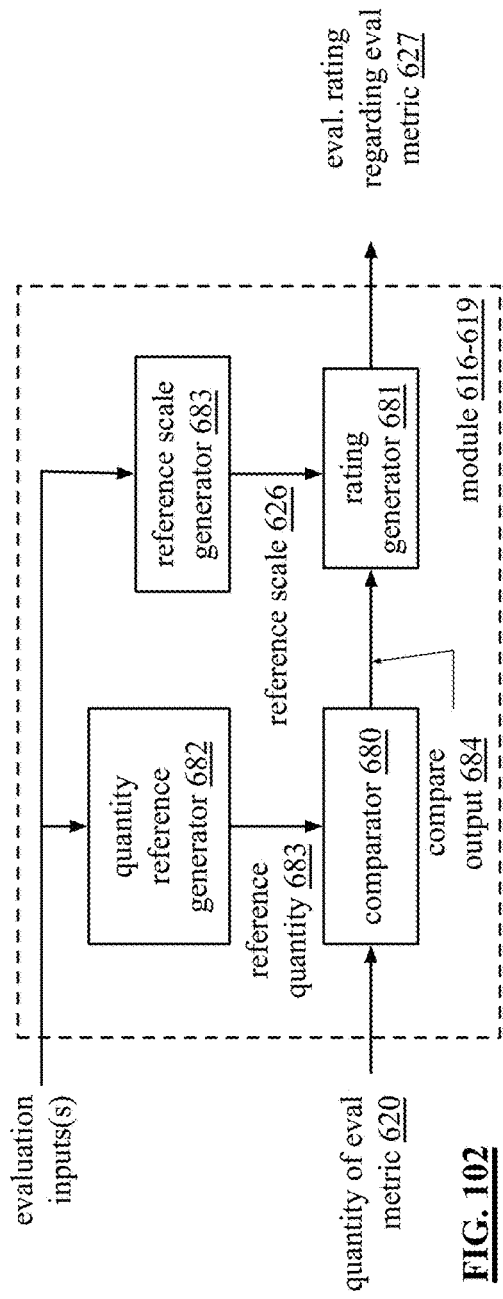
FIG. 102 is a schematic block diagram of an embodiment of an understanding, implementation, operation, or self-analysis module in accordance with the present disclosure.

FIG. 102 is a schematic block diagram of an embodiment of an understanding, implementation, operation, or self-analysis module 616-619 configured to process the quantity of evaluation metric indicator 620. The module 616-619 includes a comparator 680, a quantity reference generator 682, a rating generator 681, and a reference scale generator 683. As previously discussed, the quantity of evaluation metric indicator 620 is based on a count of evaluation metric data (e.g., a count of processes, a count of policies, etc.) and/or based on a checklist of evaluation metric data (e.g., a checklist of processes, a checklist of policies, etc.).

In an example, the quantity reference generator 682 generates a reference quantity 683 based on evaluation input(s) (e.g., evaluation viewpoint of disclosed data, discovered data, and/or desired data; evaluation metric of process, policy, procedure, documentation, certification, automation, and/or other metric; evaluation modality of sufficiency, effectiveness, quantity of use, appropriate use, and/or consistency of use; characteristics of the system that include size, capacity, etc., and/or evaluation category of identify, protect, detect, respond, and/or recover). An example of generating a reference quantity 683 for a count based evaluation is discussed with reference to FIG. 104. An example of generating a reference quantity 683 for a checklist based evaluation is discussed with reference to FIG. 107.

The comparator 680 compares the quantity of evaluation metric indicator 620 associated with a particular evaluation perspective (e.g., understanding, implementation, operation, or self-analysis) with the reference quantity 638 to produce a comparison output 684. For example, the comparator compares a count of processes (e.g., 12) for the evaluation perspective of understanding with an understanding reference quantity of processes (e.g., 13) to produce a comparison output 684 (e.g., one less process than expected). As another example, the comparator compares a list of processes with an understanding reference quantity checklist of processes to produce a comparison output 684 (e.g., all identified processes in the list are on the checklist). As another example, the comparator compares a count of processes (e.g., 8) for the evaluation perspective of implementation with an implementation reference quantity of processes (e.g., 8) to produce a comparison output 684 (e.g., have the expected number of implementation related processes).

The reference generator 683 generates a reference scale 626 based on the evaluation input(s). For example, the reference generator 683 generates a reference scale for processes for a particular evaluation perspective. As another example, the reference generator 683 generates a reference scale for processes regarding implementation for the evaluation category of identify. As another example, the reference generator 683 generates a reference scale for documentation regarding operation for the evaluation category of identify from disclosed data. Further examples of reference scales are provided with reference to FIGS. 105 and 108.

The rating generator 681 generates an evaluation rating 627 regarding an evaluation metric-evaluation perspective combination. Based on the previous example, the compare output 684 indicates that the count of identified processes within the collection of data was one less than expected for understanding and indicates that, for implementation, the quantity of processes was as expected. The rating generator 681 maps the compare output 626 (e.g., one less process than expected and as expected for understanding) to the reference scale 626 (e.g., a bell shaped curve having a scale for one or more of the evaluation metric-evaluation perspective combinations) to produce the evaluation rating 627 for processes. Further examples of generating the evaluation rating are provided with reference to FIGS. 106 and 109.

Figure 103:
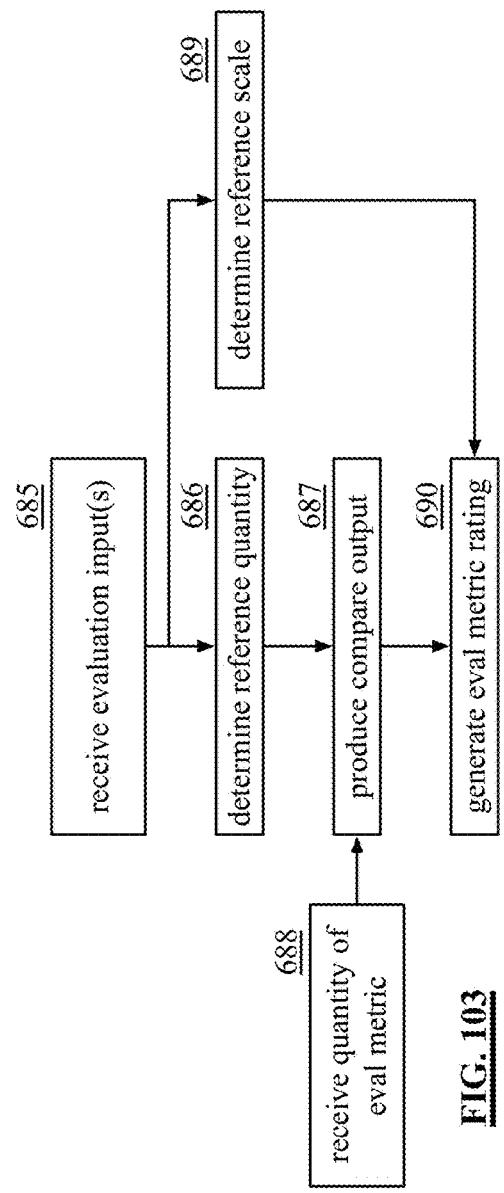
FIG. 103 is a logic diagram of an example of a module of FIG. 102 generating an evaluation metric rating in accordance with the present disclosure.

FIG. 103 is a logic diagram of an example of a module of FIG. 102 generating an evaluation metric rating. The method includes step 685 where the module receives one or more evaluation inputs (e.g., evaluation viewpoint, evaluation modality, evaluation category, system characteristics, and/or evaluation metric). The method continues at steps 686 and 689. At step 686, the module determines a reference quantity based on the evaluation input(s). At step 689, the module determines a reference scale based on the evaluation input (s).

The method further includes step 688 where the module receives a quantity of evaluation metric indication (e.g., a result of a count of processes, a result of a checklist of processes, etc.). The method continues at step 687 where the module produces a compare output based on the quantity of evaluation metric indication and the reference quantity. The method continues at step 690 where the module generates an evaluation rating for an evaluation metric based on the compare output and the reference scale.

FIG. 104 is a logic diagram of an example of a method performed by the quantity reference generator of a module of FIG. 102 to generate a reference quantity for a count based analysis. The method includes step 691 where the module determines whether the evaluation rating is to be generated based on disclosed data, discovered data, or based on a comparison disclosed, discovered, and/or desired data. When the evaluation rating is to be generated based on disclosed data or discovered data, the method continues at step 692 where the module determines to use an optimal count measure or a conventional count measure. For example, an optimal count measure corresponds to an expected number of processes, policies, procedures, documents, certificates, automations, and/or other metrics for a state of the art system of like characteristics. As another example, a conventional count corresponds to an expected number of processes, policies, procedures, documents, certificates, automations, and/or other metrics for a conventional system of like characteristics.

When the optimal count measure is not to be used, the method continues at step 693 where the module determines a convention quantity for one or more evaluation metrics (e.g., 15 processes, 5 policies, 23 procedures, 78 documents, 11 certificates, 3 automations, and/or 7 other metrics). When the optimal count measure is to be used, the method continues at step 694 where the module determines an optimal quantity for one or more evaluation metrics (e.g., 18 processes, 8 policies, 32 procedures, 124 documents, 19 certificates, 2 automations, and/or 22 other metrics).

When the evaluation rating is to be based on a comparison disclosed, discovered, and/or desired data, the method continues at step 695 where the module determines whether the evaluation is to be based on a comparison of disclosed to discovered data. If yes, the method continues at step 696 where the module determines a quantity of evaluation metric based on the discovered data for using in comparison to a quantity of evaluation metric of the disclosed data.

If the comparison is not for disclosed to discovered, the method continues at step 697 where the module determines whether the comparison is for disclosed to desired. If yes, the method continues at step 698 where the module determines a quantity of evaluation metric based on the desired data for using in comparison to a quantity of evaluation metric of the disclosed data. If not, the method continues at step 699 where the module determines a quantity of evaluation metric based on the desired data for using in comparison to a quantity of evaluation metric of the discovered data.

FIG. 105 is a diagram of an example of a quantity reference scale 689 that in a graph plotting a scale versus a deviation (deviation of quantity indication inputted from the reference quantity). The curve is bell shaped with zero deviation at the center of the bell curve. The curve could be symmetrical about the center or asymmetrical about the center (e.g., sharper curve when less than zero deviation in comparison to when greater than zero deviation). The scale value has two or more values to provide a desired level of granularity in the evaluation rating. In this example, the scale ranges from 0 to 50.

FIG. 106 is a logic diagram of an example of a method performed by a rating generator of FIG. 102 to generate an evaluation metric rating for a count based evaluation. The method begins a step 688, 686, and 689. At step 688, the module receives a quantity of evaluation metric indication of "X". At step 686, the module receives the reference quantity of "Y". At step 689, the module receives the reference scale (e.g., 0-50).

From steps 688 and 686, the method continues at step 687 where the module determine a deviation by comparing X and Y (e.g., Y-X=deviation). The method continues at step 690 where the module maps the deviation to the reference scale. For example, if the deviation is zero, the evaluation metric rating is 50. The more the deviation deviates from the zero, the lower the rating.

FIG. 107 is a logic diagram of an example of a method performed by the quantity reference generator of a module of FIG. 102 to generate a reference quantity for a checklist based analysis. The method includes step 700 where the module determines whether the evaluation rating is to be generated based on disclosed data, discovered data, or based on a comparison disclosed, discovered, and/or desired data. When the evaluation rating is to be generated based on disclosed data or discovered data, the method continues at step 701 where the module determines to use an optimal checklist or a conventional checklist. For example, an optimal checklist corresponds to a checklist for each of processes, policies, procedures, documents, certificates, automations, and/or other metrics for a state of the art system of like characteristics. As another example, a conventional checklist corresponds to a checklist for each of processes, policies, procedures, documents, certificates, automations, and/or other metrics for a conventional system of like characteristics.

When the optimal checklist is not to be used, the method continues at step 702 where the module determines a convention checklist for one or more evaluation metrics. When the optimal checklist is to be used, the method continues at step 703 where the module determines an optimal checklist for one or more evaluation metrics.

When the evaluation rating is to be based on a comparison disclosed, discovered, and/or desired data, the method continues at step 704 where the module determines whether the evaluation is to be based on a comparison of disclosed to discovered data. If yes, the method continues at step 705 where the module determines a checklist of evaluation metric based on the discovered data for using in comparison to the identified evaluation metric of the disclosed data.

If the comparison is not for disclosed to discovered, the method continues at step 706 where the module determines whether the comparison is for disclosed to desired. If yes, the method continues at step 707 where the module determines a checklist of evaluation metric based on the desired data for using in comparison to identified evaluation metric of the disclosed data. If not, the method continues at step 708 where the module determines a checklist of evaluation metric based on the desired data for using in comparison to identified evaluation metric of the discovered data.

FIG. 108 is a diagram of an example of a quantity reference scale 689 that in a graph plotting a scale versus a deviation (deviation of identified evaluation metric from the checklist for the evaluation metric). The curve is bell shaped with zero deviation at the center of the bell curve. The curve could be symmetrical about the center or asymmetrical about the center (e.g., sharper curve when less than zero deviation in comparison to when greater than zero deviation). The scale value has two or more values to provide a desired level of granularity in the evaluation rating. In this example, the scale ranges from 0 to 50.

FIG. 109 is a logic diagram of an example of a method performed by a rating generator of FIG. 102 to generate an evaluation metric rating for a checklist based evaluation. The method begins a step 688-1, 686-1, and 689-1. At step 688-1, the module receives a checklist of evaluation metric indication of "X". At step 686-1, the module receives the reference checklist of "Y". At step 689-1, the module receives the reference scale (e.g., 0-50).

From steps 688-1 and 686-1, the method continues at step 687-1 where the module determine a deviation by comparing X and Y (e.g., Y-X=deviation). The method continues at step 690-1 where the module maps the deviation to the reference scale. For example, if the deviation is zero, the evaluation metric rating is 50. The more the deviation deviates from the zero, the lower the rating.

Figure 110:
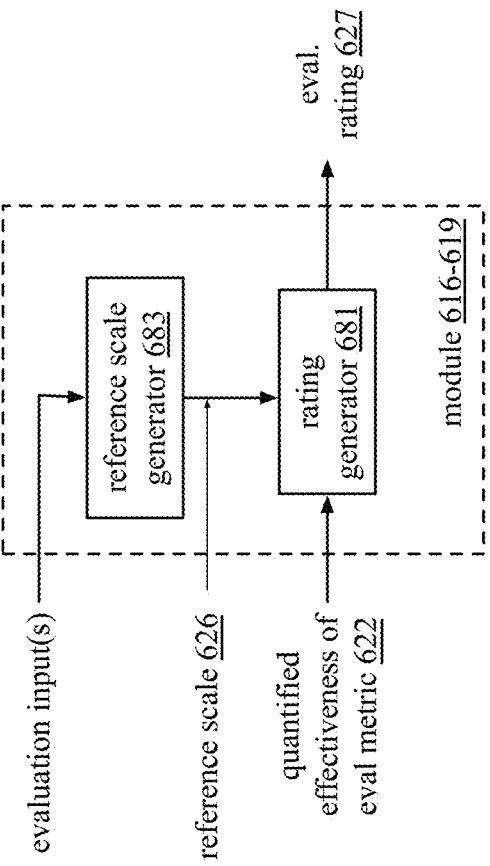
FIG. 110 is a schematic block diagram of an embodiment of an understanding, implementation, operation, or self-analysis module in accordance with the present disclosure.

FIG. 110 is a schematic block diagram of an embodiment of an understanding, implementation, operation, or self-analysis module 616-619 for processing the quantified effectiveness of evaluation metric indication 622. In this embodiment, the module 616-619 includes the reference scale generator 683 and the rating generator 681.

The reference generator 683 generates a reference scale 626 based on one or more evaluation inputs (e.g., one or more evaluation viewpoints; one or more evaluation metrics; one or more evaluation modalities; one or more characteristics of the system; and/or one or more evaluation categories). For example, the reference scale generator 683 generates a reference scale for evaluating processes of: none for a rating of 0; inconsistent for a rating of 10; repeatable for a rating of 20; standardized for a rating of 30; measured for a rating of 40; and optimized for rating of 50.

In this example, a level of "none" on the reference scale for processes corresponds to zero or near zero effectiveness of the processes to reliably, repeatedly, and/or completely indicate that the system, or portion thereof, fulfills the objectives of the system, or portion thereof, (e.g., some to all of guidelines, system requirements, system design, system build, and/or system operation). Continuing with this example, a level of "inconsistent" on the reference scale for processes corresponds to low level of effectiveness of the processes to reliably, repeatedly, and/or completely indicate that the system, or portion thereof, fulfills the objectives of the system, or portion thereof. As an example of inconsistent, there are processes but they has gaps in their content, which produces inconsistent indications of fulfilling the objectives. As another example of inconsistent, the content of one or more processes is inconsistent (e.g., contradicts, produces an infinite loop, creates a deadlock, etc.) with content of one or more other the processes, which produces inconsistent indications of fulfilling the objectives.

Continuing with this example, a level of "repeatable" on the reference scale for processes corresponds to low to mid level of effectiveness of the processes to reliably, repeatedly, and/or completely indicate that the system, or portion thereof, fulfills the objectives of the system, or portion thereof. As an example of repeatable, the content of the processes produce repeatable indications of fulfilling at least some of the objectives, or portions thereof, but the processes are static (not regularly reviewed, not regularly updated, etc.), having varying degrees of specificity, are more generic in nature than specific to the system, and/or are not created in a consistent manner.

Continuing with this example, a level of "standardized" on the reference scale for processes corresponds to mid-level of effectiveness of the processes to reliably, repeatedly, and/or completely indicate that the system, or portion thereof, fulfills the objectives of the system, or portion thereof. As an example of standardized, the content of the processes produce repeatable indications of fulfilling at least some of the objectives, or portions thereof, and are created in a consistent (e.g., standardized) manner, but the processes are static (not regularly reviewed, not regularly updated, etc.), having varying degrees of specificity, and/or are more generic in nature than specific to the system.

Continuing with this example, a level of "measured" on the reference scale for processes corresponds to mid to high level of effectiveness of the processes to reliably, repeatedly, and/or completely indicate that the system, or portion thereof, fulfills the objectives of the system, or portion thereof. As an example of measured, the content of the processes produce repeatable indications of fulfilling at least some of the objectives, or portions thereof, the processes are created in a consistent manner, have consistent specificity, and are specific to the system, but the processes are static (not regularly reviewed, not regularly updated, etc.).

Continuing with this example, a level of "optimized" on the reference scale for processes corresponds to high level of effectiveness of the processes to reliably, repeatedly, and/or completely indicate that the system, or portion thereof, fulfills the objectives of the system, or portion thereof. As an example of optimized, the content of the processes produce repeatable indications of fulfilling at least some of the objectives, or portions thereof, the processes are created in a consistent manner, have consistent specificity, are specific to the system, and are dynamic (regularly reviewed, regularly updated, etc.).

The reference scale generator 683 generates a reference scale for evaluating policies. As an example, the reference scale includes: none for a rating of 0; informal for a rating of 5; defined for a rating of 10; audited for a rating of 15; and embedded for a rating of 20. In this example, a level of "none" on the reference scale for policies corresponds to zero or near zero effectiveness of the policies to reliably, repeatedly, and/or completely indicate that the system, or portion thereof, fulfills the objectives of the system, or portion thereof.

Continuing with this example, a level of "informal" on the reference scale for policies corresponds to low level of effectiveness of the policies to reliably, repeatedly, and/or completely indicate that the system, or portion thereof, fulfills the objectives of the system, or portion thereof. As an example of informal, there are no formal requirements for creation, maintenance, and/or application of content of policies. As another example of informal, the policies have gaps in their content, which produces inconsistent indications of fulfilling the objectives.

Continuing with this example, a level of "defined" on the reference scale for policies corresponds to low to mid level of effectiveness of the policies to reliably, repeatedly, and/or completely indicate that the system, or portion thereof, fulfills the objectives of the system, or portion thereof. As an example of defined, there are formal requirements for content creation of policies and the policies produce mostly consistent results, but there are no, or limited, formal requirements for content maintenance of policies and/or content application of policies.

Continuing with this example, a level of "audited" on the reference scale for policies corresponds to mid to high level of effectiveness of the policies to reliably, repeatedly, and/or completely indicate that the system, or portion thereof, fulfills the objectives of the system, or portion thereof. As an example of audited, there are formal requirements for content creation of policies and for content application of the policies, the policies produce consistent results, but there is no, or limited, formal requirements for content maintenance of policies.

Continuing with this example, a level of "embedded" on the reference scale for policies corresponds to high level of effectiveness of the policies to reliably, repeatedly, and/or completely indicate that the system, or portion thereof, fulfills the objectives of the system, or portion thereof. As an example of embedded, there are formal requirements for content creation of policies, for content application of the policies, and for content maintenance of policies. Further, the policies produce consistent results.

As another example, the reference scale generator 683 generates a reference scale for evaluating documents of: none for a rating of 0; informal for a rating of 5; formal for a rating of 10; metric & reporting for a rating of 15; and improvement for a rating of 20. In this example, a level of "none" on the reference scale for documents corresponds to zero or near zero effectiveness of the documents to reliably, repeatedly, and/or completely indicate that the system, or portion thereof, fulfills the objectives of the system, or portion thereof.

Continuing with this example, a level of "informal" on the reference scale for documents corresponds to low level of effectiveness of the documents to reliably, repeatedly, and/or completely indicate that the system, or portion thereof, fulfills the objectives of the system, or portion thereof. As an example of informal, there are no formal requirements for creation, maintenance, and/or application of content of documents. As another example of informal, the documents have gaps in their content, which produces inconsistent indications of fulfilling the objectives.

Continuing with this example, a level of "formal" on the reference scale for documents corresponds to low to mid level of effectiveness of the documents to reliably, repeatedly, and/or completely indicate that the system, or portion thereof, fulfills the objectives of the system, or portion thereof. As an example of defined, there are formal requirements for content creation of documents, but there are no, or limited, formal requirements for content maintenance of documents and/or content application of documents.

Continuing with this example, a level of "metric & reporting" on the reference scale for documents corresponds to mid to high level of effectiveness of the documents to reliably, repeatedly, and/or completely indicate that the system, or portion thereof, fulfills the objectives of the system, or portion thereof. As an example of metric & reporting, there are formal requirements for content creation of documents and for content application of the documents, the documents produce consistent results, but there is no, or limited, formal requirements for content maintenance of documents.

Continuing with this example, a level of "improvement" on the reference scale for documents corresponds to high level of effectiveness of the documents to reliably, repeatedly, and/or completely indicate that the system, or portion thereof, fulfills the objectives of the system, or portion thereof. As an example of improvement, there are formal requirements for content creation of documents, for content application of the documents, and for content maintenance of policies.

As another example, the reference scale generator 683 generates a reference scale for evaluating automation of: unavailable for a rating of 10; none for a rating of 0; partial for a rating of 5; and full for a rating of 10. In this example, a level of "unavailable" for automation corresponds to automation for a particular incident (e.g., automation of a feature of the system) is not available. Continuing with this example, a level of "none" on the reference scale for automation corresponds to zero or near zero effectiveness of evaluating automation of the system, or portion thereof.

Continuing with this example, a level of "partial" on the reference scale for automation corresponds to mid-level effectiveness of evaluating automation of the system, or portion thereof. Continuing with this example, a level of "full" on the reference scale for automation corresponds to high level effectiveness of evaluating automation of the system, or portion thereof.

The reference scale generator 683 generates a reference scale for evaluating procedures of: none for a rating of 0; informal for a rating of 5; defined for a rating of 10; audited for a rating of 15; and embedded for a rating of 20. The reference scale generator 683 also generates a reference scale for evaluating certificates of: none for a rating of 0; informal for a rating of 5; forma for a rating of 10; metric & reporting for a rating of 15; and improvement for a rating of 20.

The rating generator 681 generates the evaluation rating 627 for the quantified effectiveness of the evaluation metric indicator 622 based on the reference scale 626. For each of the evaluation metrics, the rating generator 681 maps the quantified effectiveness of the evaluation metric to the reference scale 626. As an example, the rating generator 681 maps the quantified effectiveness of processes to the process reference scale 626. In this example, the quantified effectiveness of processes includes an indication for repeatability of the processes, process content creation consistency, consistency of process content specificity (e.g., processes are about equally detailed and/or are all appropriately detailed), a balance of generic polices to system specific policies, and/or a balance of static policies to dynamic policies. Additional examples are provided with reference to FIGS. 111-116.

Figure 111:
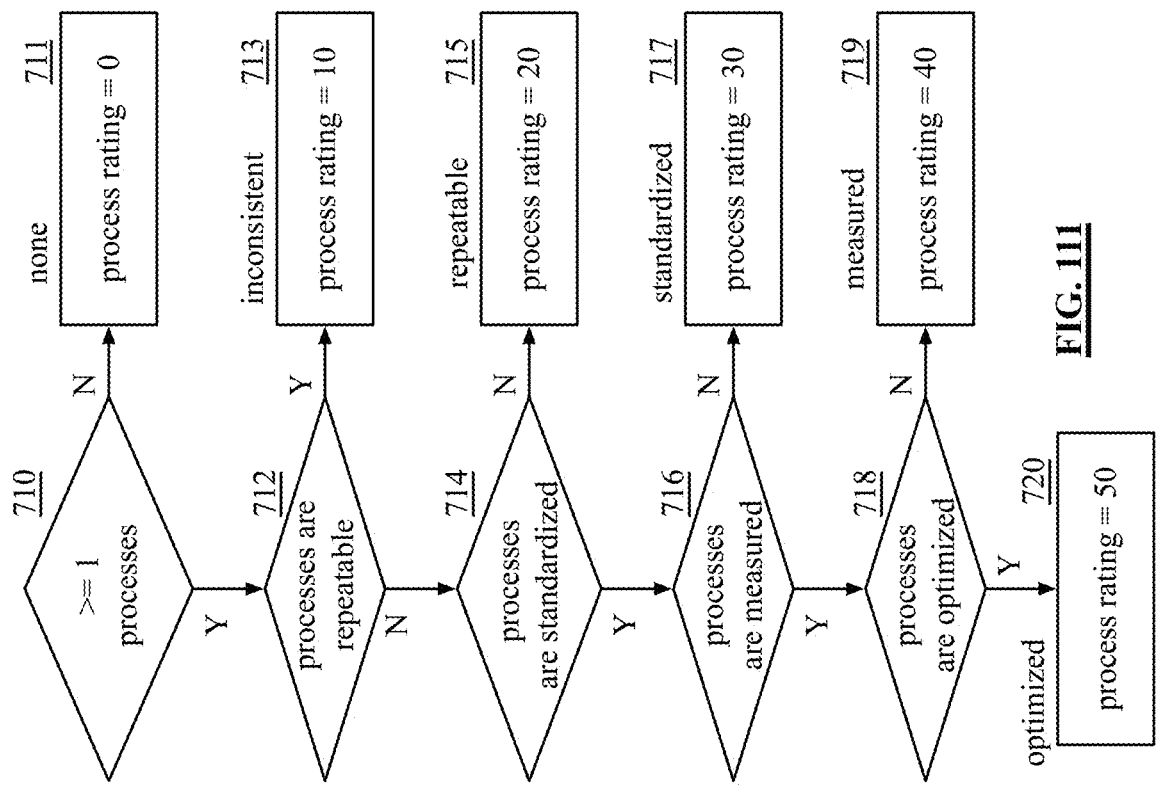
FIG. 111 is a logic diagram of an example of a module of FIG. 110 generating an evaluation metric rating in accordance with the present disclosure.

FIG. 111 is a logic diagram of an example of a module of FIG. 110 generating an evaluation metric rating. The method begins at step 710 where the module evaluates the quantified effectiveness of processes to determine whether there is at least one process in the collection of data. Note that the threshold number in this step could be greater than one. If there are no processes, the method continues at step 711 where the module generates a process rating of 0 (and/or a word rating of "none").

If there is at least one process, the method continues at step 712 where the module determines whether the content of the processes are repeatable. As a further and/or alternative example, repeatable includes content of processes produce consistent results, content detail variations from process to process, content is not routinely reviewed in an organized manner, and/or the content is not regulated.

If the content of the processes are not repeatable, the method continues at step 713 where the module generates a process rating of 10 (and/or a word rating of "inconsistent"). If, however, the content of processes are at least repeatable, the method continues at step 714 where the module determines whether the content of the processes is standardized. As a further and/or alternative example, standardized includes repeatable plus there are no appreciable variations in detail of content of the processes from process to process, and/or the content of the processes are regulated.

If the content of the processes is not standardized, the method continues at step 715 where the module generates a process rating of 20 (and/or a word rating of "repeatable"). If, however, the content of the processes are at least standardized, the method continues at step 716 where the module determines whether the content of the processes is measured. As a further and/or alternative example, measured includes standardized plus precise, exact, and/or content calculated to specific needs, concerns, and/or functioning of the system.

If the content of the processes is not measured, the method continues at step 717 where the module generates a process rating of 30 (and/or a word rating of "standardized"). If, however, the content of the processes is at least measured, the method continues at step 718 where the module determines whether the content of the processes is optimized. As a further and/or alternative example, optimized includes measured plus content of the processes are up-to-date and/or improvement of the content of the process is assessed on a regular basis as part of system protocols.

If the content of the processes is not optimized, the method continues at step 719 where the module generates a process rating of 40 (and/or a word rating of "measured"). If the content of the processes is optimized, the method continues at step 720 where the module generates a process rating of 50 (and/or a word rating of "optimized"). Note that the numerical rating are example values and could be other values. Further note that the number of level of process rating may be more or less than the six shown.

Figure 112:
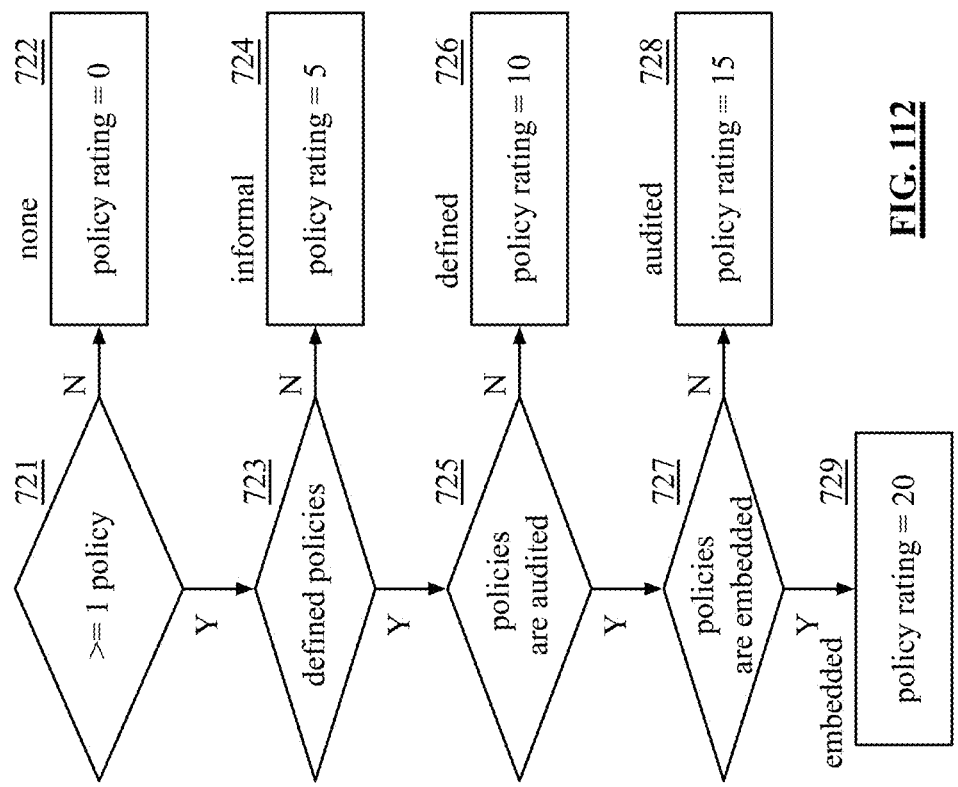
FIG. 112 is a logic diagram of a further example of a module of FIG. 110 generating an evaluation metric rating in accordance with the present disclosure.

FIG. 112 is a logic diagram of a further example of a module of FIG. 110 generating a policy evaluation rating. The method begins at step 721 where the module determines whether there is at least one policy in the collection of data. Note that the threshold number in this step could be greater than one. If there are no policies, the method continues at step 722 where the module generates a policy rating of 0 (and/or a word rating of "none").

If there is at least one policy, the method continues at step 723 where the module determines whether content of the policies is defined. As a further and/or alternative example, defined content of policies include sufficient detail to produce consistent results, include content detail variations from policy to policy, content of the policies is not routinely reviewed in an organized manner, and/or content of the policies is not all regulated.

If the content of the policies is not defined, the method continues at step 724 where the module generates a policy rating of 5 (and/or a word rating of "informal"). If, however, the content of the policies is at least defined, the method continues at step 725 where the module determines whether the policies are audited. As a further and/or alternative example, audited includes defined plus the content of the policies is routinely reviewed, and/or the content of the policies is regulated.

If the content of the policies is not audited, the method continues at step 726 where the module generates a policy rating of 10 (and/or a word rating of "defined"). If, however, the content of the policies is at least audited, the method continues at step 727 where the module determines whether the content of the policies is embedded. As a further and/or alternative example, embedded includes audited plus the content of the policies is systematically rooted in most, if not all, aspects of the system.

If the content of the policies is not embedded, the method continues at step 728 where the module generates a policy rating of 15 (and/or a word rating of "audited"). If the policies are embedded, the method continues at step 729 where the module generates a policy rating of 20 (and/or a word rating of "embedded"). Note that the numerical rating are example values and could be other values. Further note that the number of level of policy rating may be more or less than the five shown.

Figure 113:
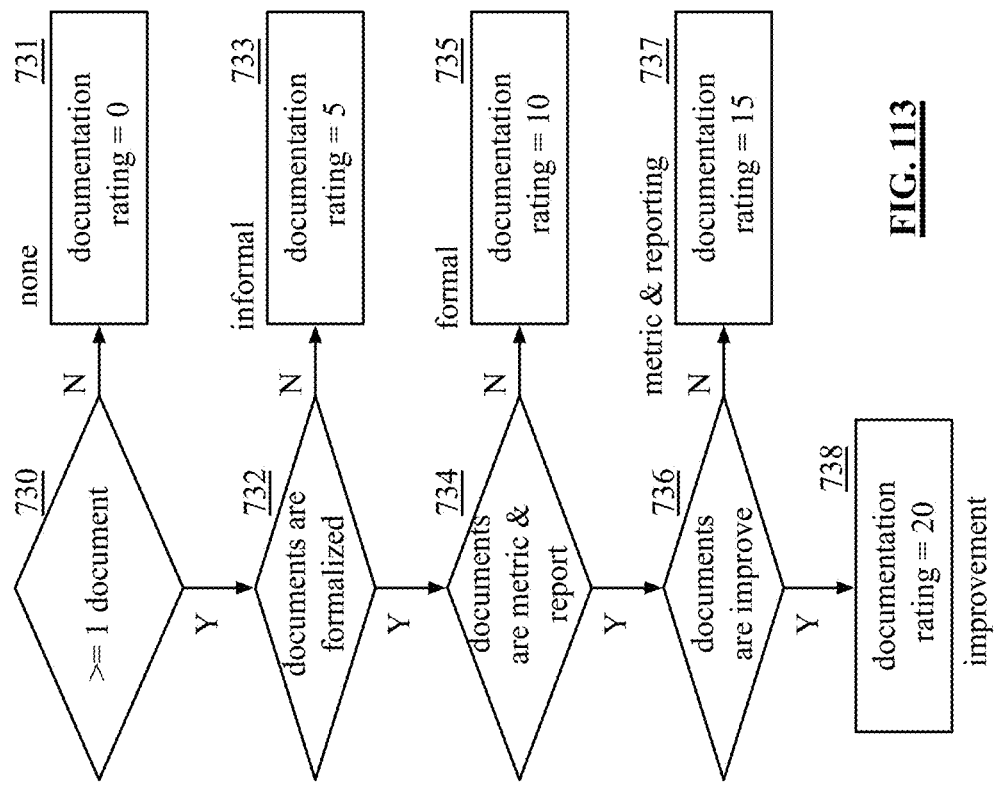
FIG. 113 is a logic diagram of a further example of a module of FIG. 110 generating an evaluation metric rating in accordance with the present disclosure.

FIG. 113 is a logic diagram of a further example of a module of FIG. 110 generating a policy evaluation rating. The method begins at step 730 where the module determines whether there is at least one document in the collection of data. Note that the threshold number in this step could be greater than one. If there are no documents, the method continues at step 731 where the module generates a documentation rating of 0 (and/or a word rating of "none").

If there is at least one document, the method continues at step 732 where the module determines whether the documents are formalized. As a further and/or alternative example, formalized documents include sufficient detail to produce consistent documentation, there will likely be variations from document to document, the documents are not routinely reviewed in an organized manner, and/or formation of documents is not regulated.

If the documents are not formalized, the method continues at step 733 where the module generates a documentation rating of 5 (and/or a word rating of "informal"). If, however, the documents are at least formalized, the method continues at step 734 where the module determines whether the documents are metric & reporting. As a further and/or alternative example, metric & reporting includes formal plus the documents are routinely reviewed, and/or the formation of documents is regulated.

If the documents are not metric & reporting, the method continues at step 735 where the module generates a documentation rating of 10 (and/or a word rating of "formal"). If, however, the documents are at least metric & reporting, the method continues at step 743 where the module determines whether the documents are improvement. As a further and/or alternative example, improvement includes metric & reporting plus document formation is systematically rooted in most, if not all, aspects of the system.

If the documents are not improvement, the method continues at step 737 where the module generates a documentation rating of 15 (and/or a word rating of "metric & reporting"). If the documents are improvement, the method continues at step 738 where the module generates a documentation rating of 20 (and/or a word rating of "improvement"). Note that the numerical rating are example values and could be other values. Further note that the number of level of documentation rating may be more or less than the five shown.

Figure 114:
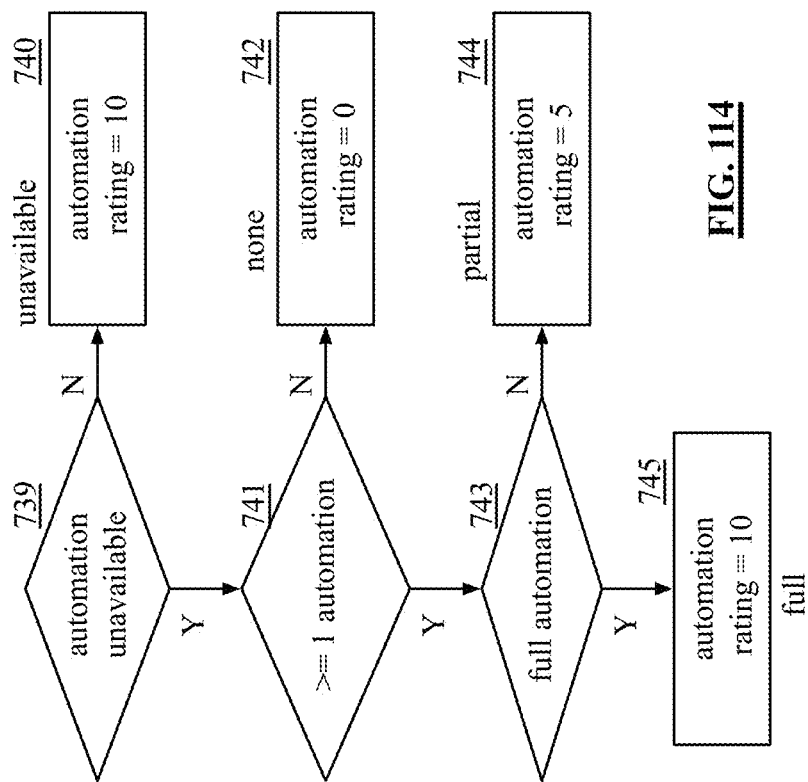
FIG. 114 is a logic diagram of a further example of a module of FIG. 110 generating an evaluation metric rating in accordance with the present disclosure.

FIG. 114 is a logic diagram of a further example of a module of FIG. 110 generating an automation evaluation rating. The method begins at step 739 where the module determines whether there is available automation for a particular system aspect, system criteria, system features, and/or system mode. If automation is not available, the method continues at step 740 where the module generates an automation rating of 10 (and/or a word rating of "unavailable").

If automation is available (e.g., there are particular system features that can be automated), the method continues at step 741 where the module determines whether there is at least one automation in the data. If not, the method continues at step 742 where the module generates an automation rating of 0 (and/or a word rating of "none").

If there is at least one automation, the method continues at step 743 where the module determines whether full automation is found in the data. As a further and/or alternative example, full automation refers to the automation techniques that are available for the system are in the data and the automations are effective (e.g., there is automation for the particular features that can have automation and the automations work as intended).

If the automation is not full, the method continues at step 744 where the module generates an automation rating of 5 (and/or a word rating of "partial"). If, however, the automation is full, the method continues at step 745 where the module generates an automation rating of 10 (and/or a word rating of "full"). Note that the numerical rating are example values and could be other values. Further note that the number of level of automation may be more or less than the four shown.

Figure 115:
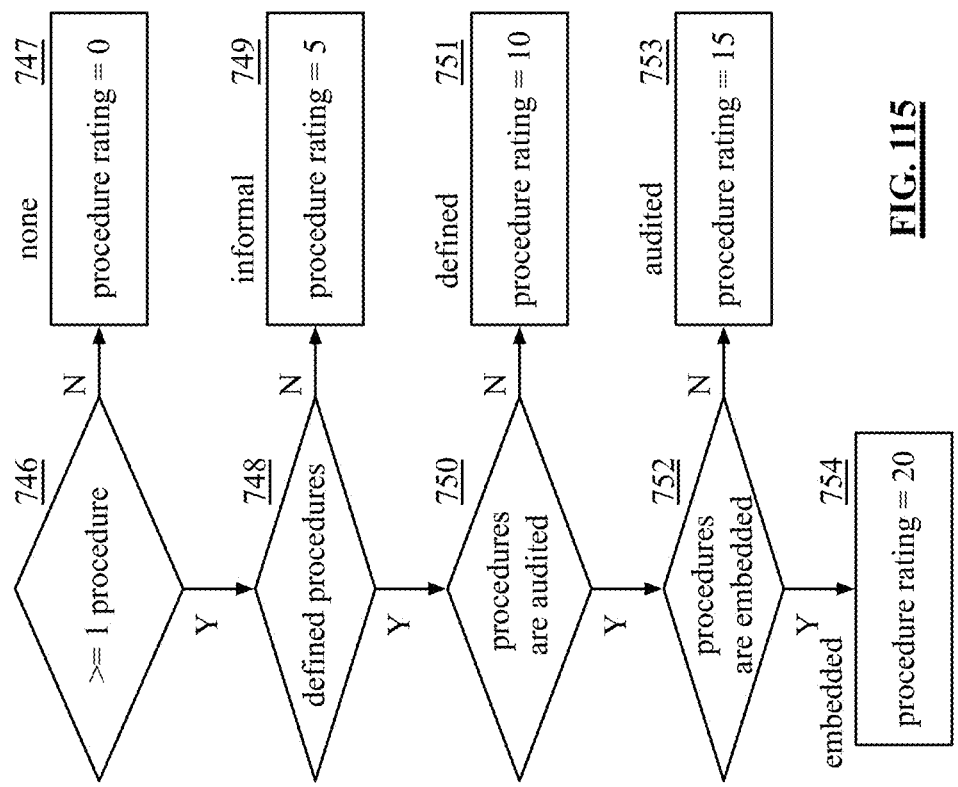
FIG. 115 is a logic diagram of a further example of a module of FIG. 110 generating an evaluation metric rating in accordance with the present disclosure.

FIG. 115 is a logic diagram of a further example of a module of FIG. 110 generating a procedure evaluation rating. In this example, the module uses a reference scale that is similar to the reference scales as was used for policies, but a different reference scale could be use. The method begins at step 746 where the module determines whether there is at least one procedure in the collection of data. Note that the threshold number in this step could be greater than one. If there are no procedures, the method continues at step 747 where the module generates a procedure rating of 0 (and/or a word rating of "none").

If there is at least one procedure, the method continues at step 748 where the module determines whether content of the procedures is defined. As a further and/or alternative example, defined content of procedures include sufficient detail to produce consistent results, include content detail variations from procedure to procedure, content of the procedures is not routinely reviewed in an organized manner, and/or content of the procedures is not all regulated.

If the content of the procedures is not defined, the method continues at step 749 where the module generates a procedure rating of 5 (and/or a word rating of "informal"). If, however, the content of the procedures is at least defined, the method continues at step 750 where the module determines whether the procedures are audited. As a further and/or alternative example, audited includes defined plus the content of the procedures is routinely reviewed, and/or the content of the procedures is regulated.

If the content of the procedures is not audited, the method continues at step 751 where the module generates a procedure rating of 10 (and/or a word rating of "defined"). If, however, the content of the procedures is at least audited, the method continues at step 752 where the module determines whether the content of the procedures is embedded. As a further and/or alternative example, embedded includes audited plus the content of the procedures is systematically rooted in most, if not all, aspects of the system.

If the content of the procedures is not embedded, the method continues at step 753 where the module generates a procedure rating of 15 (and/or a word rating of "audited"). If the procedures are embedded, the method continues at step 754 where the module generates a procedure rating of 20 (and/or a word rating of "embedded"). Note that the numerical rating are example values and could be other values. Further note that the number of level of procedure rating may be more or less than the five shown.

Figure 116:
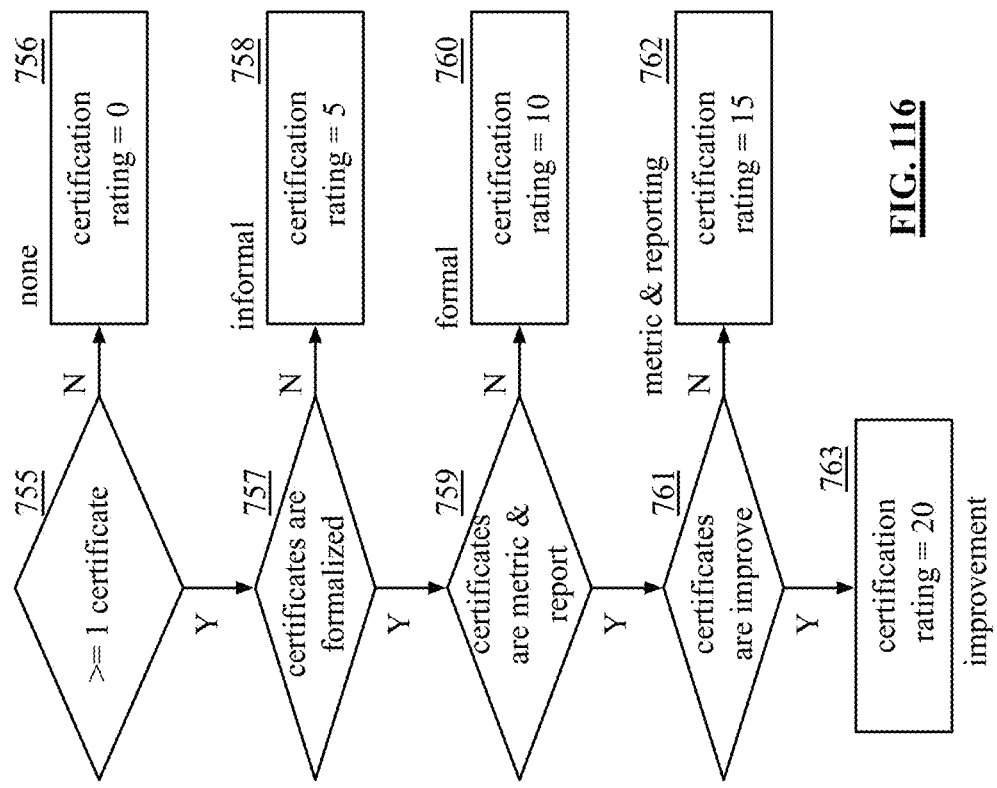
FIG. 116 is a logic diagram of a further example of a module of FIG. 110 generating an evaluation metric rating in accordance with the present disclosure.

FIG. 116 is a logic diagram of a further example of a module of FIG. 110 generating a certification evaluation rating. In this example, the module uses a reference scale that is similar to the reference scales as was used for documentation, but a different reference scale could be use. The method begins at step 755 where the module determines whether there is at least one certificate in the collection of data. Note that the threshold number in this step could be greater than one. If there are no certificates, the method continues at step 756 where the module generates a certification rating of 0 (and/or a word rating of "none").

If there is at least one certificate, the method continues at step 757 where the module determines whether the certificates are formalized. As a further and/or alternative example, formalized certificates include sufficient detail to obtain and/or verify consistent certification, there will likely be variations in the detail for obtaining and/or verifying certificates, the manner of obtaining and/or verifying certificates are not routinely reviewed in an organized manner, and/or manner of obtaining and/or verifying certificates are not regulated.

If the certificates are not formalized, the method continues at step 758 where the module generates a certification rating of 5 (and/or a word rating of "informal"). If, however, the certificates are at least formalized, the method continues at step 759 where the module determines whether the certificates are metric & reporting. As a further and/or alternative example, metric & reporting includes formal plus the manner of obtaining and/or verifying certificates are routinely reviewed, and/or the manner of obtaining and/or verifying certificates are regulated.

If the documents are not metric & reporting, the method continues at step 760 where the module generates a certification rating of 10 (and/or a word rating of "formal"). If, however, the certificates are at least metric & reporting, the method continues at step 761 where the module determines whether the certificates are improvement. As a further and/or alternative example, improvement includes metric & reporting plus the manner of obtaining and/or verifying certificates is systematically rooted in most, if not all, aspects of the system.

If the certificates are not improvement, the method continues at step 762 where the module generates a certificate rating of 15 (and/or a word rating of "metric & reporting").

If the certificates are improvement, the method continues at step 763 where the module generates a certification rating of 20 (and/or a word rating of "improvement"). Note that the numerical rating are example values and could be other values. Further note that the number of level of certification rating may be more or less than the five shown.

FIG. 117 is a schematic block diagram of an embodiment of an understanding, implementation, operation, or self-analysis module 616-619 configured to process the quantity of evaluation metric use indicator 623. The module 616-619 includes a comparator 680, a quantity reference generator 682, a rating generator 681, and a reference scale generator 683. As previously discussed, the quantity of evaluation metric use indicator 623 is based on a count of use of evaluation metric data (e.g., a count of use of processes, a count of use of policies, etc.).

In an example, the quantity reference generator 682 generates a reference use quantity 765 based on evaluation input(s) (e.g., evaluation viewpoint of disclosed data, discovered data, and/or desired data; evaluation metric of process, policy, procedure, documentation, certification, automation, and/or other metric; evaluation modality of sufficiency, effectiveness, quantity of use, appropriate use, and/or consistency of use; characteristics of the system that include size, capacity, etc., and/or evaluation category of identify, protect, detect, respond, and/or recover).

The comparator 680 compares the quantity of evaluation metric use indicator 623 associated with a particular evaluation perspective (e.g., understanding, implementation, operation, or self-analysis) with the reference quantity 665 (e.g., an anticipated level of use based on a conventional system or a state-of-art system) to produce a comparison output 766. For example, the comparator compares a count of use of processes (e.g., 12) for the evaluation perspective of understanding with an understanding reference quantity of use of processes (e.g., 13) to produce a comparison output 766 (e.g., one less use of processes than expected). As another example, the comparator compares a list of use of processes with an understanding reference quantity checklist of use of processes to produce a comparison output 766 (e.g., all identified uses of processes in the list are on the checklist). As another example, the comparator compares a count of use of processes (e.g., 8) for the evaluation perspective of implementation with an implementation reference quantity of use of processes (e.g., 8) to produce a comparison output 766 (e.g., have the expected number of uses of implementation related processes).

The reference generator 683 generates a reference scale 626 based on the evaluation input(s). For example, the reference generator 683 generates a reference scale for processes for a particular evaluation perspective. As another example, the reference generator 683 generates a reference scale for processes regarding implementation for the evaluation category of identify. As another example, the reference generator 683 generates a reference scale for documentation regarding operation for the evaluation category of identify from disclosed data. Further examples of reference scales are provided with reference to FIGS. 119-124.

The rating generator 681 generates an evaluation rating 627 regarding use of an evaluation metric-evaluation perspective combination. Based on the previous example, the compare output 684 indicates that the count of use of identified processes within the collection of data was one less than the expected use for understanding and indicates that, for implementation, the quantity of use of processes was as expected. The rating generator 681 maps the compare output 626 (e.g., one less use of processes than expected and as expected) to the reference scale 626 (e.g., a bell shaped curve having a scale for one or more of the evaluation metric-evaluation perspective combinations) to produce the evaluation rating 627 for processes based on use and for understanding.

FIG. 118 is a logic diagram of an example of a module of FIG. 117 generating an evaluation metric rating 627. The method includes step 767 where the module receives one or more evaluation inputs (e.g., evaluation viewpoint, evaluation modality, evaluation category, system characteristics, and/or evaluation metric). The method continues at steps 768 and 769. At step 768, the module determines a reference use quantity based on the evaluation input(s). At step 769, the module determines a use reference scale based on the evaluation input(s).

The method further includes step 770 where the module receives a quantity of evaluation metric indication (e.g., a result of a count of use of processes, a result of a checklist of use of processes, etc.). The method continues at step 769 where the module produces a compare output based on the quantity of evaluation metric indication and the reference use quantity. The method continues at step 772 where the module generates an evaluation rating for an evaluation metric based on the compare output and the reference scale.

Figure 119:
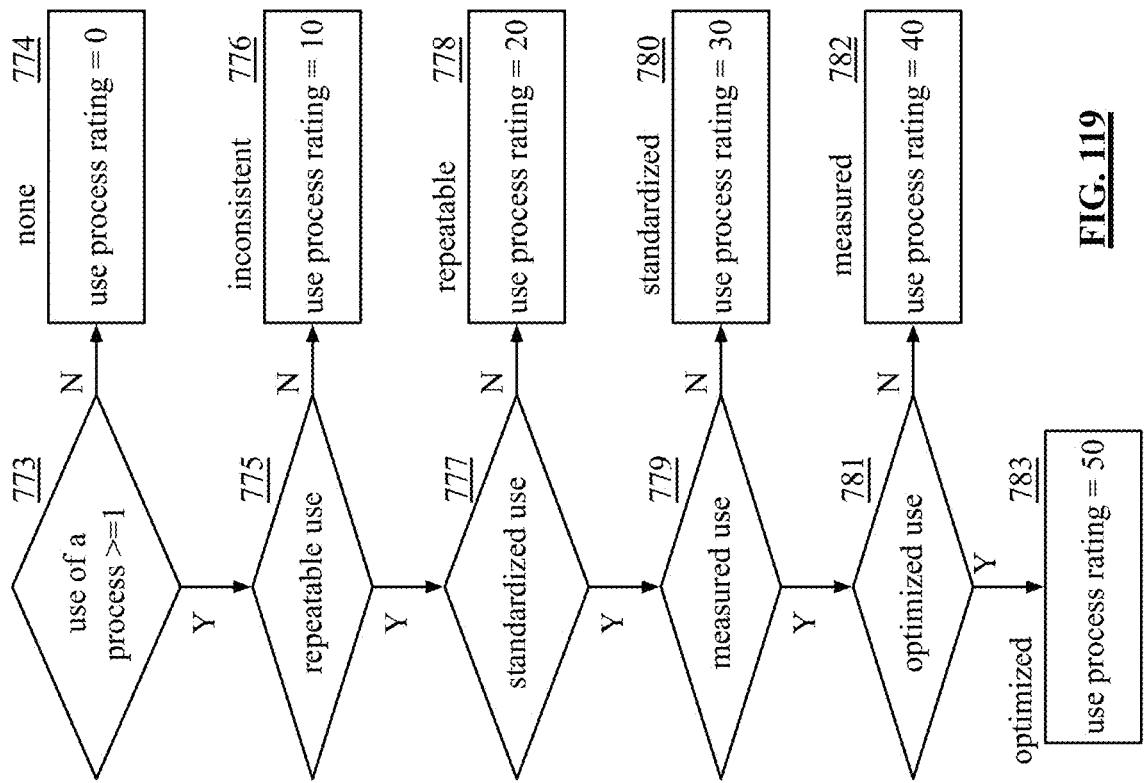
FIG. 119 is a logic diagram of an example of a module of FIG. 117 generating an evaluation metric rating in accordance with the present disclosure.

FIG. 119 is a logic diagram of an example of a module of FIG. 117 generating a process use evaluation rating. The method begins at step 773 where the module evaluates the quantity of use of processes to determine whether there is at least one use of a process in the collection of data. Note that the threshold number in this step could be greater than one. If there are no uses of a process, the method continues at step 774 where the module generates a process use rating of 0 (and/or a word rating of "none").

If there is at least one use of a process, the method continues at step 775 where the module determines whether the use of the processes is repeatable. As a further and/or alternative example, repeatable includes means to track uses of processes, there are some tracking variations, the count is not routinely reviewed in an organized manner, and/or the count is not regulated.

If the use of the processes is not repeatable, the method continues at step 776 where the module generates a process use rating of 10 (and/or a word rating of "inconsistent"). If, however, the use of processes is at least repeatable, the method continues at step 774 where the module determines whether the use of the processes is standardized. As a further and/or alternative example, standardized use includes repeatable plus the count of the processes is regulated.

If the use of the processes is not standardized, the method continues at step 778 where the module generates a process rating of 20 (and/or a word rating of "repeatable"). If, however, the use of the processes is at least standardized, the method continues at step 779 where the module determines whether the use of the processes is measured. As a further and/or alternative example, measured includes standardized plus there are no appreciable tracking variations.

If the use of the processes is not measured, the method continues at step 780 where the module generates a process use rating of 30 (and/or a word rating of "standardized"). If, however, the use of the processes is at least measured, the method continues at step 781 where the module determines whether the use of the processes is optimized. As a further and/or alternative example, optimized includes measured plus the count is routinely reviewed in an organized manner.

If the use of the processes is not optimized, the method continues at step 782 where the module generates a process use rating of 40 (and/or a word rating of "measured"). If the use of the processes is optimized, the method continues at step 783 where the module generates a process use rating of 50 (and/or a word rating of "optimized"). Note that the numerical rating are example values and could be other values. Further note that the number of level of use of process rating may be more or less than the six shown.

Figure 120:
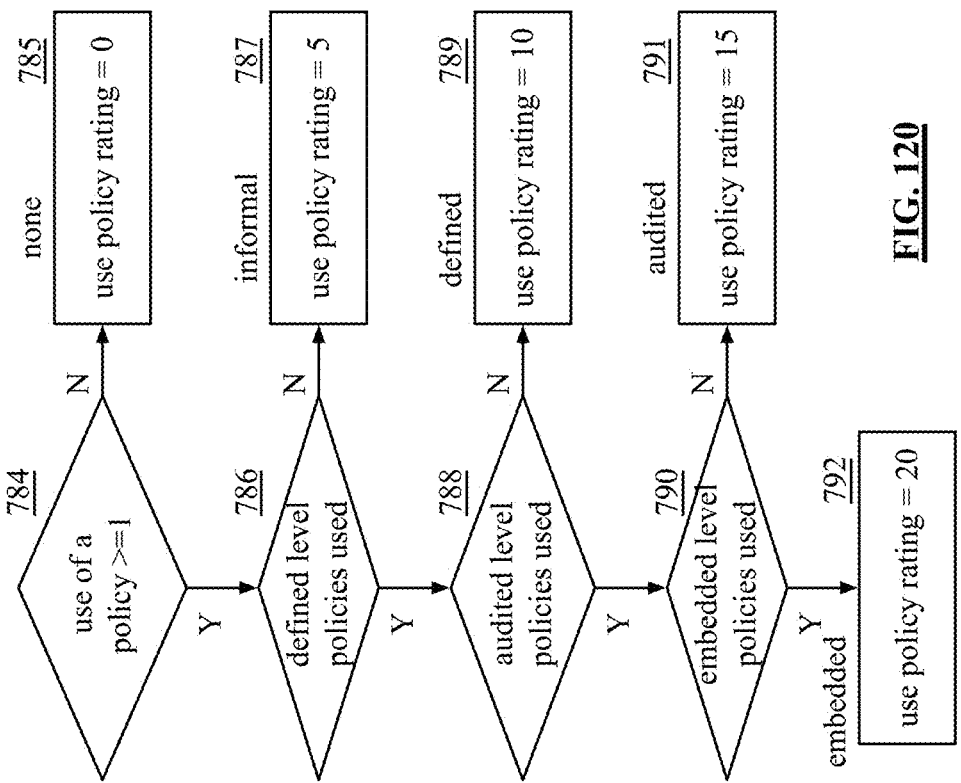
FIG. 120 is a logic diagram of an example of a module of FIG. 117 generating an evaluation metric rating in accordance with the present disclosure.

FIG. 120 is a logic diagram of an example of a module of FIG. 117 generating an evaluation policy use rating. The method begins at step 784 where the module determines whether there is at least one use of a policy in the collection of data. Note that the threshold number in this step could be greater than one. If there are no uses of a policy, the method continues at step 785 where the module generates a policy use rating of 0 (and/or a word rating of "none").

If there is at least one use of a policy, the method continues at step 786 where the module determines whether use of the policies is defined. As a further and/or alternative example, defined use of policies includes means to track uses of policies, there are some tracking variations, the count is not routinely reviewed in an organized manner, and/or the count is not regulated.

If the use of the policies is not defined, the method continues at step 787 where the module generates a policy use rating of 5 (and/or a word rating of "informal"). If, however, the use of the policies is at least defined, the method continues at step 788 where the module determines whether use of policies is audited. As a further and/or alternative example, audited includes defined plus there are negligible tracking variations.

If the use of the policies is not audited, the method continues at step 789 where the module generates a policy use rating of 10 (and/or a word rating of "defined"). If, however, the use of the policies is at least audited, the method continues at step 790 where the module determines whether the use of the policies is embedded. As a further and/or alternative example, embedded includes audited plus the count is routinely reviewed in an organized manner and the count is regulated.

If the use of the policies is not embedded, the method continues at step 791 where the module generates a policy use rating of 15 (and/or a word rating of "audited"). If the use of policies is embedded, the method continues at step 792 where the module generates a policy use rating of 20 (and/or a word rating of "embedded"). Note that the numerical rating are example values and could be other values. Further note that the number of level of use of policy rating may be more or less than the five shown.

Figure 121:
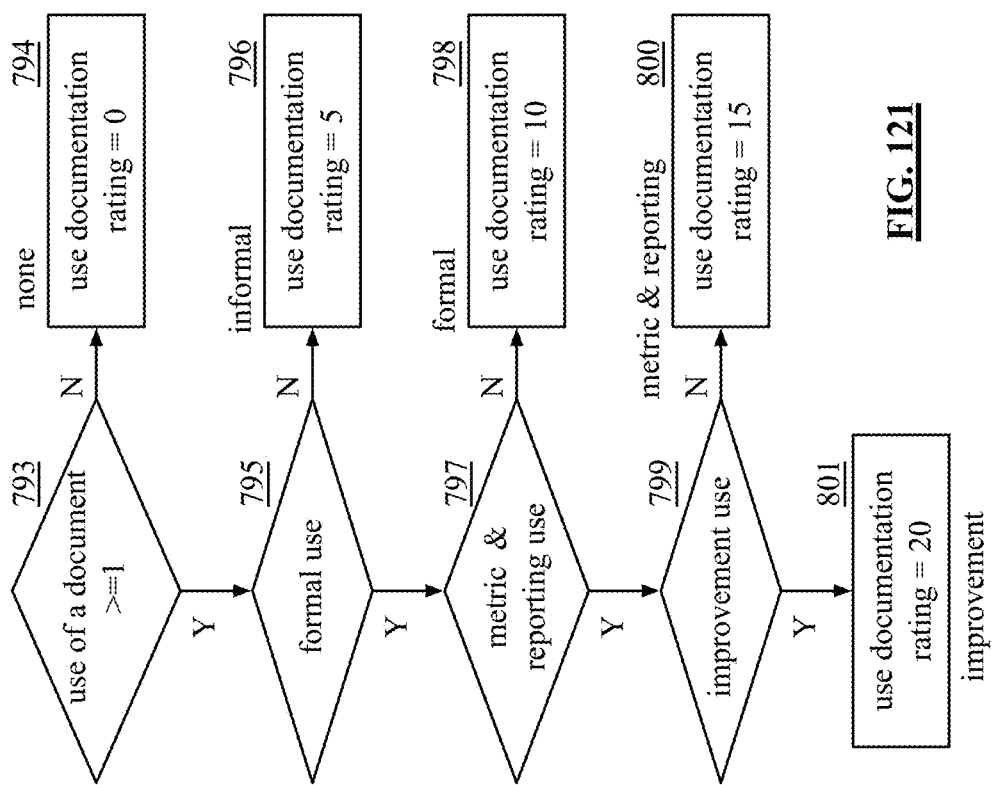
FIG. 121 is a logic diagram of an example of a module of FIG. 117 generating an evaluation metric rating in accordance with the present disclosure.

FIG. 121 is a logic diagram of an example of a module of FIG. 117 generating a documentation use evaluation rating. The method begins at step 793 where the module determines whether there is at least one use of a document in the collection of data. Note that the threshold number in this step could be greater than one. If there are no uses of a document, the method continues at step 794 where the module generates a documentation use rating of 0 (and/or a word rating of "none").

If there is at least one use of a document, the method continues at step 795 where the module determines whether the use of documents is formalized. As a further and/or alternative example, formalized use of documents includes means for tracking use of documents (e.g., access a document, create a document, edit a document, etc.), there are some tracking variations, the count is not routinely reviewed in an organized manner, and/or the count is not regulated.

If the use of documents is not formalized, the method continues at step 796 where the module generates a documentation use rating of 5 (and/or a word rating of "informal"). If, however, the use of documents is at least formalized, the method continues at step 797 where the module determines whether the use of documents is metric & reporting. As a further and/or alternative example, metric & reporting includes formal plus there are negligible tracking variations.

If the use of documents is not metric & reporting, the method continues at step 798 where the module generates a documentation use rating of 10 (and/or a word rating of "formal"). If, however, the use of documents is at least metric & reporting, the method continues at step 799 where the module determines whether the use of documents is improvement. As a further and/or alternative example, improvement includes metric & reporting plus the count is routinely reviewed in an organized manner and the count is regulated.

If the use of documents is not improvement, the method continues at step 800 where the module generates a documentation use rating of 15 (and/or a word rating of "metric & reporting"). If the use of documents is improvement, the method continues at step 801 where the module generates a documentation use rating of 20 (and/or a word rating of "improvement"). Note that the numerical rating are example values and could be other values. Further note that the number of level of uses of documentation rating may be more or less than the five shown.

Figure 122:
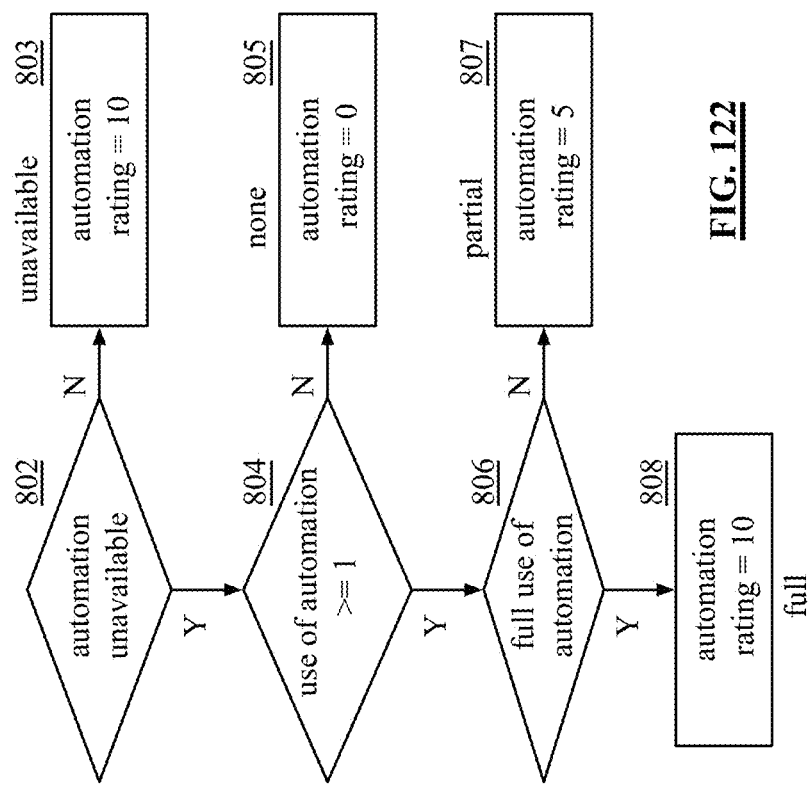
FIG. 122 is a logic diagram of an example of a module of FIG. 117 generating an evaluation metric rating in accordance with the present disclosure.

FIG. 122 is a logic diagram of an example of a module of FIG. 117 generating an automation use evaluation rating. The method begins at step 802 where the module determines whether there is available automation for a particular system aspect, system criteria, system features, and/or system mode. If use of automation is not available, the method continues at step 803 where the module generates an automation rating of 10 (and/or a word rating of "unavailable").

If use of automation is available (e.g., there is automation for one or more particular system features), the method continues at step 804 where the module determines whether there is at least one use of automation in the data. If not, the method continues at step 805 where the module generates an automation use rating of 0 (and/or a word rating of "none").

If there is at least one use of automation, the method continues at step 806 where the module determines whether there was full use of automation in the data. As a further and/or alternative example, full use of automation refers to a count of use of automation is at an expected level.

If the use of automation is not full, the method continues at step 807 where the module generates an automation use rating of 5 (and/or a word rating of "partial"). If, however, the use of automation is full, the method continues at step 808 where the module generates an automation use rating of 10 (and/or a word rating of "full"). Note that the numerical rating are example values and could be other values. Further note that the number of level of use of automation may be more or less than the four shown.

Figure 123:
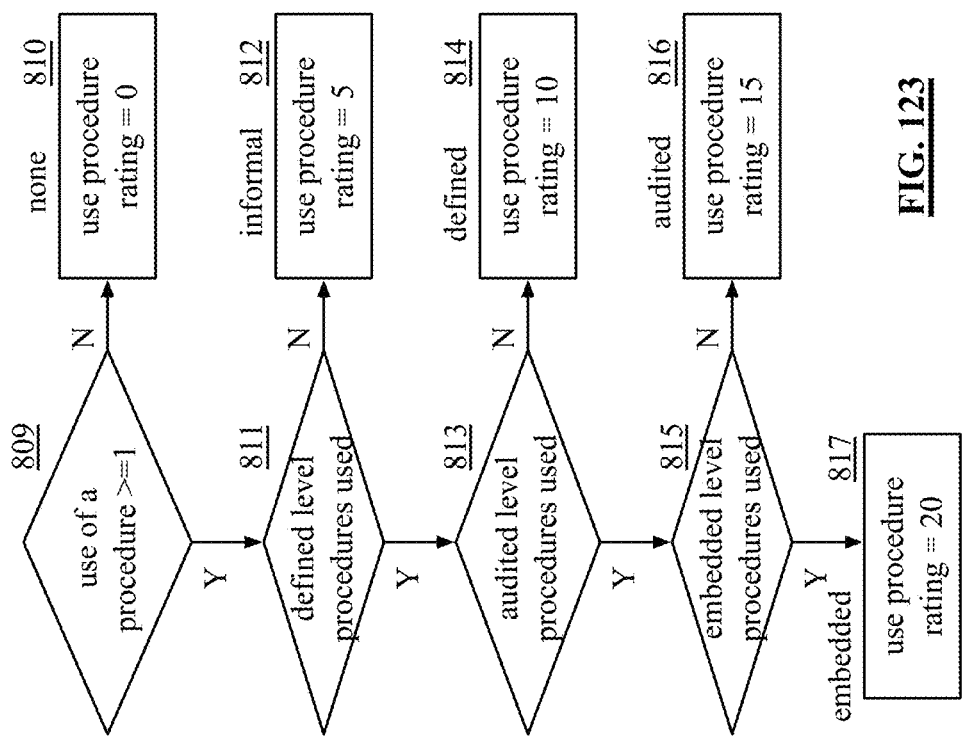
FIG. 123 is a logic diagram of an example of a module of FIG. 117 generating an evaluation metric rating in accordance with the present disclosure.

FIG. 123 is a logic diagram of an example of a module of FIG. 117 generating a procedure use evaluation rating. In this example, the module uses a reference scale that is similar to the reference scales as was used for the use of policies, but a different reference scale could be use. The method begins at step 809 where the module determines whether there is at least one use of a procedure in the collection of data. Note that the threshold number in this step could be greater than one. If there are no uses of a procedure, the method continues at step 810 where the module generates a procedure use rating of 0 (and/or a word rating of "none").

If there is at least one use of a procedure, the method continues at step 811 where the module determines whether use of the procedures is defined. As a further and/or alternative example, defined use of procedures includes means to track uses of procedures, there are some tracking variations, the count is not routinely reviewed in an organized manner, and/or the count is not regulated.

If the use of the procedures is not defined, the method continues at step 812 where the module generates a procedure use rating of 5 (and/or a word rating of "informal"). If, however, the use of the procedures is at least defined, the method continues at step 813 where the module determines whether use of procedures is audited. As a further and/or alternative example, audited includes defined plus there are negligible tracking variations.

If the use of the procedures is not audited, the method continues at step 814 where the module generates a procedure use rating of 10 (and/or a word rating of "defined"). If, however, the use of the procedures is at least audited, the method continues at step 815 where the module determines whether the use of the procedures is embedded. As a further and/or alternative example, embedded includes audited plus the count is routinely reviewed in an organized manner and the count is regulated.

If the use of the procedures is not embedded, the method continues at step 816 where the module generates a procedure use rating of 15 (and/or a word rating of "audited"). If the use of procedures is embedded, the method continues at step 817 where the module generates a procedure use rating of 20 (and/or a word rating of "embedded"). Note that the numerical rating are example values and could be other values. Further note that the number of level of use of procedure rating may be more or less than the five shown.

Figure 124:
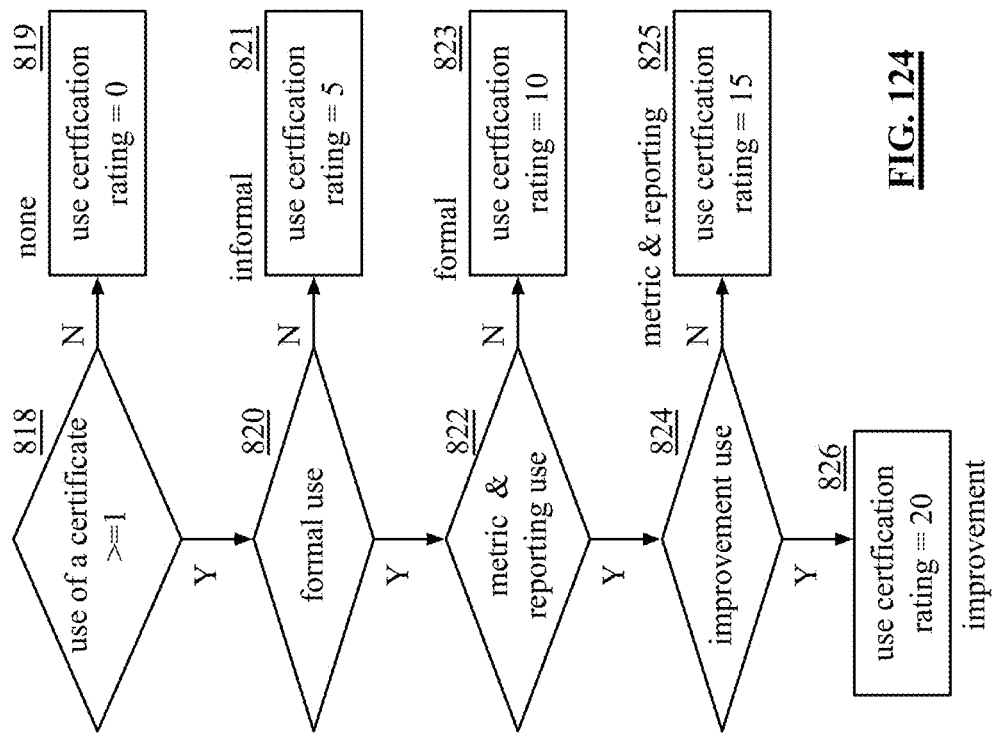
FIG. 124 is a logic diagram of an example of a module of FIG. 117 generating an evaluation metric rating in accordance with the present disclosure.

FIG. 124 is a logic diagram of an example of a module of FIG. 117 generating a certificate use evaluation rating. In this example, the module uses a reference scale that is similar to the reference scales as was used for documentation, but a different reference scale could be use. The method begins at step 818 where the module determines whether there is at least one use of a certificate (e.g., obtaining a certificate, verifying a certificate, updating a certificate, etc.) in the collection of data. Note that the threshold number in this step could be greater than one. If there are no uses of a certificate, the method continues at step 819 where the module generates a certification use rating of 0 (and/or a word rating of "none").

If there is at least one use of a certificate, the method continues at step 820 where the module determines whether the use of certificates is formalized. As a further and/or alternative example, formalized use of certificates includes means for tracking use of certificates, there are some tracking variations, the count is not routinely reviewed in an organized manner, and/or the count is not regulated.

If the use of certificates is not formalized, the method continues at step 821 where the module generates a certification use rating of 5 (and/or a word rating of "informal"). If, however, the use of certificates is at least formalized, the method continues at step 822 where the module determines whether the use of certificates is metric & reporting. As a further and/or alternative example, metric & reporting includes formal plus there are negligible tracking variations.

If the use of certificates is not metric & reporting, the method continues at step 823 where the module generates a certification use rating of 10 (and/or a word rating of "formal"). If, however, the use of certificates is at least metric & reporting, the method continues at step 824 where the module determines whether the use of certificates is improvement. As a further and/or alternative example, improvement includes metric & reporting plus the count is routinely reviewed in an organized manner and the count is regulated.

If the use of certificates is not improvement, the method continues at step 825 where the module generates a certification use rating of 15 (and/or a word rating of "metric & reporting"). If the use of certificates is improvement, the method continues at step 826 where the module generates a certification use rating of 20 (and/or a word rating of "improvement"). Note that the numerical rating are example values and could be other values. Further note that the number of level of uses of certification rating may be more or less than the five shown.

Figure 125:
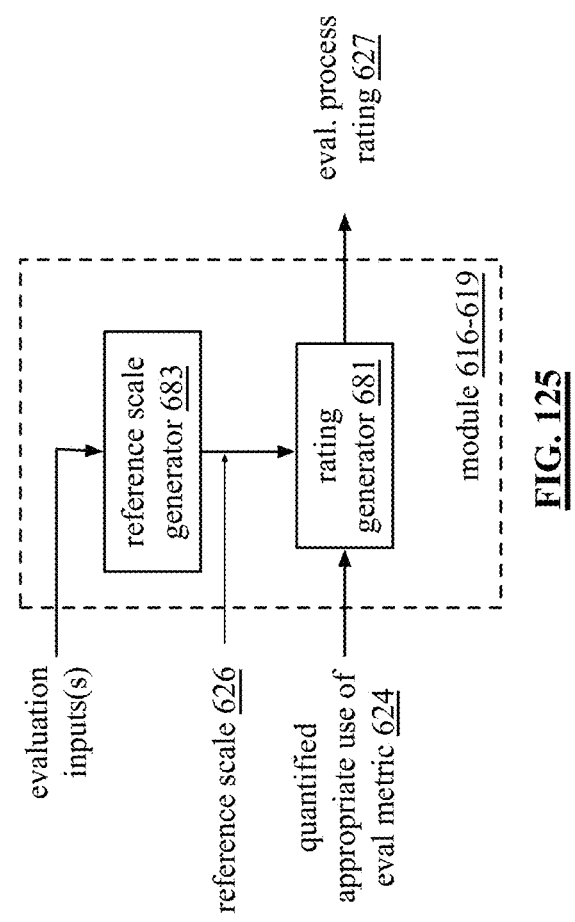
FIG. 125 is a schematic block diagram of an embodiment of an understanding, implementation, operation, or self-analysis module in accordance with the present disclosure.

FIG. 125 is a schematic block diagram of an embodiment of an understanding, implementation, operation, or self-analysis 616-619 for processing the quantified appropriate use of evaluation metric indication 624. In this embodiment, the module 616-619 includes the reference scale generator 683 and the rating generator 681.

The reference generator 683 generates a reference scale 626 based on one or more evaluation inputs (e.g., one or more evaluation viewpoints; one or more evaluation metrics; one or more evaluation modalities; one or more characteristics of the system; and/or one or more evaluation categories). For example, the reference scale generator 683 generates a reference scale for evaluating appropriate use of processes of: none for a rating of 0; inconsistent for a rating of 10; repeatable for a rating of 20; standardized for a rating of 30; measured for a rating of 40; and optimized for rating of 50.

In this example, a level of "none" on the reference scale for the appropriate use of processes corresponds to zero or near zero confidence in the appropriate use of the processes to reliably, repeatedly, and/or completely indicate that the system, or portion thereof, fulfills the objectives of the system, or portion thereof, (e.g., some to all of guidelines, system requirements, system design, system build, and/or system operation). Continuing with this example, a level of "inconsistent" on the reference scale for appropriate use of processes corresponds to low confidence level of appropriate use of the processes to reliably, repeatedly, and/or completely indicate that the system, or portion thereof, fulfills the objectives of the system, or portion thereof. As an example of inconsistent, there are gaps (e.g., missing, incomplete, inaccurate, etc.) in conditions as to when processes are to be used. As another example of inconsistent, the conditions for use of one or more processes is inconsistent (e.g., contradicts, produces an infinite loop, creates a deadlock, etc.) with conditions for use of one or more other the processes.

Continuing with this example, a level of "repeatable" on the reference scale for the appropriate use of processes corresponds to low to mid level of confidence of appropriate use of the processes to reliably, repeatedly, and/or completely indicate that the system, or portion thereof, fulfills the objectives of the system, or portion thereof. As an example of repeatable, the conditions for use processes produce repeatable uses of the processes to fulfill at least some of the objectives, or portions thereof, but the conditions for use of processes are static (not regularly reviewed, not regularly updated, etc.), the conditions of use have varying degrees of specificity (e.g., some very detailed, others are vague), the conditions for use are more generic in nature than specific to the system, and/or are the conditions for use created in a consistent manner.

Continuing with this example, a level of "standardized" on the reference scale for appropriate use of processes corresponds to mid-level confidence of the appropriate use of the processes to reliably, repeatedly, and/or completely indicate that the system, or portion thereof, fulfills the objectives of the system, or portion thereof. As an example of standardized, the conditions for use of the processes produce repeatable uses of the processes to fulfill at least some of the objectives, or portions thereof, and the conditions of use are created in a consistent (e.g., standardized) manner, but conditions of use of the processes are static (not regularly reviewed, not regularly updated, etc.), the conditions of use have varying degrees of specificity, and/or the conditions of use are more generic in nature than specific to the system.

Continuing with this example, a level of "measured" on the reference scale for the appropriate use of processes corresponds to mid to high level of confidence in the appropriate use of the processes to reliably, repeatedly, and/or completely indicate that the system, or portion thereof, fulfills the objectives of the system, or portion thereof. As an example of measured, the conditions for use of the processes produce repeatable uses of the processes to fulfill at least some of the objectives, or portions thereof, the conditions of use of processes are created in a consistent manner, the conditions for use have consistent specificity, and the conditions for use are specific to the system, but the conditions for use of processes are static (not regularly reviewed, not regularly updated, etc.).

Continuing with this example, a level of "optimized" on the reference scale for appropriate use of processes corresponds to high level of confidence in the appropriate use of the processes to reliably, repeatedly, and/or completely indicate that the system, or portion thereof, fulfills the objectives of the system, or portion thereof. As an example of optimized, the conditions of use of the processes produce repeatable uses of the processes to fulfill at least some of the objectives, or portions thereof, the conditions of use of the processes are created in a consistent manner, the conditions of use have consistent specificity, the conditions of use are specific to the system, and the conditions of use are dynamic (regularly reviewed, regularly updated, etc.).

The reference scale generator 683 generates a reference scale for evaluating appropriate use of policies. As an example, the reference scale includes: none for a rating of 0; informal for a rating of 5; defined for a rating of 10; audited for a rating of 15; and embedded for a rating of 20. In this example, a level of "none" on the reference scale for appropriate use of policies corresponds to zero or near zero confidence in the appropriate use of the policies to reliably, repeatedly, and/or completely indicate that the system, or portion thereof, fulfills the objectives of the system, or portion thereof.

Continuing with this example, a level of "informal" on the reference scale for appropriate use of policies corresponds to low level of confidence of the appropriate use of policies to reliably, repeatedly, and/or completely indicate that the system, or portion thereof, fulfills the objectives of the system, or portion thereof. As an example of informal, the conditions for use of one or more policies is inconsistent (e.g., contradicts, produces an infinite loop, creates a deadlock, etc.) with conditions for use of one or more other the policies. As another example of informal, there are gaps (e.g., missing, incomplete, inaccurate, etc.) in conditions as to when policies are to be used.

Continuing with this example, a level of "defined" on the reference scale for appropriate use of policies corresponds to low to mid level of confidence of appropriate use of the policies to reliably, repeatedly, and/or completely indicate that the system, or portion thereof, fulfills the objectives of the system, or portion thereof. As an example of defined, the conditions for use policies produce repeatable uses of the policies to fulfill at least some of the objectives, or portions thereof, but the conditions for use of policies are static (not regularly reviewed, not regularly updated, etc.), the conditions of use have varying degrees of specificity (e.g., some very detailed, others are vague), the conditions for use are more generic in nature than specific to the system, and/or are the conditions for use created in a consistent manner.

Continuing with this example, a level of "audited" on the reference scale for appropriate use of policies corresponds to mid to high level of confidence of appropriate use of the policies to reliably, repeatedly, and/or completely indicate that the system, or portion thereof, fulfills the objectives of the system, or portion thereof. As an example of audited, the conditions for use of the policies produce repeatable uses of the policies to fulfill at least some of the objectives, or portions thereof, the conditions of use of policies are created in a consistent manner, the conditions for use have consistent specificity, and the conditions for use are specific to the system, but the conditions for use of policies are static (not regularly reviewed, not regularly updated, etc.).

Continuing with this example, a level of "embedded" on the reference scale for appropriate use of policies corresponds to high level of confidence of appropriate use of the policies to reliably, repeatedly, and/or completely indicate that the system, or portion thereof, fulfills the objectives of the system, or portion thereof. As an example of embedded, the conditions of use of the policies produce repeatable uses of the policies to fulfill at least some of the objectives, or portions thereof, the conditions of use of the policies are created in a consistent manner, the conditions of use have consistent specificity, the conditions of use are specific to the system, and the conditions of use are dynamic (regularly reviewed, regularly updated, etc.).

As another example, the reference scale generator 683 generates a reference scale for evaluating appropriate use of documents of: none for a rating of 0; informal for a rating of 5; formal for a rating of 10; metric & reporting for a rating of 15; and improvement for a rating of 20. In this example, a level of "none" on the reference scale for appropriate use of documents corresponds to zero or near zero confidence of appropriate use of documents to reliably, repeatedly, and/or completely indicate that the system, or portion thereof, fulfills the objectives of the system, or portion thereof.

Continuing with this example, a level of "informal" on the reference scale for appropriate use of documents corresponds to low level of confidence of appropriate use of the documents to reliably, repeatedly, and/or completely indicate that the system, or portion thereof, fulfills the objectives of the system, or portion thereof. As an example of informal, there are gaps (e.g., missing, incomplete, inaccurate, etc.) in conditions as to when documents are to be used. As another example of inconsistent, the conditions for use of one or more documents is inconsistent (e.g., contradicts, produces an infinite loop, creates a deadlock, etc.) with conditions for use of one or more other the documents.

Continuing with this example, a level of "formal" on the reference scale for appropriate use of documents corresponds to low to mid level of confidence of appropriate use of documents to reliably, repeatedly, and/or completely indicate that the system, or portion thereof, fulfills the objectives of the system, or portion thereof. As an example of defined, the conditions for use of documents produce repeatable uses of the processes to fulfill at least some of the objectives, or portions thereof, but the conditions for use of documents are static (not regularly reviewed, not regularly updated, etc.), the conditions of use have varying degrees of specificity (e.g., some very detailed, others are vague), the conditions for use are more generic in nature than specific to the system, and/or are the conditions for use created in a consistent manner.

Continuing with this example, a level of "metric & reporting" on the reference scale for appropriate use of documents corresponds to mid to high level of confidence of appropriate use of the documents to reliably, repeatedly, and/or completely indicate that the system, or portion thereof, fulfills the objectives of the system, or portion thereof. As an example of metric & reporting, the conditions for use of the documents produce repeatable uses of the documents to fulfill at least some of the objectives, or portions thereof, the conditions of use of documents are created in a consistent manner, the conditions for use have consistent specificity, and the conditions for use are specific to the system, but the conditions for use of documents are static (not regularly reviewed, not regularly updated, etc.).

Continuing with this example, a level of "improvement" on the reference scale for appropriate use of documents corresponds to high level of confidence of appropriate use of the documents to reliably, repeatedly, and/or completely indicate that the system, or portion thereof, fulfills the objectives of the system, or portion thereof. As an example of improvement, the conditions of use of the documents produce repeatable uses of the documents to fulfill at least some of the objectives, or portions thereof, the conditions of use of the documents are created in a consistent manner, the conditions of use have consistent specificity, the conditions of use are specific to the system, and the conditions of use are dynamic (regularly reviewed, regularly updated, etc.).

As another example, the reference scale generator 683 generates a reference scale for evaluating appropriate use of automation of: unavailable for a rating of 10; none for a rating of 0; partial for a rating of 5; and full for a rating of 10. In this example, a level of "unavailable" for appropriate use of automation corresponds to automation for a particular incident (e.g., automation of a feature of the system) is not available. Continuing with this example, a level of "none" on the reference scale for appropriate use of automation corresponds to zero or near zero confidence in appropriate use of automation within the system, or portion thereof.

Continuing with this example, a level of "partial" on the reference scale for appropriate use of automation corresponds to mid-level confidence of appropriate use of automation within the system, or portion thereof. As an example of partial, the conditions for use of automation produce repeatable uses of automation, the conditions of use are created in a consistent (e.g., standardized) manner, but conditions of use of the automation are static (not regularly reviewed, not regularly updated, etc.), the conditions of use have varying degrees of specificity, and/or the conditions of use are more generic in nature than specific to the system.

Continuing with this example, a level of "full" on the reference scale for appropriate use of automation corresponds to high level of confidence in appropriate use of automation within the system, or portion thereof. As an example of full, the conditions of use of automation produce repeatable uses of automation, the conditions of use of automation are created in a consistent manner, the conditions of use have consistent specificity, the conditions of use are specific to the system, and the conditions of use are dynamic (regularly reviewed, regularly updated, etc.).

The reference scale generator 683 generates a reference scale for evaluating appropriate use of procedures of: none for a rating of 0; informal for a rating of 5; defined for a rating of 10; audited for a rating of 15; and embedded for a rating of 20. The reference scale generator 683 also generates a reference scale for evaluating appropriate use of certificates of: none for a rating of 0; informal for a rating of 5; forma for a rating of 10; metric & reporting for a rating of 15; and improvement for a rating of 20.

The rating generator 681 generates the evaluation rating 627 for the quantified appropriate use (e.g., not used when not supposed to be used) of the evaluation metric indicator 624 based on the reference scale 626. For each of the evaluation metrics, the rating generator 681 maps the quantified appropriate use of the evaluation metric to the reference scale 626. As an example, the rating generator 681 maps the quantified appropriate use of processes to the process reference scale 626. In this example, the quantified appropriate use of processes includes an indication for the conditions of use of the processes showing repeatable uses of the processes to fulfill at least some of the objectives, or portions thereof, an indication that the conditions of use of the processes are created in a consistent manner, an indication that the conditions of use have consistent specificity, an indication that the conditions of use are specific to the system, and/or an indication that the conditions of use are dynamic (regularly reviewed, regularly updated, etc.). Additional examples are provided with reference to FIGS. 126-131.

Figure 126:
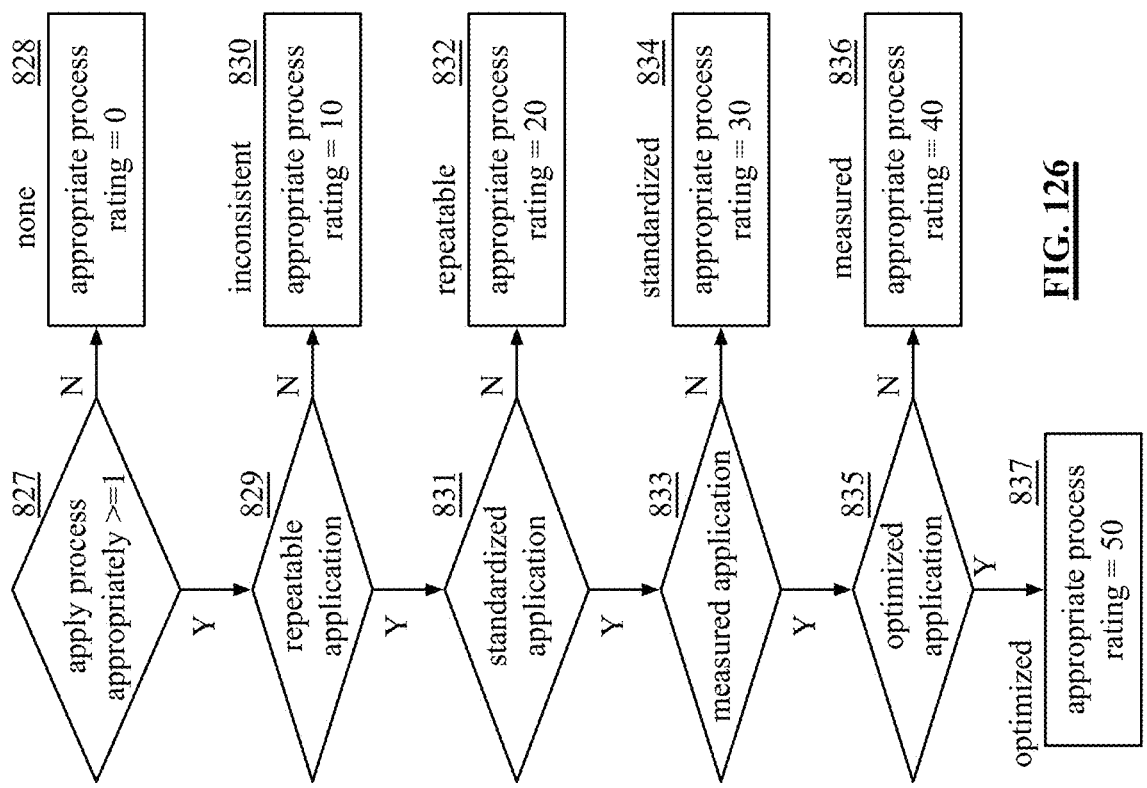
FIG. 126 is a logic diagram of an example of a module of FIG. 125 generating an evaluation metric rating in accordance with the present disclosure.

FIG. 126 is a logic diagram of an example of a module of FIG. 125 generating an evaluation metric rating. The method begins at step 827 where the module evaluates the quantified appropriate use of processes to determine whether there is at least one appropriate use of a process in the collection of data. Note that the threshold number in this step could be greater than one. If there are no appropriate uses of a process, the method continues at step 828 where the module generates an appropriate use process rating of 0 (and/or a word rating of "none").

If there is at least one appropriate use of a process, the method continues at step 829 where the module determines whether the conditions of use of processes are repeatable. As a further and/or alternative example, repeatable includes conditions of use of processes produce consistent results, condition detail variations from process to process, the conditions of use are not routinely reviewed in an organized manner, and/or the conditions of use are not regulated.

If the conditions of use of the processes are not repeatable, the method continues at step 830 where the module generates a process rating of 10 (and/or a word rating of "inconsistent"). If, however, the conditions of use of processes are at least repeatable, the method continues at step 831 where the module determines whether the conditions of use of the processes is standardized. As a further and/or alternative example, standardized includes repeatable plus there are no appreciable variations in detail of conditions of use of the processes from process to process, and/or the conditions of use of the processes are regulated.

If the conditions of use of the processes is not standardized, the method continues at step 832 where the module generates a process rating of 20 (and/or a word rating of "repeatable"). If, however, the conditions of use of the processes are at least standardized, the method continues at step 833 where the module determines whether the conditions of use of the processes is measured. As a further and/or alternative example, measured includes standardized plus precise, exact, and/or conditions of use calculated to specific needs, concerns, and/or functioning of the system.

If the conditions of use of the processes is not measured, the method continues at step 834 where the module generates a process rating of 30 (and/or a word rating of "standardized"). If, however, the conditions of use of the processes is at least measured, the method continues at step 835 where the module determines whether the conditions of use of the processes is optimized. As a further and/or alternative example, optimized includes measured plus conditions of use of the processes are up-to-date and/or improvement of the conditions of use of the process is assessed on a regular basis as part of system protocols.

If the conditions of use of the processes is not optimized, the method continues at step 836 where the module generates a process rating of 40 (and/or a word rating of "measured"). If the conditions of use of the processes is optimized, the method continues at step 837 where the module generates a process rating of 50 (and/or a word rating of "optimized"). Note that the numerical rating are example values and could be other values. Further note that the number of level of process rating may be more or less than the six shown.

Figure 127:
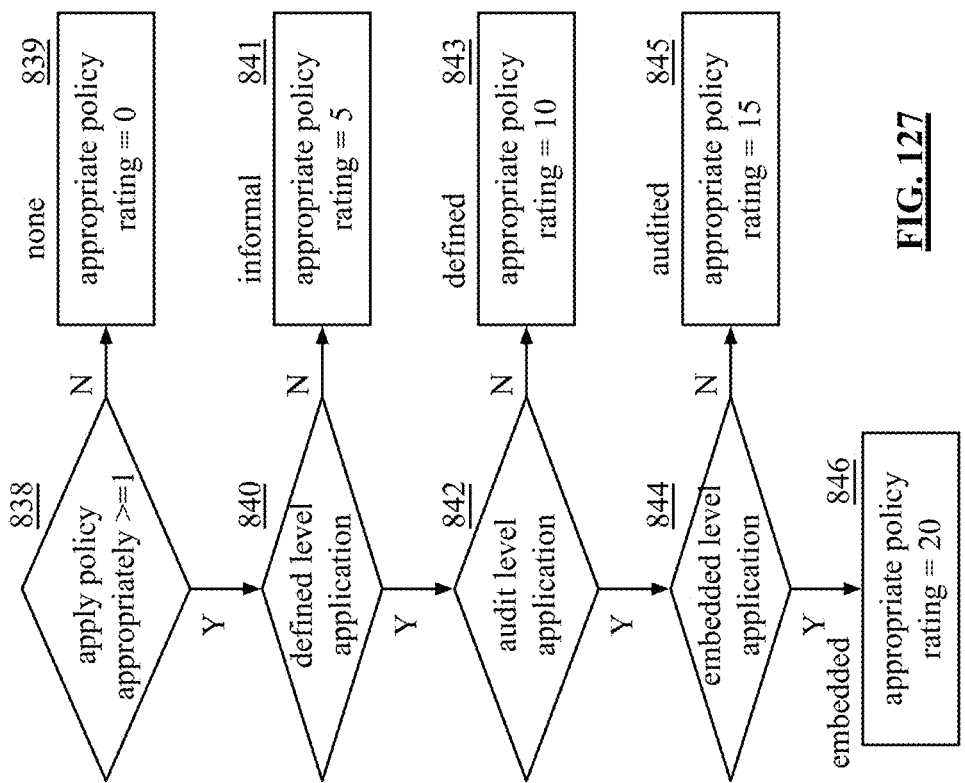
FIG. 127 is a logic diagram of an example of a module of FIG. 125 generating an evaluation metric rating in accordance with the present disclosure.

FIG. 127 is a logic diagram of an example of a module of FIG. 125 generating an appropriate use of policy evaluation rating. The method begins at step 838 where the module determines whether there is at least one appropriate use of a policy in the collection of data. Note that the threshold number in this step could be greater than one. If there are no appropriate uses of a policy, the method continues at step 839 where the module generates an appropriate use of policy rating of 0 (and/or a word rating of "none").

If there is at least one appropriate use of a policy, the method continues at step 840 where the module determines whether the appropriate use of the policies is defined. As a further and/or alternative example, defined appropriate use of policies includes means to track conditions of use of policies, there are some tracking variations, the conditions of use are not routinely reviewed in an organized manner, and/or the conditions of use are not regulated.

If the appropriate use of the policies is not defined, the method continues at step 841 where the module generates an appropriate use of policy rating of 5 (and/or a word rating of "informal"). If, however, the appropriate use of the policies is at least defined, the method continues at step 842 where the module determines whether appropriate use of policies is audited. As a further and/or alternative example, audited includes defined plus there are negligible tracking variations.

If the appropriate use of the policies is not audited, the method continues at step 843 where the module generates an appropriate use of policy rating of 10 (and/or a word rating of "defined"). If, however, the appropriate use of the policies is at least audited, the method continues at step 844 where the module determines whether the appropriate use of the policies is embedded. As a further and/or alternative example, embedded includes audited plus the conditions of use are routinely reviewed in an organized manner and the conditions of use are regulated.

If the appropriate use of the policies is not embedded, the method continues at step 845 where the module generates an appropriate use of policy rating of 15 (and/or a word rating of "audited"). If the appropriate use of policies is embedded, the method continues at step 846 where the module generates an appropriate use of policy rating of 20 (and/or a word rating of "embedded"). Note that the numerical rating are example values and could be other values. Further note that the number of level of appropriate use of policy rating may be more or less than the five shown.

Figure 128:
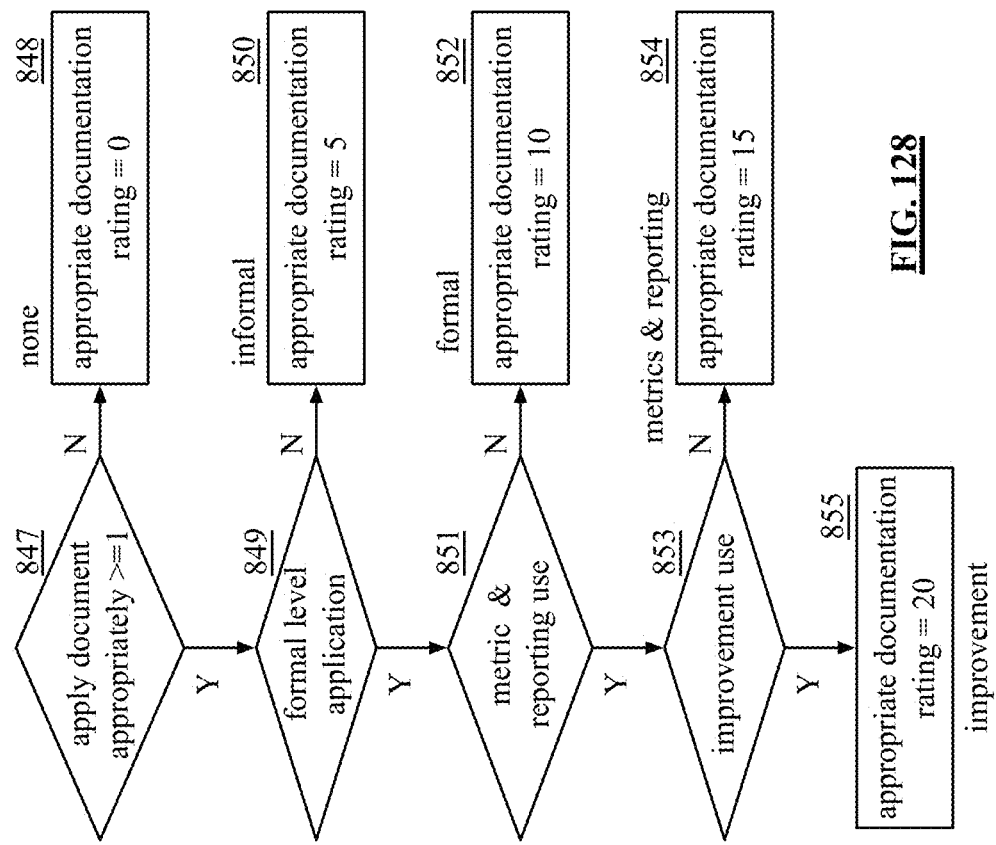
FIG. 128 is a logic diagram of an example of a module of FIG. 125 generating an evaluation metric rating in accordance with the present disclosure.

FIG. 128 is a logic diagram of an example of a module of FIG. 125 generating an appropriate use documentation evaluation rating. The method begins at step 847 where the module determines whether there is at least one appropriate use of a document in the collection of data. Note that the threshold number in this step could be greater than one. If there are no appropriate uses of a document, the method continues at step 848 where the module generates an appropriate use of documentation rating of 0 (and/or a word rating of "none").

If there is at least one appropriate use of a document, the method continues at step 849 where the module determines whether the appropriate use of documents is formalized. As a further and/or alternative example, formalized appropriate use of documents includes means for tracking appropriate use of documents, there are some tracking variations, the conditions of use is not routinely reviewed in an organized manner, and/or the conditions of use is not regulated.

If the appropriate use of documents is not formalized, the method continues at step 850 where the module generates an appropriate use of documentation rating of 5 (and/or a word rating of "informal"). If, however, the appropriate use of documents is at least formalized, the method continues at step 851 where the module determines whether the appropriate use of documents is metric & reporting. As a further and/or alternative example, metric & reporting includes formal plus there are negligible tracking variations.

If the appropriate use of documents is not metric & reporting, the method continues at step 852 where the module generates an appropriate use of documentation rating of 10 (and/or a word rating of "formal"). If, however, the appropriate use of documents is at least metric & reporting, the method continues at step 853 where the module determines whether the appropriate use of documents is improvement. As a further and/or alternative example, improvement includes metric & reporting plus the conditions of use are routinely reviewed in an organized manner and the conditions of use are regulated.

If the appropriate use of documents is not improvement, the method continues at step 854 where the module generates an appropriate use of documentation rating of 15 (and/or a word rating of "metric & reporting"). If the appropriate use of documents is improvement, the method continues at step 855 where the module generates an appropriate use of documentation rating of 20 (and/or a word rating of "improvement"). Note that the numerical rating are example values and could be other values. Further note that the number of level of appropriate use of documentation rating may be more or less than the five shown.

Figure 129:
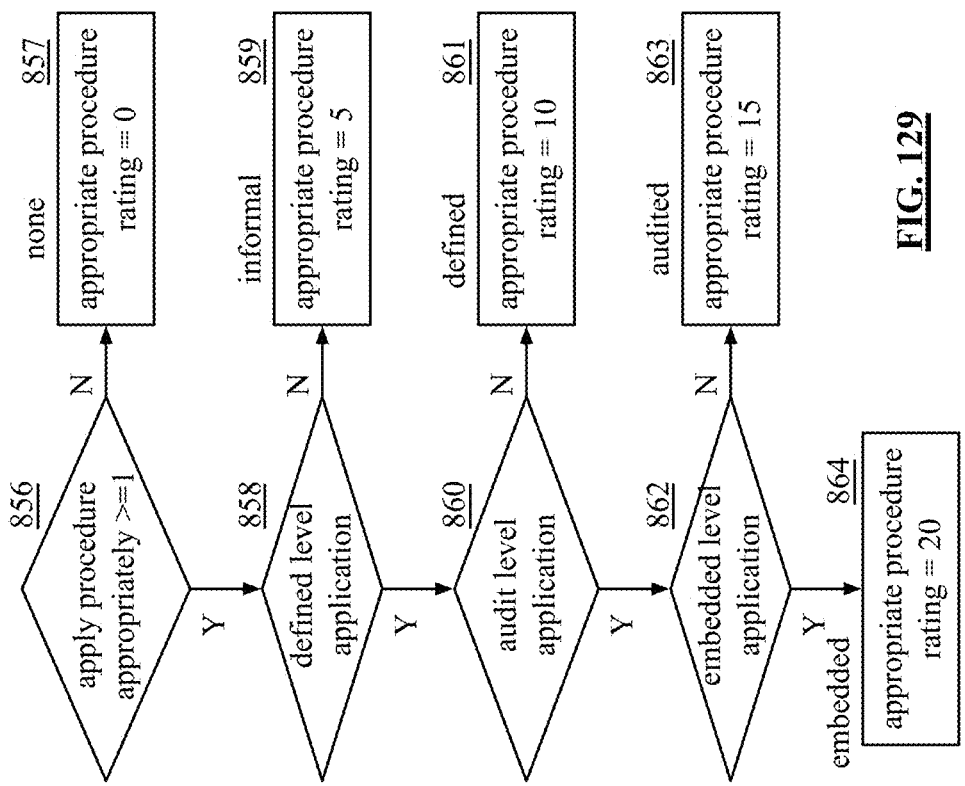
FIG. 129 is a logic diagram of an example of a module of FIG. 125 generating an evaluation metric rating in accordance with the present disclosure.

FIG. 129 is a logic diagram of an example of a module of FIG. 125 generating an appropriate use of procedure evaluation rating. The method begins at step 856 where the module determines whether there is at least one appropriate use of a procedure in the collection of data. Note that the threshold number in this step could be greater than one. If there are no appropriate uses of a procedure, the method continues at step 857 where the module generates an appropriate use of procedure rating of 0 (and/or a word rating of "none").

If there is at least one appropriate use of a procedure, the method continues at step 858 where the module determines whether the appropriate use of the procedures is defined. As a further and/or alternative example, defined appropriate use of procedures includes means to track conditions of use of procedures, there are some tracking variations, the conditions of use are not routinely reviewed in an organized manner, and/or the conditions of use are not regulated.

If the appropriate use of the procedures is not defined, the method continues at step 859 where the module generates an appropriate use of procedure rating of 5 (and/or a word rating of "informal"). If, however, the appropriate use of the procedures is at least defined, the method continues at step 860 where the module determines whether appropriate use of procedures is audited. As a further and/or alternative example, audited includes defined plus there are negligible tracking variations.

If the appropriate use of the procedures is not audited, the method continues at step 861 where the module generates an appropriate use of procedure rating of 10 (and/or a word rating of "defined"). If, however, the appropriate use of the procedures is at least audited, the method continues at step 862 where the module determines whether the appropriate use of the procedures is embedded. As a further and/or alternative example, embedded includes audited plus the conditions of use are routinely reviewed in an organized manner and the conditions of use are regulated.

If the appropriate use of the procedures is not embedded, the method continues at step 863 where the module generates an appropriate use of procedure rating of 15 (and/or a word rating of "audited"). If the appropriate use of procedures is embedded, the method continues at step 864 where the module generates an appropriate use of procedure rating of 20 (and/or a word rating of "embedded"). Note that the numerical rating are example values and could be other values. Further note that the number of level of appropriate use of procedure rating may be more or less than the five shown.

Figure 130:
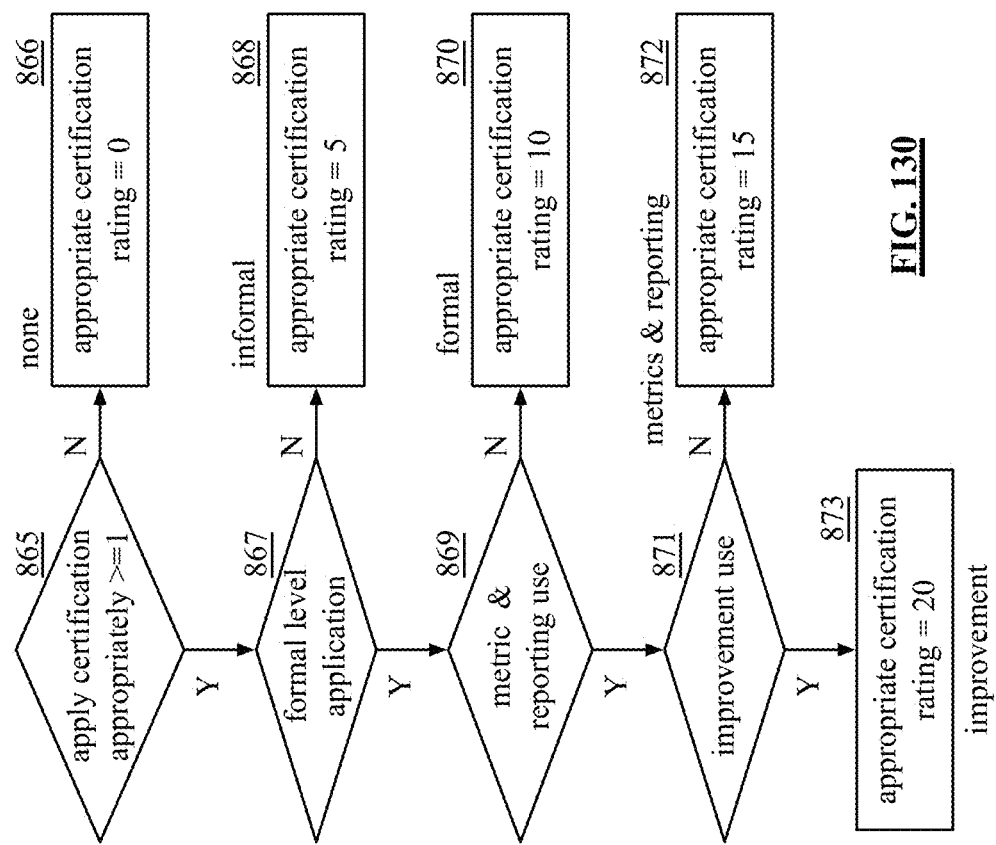
FIG. 130 is a logic diagram of an example of a module of FIG. 125 generating an evaluation metric rating in accordance with the present disclosure.

FIG. 130 is a logic diagram of an example of a module of FIG. 125 generating an appropriate use certification evaluation rating. The method begins at step 865 where the module determines whether there is at least one appropriate use of a certificate in the collection of data. Note that the threshold number in this step could be greater than one. If there are no appropriate uses of a certificate, the method continues at step 866 where the module generates an appropriate use of certification rating of 0 (and/or a word rating of "none").

If there is at least one appropriate use of a certificate, the method continues at step 867 where the module determines whether the appropriate use of certificates is formalized. As a further and/or alternative example, formalized appropriate use of certificates includes means for tracking appropriate use of certificates, there are some tracking variations, the conditions of use is not routinely reviewed in an organized manner, and/or the conditions of use is not regulated.

If the appropriate use of certificates is not formalized, the method continues at step 868 where the module generates an appropriate use of certification rating of 5 (and/or a word rating of "informal"). If, however, the appropriate use of certificates is at least formalized, the method continues at step 869 where the module determines whether the appropriate use of certificates is metric & reporting. As a further and/or alternative example, metric & reporting includes formal plus there are negligible tracking variations.

If the appropriate use of certificates is not metric & reporting, the method continues at step 870 where the module generates an appropriate use of certification rating of 10 (and/or a word rating of "formal"). If, however, the appropriate use of certificates is at least metric & reporting, the method continues at step 871 where the module determines whether the appropriate use of certificates is improvement. As a further and/or alternative example, improvement includes metric & reporting plus the conditions of use are routinely reviewed in an organized manner and the conditions of use are regulated.

If the appropriate use of certificates is not improvement, the method continues at step 872 where the module generates an appropriate use of certification rating of 15 (and/or a word rating of "metric & reporting"). If the appropriate use of certificates is improvement, the method continues at step 873 where the module generates an appropriate use of certification rating of 20 (and/or a word rating of "improvement"). Note that the numerical rating are example values and could be other values. Further note that the number of level of appropriate use of certification rating may be more or less than the five shown.

Figure 131:
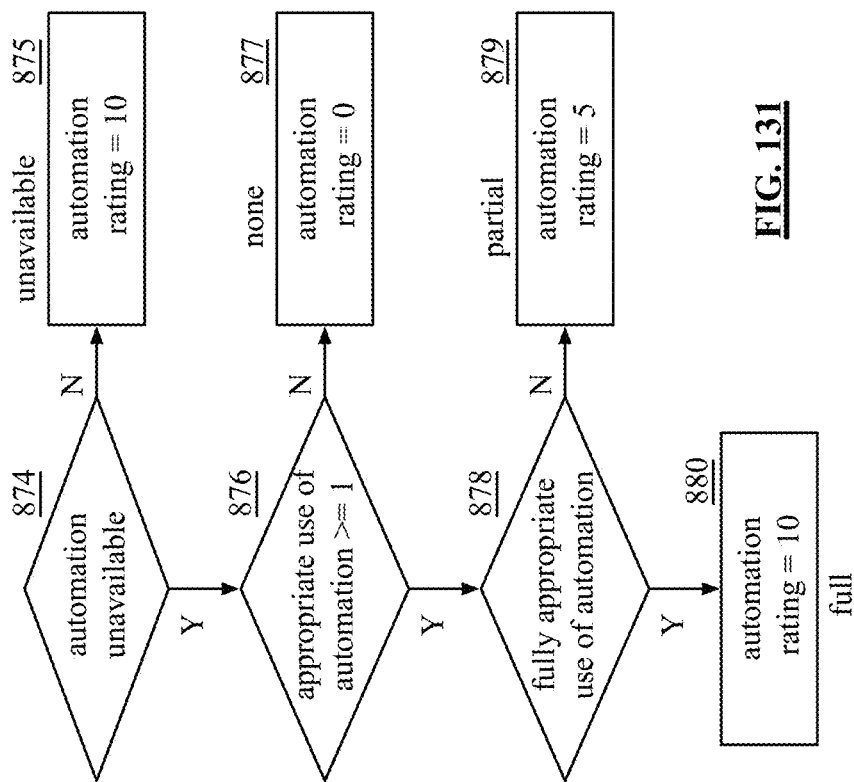
FIG. 131 is a logic diagram of an example of a module of FIG. 125 generating an evaluation metric rating in accordance with the present disclosure.

FIG. 131 is a logic diagram of an example of a module of FIG. 125 generating an appropriate use of automation evaluation rating. The method begins at step 874 where the module determines whether there is available automation for a particular system aspect, system criteria, system features, and/or system mode. If use of automation is not available, the method continues at step 875 where the module generates an automation rating of 10 (and/or a word rating of "unavailable").

If use of automation is available (e.g., there is automation for one or more particular system features), the method continues at step 876 where the module determines whether there is at least one appropriate use of automation in the data. If not, the method continues at step 877 where the module generates an appropriate use of automation rating of 0 (and/or a word rating of "none").

If there is at least one appropriate use of automation, the method continues at step 878 where the module determines whether there was full appropriate use of automation in the data. As a further and/or alternative example, full appropriate use of automation refers to the conditions of use of automation is at an expected level.

If the appropriate use of automation is not full, the method continues at step 879 where the module generates an appropriate use of automation rating of 5 (and/or a word rating of "partial"). If, however, the appropriate use of automation is full, the method continues at step 880 where the module generates an appropriate use of automation rating of 10 (and/or a word rating of "full"). Note that the numerical rating are example values and could be other values. Further note that the number of level of use of automation may be more or less than the four shown.

FIG. 132 is a schematic block diagram of an embodiment of an understanding, implementation, operation, or self-analysis 616-619 for processing the quantified consistency of use of evaluation metric indication 624 (e.g., inconsistency equates to not being used when it should have been). In this embodiment, the module 616-619 includes the reference scale generator 683 and the rating generator 681.

The reference generator 683 generates a reference scale 626 based on one or more evaluation inputs (e.g., one or more evaluation viewpoints; one or more evaluation metrics; one or more evaluation modalities; one or more characteristics of the system; and/or one or more evaluation categories). For example, the reference scale generator 683 generates a reference scale for evaluating consistency of use of processes of: none for a rating of 0; inconsistent for a rating of 10; repeatable for a rating of 20; standardized for a rating of 30; measured for a rating of 40; and optimized for rating of 50.

In this example, a level of "none" on the reference scale for the consistency of use of processes corresponds to zero or near zero confidence in the consistency of use of the processes to reliably, repeatedly, and/or completely indicate that the system, or portion thereof, fulfills the objectives of the system, or portion thereof, (e.g., some to all of guidelines, system requirements, system design, system build, and/or system operation). Continuing with this example, a level of "inconsistent" on the reference scale for consistency of use of processes corresponds to low confidence level of consistency of use of the processes to reliably, repeatedly, and/or completely indicate that the system, or portion thereof, fulfills the objectives of the system, or portion thereof. As an example of inconsistent, there are gaps (e.g., missing, incomplete, inaccurate, etc.) in situations as to when processes are to be used. As another example of inconsistent, the situations for use of one or more processes is inconsistent (e.g., contradicts, produces an infinite loop, creates a deadlock, etc.) with situations for use of one or more other the processes.

Continuing with this example, a level of "repeatable" on the reference scale for the consistency of use of processes corresponds to low to mid level of confidence of consistency of use of the processes to reliably, repeatedly, and/or completely indicate that the system, or portion thereof, fulfills the objectives of the system, or portion thereof. As an example of repeatable, the situations for use processes produce repeatable uses of the processes to fulfill at least some of the objectives, or portions thereof, but the situations for use of processes are static (not regularly reviewed, not regularly updated, etc.), the situations of use have varying degrees of specificity (e.g., some very detailed, others are vague), the situations for use are more generic in nature than specific to the system, and/or are the situations for use created in a consistent manner.

Continuing with this example, a level of "standardized" on the reference scale for consistency of use of processes corresponds to mid-level confidence of the consistency of use of the processes to reliably, repeatedly, and/or completely indicate that the system, or portion thereof, fulfills the objectives of the system, or portion thereof. As an example of standardized, the situations for use of the processes produce repeatable uses of the processes to fulfill at least some of the objectives, or portions thereof, and the situations of use are created in a consistent (e.g., standardized) manner, but situations of use of the processes are static (not regularly reviewed, not regularly updated, etc.), the situations of use have varying degrees of specificity, and/or the situations of use are more generic in nature than specific to the system.

Continuing with this example, a level of "measured" on the reference scale for the consistency of use of processes corresponds to mid to high level of confidence in the consistency of use of the processes to reliably, repeatedly, and/or completely indicate that the system, or portion thereof, fulfills the objectives of the system, or portion thereof. As an example of measured, the situations for use of the processes produce repeatable uses of the processes to fulfill at least some of the objectives, or portions thereof, the situations of use of processes are created in a consistent manner, the situations for use have consistent specificity, and the situations for use are specific to the system, but the situations for use of processes are static (not regularly reviewed, not regularly updated, etc.).

Continuing with this example, a level of "optimized" on the reference scale for consistency of use of processes corresponds to high level of confidence in the consistency of use of the processes to reliably, repeatedly, and/or completely indicate that the system, or portion thereof, fulfills the objectives of the system, or portion thereof. As an example of optimized, the situations of use of the processes produce repeatable uses of the processes to fulfill at least some of the objectives, or portions thereof, the situations of use of the processes are created in a consistent manner, the situations of use have consistent specificity, the situations of use are specific to the system, and the situations of use are dynamic (regularly reviewed, regularly updated, etc.).

The reference scale generator 683 generates a reference scale for evaluating consistency of use of policies. As an example, the reference scale includes: none for a rating of 0; informal for a rating of 5; defined for a rating of 10; audited for a rating of 15; and embedded for a rating of 20. In this example, a level of "none" on the reference scale for consistency of use of policies corresponds to zero or near zero confidence in the consistency of use of the policies to reliably, repeatedly, and/or completely indicate that the system, or portion thereof, fulfills the objectives of the system, or portion thereof.

Continuing with this example, a level of "informal" on the reference scale for consistency of use of policies corresponds to low level of confidence of the consistency of use of policies to reliably, repeatedly, and/or completely indicate that the system, or portion thereof, fulfills the objectives of the system, or portion thereof. As an example of informal, the situations for use of one or more policies is inconsistent (e.g., contradicts, produces an infinite loop, creates a deadlock, etc.) with situations for use of one or more other the policies. As another example of informal, there are gaps (e.g., missing, incomplete, inaccurate, etc.) in situations as to when policies are to be used.

Continuing with this example, a level of "defined" on the reference scale for consistency of use of policies corresponds to low to mid level of confidence of consistency of use of the policies to reliably, repeatedly, and/or completely indicate that the system, or portion thereof, fulfills the objectives of the system, or portion thereof. As an example of defined, the situations for use policies produce repeatable uses of the policies to fulfill at least some of the objectives, or portions thereof, but the situations for use of policies are static (not regularly reviewed, not regularly updated, etc.), the situations of use have varying degrees of specificity (e.g., some very detailed, others are vague), the situations for use are more generic in nature than specific to the system, and/or are the situations for use created in a consistent manner.

Continuing with this example, a level of "audited" on the reference scale for consistency of use of policies corresponds to mid to high level of confidence of consistency of use of the policies to reliably, repeatedly, and/or completely indicate that the system, or portion thereof, fulfills the objectives of the system, or portion thereof. As an example of audited, the situations for use of the policies produce repeatable uses of the policies to fulfill at least some of the objectives, or portions thereof, the situations of use of policies are created in a consistent manner, the situations for use have consistent specificity, and the situations for use are specific to the system, but the situations for use of policies are static (not regularly reviewed, not regularly updated, etc.).

Continuing with this example, a level of "embedded" on the reference scale for consistency of use of policies corresponds to high level of confidence of consistency of use of the policies to reliably, repeatedly, and/or completely indicate that the system, or portion thereof, fulfills the objectives of the system, or portion thereof. As an example of embedded, the situations of use of the policies produce repeatable uses of the policies to fulfill at least some of the objectives, or portions thereof, the situations of use of the policies are created in a consistent manner, the situations of use have consistent specificity, the situations of use are specific to the system, and the situations of use are dynamic (regularly reviewed, regularly updated, etc.).

As another example, the reference scale generator 683 generates a reference scale for evaluating consistency of use of documents of: none for a rating of 0; informal for a rating of 5; formal for a rating of 10; metric & reporting for a rating of 15; and improvement for a rating of 20. In this example, a level of "none" on the reference scale for consistency of use of documents corresponds to zero or near zero confidence of consistency of use of documents to reliably, repeatedly, and/or completely indicate that the system, or portion thereof, fulfills the objectives of the system, or portion thereof.

Continuing with this example, a level of "informal" on the reference scale for consistency of use of documents corresponds to low level of confidence of consistency of use of the documents to reliably, repeatedly, and/or completely indicate that the system, or portion thereof, fulfills the objectives of the system, or portion thereof. As an example of informal, there are gaps (e.g., missing, incomplete, inaccurate, etc.) in situations as to when documents are to be used. As another example of inconsistent, the situations for use of one or more documents is inconsistent (e.g., contradicts, produces an infinite loop, creates a deadlock, etc.) with situations for use of one or more other the documents.

Continuing with this example, a level of "formal" on the reference scale for consistency of use of documents corresponds to low to mid level of confidence of consistency of use of documents to reliably, repeatedly, and/or completely indicate that the system, or portion thereof, fulfills the objectives of the system, or portion thereof. As an example of defined, the situations for use of documents produce repeatable uses of the processes to fulfill at least some of the objectives, or portions thereof, but the situations for use of documents are static (not regularly reviewed, not regularly updated, etc.), the situations of use have varying degrees of specificity (e.g., some very detailed, others are vague), the situations for use are more generic in nature than specific to the system, and/or are the situations for use created in a consistent manner.

Continuing with this example, a level of "metric & reporting" on the reference scale for consistency of use of documents corresponds to mid to high level of confidence of consistency of use of the documents to reliably, repeatedly, and/or completely indicate that the system, or portion thereof, fulfills the objectives of the system, or portion thereof. As an example of metric & reporting, the situations for use of the documents produce repeatable uses of the documents to fulfill at least some of the objectives, or portions thereof, the situations of use of documents are created in a consistent manner, the situations for use have consistent specificity, and the situations for use are specific to the system, but the situations for use of documents are static (not regularly reviewed, not regularly updated, etc.).

Continuing with this example, a level of "improvement" on the reference scale for consistency of use of documents corresponds to high level of confidence of consistency of use of the documents to reliably, repeatedly, and/or completely indicate that the system, or portion thereof, fulfills the objectives of the system, or portion thereof. As an example of improvement, the situations of use of the documents produce repeatable uses of the documents to fulfill at least some of the objectives, or portions thereof, the situations of use of the documents are created in a consistent manner, the situations of use have consistent specificity, the situations of use are specific to the system, and the situations of use are dynamic (regularly reviewed, regularly updated, etc.).

As another example, the reference scale generator 683 generates a reference scale for evaluating consistency of use of automation of: unavailable for a rating of 10; none for a rating of 0; partial for a rating of 5; and full for a rating of 10. In this example, a level of "unavailable" for consistency of use of automation corresponds to automation for a particular incident (e.g., automation of a feature of the system) is not available. Continuing with this example, a level of "none" on the reference scale for consistency of use of automation corresponds to zero or near zero confidence in consistency of use of automation within the system, or portion thereof.

Continuing with this example, a level of "partial" on the reference scale for consistency of use of automation corresponds to mid-level confidence of consistency of use of automation within the system, or portion thereof. As an example of partial, the situations for use of automation produce repeatable uses of automation, the situations of use are created in a consistent (e.g., standardized) manner, but situations of use of the automation are static (not regularly reviewed, not regularly updated, etc.), the situations of use have varying degrees of specificity, and/or the situations of use are more generic in nature than specific to the system.

Continuing with this example, a level of "full" on the reference scale for consistency of use of automation corresponds to high level of confidence in consistency of use of automation within the system, or portion thereof. As an example of full, the situations of use of automation produce repeatable uses of automation, the situations of use of automation are created in a consistent manner, the situations of use have consistent specificity, the situations of use are specific to the system, and the situations of use are dynamic (regularly reviewed, regularly updated, etc.).

The reference scale generator 683 generates a reference scale for evaluating consistency of use of procedures of: none for a rating of 0; informal for a rating of 5; defined for a rating of 10; audited for a rating of 15; and embedded for a rating of 20. The reference scale generator 683 also generates a reference scale for evaluating consistency of use of certificates of: none for a rating of 0; informal for a rating of 5; forma for a rating of 10; metric & reporting for a rating of 15; and improvement for a rating of 20.

The rating generator 681 generates the evaluation rating 627 for the quantified consistency of use (e.g., not used when not supposed to be used) of the evaluation metric indicator 624 based on the reference scale 626. For each of the evaluation metrics, the rating generator 681 maps the quantified consistency of use of the evaluation metric to the reference scale 626. As an example, the rating generator 681 maps the quantified consistency of use of processes to the process reference scale 626. In this example, the quantified consistency of use of processes includes an indication for the situations of use of the processes showing repeatable uses of the processes to fulfill at least some of the objectives, or portions thereof, an indication that the situations of use of the processes are created in a consistent manner, an indication that the situations of use have consistent specificity, an indication that the situations of use are specific to the system, and/or an indication that the situations of use are dynamic (regularly reviewed, regularly updated, etc.). Additional examples are provided with reference to FIGS. 126-131.

FIG. 133 is a logic diagram of an example of a module of FIG. 132 generating an evaluation metric rating. The method begins at step 881 where the module evaluates the quantified consistency of use of processes to determine whether there is at least one consistency of use of a process in the collection of data. Note that the threshold number in this step could be greater than one. If there are no consistency of uses of a process, the method continues at step 882 where the module generates a consistency of use process rating of 0 (and/or a word rating of "none").

If there is at least one consistency of use of a process, the method continues at step 883 where the module determines whether the situations of use of processes are repeatable. As a further and/or alternative example, repeatable includes situations of use of processes produce consistent results, situation detail variations from process to process, the situations of use are not routinely reviewed in an organized manner, and/or the situations of use are not regulated.

If the situations of use of the processes are not repeatable, the method continues at step 884 where the module generates a process rating of 10 (and/or a word rating of "inconsistent"). If, however, the situations of use of processes are at least repeatable, the method continues at step 885 where the module determines whether the situations of use of the processes is standardized. As a further and/or alternative example, standardized includes repeatable plus there are no appreciable variations in detail of situations of use of the processes from process to process, and/or the situations of use of the processes are regulated.

If the situations of use of the processes is not standardized, the method continues at step 886 where the module generates a process rating of 20 (and/or a word rating of "repeatable"). If, however, the situations of use of the processes are at least standardized, the method continues at step 887 where the module determines whether the situations of use of the processes is measured. As a further and/or alternative example, measured includes standardized plus precise, exact, and/or situations of use calculated to specific needs, concerns, and/or functioning of the system.

If the situations of use of the processes is not measured, the method continues at step 888 where the module generates a process rating of 30 (and/or a word rating of "standardized"). If, however, the situations of use of the processes is at least measured, the method continues at step 889 where the module determines whether the situations of use of the processes is optimized. As a further and/or alternative example, optimized includes measured plus situations of use of the processes are up-to-date and/or improvement of the situations of use of the process is assessed on a regular basis as part of system protocols.

If the situations of use of the processes is not optimized, the method continues at step 890 where the module generates a process rating of 40 (and/or a word rating of "measured"). If the situations of use of the processes is optimized, the method continues at step 891 where the module generates a process rating of 50 (and/or a word rating of "optimized"). Note that the numerical rating are example values and could be other values. Further note that the number of level of process rating may be more or less than the six shown.

Figure 134:
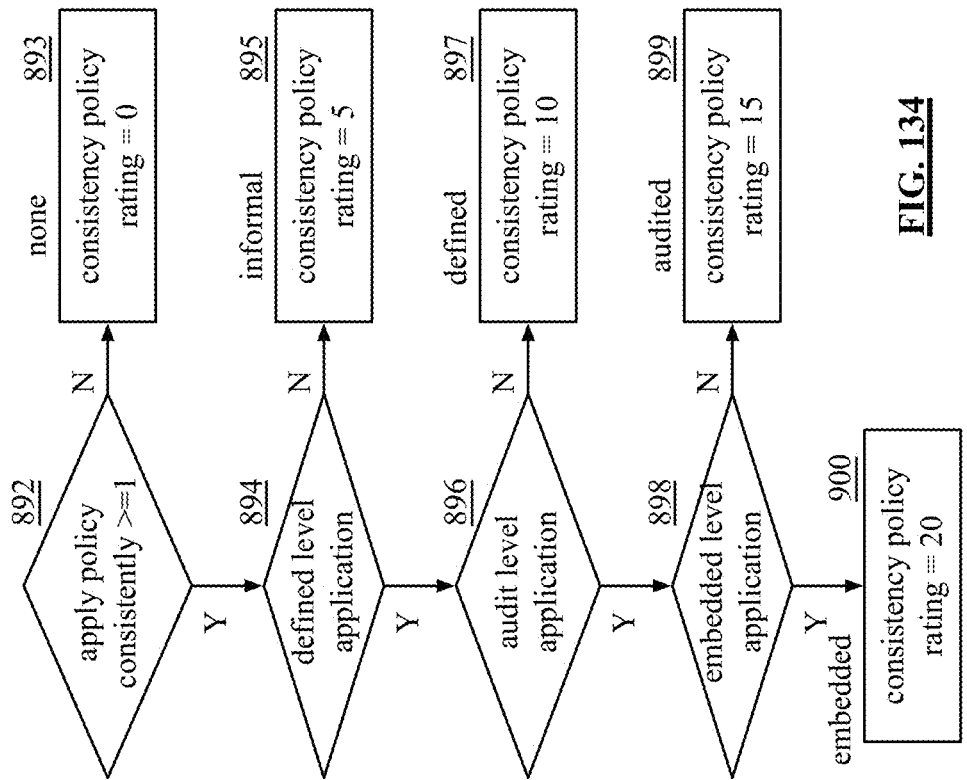
FIG. 134 is a logic diagram of an example of a module of FIG. 125 generating an evaluation metric rating in accordance with the present disclosure.

FIG. 134 is a logic diagram of an example of a module of FIG. 132 generating a consistency of use of policy evaluation rating. The method begins at step 892 where the module determines whether there is at least one consistency of use of a policy in the collection of data. Note that the threshold number in this step could be greater than one. If there are no consistency of uses of a policy, the method continues at step 893 where the module generates a consistency of use of policy rating of 0 (and/or a word rating of "none").

If there is at least one consistency of use of a policy, the method continues at step 894 where the module determines whether the consistency of use of the policies is defined. As a further and/or alternative example, defined consistency of use of policies includes means to track situations of use of policies, there are some tracking variations, the situations of use are not routinely reviewed in an organized manner, and/or the situations of use are not regulated.

If the consistency of use of the policies is not defined, the method continues at step 895 where the module generates a consistency of use of policy rating of 5 (and/or a word rating of "informal"). If, however, the consistency of use of the policies is at least defined, the method continues at step 896 where the module determines whether consistency of use of policies is audited. As a further and/or alternative example, audited includes defined plus there are negligible tracking variations.

If the consistency of use of the policies is not audited, the method continues at step 897 where the module generates a consistency of use of policy rating of 10 (and/or a word rating of "defined"). If, however, the consistency of use of the policies is at least audited, the method continues at step 898 where the module determines whether the consistency of use of the policies is embedded. As a further and/or alternative example, embedded includes audited plus the situations of use are routinely reviewed in an organized manner and the situations of use are regulated.

If the consistency of use of the policies is not embedded, the method continues at step 899 where the module generates a consistency of use of policy rating of 15 (and/or a word rating of "audited"). If the consistency of use of policies is embedded, the method continues at step 900 where the module generates a consistency of use of policy rating of 20 (and/or a word rating of "embedded"). Note that the numerical rating are example values and could be other values. Further note that the number of level of consistency of use of policy rating may be more or less than the five shown.

Figure 135:
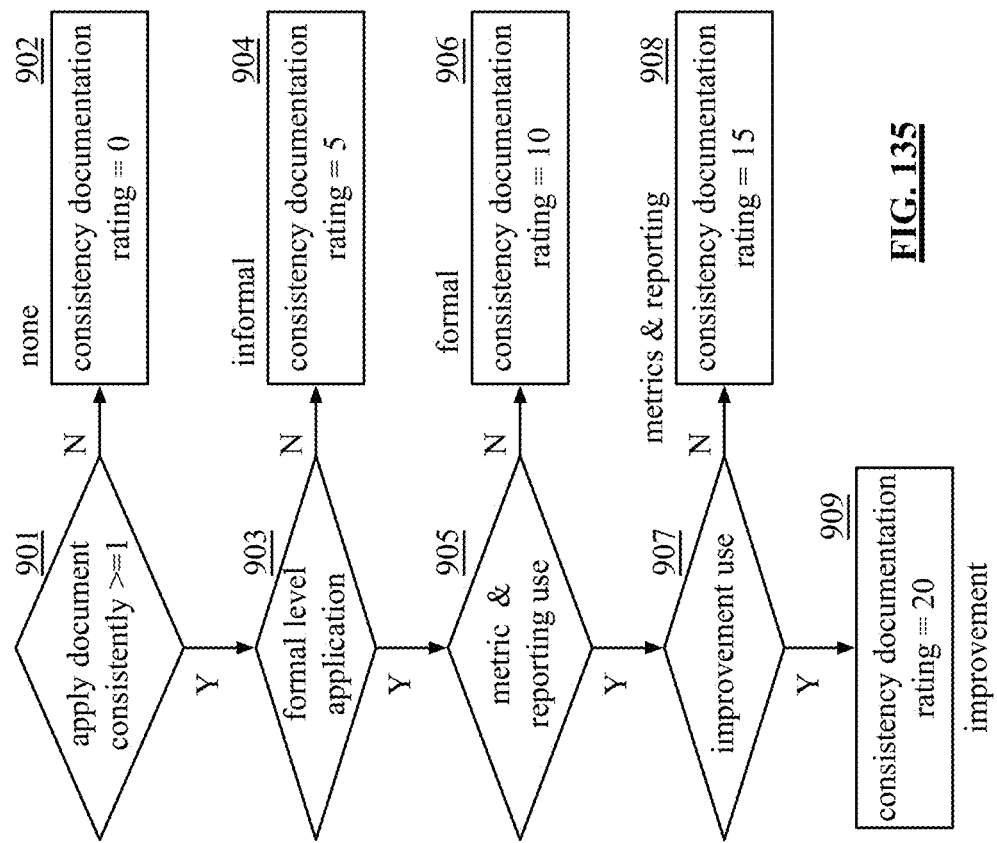
FIG. 135 is a logic diagram of an example of a module of FIG. 125 generating an evaluation metric rating in accordance with the present disclosure.

FIG. 135 is a logic diagram of an example of a module of FIG. 132 generating a consistency of use documentation evaluation rating. The method begins at step 901 where the module determines whether there is at least one consistency of use of a document in the collection of data. Note that the threshold number in this step could be greater than one. If there are no consistency of uses of a document, the method continues at step 902 where the module generates a consistency of use of documentation rating of 0 (and/or a word rating of "none").

If there is at least one consistency of use of a document, the method continues at step 903 where the module determines whether the consistency of use of documents is formalized. As a further and/or alternative example, formalized consistency of use of documents includes means for tracking consistency of use of documents, there are some tracking variations, the situations of use is not routinely reviewed in an organized manner, and/or the situations of use is not regulated.

If the consistency of use of documents is not formalized, the method continues at step 904 where the module generates a consistency of use of documentation rating of 5 (and/or a word rating of "informal"). If, however, the consistency of use of documents is at least formalized, the method continues at step 905 where the module determines whether the consistency of use of documents is metric & reporting. As a further and/or alternative example, metric & reporting includes formal plus there are negligible tracking variations.

If the consistency of use of documents is not metric & reporting, the method continues at step 906 where the module generates a consistency of use of documentation rating of 10 (and/or a word rating of "formal"). If, however, the consistency of use of documents is at least metric & reporting, the method continues at step 907 where the module determines whether the consistency of use of documents is improvement. As a further and/or alternative example, improvement includes metric & reporting plus the situations of use are routinely reviewed in an organized manner and the situations of use are regulated.

If the consistency of use of documents is not improvement, the method continues at step 908 where the module generates a consistency of use of documentation rating of 15 (and/or a word rating of "metric & reporting"). If the consistency of use of documents is improvement, the method continues at step 909 where the module generates a consistency of use of documentation rating of 20 (and/or a word rating of "improvement"). Note that the numerical rating are example values and could be other values. Further note that the number of level of consistency of use of documentation rating may be more or less than the five shown.

Figure 136:
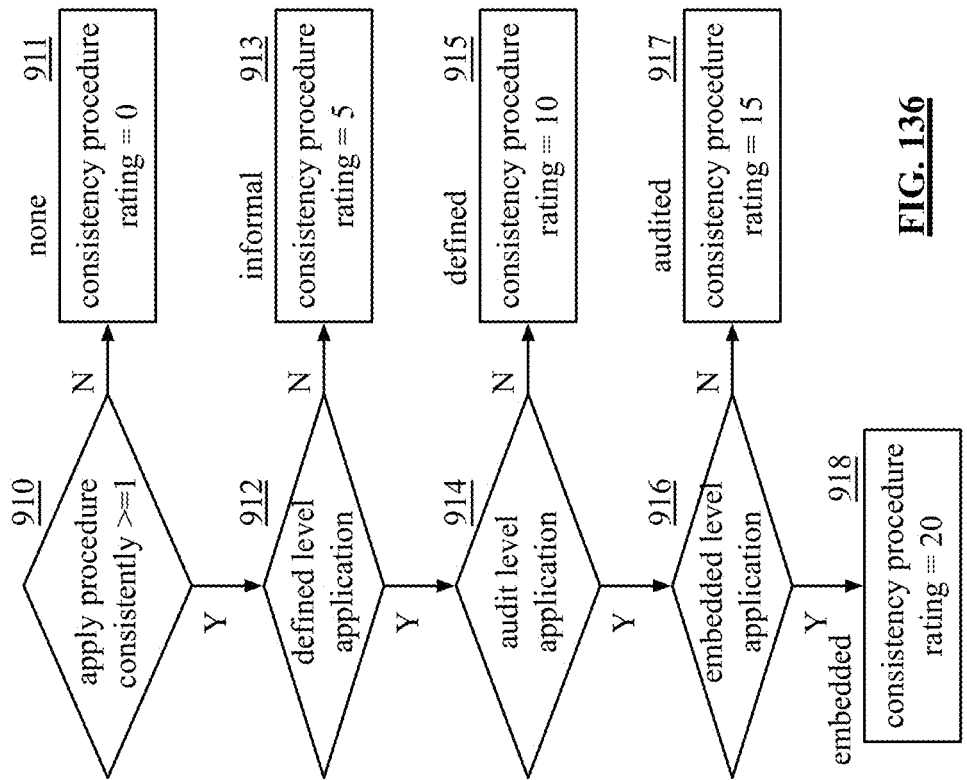
FIG. 136 is a logic diagram of an example of a module of FIG. 125 generating an evaluation metric rating in accordance with the present disclosure.

FIG. 136 is a logic diagram of an example of a module of FIG. 132 generating a consistency of use of procedure evaluation rating. The method begins at step 910 where the module determines whether there is at least one consistency of use of a procedure in the collection of data. Note that the threshold number in this step could be greater than one. If there are no consistency of uses of a procedure, the method continues at step 911 where the module generates a consistency of use of procedure rating of 0 (and/or a word rating of "none").

If there is at least one consistency of use of a procedure, the method continues at step 912 where the module determines whether the consistency of use of the procedures is defined. As a further and/or alternative example, defined consistency of use of procedures includes means to track situations of use of procedures, there are some tracking variations, the situations of use are not routinely reviewed in an organized manner, and/or the situations of use are not regulated.

If the consistency of use of the procedures is not defined, the method continues at step 913 where the module generates a consistency of use of procedure rating of 5 (and/or a word rating of "informal"). If, however, the consistency of use of the procedures is at least defined, the method continues at step 914 where the module determines whether consistency of use of procedures is audited. As a further and/or alternative example, audited includes defined plus there are negligible tracking variations.

If the consistency of use of the procedures is not audited, the method continues at step 915 where the module generates a consistency of use of procedure rating of 10 (and/or a word rating of "defined"). If, however, the consistency of use of the procedures is at least audited, the method continues at step 916 where the module determines whether the consistency of use of the procedures is embedded. As a further and/or alternative example, embedded includes audited plus the situations of use are routinely reviewed in an organized manner and the situations of use are regulated.

If the consistency of use of the procedures is not embedded, the method continues at step 917 where the module generates a consistency of use of procedure rating of 15 (and/or a word rating of "audited"). If the consistency of use of procedures is embedded, the method continues at step 918 where the module generates a consistency of use of procedure rating of 20 (and/or a word rating of "embedded"). Note that the numerical rating are example values and could be other values. Further note that the number of level of consistency of use of procedure rating may be more or less than the five shown.

Figure 137:
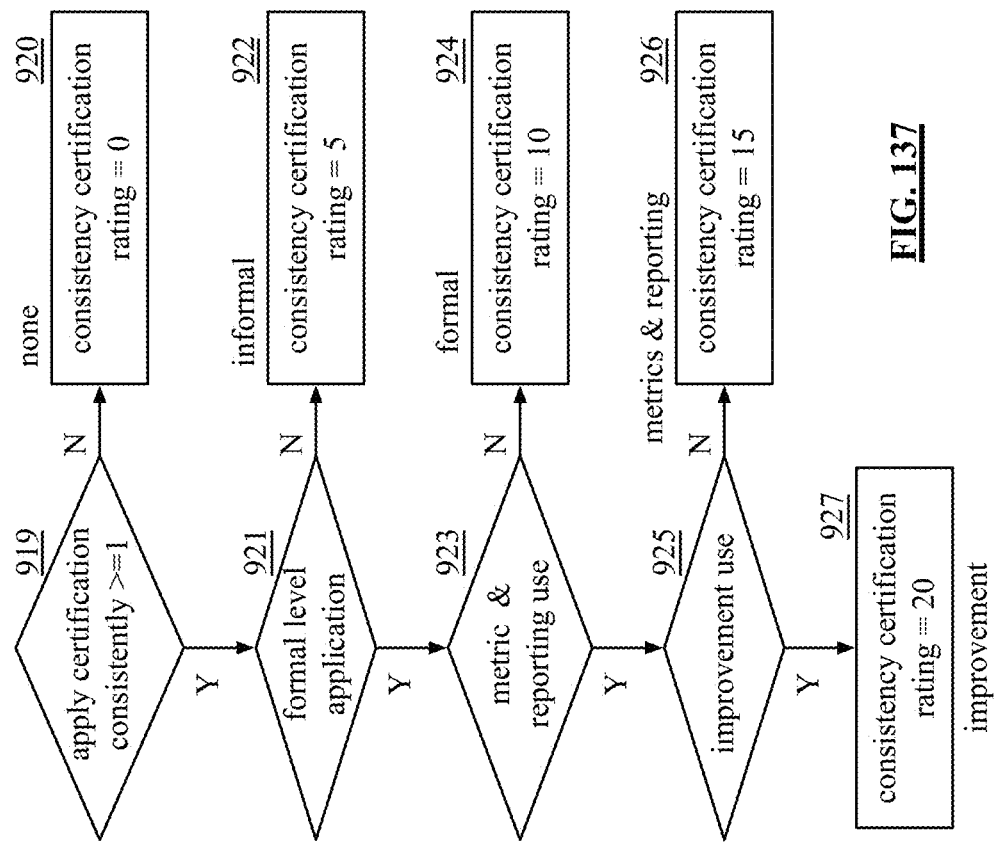
FIG. 137 is a logic diagram of an example of a module of FIG. 125 generating an evaluation metric rating in accordance with the present disclosure.

FIG. 137 is a logic diagram of an example of a module of FIG. 132 generating a consistency of use certification evaluation rating. The method begins at step 919 where the module determines whether there is at least one consistency of use of a certificate in the collection of data. Note that the threshold number in this step could be greater than one. If there are no consistency of uses of a certificate, the method continues at step 920 where the module generates a consistency of use of certification rating of 0 (and/or a word rating of "none").

If there is at least one consistency of use of a certificate, the method continues at step 921 where the module determines whether the consistency of use of certificates is formalized. As a further and/or alternative example, formalized consistency of use of certificates includes means for tracking consistency of use of certificates, there are some tracking variations, the situations of use is not routinely reviewed in an organized manner, and/or the situations of use is not regulated.

If the consistency of use of certificates is not formalized, the method continues at step 922 where the module generates a consistency of use of certification rating of 5 (and/or a word rating of "informal"). If, however, the consistency of use of certificates is at least formalized, the method continues at step 923 where the module determines whether the consistency of use of certificates is metric & reporting. As a further and/or alternative example, metric & reporting includes formal plus there are negligible tracking variations.

If the consistency of use of certificates is not metric & reporting, the method continues at step 924 where the module generates a consistency of use of certification rating of 10 (and/or a word rating of "formal"). If, however, the consistency of use of certificates is at least metric & reporting, the method continues at step 925 where the module determines whether the consistency of use of certificates is improvement. As a further and/or alternative example, improvement includes metric & reporting plus the situations of use are routinely reviewed in an organized manner and the situations of use are regulated.

If the consistency of use of certificates is not improvement, the method continues at step 926 where the module generates a consistency of use of certification rating of 15 (and/or a word rating of "metric & reporting"). If the consistency of use of certificates is improvement, the method continues at step 927 where the module generates a consistency of use of certification rating of 20 (and/or a word rating of "improvement"). Note that the numerical rating are example values and could be other values. Further note that the number of level of consistency of use of certification rating may be more or less than the five shown.

Figure 138:
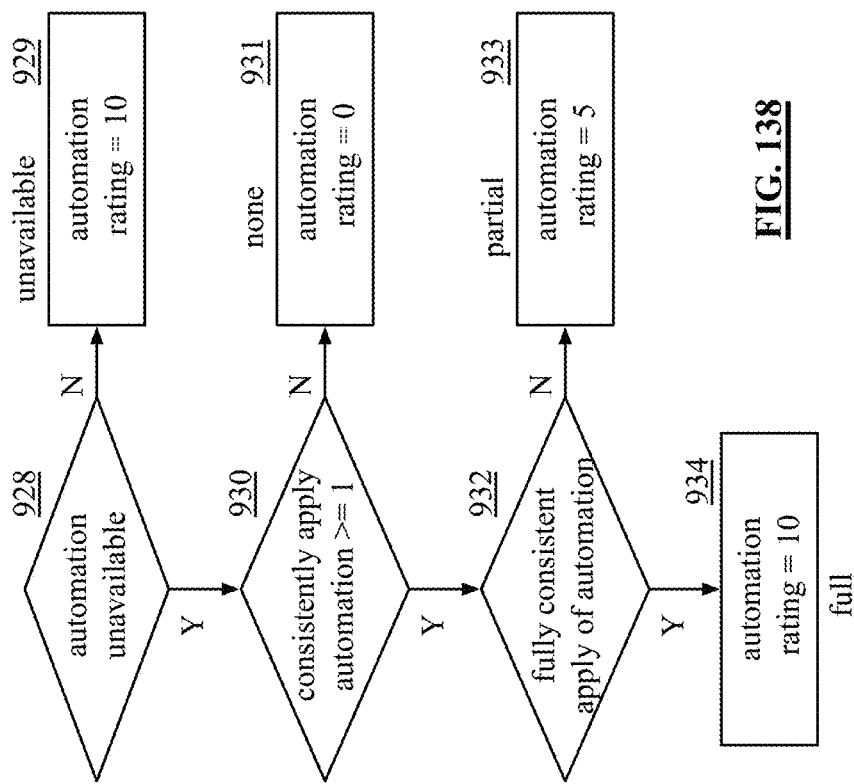
FIG. 138 is a logic diagram of an example of a module of FIG. 125 generating an evaluation metric rating in accordance with the present disclosure.

FIG. 138 is a logic diagram of an example of a module of FIG. 132 generating a consistency of use of automation evaluation rating. The method begins at step 928 where the module determines whether there is available automation for a particular system aspect, system criteria, system features, and/or system mode. If use of automation is not available, the method continues at step 929 where the module generates an automation rating of 10 (and/or a word rating of "unavailable").

If use of automation is available (e.g., there is automation for one or more particular system features), the method continues at step 930 where the module determines whether there is at least one consistency of use of automation in the data. If not, the method continues at step 931 where the module generates a consistency of use of automation rating of 0 (and/or a word rating of "none").

If there is at least one consistency of use of automation, the method continues at step 932 where the module determines whether there was full consistency of use of automation in the data. As a further and/or alternative example, full consistency of use of automation refers to the situations of use of automation is at an expected level.

If the consistency of use of automation is not full, the method continues at step 933 where the module generates a consistency of use of automation rating of 5 (and/or a word rating of "partial"). If, however, the consistency of use of automation is full, the method continues at step 934 where the module generates a consistency of use of automation rating of 10 (and/or a word rating of "full"). Note that the numerical rating are example values and could be other values. Further note that the number of level of use of automation may be more or less than the four shown.

FIG. 139 is a logic diagram of an example of an analysis system generating an evaluation output regrading processes of the system, or portion thereof. The method begins at step 935 where an analysis unit of the analysis system obtains (e.g., receives, gathers, inputs, and/or other means) a collection of data regarding processes of a system aspect (e.g., what is being evaluated with respect to one or more system elements, one or more system criteria, and/or one or more system modes).

The method continues at step 936 where the analysis unit acquires (e.g., receives, generates, determines, and/or other means) data analysis parameters regarding processes of the system aspect. An example of data analysis parameters were discussed with reference to FIG. 35 and with reference to one or more of 89-138.

The method continues at step 937 where the analysis unit determines one or more evaluation perspectives based on the data analysis parameters. An evaluation perspective is understanding (e.g., knowledge and/or intent of system), implementation (e.g., how the system was developed), operation (e.g., how the system fulfills its objectives), or self-analysis (e.g., the system's self-protecting, self-healing, etc.).

The method continues at step 938 where the analysis unit determines one or more evaluation modalities based on the data analysis parameters. An evaluation modality is sufficiency, effectiveness, a measure of use, a measure of appropriate of use, or a measure of consistency of use. Sufficiency is regarding an adequate quantity of data regarding processes associated with the system aspect. Effectiveness is regarding adequate content of the data regarding processes with respect to one or more objectives of the system aspect. The measure of use is regarding the quantity of use of the data regarding processes with respect to supporting the one or more objectives of the system aspect. The measure of appropriate use is regarding the conditions of use of the data regarding processes with respect to supporting the one or more objectives of the system aspect. The measure of consistency of use is regarding the situations of use of data regarding processes with respect to supporting the one or more objectives of the system aspect.

The method continues at step 940 where the analysis unit evaluates the collection of data in accordance with processes, the one or more evaluation perspectives, and the one or more evaluation modalities to produce one or more evaluation outputs regarding processes. An evaluation output is one or more evaluation ratings, one or more system aspect deficiencies, or one or more auto-corrections of the one or more system aspect deficiencies.

FIG. 140 is a logic diagram of an example of an analysis system generating an evaluation output regrading policies of the system, or portion thereof. The method begins at step 941 where an analysis unit of the analysis system obtains (e.g., receives, gathers, inputs, and/or other means) a collection of data regarding policies of a system aspect (e.g., what is being evaluated with respect to one or more system elements, one or more system criteria, and/or one or more system modes).

The method continues at step 942 where the analysis unit acquires (e.g., receives, generates, determines, and/or other means) data analysis parameters regarding policies of the system aspect. An example of data analysis parameters were discussed with reference to FIG. 35 and with reference to one or more of 89-138.

The method continues at step 943 where the analysis unit determines one or more evaluation perspectives based on the data analysis parameters. An evaluation perspective is understanding (e.g., knowledge and/or intent of system), implementation (e.g., how the system was developed), operation (e.g., how the system fulfills its objectives), or self-analysis (e.g., the system's self-protecting, self-healing, etc.).

The method continues at step 944 where the analysis unit determines one or more evaluation modalities based on the data analysis parameters. An evaluation modality is sufficiency, effectiveness, a measure of use, a measure of appropriate of use, or a measure of consistency of use. Sufficiency is regarding an adequate quantity of data regarding policies associated with the system aspect. Effectiveness is regarding adequate content of the data regarding policies with respect to one or more objectives of the system aspect. The measure of use is regarding the quantity of use of the data regarding policies with respect to supporting the one or more objectives of the system aspect. The measure of appropriate use is regarding the conditions of use of the data regarding policies with respect to supporting the one or more objectives of the system aspect. The measure of consistency of use is regarding the situations of use of data regarding policies with respect to supporting the one or more objectives of the system aspect.

The method continues at step 946 where the analysis unit evaluates the collection of data in accordance with policies, the one or more evaluation perspectives, and the one or more evaluation modalities to produce one or more evaluation outputs regarding policies. An evaluation output is one or more evaluation ratings, one or more system aspect deficiencies, or one or more auto-corrections of the one or more system aspect deficiencies.

FIG. 141 is a logic diagram of an example of an analysis system generating an evaluation output regrading automation of the system, or portion thereof. The method begins at step 947 where an analysis unit of the analysis system obtains (e.g., receives, gathers, inputs, and/or other means) a collection of data regarding automation of a system aspect (e.g., what is being evaluated with respect to one or more system elements, one or more system criteria, and/or one or more system modes).

The method continues at step 948 where the analysis unit acquires (e.g., receives, generates, determines, and/or other means) data analysis parameters regarding automation of the system aspect. An example of data analysis parameters were discussed with reference to FIG. 35 and with reference to one or more of 89-138.

The method continues at step 949 where the analysis unit determines one or more evaluation perspectives based on the data analysis parameters. An evaluation perspective is understanding (e.g., knowledge and/or intent of system), implementation (e.g., how the system was developed), operation (e.g., how the system fulfills its objectives), or self-analysis (e.g., the system's self-protecting, self-healing, etc.).

The method continues at step 950 where the analysis unit determines one or more evaluation modalities based on the data analysis parameters. An evaluation modality is sufficiency, effectiveness, a measure of use, a measure of appropriate of use, or a measure of consistency of use. Sufficiency is regarding an adequate quantity of data for automation associated with the system aspect. Effectiveness is regarding adequate content of the data regarding automation with respect to one or more objectives of the system aspect. The measure of use is regarding the quantity of use of the data regarding automation with respect to supporting the one or more objectives of the system aspect. The measure of appropriate use is regarding the conditions of use of the data regarding automation with respect to supporting the one or more objectives of the system aspect. The measure of consistency of use is regarding the situations of use of data regarding automation with respect to supporting the one or more objectives of the system aspect.

The method continues at step 952 where the analysis unit evaluates the collection of data in accordance with automation, the one or more evaluation perspectives, and the one or more evaluation modalities to produce one or more evaluation outputs regarding automation. An evaluation output is one or more evaluation ratings, one or more system aspect deficiencies, or one or more auto-corrections of the one or more system aspect deficiencies.

FIG. 142 is a logic diagram of an example of an analysis system generating an evaluation output regrading documentation of the system, or portion thereof. The method begins at step 953 where an analysis unit of the analysis system obtains (e.g., receives, gathers, inputs, and/or other means) a collection of data regarding documentation of a system aspect (e.g., what is being evaluated with respect to one or more system elements, one or more system criteria, and/or one or more system modes).

The method continues at step 954 where the analysis unit acquires (e.g., receives, generates, determines, and/or other means) data analysis parameters regarding documentation of the system aspect. An example of data analysis parameters were discussed with reference to FIG. 35 and with reference to one or more of 89-138.

The method continues at step 955 where the analysis unit determines one or more evaluation perspectives based on the data analysis parameters. An evaluation perspective is understanding (e.g., knowledge and/or intent of system), implementation (e.g., how the system was developed), operation (e.g., how the system fulfills its objectives), or self-analysis (e.g., the system's self-protecting, self-healing, etc.).

The method continues at step 956 where the analysis unit determines one or more evaluation modalities based on the data analysis parameters. An evaluation modality is sufficiency, effectiveness, a measure of use, a measure of appropriate of use, or a measure of consistency of use. Sufficiency is regarding an adequate quantity of data for documentation associated with the system aspect. Effectiveness is regarding adequate content of the data regarding documentation with respect to one or more objectives of the system aspect. The measure of use is regarding the quantity of use of the data regarding documentation with respect to supporting the one or more objectives of the system aspect. The measure of appropriate use is regarding the conditions of use of the data regarding documentation with respect to supporting the one or more objectives of the system aspect. The measure of consistency of use is regarding the situations of use of data regarding documentation with respect to supporting the one or more objectives of the system aspect.

The method continues at step 958 where the analysis unit evaluates the collection of data in accordance with documentation, the one or more evaluation perspectives, and the one or more evaluation modalities to produce one or more evaluation outputs regarding documentation. An evaluation output is one or more evaluation ratings, one or more system aspect deficiencies, or one or more auto-corrections of the one or more system aspect deficiencies.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    obtaining, by an analysis unit, a collection of data for a particular evaluation of a system aspect;
    acquiring, by the analysis unit, data analysis parameters regarding the particular evaluation of the system aspect;
    determining, by the analysis unit, one or more evaluation perspectives based on the data analysis parameters;
    determining, by the analysis unit, one or more evaluation modalities based on the data analysis parameters;
    determining, by the analysis unit, one or more evaluation metrics based on the data analysis parameters; and
    evaluating, by the analysis unit, the collection of data in accordance with the one or more evaluation metrics, the one or more evaluation perspectives, and the one or more evaluation modalities to produce one or more evaluation outputs; wherein the evaluating the collection of data further includes, when the one or more evaluation modalities is a sufficiency modality:
        quantifying data of the collection of data regarding an evaluation metric of the one or more evaluation metrics to produce quantified data;
        determining a reference scale based on an evaluation perspective of the one or more evaluation perspectives and one or more objectives of the system aspect for the evaluation metric; and
        comparing the quantified data with the reference scale to produce an evaluation rating regarding sufficiency of the evaluation metric for the system aspect from the evaluation perspective as at least a part of the one or more evaluation outputs regarding the processes of the system aspect.

2. The method of claim 1, wherein the system aspect comprises:
    one or more system elements;
    one or more system criteria; and/or
    one or more system modes.

3. The method of claim 1, wherein an evaluation perspective of the one or more evaluation perspectives comprises:
    understanding;
    implementation;
    operation; or
    self-analysis.

4. The method of claim 1, wherein an evaluation metric of the one or more evaluation metrics comprises:
    process;
    policy;
    procedure;
    documentation;
    automation; or
    certification.

5. The method of claim 1, wherein an evaluation modality of the one or more evaluation modalities comprises:
    a level of sufficiency of an evaluation metric of the one or more evaluation metrics associated with the system aspect;
    a level of effectiveness of the evaluation metric with respect to one or more objectives of the system aspect;
    a measure of use of the evaluation metric with respect to supporting the one or more objectives of the system aspect;
    a measure of appropriate use of the evaluation metric with respect to supporting the one or more objectives of the system aspect; or
    a measure of consistency of use of the evaluation metric with respect to supporting the one or more objectives of the system aspect.

6. The method of claim 1, wherein an evaluation output of the one or more evaluation outputs comprises:
    one or more evaluation ratings;
    one or more system aspect deficiencies; or
    one or more auto-corrections of the one or more system aspect deficiencies.

7. The method of claim 1, wherein the evaluating the collection of data comprises:
    when the one or more evaluation modalities is an effectiveness modality:
    determining a reference scale based on an evaluation perspective of the one or more evaluation perspectives and one or more objectives of the system aspect for an evaluation metric of the one or more evaluation metrics; and
    evaluating data of the collection of data regarding the evaluation metric with respect to the reference scale to produce an evaluation rating regarding how effective the evaluation metric supports the one or more objectives of the system aspect from the evaluation perspective.

8. The method of claim 1, wherein the evaluating the collection of data comprises:
    when the one or more evaluation modalities is a measure of use modality:
    determining a reference scale based on an evaluation perspective of the one or more evaluation perspectives and one or more objectives of the system aspect for an evaluation metric of the one or more evaluation metrics; and
    evaluating data of the collection of data regarding the evaluation metric with respect to the reference scale to produce an evaluation rating regarding use of the evaluation metric to support the one or more objectives of the system aspect from the evaluation perspective.

9. The method of claim 1, wherein the evaluating the collection of data comprises:
when the one or more evaluation modalities is a measure of appropriate use modality:
determining a reference scale based on an evaluation perspective of the one or more evaluation perspectives and one or more objectives of the system aspect for an evaluation metric of the one or more evaluation metrics; and
evaluating data of the collection of data regarding the evaluation metric with respect to the reference scale to produce an evaluation rating regarding appropriate use of the evaluation metric to support the one or more objectives of the system aspect from the evaluation perspective.

10. The method of claim 1, wherein the evaluating the collection of data comprises:
when the one or more evaluation modalities is a measure of consistency of use modality:
determining a reference scale based on an evaluation perspective of the one or more evaluation perspectives and one or more objectives of the system aspect for an evaluation metric of the one or more evaluation metrics; and
evaluating data of the collection of data regarding the evaluation metric with respect to the reference scale to produce an evaluation rating regarding consistency of use of the evaluation metric to support the one or more objectives of the system aspect from the evaluation perspective.

11. The method of claim 1 further comprises:
determining, by the analysis unit, one or more evaluation viewpoints based on the data analysis parameters.

12. The method of claim 11, wherein an evaluation viewpoint of the one or more evaluation viewpoints comprises:
a disclosed data viewpoint;
a discovered data viewpoint; or
a desired data viewpoint.

13. The method of claim 1 further comprises:
determining, by the analysis unit, one or more evaluation categories based on the data analysis parameters.

14. The method of claim 13, wherein an evaluation category of the one or more evaluation categories comprises:
an identify category;
a protect category;
a detect category;
a respond category; or
a recover category.

15. A computer readable memory comprises:
a first memory section for storing operational instructions that, when executed by a computing entity, causes the computing entity to:
obtain a collection of data for a particular evaluation of a system aspect; and
acquire data analysis parameters regarding the particular evaluation of the system aspect;
a second memory section for storing operational instructions that, when executed by the computing entity, causes the computing entity to:
determine one or more evaluation perspectives based on the data analysis parameters;
determine one or more evaluation modalities based on the data analysis parameters; and
determine one or more evaluation metrics based on the data analysis parameters; and
a third memory section for storing operational instructions that, when executed by the computing entity, causes the computing entity to:
evaluate the collection of data in accordance with the one or more evaluation metrics, the one or more evaluation perspectives, and the one or more evaluation modalities to produce one or more evaluation outputs; wherein the evaluating the collection of data further includes, when the one or more evaluation modalities is a sufficiency modality:
quantify data of the collection of data regarding an evaluation metric of the one or more evaluation metrics to produce quantified data;
determine a reference scale based on an evaluation perspective of the one or more evaluation perspectives and one or more objectives of the system aspect for the evaluation metric; and
compare the quantified data with the reference scale to produce an evaluation rating regarding sufficiency of the evaluation metric for the system aspect from the evaluation perspective as at least a part of the one or more evaluation outputs regarding the processes of the system aspect.

16. The computer readable memory of claim 15, wherein the system aspect comprises:
one or more system elements;
one or more system criteria; and/or
one or more system modes.

17. The computer readable memory of claim 15, wherein an evaluation perspective of the one or more evaluation perspectives comprises:
understanding;
implementation;
operation; or
self-analysis.

18. The computer readable memory of claim 15, wherein an evaluation metric of the one or more evaluation metrics comprises:
process;
policy;
procedure;
documentation;
automation; or
certification.

19. The computer readable memory of claim 15, wherein an evaluation modality of the one or more evaluation modalities comprises:
a level of sufficiency of an evaluation metric of the one or more evaluation metrics associated with the system aspect;
a level of effectiveness of the evaluation metric with respect to one or more objectives of the system aspect;
a measure of use of the evaluation metric with respect to supporting the one or more objectives of the system aspect;
a measure of appropriate use of the evaluation metric with respect to supporting the one or more objectives of the system aspect; or
a measure of consistency of use of the evaluation metric with respect to supporting the one or more objectives of the system aspect.

20. The computer readable memory of claim 15, wherein an evaluation output of the one or more evaluation outputs comprises:

one or more evaluation ratings;

one or more system aspect deficiencies; or one or more auto-corrections of the one or more system aspect deficiencies.

21. The computer readable memory of claim 15, wherein the third memory section further stores operational instructions that, when executed by the computing entity, causes the computing entity to evaluate the collection of data by:

when the one or more evaluation modalities is an effectiveness modality:

determining a reference scale based on an evaluation perspective of the one or more evaluation perspectives and one or more objectives of the system aspect for an evaluation metric of the one or more evaluation metrics; and evaluating data of the collection of data regarding the evaluation metric with respect to the reference scale to produce an evaluation rating regarding how effective the evaluation metric supports the one or more objectives of the system aspect from the evaluation perspective.

22. The computer readable memory of claim 15, wherein the third memory section further stores operational instructions that, when executed by the computing entity, causes the computing entity to evaluate the collection of data by:

when the one or more evaluation modalities is a measure of use modality:

determining a reference scale based on an evaluation perspective of the one or more evaluation perspectives and one or more objectives of the system aspect for an evaluation metric of the one or more evaluation metrics; and evaluating data of the collection of data regarding the evaluation metric with respect to the reference scale to produce an evaluation rating regarding use of the evaluation metric to support the one or more objectives of the system aspect from the evaluation perspective.

23. The computer readable memory of claim 15, wherein the third memory section further stores operational instructions that, when executed by the computing entity, causes the computing entity to evaluate the collection of data by:

when the one or more evaluation modalities is a measure of appropriate use modality:

determining a reference scale based on an evaluation perspective of the one or more evaluation perspectives and one or more objectives of the system aspect for an evaluation metric of the one or more evaluation metrics; and evaluating data of the collection of data regarding the evaluation metric with respect to the reference scale to produce an evaluation rating regarding appropriate use of the evaluation metric to support the one or more objectives of the system aspect from the evaluation perspective.

24. The computer readable memory of claim 15, wherein the third memory section further stores operational instructions that, when executed by the computing entity, causes the computing entity to evaluate the collection of data by:

when the one or more evaluation modalities is a measure of consistency of use modality:

determining a reference scale based on an evaluation perspective of the one or more evaluation perspectives and one or more objectives of the system aspect for an evaluation metric of the one or more evaluation metrics; and evaluating data of the collection of data regarding the evaluation metric with respect to the reference scale to produce an evaluation rating regarding consistency of use of the evaluation metric to support the one or more objectives of the system aspect from the evaluation perspective.

25. The computer readable memory of claim 15, wherein the second memory section further stores operational instructions that, when executed by the computing entity, causes the computing entity to:

determine one or more evaluation viewpoints based on the data analysis parameters.

26. The computer readable memory of claim 25, wherein an evaluation viewpoint of the one or more evaluation viewpoints comprises:

a disclosed data viewpoint;

a discovered data viewpoint; or a desired data viewpoint.

27. The computer readable memory of claim 15, wherein the second memory section further stores operational instructions that, when executed by the computing entity, causes the computing entity to:

determine one or more evaluation categories based on the data analysis parameters.

28. The computer readable memory of claim 27, wherein an evaluation category of the one or more evaluation categories comprises:

an identify category;

a protect category;

a detect category;

a respond category; or a recover category.

* * * * *